US010491057B2

(12) United States Patent
Seki et al.

(10) Patent No.: US 10,491,057 B2
(45) Date of Patent: Nov. 26, 2019

(54) STATOR, BRUSHLESS MOTOR, STATOR MANUFACTURING METHOD

(71) Applicant: ASMO CO., LTD., Kosai, Shizuoka-pref. (JP)

(72) Inventors: Akihiko Seki, Toyokawa (JP); Tetsuji Yoshikawa, Hamamatsu (JP); Yoshihiro Adachi, Hamamatsu (JP); Yukihide Ishino, Hamamatsu (JP); Isoshi Soga, Hamamatsu (JP); Yuji Takemura, Hamamatsu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 194 days.

(21) Appl. No.: 15/420,108

(22) Filed: Jan. 31, 2017

(65) Prior Publication Data

US 2017/0141627 A1 May 18, 2017

Related U.S. Application Data

(62) Division of application No. 13/752,396, filed on Jan. 29, 2013, now abandoned.

(30) Foreign Application Priority Data

Feb. 8, 2012 (JP) ................................ 2012-025297
Feb. 8, 2012 (JP) ................................ 2012-025298
(Continued)

(51) Int. Cl.
*H02K 1/14* (2006.01)
*H02K 15/095* (2006.01)
(Continued)

(52) U.S. Cl.
CPC ............... *H02K 1/148* (2013.01); *H02K 3/18* (2013.01); *H02K 3/28* (2013.01); *H02K 3/345* (2013.01);
(Continued)

(58) Field of Classification Search
CPC ............................ H02K 1/18; H02K 2203/15
(Continued)

(56) References Cited

U.S. PATENT DOCUMENTS 5,828,147 A 10/1998 Best et al.
6,127,753 A 10/2000 Yamazaki et al.
(Continued)

FOREIGN PATENT DOCUMENTS

CN 101188367 A 5/2008
CN 102201708 A 9/2011
(Continued)

OTHER PUBLICATIONS

Japanese Office Action dated Dec. 17, 2013, which was issued in the corresponding Japanese Patent Application No. 2012-025297.
(Continued)

*Primary Examiner* — Burton S Mullins
(74) *Attorney, Agent, or Firm* — Solaris Intellectual Property Group, PLLC

(57) ABSTRACT

A stator includes: plural core configuration sections each including plural yoke configuration sections that configure a ring shaped yoke and are segmented in a yoke circumferential direction and plural teeth sections that project from the respective yoke configuration sections along a yoke radial direction, with the plural yoke configuration sections and the plural teeth sections integrated together; plural coil wires that are wound onto the respective teeth sections to configure plural winding portions; and plural insulators that each include plural insulator portions that are integrated to each
(Continued)

of the respective core configuration sections and insulate between the teeth sections and the winding portions, and a connection portion that connects together the plural insulator portions.

43 Claims, 78 Drawing Sheets

(30) Foreign Application Priority Data

| | | |
|---|---|---|
| Feb. 27, 2012 | (JP) | 2012-040627 |
| Apr. 19, 2012 | (JP) | 2012-095870 |
| Apr. 19, 2012 | (JP) | 2012-095871 |
| Apr. 19, 2012 | (JP) | 2012-095872 |
| Nov. 16, 2012 | (JP) | 2012-252190 |

(51) Int. Cl.

| | |
|---|---|
| ***H02K 3/34*** | (2006.01) |
| ***H02K 3/52*** | (2006.01) |
| ***H02K 3/28*** | (2006.01) |
| ***H02K 15/02*** | (2006.01) |
| ***H02K 3/18*** | (2006.01) |
| ***H02K 15/10*** | (2006.01) |

(52) U.S. Cl.

CPC ............. *H02K 3/522* (2013.01); *H02K 15/02* (2013.01); *H02K 15/022* (2013.01); *H02K 15/095* (2013.01); *H02K 15/10* (2013.01); *H02K 2203/06* (2013.01); *H02K 2203/12* (2013.01); *Y10T 29/49009* (2015.01)

(58) Field of Classification Search

USPC ........................................... 310/216.011, 194

See application file for complete search history.

(56) References Cited

U.S. PATENT DOCUMENTS

| | | | | |
|---|---|---|---|---|
| 6,177,751 | B1 * | 1/2001 | Suzuki | H02K 1/148 310/194 |
| 6,941,644 | B2 | 9/2005 | Shteynberg et al. | |
| 7,026,739 | B2 * | 4/2006 | Okada | H02K 3/522 310/194 |
| 7,116,023 | B2 * | 10/2006 | Wang | H02K 1/148 310/71 |
| 7,126,246 | B2 * | 10/2006 | Izumi | H02K 3/18 310/208 |
| 7,188,403 | B2 * | 3/2007 | Yamamoto | H01R 39/32 29/605 |
| 7,196,443 | B2 * | 3/2007 | Kimura | H02K 3/522 29/596 |
| 7,498,709 | B2 * | 3/2009 | Shteynberg | H02K 15/022 242/445 |
| 7,560,839 | B2 * | 7/2009 | Sumiya | F02M 37/048 310/43 |
| 7,626,303 | B2 * | 12/2009 | Watanabe | H02K 3/522 310/194 |
| 7,663,287 | B2 * | 2/2010 | Haga | H02K 3/325 310/260 |
| 7,679,255 | B2 * | 3/2010 | Evans | H02K 1/148 310/216.066 |
| 7,923,872 | B2 | 4/2011 | Sahara et al. | |
| 8,482,180 | B2 | 7/2013 | Seki et al. | |
| 2001/0013732 | A1 | 8/2001 | Hsu | |
| 2002/0011755 | A1 | 1/2002 | Shteynberg et al. | |
| 2004/0051417 | A1 * | 3/2004 | Yamazaki | H02K 1/148 310/216.009 |
| 2004/0113511 | A1 * | 6/2004 | Schmidt | H02K 1/148 310/216.061 |
| 2004/0164639 | A1 | 8/2004 | Yamamoto et al. | |
| 2004/0263015 | A1 | 12/2004 | Okada et al. | |
| 2005/0099085 | A1 | 5/2005 | Du et al. | |
| 2006/0208605 | A1 | 9/2006 | Aoyama et al. | |
| 2010/0295394 | A1 | 11/2010 | Sahara et al. | |
| 2011/0148245 | A1 | 6/2011 | Wang et al. | |
| 2012/0098381 | A1 * | 4/2012 | Seki | H02K 1/148 310/215 |

FOREIGN PATENT DOCUMENTS

| | | | |
|---|---|---|---|
| CN | 102457149 | A | 5/2012 |
| EP | 1499000 | A1 | 1/2005 |
| EP | 1748534 | A2 | 1/2007 |
| JP | S58-059339 | U | 4/1983 |
| JP | H9-322441 | A | 12/1997 |
| JP | H11-341717 | A | 12/1999 |
| JP | 2000-50581 | A | 2/2000 |
| JP | 2000-201443 | A | 7/2000 |
| JP | 2001-145314 | A | 5/2001 |
| JP | 2003-134716 | A | 5/2003 |
| JP | 2003-250252 | A | 9/2003 |
| JP | 2005-051998 | A | 2/2005 |
| JP | 2006-101661 | A | 4/2006 |
| JP | 2006-166597 | A | 6/2006 |
| JP | 3816783 | B2 | 8/2006 |
| JP | 2006-288080 | A | 10/2006 |
| JP | 2012-75213 | A | 4/2012 |

OTHER PUBLICATIONS

Japanese Office Action dated Jan. 7, 2014, which was issued in the corresponding Japanese Patent Application No. 2012-040627.

Japanese Office Action dated Jan. 7, 2014, which was issued in the corresponding Japanese Patent Application No. 2012-025298.

Japanese Office Action dated Jan. 21, 2014, which was issued in the corresponding Japanese Patent Application No. 2012-095872.

Japanese Office Action dated Sep. 29, 2015, which was issued in the corresponding Japanese Patent Application No. 2012-095870.

Chinese Office Action dated Mar. 10, 2016, which was issued in the corresponding Chinese Patent Application No. 201310049903.4.

Japanese Office Action dated May 10, 2016, which was issued in the corresponding Japanese Patent Application No. 2012-252190.

Chinese Office Action dated Sep. 13, 2016, which was issued in the corresponding Chinese Patent Application No. 201310049903.4.

Non-Final Office Action issued in co-pending U.S. Appl. No. 13/752,396 dated Jun. 23, 2015.

Final Office Action issued in co-pending U.S. Appl. No. 13/752,396 dated Jul. 14, 2016.

Non-Final Office Action issued in co-pending U.S. Appl. No. 13/752,396 dated Nov. 2, 2016.

English language translation of the following: Office action dated Mar. 1, 2017 from the SIPO in a Chinese patent application No. 201310049903.4 corresponding to the instant patent application. This office action translation is submitted now in order to supplement the understanding of the cited reference which is being disclosed in the instant Information Disclosure Statement.

* cited by examiner

STATOR, BRUSHLESS MOTOR, STATOR MANUFACTURING METHOD

CROSS-REFERENCE TO RELATED APPLICATIONS

This application is a divisional application of U.S. application Ser. No. 13/752,396, filed on Jan. 29, 2013, which is based on and claims priority under 35 U.S.C. § 119 from Japanese Patent Application No. 2012-25297, filed on Feb. 8, 2012, Japanese Patent Application No. 2012-25298, filed on Feb. 8, 2012, Japanese Patent Application No. 2012-40627, filed on Feb. 27, 2012, Japanese Patent Application No. 2012-95870, filed on Apr. 19, 2012, Japanese Patent Application No. 2012-95871, filed on Apr. 19, 2012, Japanese Patent Application No. 2012-95872, filed on Apr. 19, 2012, and Japanese Patent Application No. 2012-252190, filed on Nov. 16, 2012. The entire contents of all of the applications identified above are hereby incorporated by reference into this application.

BACKGROUND OF THE INVENTION

Technical Field

The present invention relates to a stator, a brushless motor, and a stator manufacturing method.

Related Art

Known stators employed in a brushless motor are for example disclosed in Japanese Patent Application Laid-Open (JP-A) No. 9-322441. JP-A No. 9-322441 discloses an armature with a yoke configured by plural ring shaped yoke configuration sections segmented along the axial direction. Each of the yoke configuration sections is integrally formed with plural tooth portions that project towards a radial direction outside of the yoke.

As disclosed in Japanese Patent No. 3816783, known stators include a stator core and a pair of insulators mounted to the stator core from both axial direction sides of the stator core.

SUMMARY

However, when the technology of JP-A No. 9-322441 is applied to an armature employed in an inner rotor type rotating machine armature, the plural tooth portions project towards a radial direction inside of each of the yoke configuration portions. It is accordingly difficult to wind a coil from the radial direction outside of each of the yoke configuration portions with the flyer of a flyer machine. The coils need to be wound from the radial direction inside of each of the yoke configuration portions with a nozzle of a nozzle machine. However in such cases, since it is necessary to secure space for passage of the nozzle, it is difficult to achieve a high dense arrangement of the coils, this being disadvantageous in terms of reducing the size of a rotating machine. Moreover, the coil winding speed when employing a nozzle machine is lower than when employing a flyer machine. This is disadvantageous to high-speed coil winding operations, and therefore also disadvantageous to reducing costs resulting by reducing the number of equipment units.

Note that a flyer machine is a device that moves the flyer to circle the periphery of a tooth portion while aligning and winding a coil over the tooth portion with a variable former. A nozzle machine is a device that winds a coil on a tooth portion by repeatedly alternating between a process in which the nozzle circles the periphery of the tooth portion and a process of sliding the nozzle in the axial direction.

Since a stator disclosed in Japanese Patent No. 3816783 is provided with a pair of insulators, the number of components required to assemble the stator is increased.

In consideration of the above circumstances, the present invention is directed towards achieving a more compact and lower cost stator to be employed in a brushless motor.

The present invention is also directed towards providing a stator manufacturing method that can reduce the number of components necessary to assemble the stator.

In order to address the above issues, a stator of a first aspect of the present invention includes: plural core configuration sections each including plural yoke configuration sections that configure a ring shaped yoke and are segmented in a yoke circumferential direction and plural teeth sections that project from the respective yoke configuration sections along a yoke radial direction, with the plural yoke configuration sections and the plural teeth sections integrated together; plural coil wires that are wound onto the respective teeth sections to configure plural winding portions; and plural insulators that each includes plural insulator portions that are integrated to each of the respective core configuration sections and insulate between the teeth sections and the winding portions, and a connection portion that connects together the plural insulator portions.

Due to the configuration described above, the stator is for example manufactured using the following processes. First, the core configuration sections are integrated to the insulator portions of each of the insulators to form sub-assemblies of plural groups. Next, a flyer machine is employed to wind the coil wires onto the respective teeth sections of each of the sub-assemblies from a radial direction outside, forming stator configuration sections for each of the groups. Then, the plural stator configuration sections are assembled together to form the stator. The stator is manufactured by these processes.

In the stator, the yoke is segmented in the yoke circumferential direction and configured from the plural yoke configuration sections. Therefore, even when the stator is employed in a brushless motor in which plural teeth sections project along the yoke radial direction, the sub-assemblies for each of the plural groups are formed as described above, and the coil wires can be wound using a flyer machine onto each of the teeth sections of each of the sub-assemblies from the radial direction outside. There is accordingly no need to secure space between the teeth sections, as is required when a nozzle machine is employed, enabling a higher dense arrangement of the coil wires to be achieved, and enabling a more compact stator to be realized.

Moreover, as described above, the yoke is segmented in the yoke circumferential direction into the plural yoke configuration sections, and so, for example, the stator can be made more compact in the yoke axial direction than in cases in which the yoke is segmented into plural yoke configuration sections in the yoke axial direction.

When a flyer machine is employed, since the winding speed of the coil wires is higher than when using a nozzle machine, the process of winding the coil wires can be speeded up, and accordingly a reduction in cost of the stator can be achieved due to reducing the number of equipment units.

As in a stator of a second aspect of the present invention, the stator of the first aspect is preferably configured wherein the plural coil wires configure plural phases.

A stator of a third aspect of the present invention is the stator of the first aspect or the second aspect wherein: each of the coil wires includes plural crossing wires that connect together the plural winding portions and are laid out at the connection portion; the plural connection portions are disposed with a gap between each other in one direction out of the yoke radial direction, the yoke axial direction, or in a direction that is a combination thereof; and a housing portion is formed to at least one connection portion out of the plural connection portions for housing a member.

According to this stator, the housing portion for housing a member is formed to at least one connection portion out of the plural connection portions that are disposed with a gap between each other in one direction out of the yoke radial direction, the yoke axial direction, or in a direction that is a combination thereof. Interference between the connection portion and the member can accordingly be avoided, enabling the stator to be realized with an even more compact size and lower cost.

A stator of a fourth aspect of the present invention is the stator of any one of the first aspect to the third aspect wherein: each of the coil wires includes plural crossing wires that connect together the plural winding portions and are laid out at at least one of the plural connection portions; and each of the connection portions includes a retaining portion that retains the plural crossing wires laid out at the connection portion.

According to this stator, each of the connection portions includes the retaining portion that retains the plural crossing wires that are laid out at the connection portion. Therefore, for example, the crossing wires can be retained at the connection portions by the retaining portions when forming the stator by assembling together the plural stator configuration sections as described above, and so efficient handling can be achieved when assembling together the plural stator configuration sections. Moreover, even after the stator has been incorporated in a brushless motor, the crossing wires are retained at the connection portions by the retaining portions, and therefore, flapping of the crossing wires can be suppressed, enabling noise and fault occurrence to be suppressed.

A stator of a fifth aspect of the present invention is the stator of any one of the first to the fourth aspects wherein: the plural connection portions are disposed with a gap between each other in the yoke radial direction; and at least one of the plural connection portions includes a spacer provided between the plural connection portions in the yoke radial direction and retaining the plural connection portions in a state separated from each other in the yoke radial direction.

According to this stator, the plural connection portions can be retained in a state separated from each other in the yoke radial direction by the spacer. Space for laying out the crossing wires between the plural connection portions in the yoke radial direction can accordingly be secured, and rattling of the plural connection portions can also be suppressed.

A stator of a sixth aspect of the present invention is the stator of any one of the first to the fourth aspects wherein: the plural connection portions are disposed with a gap between each other in the yoke axial direction; at least one of the plural connection portions includes a spacer provided between the plural connection portions in the yoke axial direction and retaining the plural connection portions in a state separated from each other in the yoke axial direction.

According to this stator, the plural connection portions can be retained in a state separated from each other in the yoke axial direction by the spacer. Space for laying out the crossing wires between the plural connection portions in the yoke axial direction can accordingly be secured, and rattling of the plural connection portions can also be suppressed.

A stator of a seventh aspect of the present invention is the stator of any one of the first to the sixth aspects wherein the plural connection portions are provided coaxially to the yoke.

According to this stator, the connection portions are provided coaxially to the yoke, enabling the structure to be simplified.

A stator of an eighth aspect of the present invention is the stator of the third aspect wherein the member is a crossing wire out of the plural crossing wires, the crossing wire is laid out at the different connection portion form the connection portion having the housing portion.

According to this stator, interference between the connection portions and the crossing wires can thereby be avoided, and so the length of the crossing wires can be suppressed from increasing. The stator can accordingly be made even more compact and at even lower cost.

A stator of a ninth aspect of the present invention is the stator of the fourth aspect wherein the retaining portion is formed in a projection shape.

According to this stator, the retaining portion is formed in a projection shape, enabling the structure to be simplified. Better handling can also be achieved when assembling the plural connection portions together than in cases in which the plural connection portions are fitted together around the entire circumference.

A stator of a tenth aspect of the present invention is the stator of the fifth aspect or the sixth aspect wherein the spacer is formed in a projection shape.

According to this stator, the spacer is formed in a projection shape, enabling the structure to be simplified. Better handling can also be achieved when assembling the plural connection portions together than in cases in which the plural connection portions are fitted together around the entire circumference.

A stator of an eleventh aspect of the present invention is the stator of any one of the first to the tenth aspects wherein the connection portion is positioned further to the yoke radial direction inside than the core configuration section.

According to this stator, the connection portion is positioned further to the yoke radial direction inside than the core configuration section. Interference between the flyer of a flyer machine and the connection portion can accordingly be suppressed when winding the coil wire on the teeth sections from the radial direction outside using the flyer machine.

A stator of a twelfth aspect of the present invention is the stator of any one of the first to the eleventh aspects wherein: the insulator portions of at least one of the plural insulators include insulator main body portions that are integrated to the respective core configuration sections and insulate between the teeth sections and the winding portions, and extending portions that are positioned further to the radial direction inside than the core configuration section and extend from the insulator main body portion in one direction out of the yoke axial direction, the yoke radial direction, or the yoke circumferential direction, or a direction that is a combination thereof; and the connection portion connects together the extending portions of the plural insulator portions.

According to this stator, the extending portions extend from the insulator main body portions that are integrated to the respective core configuration sections in one direction out of the yoke axial direction, the yoke radial direction, or the yoke circumferential direction, or a direction that is a combination thereof, and the extension end portions of the extending portions are connected together by the connection portion. The extending portion is positioned here further to the yoke radial direction inside than the core configuration section. Interference between the flyer of a flyer machine and the extending portion and/or the connection portion can accordingly be suppressed when winding the coil wire on the teeth sections from the radial direction outside using the flyer machine.

A stator of a thirteenth aspect of the present invention is the stator of any one of the first to the twelfth aspects wherein: the insulator portion includes a first insulator portion and a second insulator portion, the first insulator portion and the second insulator portion each including a teeth section insulator portion and a yoke configuration section insulator portion respectively covering the teeth section and the yoke configuration section.

A stator of a fourteenth aspect of the present invention is the stator of any one of the first to the thirteenth aspects further including a terminal station that is provided to each of the plural insulators and that connects to a terminal portion of each of the plural coil wires.

The terminal station is provided to each of the plural insulators, and each of the terminal portions of the plural coil wires is connected to the respective terminal station. Positioning of the terminal portions of the coil wires can accordingly be performed easily.

A stator of a fifteenth aspect of the present invention is the stator of the fourteenth aspect wherein: the connection portion is positioned at the yoke radial direction inside; and a projection portion is formed to an end portion of at least one insulator portion out of the plural insulator portions at an opposite side to a yoke side, the projection portion projecting out to the yoke side with respect to the connection portion; and the terminal station is provided at the projection portion.

According to this stator, the terminal station is provided at the projection portion that projects out to the yoke side with respect to the connection portion. Interference between the terminal station and the connection portion can accordingly be suppressed, and positioning of the terminal portions can accordingly be performed easily.

A stator of a sixteenth aspect of the present invention is the stator of the fifteenth aspect wherein: an insertion groove is formed to the projection portion so as to open towards the yoke axial direction; and the terminal station is inserted into the insertion groove.

According to this stator, the terminal station can be easily fixed to the projection portion by inserting the terminal station into the insertion groove formed to the projection portion.

A stator of a seventeenth aspect of the present invention is the stator of the fifteenth aspect or the sixteenth aspect wherein: the connection portion is disposed displaced in the yoke axial direction with respect to the plural insulator portions; and the terminal station makes contact with a surface on the yoke side of the connection portion.

According to this stator, the terminal station makes contact with a surface on the yoke side of the connection portion, and rattling of the terminal station can accordingly be suppressed.

A stator of an eighteenth aspect of the present invention is the stator of any one of the fourteenth to the seventeenth aspects wherein: each of the plural coil wires includes a crossing wire that connects together the plural winding portions and that is laid out displaced in the yoke axial direction with respect to the insulator portion; and the terminal station is provided on the yoke axial direction opposite side to the crossing wires.

According to this stator, the terminal station is provided on the yoke axial direction opposite side to the crossing wires, enabling the terminal station and a control circuit to be connected together easily at the opposite side to the crossing wires.

A stator of a nineteenth aspect of the present invention is the stator the fourteenth aspect further including a guide portion that is formed along the yoke axial direction at each of the plural insulators, wherein the terminal portion of each of the plural coil wires is guided by the guide portion. Positioning of the terminal portions of the coil wires can accordingly be performed easily.

A stator of a twentieth aspect of the present invention is the stator of the nineteenth aspect wherein the guide portion is provided to a side face of the projection portion.

According to this stator, the guide portion is provided at the projection portion projecting towards the yoke side with respect to the connection portion, thereby enabling interference between the terminal portions and the connection portion to be suppressed, and enabling the terminal portions to be positioned easily.

A stator of a twenty-first aspect of the present invention is the stator of the fourteenth aspect wherein: one of the plural yoke configuration sections is provided with a terminal station that connects to a terminal portion of each of the plural coil wires.

The terminal station is provided to one of the plural yoke configuration sections and the terminal portions of each of the plural coil wires are connected to the terminal station. Positioning of the terminal portions of the coil wires can accordingly be performed easily.

A stator of a twenty-second aspect of the present invention is the stator of any one of the first to the twenty-first aspects further including a second connection portion that is separated in a stator core axial direction from the connection portion, that is formed to at least one insulator out of the plural insulators, and that connects together the plural insulator portions of the at least one insulator.

According to this stator, the second connection portion is formed to at least one insulator out of the plural insulators, and connects together the plural insulator portions of the at least one insulator. The second connection portion accordingly enables the rigidity between the plural insulator portions, and therefore the rigidity of the stator overall after assembly, to be secured.

The second connection portion is separated in the stator core axial direction from the connection portion. The rigidity of the overall stator after assembly can accordingly be secured with good balance.

A stator of a twenty-third aspect of the present invention is the stator of the twenty-second aspect wherein: the connection portion is disposed at a first side in the stator core axial direction; and the second connection portion is formed at the insulator positioned furthest to a second side in the stator core axial direction out of the plural insulators when the plural insulators are in a pre-assembly state arranged along the stator core axial direction.

According to this stator, the second connection portion is formed to the insulator positioned furthest to the stator core axial direction second side out of the plural insulators when the plural insulators are in a pre-assembly state arranged along the stator core axial direction. Accordingly interference of the insulator portions formed to the other insulators with the second connection portion can be avoided when the plural insulators are being assembled along the stator core axial direction.

A stator of a twenty-fourth aspect of the present invention is the stator of the twenty-second aspect wherein: the plural connection portions are disposed coaxially to each other and have different external diameters to each other; and the second connection portion is formed to the insulator with the connection portion of the smallest external diameter out of the plural insulators.

According to this stator, the second connection portion is formed to the insulator with the connection portion of the smallest external diameter out of the plural insulators. Accordingly interference of the insulator portions formed to the other insulators with the second connection portion can be avoided when the other insulators are being assembled from a first stator core axial direction side to the insulator with the first connection portion of the smallest external diameter.

A stator of a twenty-fifth aspect of the present invention is the stator of any one of the twenty-second to the twenty-fourth aspects wherein: the second connection portion connects together the plural extending portions of one of the insulators.

According to this stator, the second connection portion connects together the plural extending portions of one of the insulators. The rigidity between the plural insulator portions can accordingly secured even when each of the insulator portions includes the extending portions extending from the first connection portion.

A stator of a twenty-sixth aspect of the present invention is the stator of any one of the twenty-second to the twenty-fifth aspects wherein the plural insulators have an interlocking structure for positioning with respect to each other, the interlocking structure including: a fitting portion formed at the second connection portion; and a fitted-to portion that fits together with the fitting portion and is formed to an insulator portion positioned between a pair of insulator portions connected by the second connection portion out of the plural insulator portions.

According to this stator, the fitting portion is formed to the second connection portion, and the fitted-to portion is formed to the insulator portion positioned between a pair of insulator portions connected by the second connection portion out of the plural insulator portions. Fitting together of the fitting portion and the fitted-to portion can accordingly be performed easily.

A stator of a twenty-seventh aspect of the present invention is the stator of any one of the twenty-second to the twenty-sixth aspects wherein: the insulator portion includes a first insulator portion and a second insulator portion segmented in the stator core axial direction; the connection portion connects together the plural first insulator portions of each of the insulators; and the second connection portion connects together the plural first insulator portions in one of the insulators.

According to this stator, the plural first insulator portions are connected together by the second connection portion as well as the connection portion in at least one of the plural insulators. The rigidity between the plural first insulator portions, and hence the rigidity of the overall stator after assembly, can accordingly be secured by the second connection portion.

A stator of a twenty-eighth aspect of the present invention is the stator of any one of the twenty-second to the twenty-sixth aspects wherein: the insulator portion includes a first insulator portion and a second insulator portion segmented in the stator core axial direction; the connection portion connects together the plural first insulator portions of each of the insulators; and the second connection portion connects together the plural second insulator portions in one of the insulators.

According to this stator, the plural first insulator portions are connected by the connection portion and the plural second insulator portions are connected by the second connection portion in at least one of the plural insulators. The rigidity between the plural first insulator portions and the rigidity between the plural second insulator portions can accordingly be increased with good balance, and hence the rigidity of the overall stator after assembly can be secured by the connection portion and the second connection portion.

A stator of a twenty-ninth aspect of the present invention is the stator of any one of the first to the twenty-first aspect wherein: the plural insulators have an interlocking structure for positioning with respect to each other; the core configuration portion includes a teeth section extending along the stator core radial direction and a yoke configuration section formed to a leading end portion of the teeth section; the insulator portions each includes a yoke configuration section insulator portion that covers the yoke configuration section; and the interlocking structure includes a fitting portion formed to a first of adjacent of the yoke configuration section insulator portions, and a fitted-to portion that fits together with the fitting portion and is formed to a second of the adjacent yoke configuration section insulator portions.

According to this stator, the fitting portion is formed at the first of the adjacent yoke configuration section insulator portions, and the fitted-to portion is formed to the second of the adjacent yoke configuration section insulator portion. Fitting together of the fitting portions and the fitted-to portions can accordingly be performed easily.

A stator of a thirtieth aspect of the present invention is the stator of any one of the first to the twenty-first aspects further including an interlocking structure that fixes the plural connection portions together.

This stator includes the interlocking structure that fixes the plural connection portions together. The rigidity between the plural connection portions, and hence the rigidity of the overall stator after assembly, can accordingly be secured by fixing together the plural connection portions with the interlocking structure.

A stator of a thirty-first aspect of the present invention is the stator of any one of the first to the thirtieth aspect wherein: plural independently formed groups of stator configuration sections are configured by assembling the plural core configuration sections to the respective plural insulators; in each of the plural stator configuration section groups, the plural core configuration sections are disposed so as to form a gap corresponding to at least one core configuration section between adjacent core configuration sections; the plural stator configuration section groups are disposed such that in a mutually assembled state a core configuration section of another group is disposed in the gap; and each of the plural coil wires is formed continuously from end-to-end and includes a crossing wire that connects together the plural winding portions.

This stator in the configuration described above is for example manufactured using the following processes. Namely, first the core configuration sections are integrated to the insulator portions of each of the insulators, forming a sub-assembly for each of the plural groups. Next, the coil wire is wound on each of the teeth sections of each of the sub-assemblies from the radial direction outside using a flyer machine, forming a stator configuration section for each of the plural groups. Then, the plural stator configuration sections are assembled together to form the stator. The stator is manufactured by the above processes.

In each of the plural stator configuration section groups, the plural core configuration sections are disposed such that a gap corresponding to at least one core configuration section is present between adjacent core configuration sections. Accordingly, as described above, the flyer machine can be suppressed from interfering with the other core configuration sections when winding the coil wire on each of the teeth sections of each of the sub-assemblies from the radial direction outside using a flyer machine.

Moreover, each of the plural coil wires is formed continuously from end-to-end and includes the crossing wire that connects together the plural winding portions laid out along the connection portion. Slackening of the winding portion from the teeth section can accordingly be suppressed.

A stator of a thirty-second aspect of the present invention is the stator of the thirty-first aspect wherein: out of the crossing wires, at least one of the crossing wires connected to a winding start end portion of the winding portion and one of the crossing wires connected to a winding finish end portion of the winding portion cross over at a connection vicinity between the connection portion and the insulator portion.

According to this stator, at least one of the crossing wires connected to the winding start end portion of the winding portion and one of the crossing wires connected to the winding finish end portion of the winding portion cross over at the connection vicinity between the connection portion and the insulator portion. Accordingly, slackening of the winding portion from the teeth section can be even more effectively suppressed.

A stator of a thirty-third aspect of the present invention is the stator of the thirty-second aspect wherein: each of the insulator portions includes an insulator main body portion that is integrated to the core configuration section and insulates between the teeth section and the winding portion, and an extending portion that connects together the insulator main body portion and the connection portion; and a radial direction extension portion is formed to the extending portion so as to extend in a radial direction of the stator configuration section from the connection portion; and an intersection portion between the crossing wire connected to the winding start end portion of the winding portion and the crossing wire connected to the winding finish end portion of the winding portion is disposed at a position that overlaps with the radial direction extension portion as viewed along the stator configuration section axial direction.

According to this stator, the radial direction extending portion that extends in the radial direction of the stator configuration section is formed to the extending portion that connects together the insulator main body portion and the connection portion, and the intersection portion mentioned above is disposed at the position that overlaps with the radial direction extension portion as viewed along the stator configuration section axial direction. Slackening of the winding portion from the teeth section can accordingly be even better suppressed due to the crossing wires mentioned above intersecting in a space secured by the radial direction extension portion.

A stator of a thirty-fourth aspect of the present invention is the stator of the thirty-second aspect wherein: each of the insulator portions includes an insulator main body portion that is integrated to the core configuration section and insulates between the teeth section and the winding portion, and an extending portion that connects together the insulator main body portion and the connection portion; and an axial direction extension portion is formed to the extending portion so as to extend in an axial direction of the stator configuration section from the connection portion; and an intersection portion between the crossing wire connected to the winding start end portion of the winding portion and the crossing wire connected to the winding finish end portion of the winding portion is disposed at a position that overlaps with the axial direction extension portion as viewed along the stator configuration section radial direction.

According to this stator, the axial direction extending portion that extends in the stator configuration section axial direction is formed to the extending portion that connects together the insulator main body portion and the connection portion, and the intersection portion mentioned above is disposed at the position that overlaps with the axial direction extension portion as viewed along the stator configuration section radial direction. Slackening of the winding portion from the teeth section can accordingly be even better suppressed due to the crossing wires mentioned above intersecting in a space secured by the axial direction extension portion.

A stator of a thirty-fifth aspect of the present invention is the stator of any one of the first to the thirty-fourth aspects wherein the teeth section projects from the yoke configuration section towards the yoke radial direction inside.

Accordingly, even when the teeth section projects from the yoke configuration section towards the yoke radial direction inside, the coil wire can be wound on each of the teeth sections of each of the sub-assemblies from the radial direction outside using a coil wire winding machine due to the yoke being configured by the plural yoke configuration sections segmented in the yoke circumferential direction.

A stator of a thirty-sixth aspect of the present invention is the stator of any one of the first to the thirty-fifth aspects wherein: the insulator portion includes an extension side wall portion that extends along an axial direction of the stator configuration section; and in each of the plural stator configuration section groups, with respect to an imaginary line extending in a tangential direction to the stator configuration section so as to pass through the extension side wall portion, an end in the circumferential direction of the yoke configuration section of a first core configuration section is positioned so as to be on the opposite side to a second core configuration section disposed adjacent to the first core configuration section with the imaginary line being disposed between the first and second core configuration sections.

According to this stator, in each of the plural stator configuration section groups, with respect to the imaginary line extending in a tangential direction to the stator configuration section so as to pass through the extension side wall portion, the end in the circumferential direction of the yoke configuration section of the first core configuration section is positioned so as to be on the opposite side to the second core configuration section adjacent to the first core configuration section with the imaginary line being disposed between the first and the second core configuration sections. Accordingly, as described above, even when a coil wire winding machine is employed to wind the coil wire on each of the teeth sections of each of the sub-assemblies from the radial direction outside, the coil wire winding machine can be suppressed from interfering with other core configuration sections, and in particular, with the yoke configuration section circumferential direction ends thereof.

A stator of a thirty-seventh aspect of the present invention is the stator of any one of the first to the thirty-fourth aspects, wherein the plural teeth sections project from the yoke configuration section towards the yoke radial direction outside.

Accordingly, since the interval between leading end portions of the adjacent e teeth sections can be secured when the teeth sections project from the yoke configuration section towards the yoke radial direction outside, a coil wire winding machine can be employed to wind the coil wire on each of the teeth sections from the radial direction outside.

A stator of a thirty-eighth aspect of the present invention is the stator of the thirty-seventh aspect, wherein adjacent yoke configuration sections are fitted together with recess and protrusion shaped fitting portions.

The rigidity of the yoke can accordingly be raised when the adjacent yoke configuration sections are fitted together with recess and protrusion shaped fitting portions.

A stator of a thirty-ninth aspect of the present invention is the stator of any one of the thirty-fifth to the thirty-eighth aspects, wherein the winding portions are compression deformed by pressing.

According to this stator, the winding portions are compression deformed by pressing. Bulging of the winding portions can accordingly be suppressed, and high dense arrangement of the coil wires can be achieved, and space for pressing operation by a press can be secured.

A stator of a fortieth aspect of the present invention is the stator of any one of the thirty-fifth to the thirty-ninth aspects wherein: each of the plural stator configuration section groups is configured by a combination of mutually different phases; in each of the stator configuration sections the plural teeth sections are disposed at even intervals from each other; and out of the plural winding portions, a pair of winding portions that face each other across a stator configuration section axis are formed from the same coil wire and are formed by winding in reverse directions to each other.

According to this stator, in each of the stator configuration sections, the plural teeth sections are disposed at even intervals from each other, so the intervals between the plural teeth sections can be respectively secured. The coil wire can accordingly be easily wound on the teeth sections.

A stator of a forty-first aspect of the present invention is the stator of the fortieth aspect wherein: a winding portion wound in a loosening direction on the teeth section out of the pair of winding portions and a crossing wire between the pair of winding portions are connected together by a lead portion that is led out from the teeth section; a protrusion portion to which the lead portion is anchored is formed to the insulator; and the winding portion wound in a loosening direction on the teeth section out of the pair of winding portions is restricted from slackening by the lead portion being anchored to the protrusion portion.

According to this stator, the winding portion wound in the loosening direction on the teeth section is restricted from slackening by the lead portion anchoring to the protrusion portion. Accordingly, slackening of the winding portion wound on the teeth section in the loosening direction can be suppressed.

A brushless motor of a forty-second aspect of the present invention includes the stator according to any one of the first to the forty-first aspects and a rotor that rotates in a rotational magnetic field generated by the stator.

According to this brushless motor, a compact size and low cost can be realized by employing the stator of any one of the first to the forty-first aspects A forty-third aspect of the present invention is a manufacturing method of the stator of any one of the first to the fortieth aspects including: a sub-assembly forming process in which the core configuration sections are integrated to the insulator portions of each of the insulators to form a sub-assembly for each of plural groups; a stator configuration section forming process in which the stator configuration sections are formed for each of the plural groups by winding the coil wire on each of the teeth sections of each of the sub-assemblies from a radial direction outside of the stator configuration section using a coil wire winding machine; and a stator forming process that forms a stator by assembling the plural stator configuration sections together.

According to this stator manufacturing method, the sub-assemblies are formed for each of the plural groups, and the coil wire is wound on each of the teeth sections of each of the sub-assemblies from the radial direction outside of the stator configuration section using the coil wire winding machine. There is accordingly no need to secure space between the teeth sections, as would be required when employing a nozzle machine. High dense arrangement of the coil wire is accordingly possible, and a compact size can be achieved for the stator.

Moreover, the sub-assemblies are formed for each of the plural groups, and the coil wire is wound on each of the teeth sections of each of the sub-assemblies from a radial direction outside. An increased speed in the coil wire winding process is accordingly realized, and therefore a reduction in cost of the stator can be realized due to a reduction in the number of equipment units.

A stator manufacturing method of a forty-fourth aspect of the present invention is the stator manufacturing method of the forty-third aspect further including: between the stator configuration section forming process and the stator forming process, a compression process that presses and compression deforms the winding portions in each of the plural stator configuration section groups.

According to this stator manufacturing method, the winding portions are pressed and compression deformed in the compression process. Bulging of the winding portions can accordingly be suppressed, and high dense arrangement of the coil wires can be achieved, and space for the pressing operation by a press can be secured.

A stator manufacturing method of a forty-fifth aspect of the present invention is the stator manufacturing method of the forty-fourth aspect, wherein in the compression process the winding portions are pressed from a direction orthogonal to a teeth section axial direction.

According to this stator manufacturing method, in the compression process the winding portions are pressed from a direction orthogonal to the teeth section axial direction. Bulging of the winding portions can accordingly be further suppressed, and high dense arrangement of the coil wires can be achieved.

A stator manufacturing method of a forty-sixth aspect of the present invention is the stator manufacturing method of the forty-fourth aspect or the forty-fifth aspect, wherein in the compression process the winding portions are pressed from both sides of the direction orthogonal to the teeth section axial direction.

According to this stator manufacturing method, in the compression process, the winding portions are pressed from both sides of the direction orthogonal to the teeth section axial direction. The winding portions can accordingly be further compression deformed.

A stator manufacturing method of a forty-seventh aspect of the present invention is the stator manufacturing method of the forty-fourth aspect, wherein in the compression process the winding portions are pressed such that the pressing direction on the winding portions is a tangential direction to the respective stator configuration sections.

According to this stator manufacturing method, in the compression process the winding portions are pressed such that the pressing direction on the winding portions is a tangential direction to the respective stator configuration sections. In each of the plural stator configuration section groups here, the plural core configuration sections are disposed such that at least a gap corresponding to one stator configuration section is present between adjacent of the plural core configuration sections. The winding portions can accordingly be pressed whilst still suppressing interference between the press and the core configuration sections.

A stator manufacturing method of a forty-eighth aspect of the present invention includes: an installation and cutoff process that employs an insulator in which plural first insulator portions, second insulator portions, and bridging sections have been integrated together and each of the bridging sections connect together the first insulator portions and the second insulator portions, that installs a core configuration section for forming a stator core to one portion out of the first insulator portion and the second insulator portion, and that cuts off the bridging section; a positional alignment process that performs positional alignment between the other portion out of the first insulator portion and the second insulator portion and the core configuration section by moving at least one portion out of the first insulator portion and the second insulator portion with respect to the other portion; an installation process that installs the other portion out of the first insulator portion and the second insulator portion to the core configuration section; and a coil wire winding process that forms a coil wire winding portion with a coil wire on the core configuration section by winding the coil wire on the core configuration section with the first insulator portion and the second insulator portion interposed therebetween.

According to this stator manufacturing method, an insulator is employed in which the plural first insulator portions, second insulator portions, and bridging sections have been integrated together and the bridging sections connect together the first insulator portions and the second insulator portions. A reduction in the number of components required for stator assembly can hence be achieved in comparison to cases in which an insulator is employed wherein the first insulator portions and the second insulator portions are formed separately.

A stator manufacturing method of a forty-ninth aspect of the present invention is the stator manufacturing method of the forty-eighth aspect, wherein in the installation and cutoff process, the bridging section is cut off after the core configuration section has been installed to the one portion out of the first insulator portion and the second insulator portion.

According to this stator manufacturing method, in the installation and cutoff process, the bridging section is cut off after the core configuration section has been installed to the one portion out of the first insulator portion and the second insulator portion. Accordingly, for example when installing the core configuration section to the one portion out of the first insulator portion and the second insulator portion, the entire insulator including the first insulator portion and the second insulator portion can be set in a jig in one operation when the insulator is set in a jig. A reduction in the number of processes for setting the insulator in the jig can accordingly be achieved in comparison to cases in which the bridging portion is cut off before the core configuration section has been installed to the one portion out of the first insulator portion and the second insulator portion.

A stator manufacturing method of a fiftieth aspect of the present invention is the stator manufacturing method of the forty-eighth aspect or the forty-ninth aspect wherein, as the insulator, the first insulator portion and the second insulator portion each respectively include a teeth section insulator portion and a yoke configuration section insulator portion that respectively cover a teeth section and a yoke configuration section formed to the core configuration section, and the bridging section connects together the yoke configuration section insulator portions of the first insulator portion and the second insulator portion.

The teeth section of the core configuration section is a location at which the coil wire is wound to form a coil wire winding portion. Moreover, for example a guide portion that guides the terminal portion of the coil wire is formed at a base end side of the teeth section of the core configuration section.

With regards to this point, according to this stator manufacturing method, the bridging section is employed in the insulator to connect together the yoke configuration section insulator portions of the first insulator portions and the second insulator portions. Accordingly, it is possible to suppress the bridging section provided to cause adverse influence to for example the coil wire winding portion and the guide portion.

BRIEF DESCRIPTION OF THE DRAWINGS

Embodiments of the present invention will be described in detail based on the following figures, wherein.

DESCRIPTION

First Exemplary Embodiment of the Present Invention

Explanation first follows regarding a first exemplary embodiment of the present invention, with reference to FIG. 1 to FIG. 4.

Figure 1:
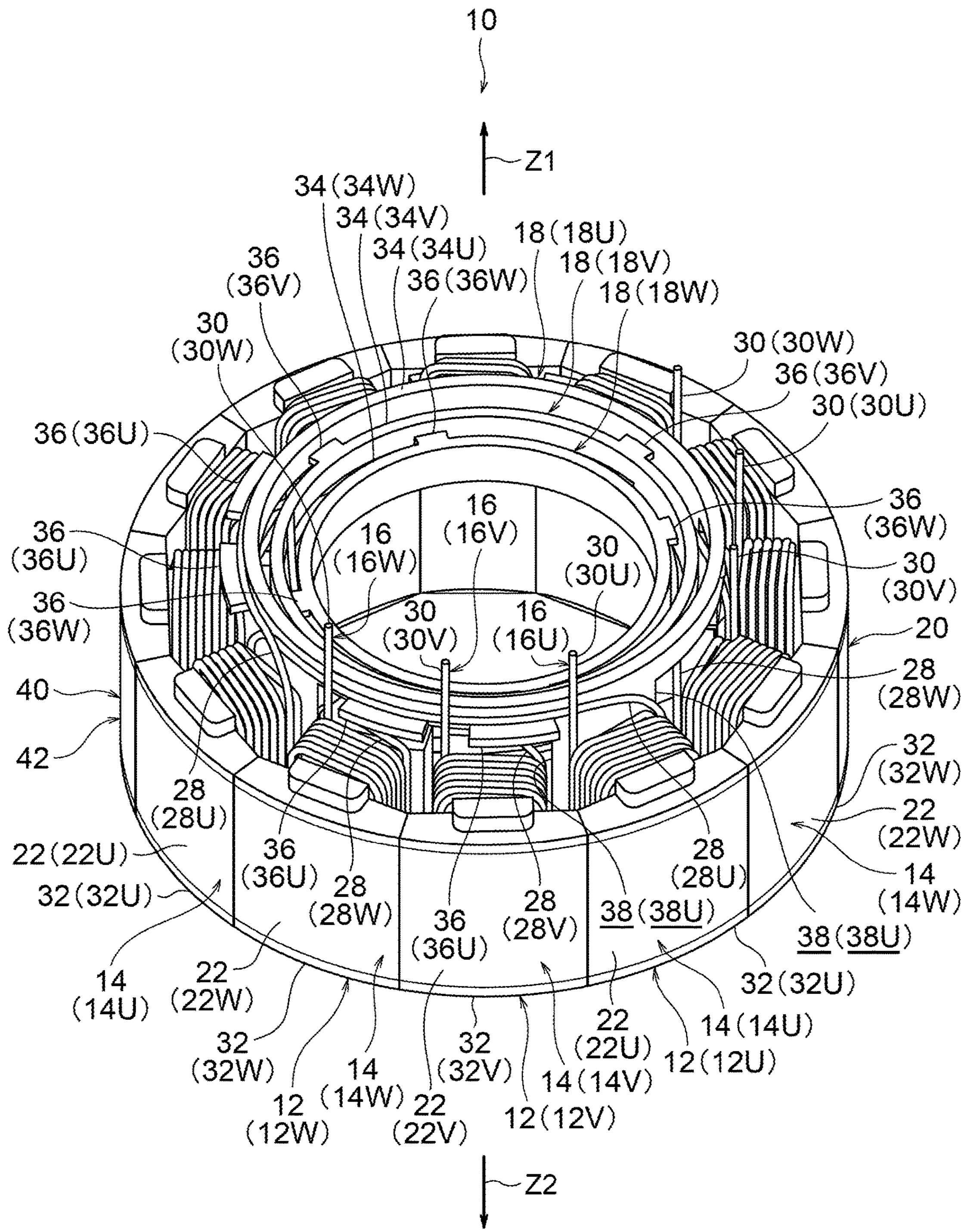
FIG. 1 is a perspective view illustrating a stator according to a first exemplary embodiment of the present invention.
Figure 2A:
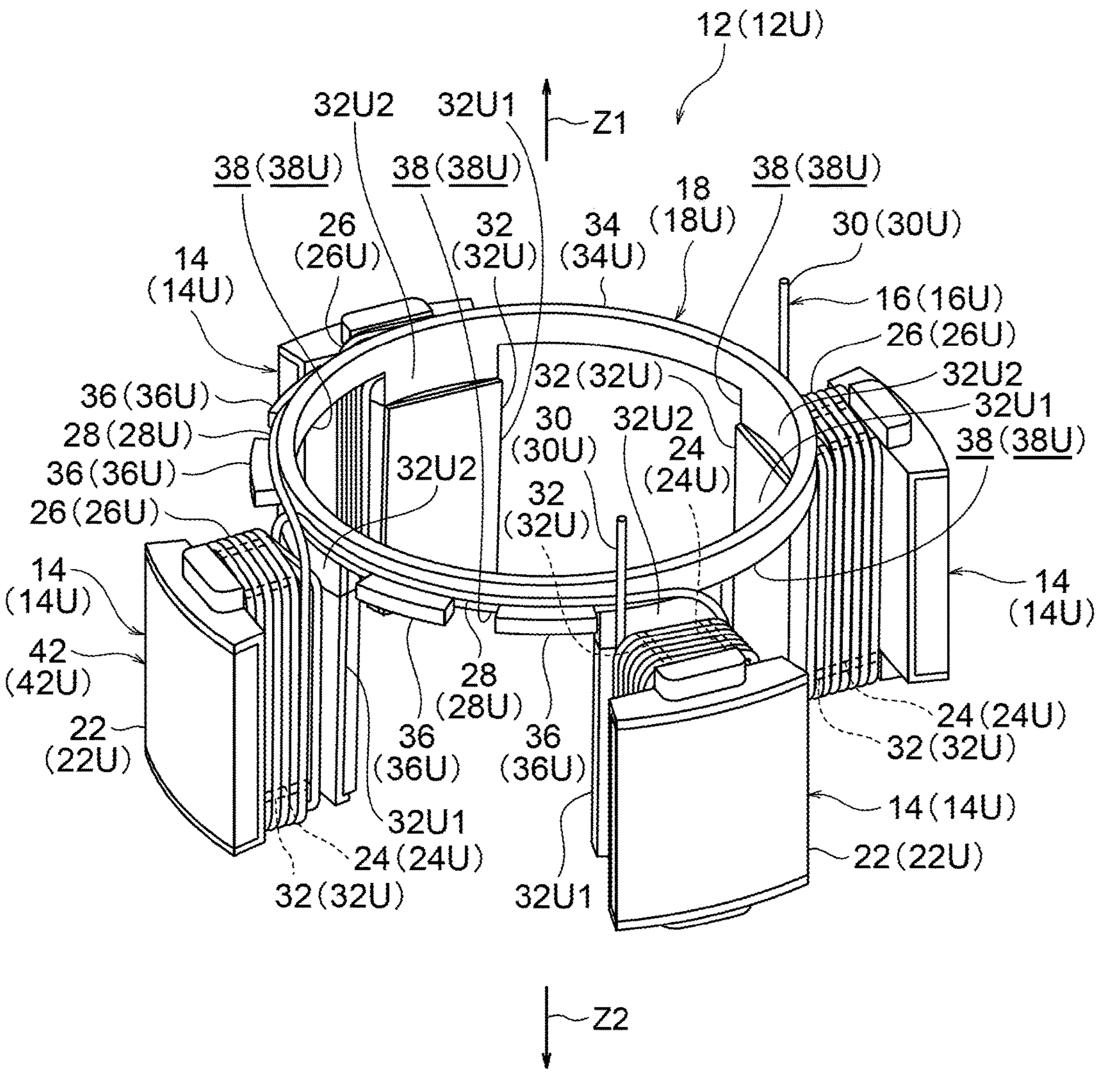
FIG. 2A is a perspective view illustrating a U-phase stator configuration section illustrated in FIG. 1.
Figure 2B:
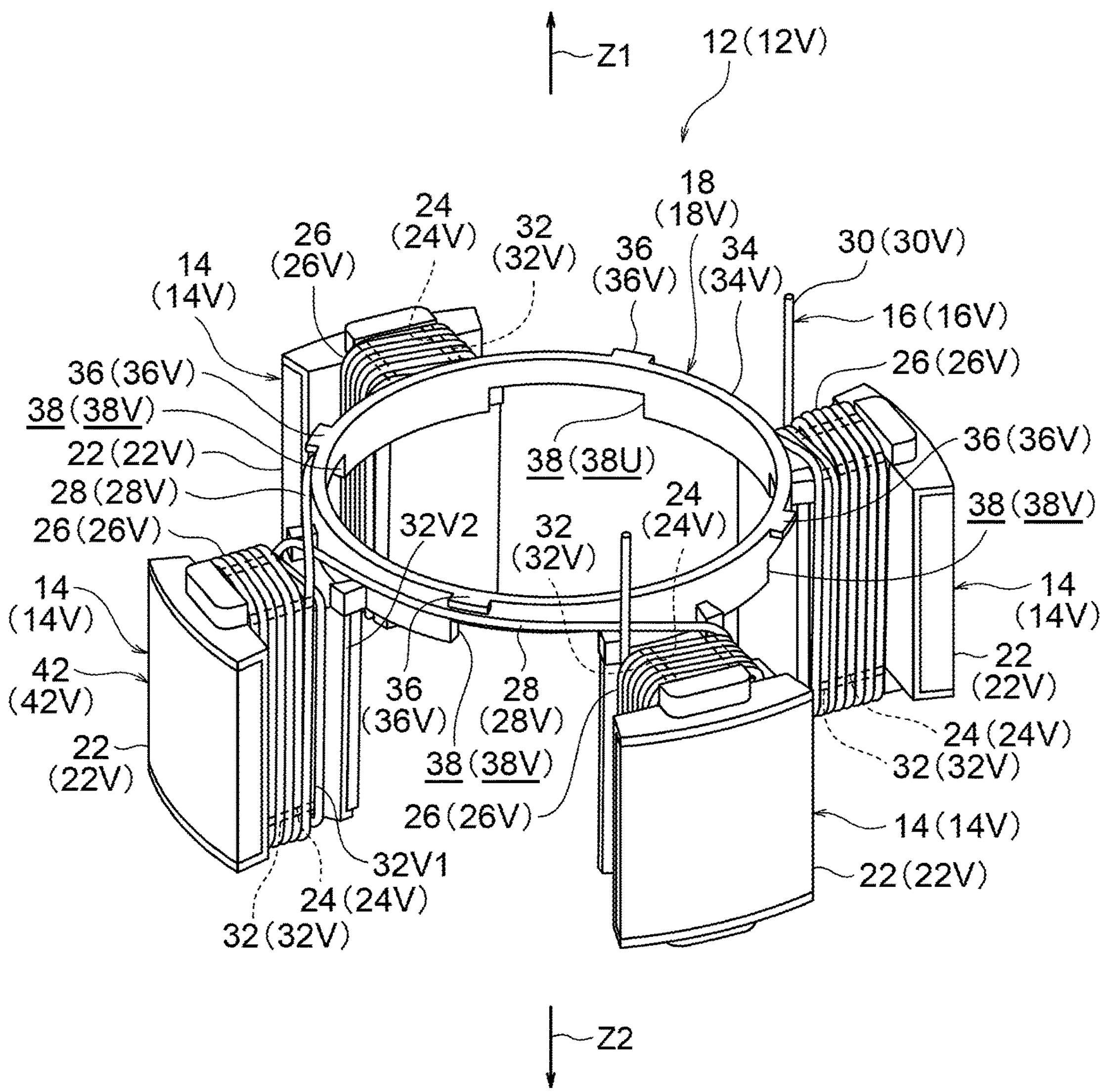
FIG. 2B is a perspective view illustrating a V-phase stator configuration section illustrated in FIG. 1.
Figure 2C:
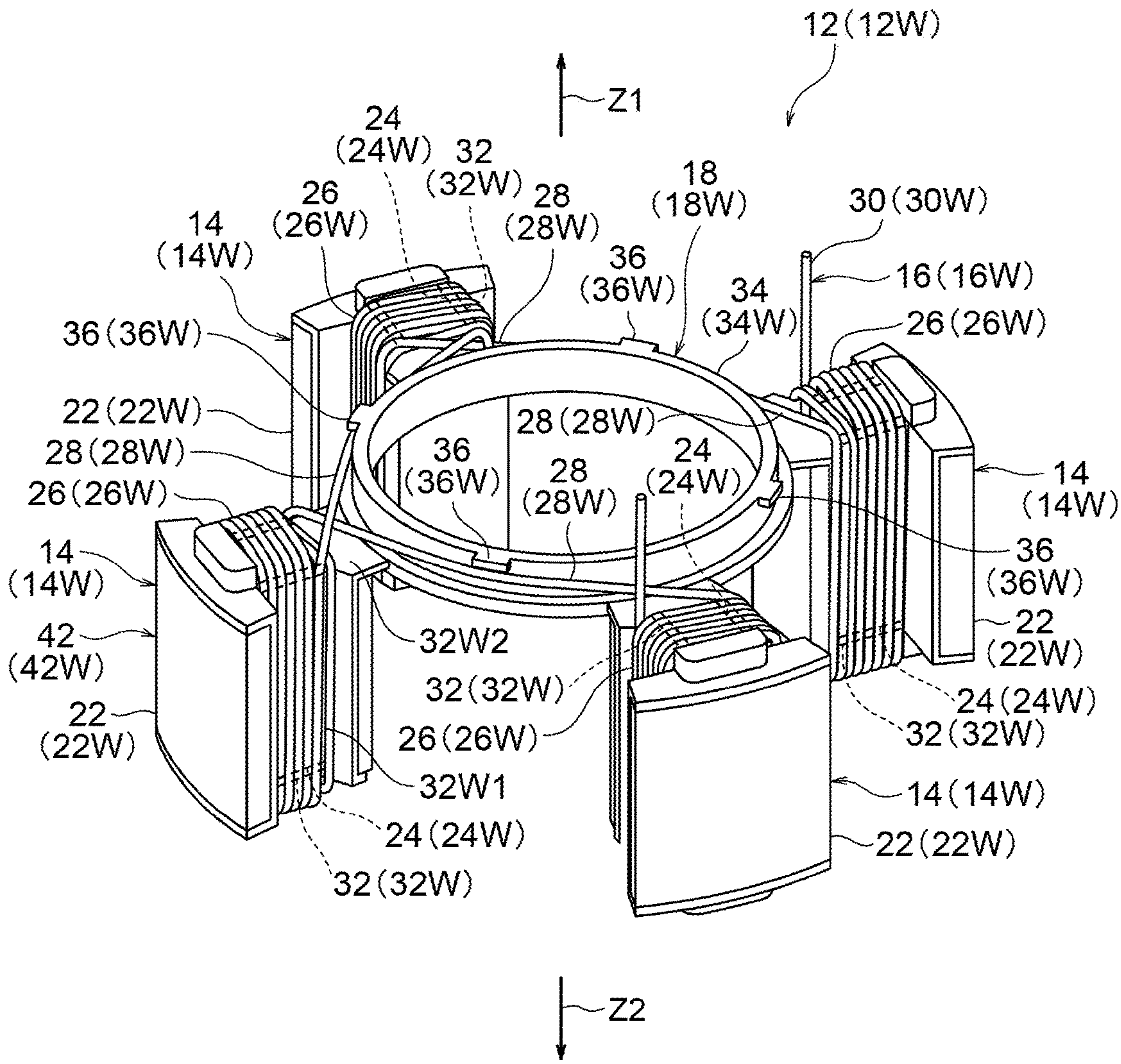
FIG. 2C is a perspective view illustrating a W-phase stator configuration section illustrated in FIG. 1.

A stator 10 according to the first exemplary embodiment illustrated in FIG. 1 is a stator employed in an inner rotor type brushless motor, and is configured including a U-phase stator configuration section 12U, a V-phase stator configuration section 12V and a W-phase stator configuration section 12W, as illustrated in FIG. 2A to FIG. 2C.

As illustrated in FIG. 2A, the U-phase stator configuration section 12U is configured with plural core configuration sections 14U, a coil wire 16U, and an insulator 18U. The plural core configuration sections 14U configure a core 20, together with plural V-phase core configuration sections 14V and plural W-phase core configuration sections 14W, described later (see FIG. 1 for each). The core configuration sections 14U respectively include plural yoke configuration sections 22U and plural teeth sections 24U.

The plural yoke configuration sections 22U configure a ring shaped yoke 40, together with V-phase yoke configuration sections 22V and W-phase yoke configuration sections 22W, described later (see FIG. 1 for each), and are respectively circular arc shaped. The plural teeth sections 24U are integrally formed to the respective yoke configuration sections 22U, and project from the yoke configuration sections 22U towards a radial direction inside from the yoke 40 (see FIG. 1).

The coil wire 16U configures the U-phase and includes plural winding portions 26U and plural crossing wires 28U. The plural winding portions 26U are wound concentrically on the teeth sections 24U, with insulator portions 32U, described later, disposed therebetween. The winding portions 26U are mutually connected to each other by the plural crossing wires 28U. The crossing wires 28U are connected to the plural winding portions 26U and are laid (wound) around the outer peripheral face of a connection portion 34U formed to the insulator 18U, described later. Terminal portions 30U at both end sides of the coil wire 16U lead out from the teeth sections 24U to a first axial direction side (the arrow Z1 side) of the stator 10. The crossing wires 28U are positioned on the same side in a first axial direction as the terminal portions 30U.

The insulator 18U is made from a resin, and includes integral plural insulator portions 32U and the connection portion 34U. The number of plural insulator portions 32U provided is the same as the number of the plural teeth sections 24U mentioned above. The plural insulator portions 32U project out on a yoke configuration sections 22U side (a yoke 40 side in FIG. 1) with respect to the connection portion 34U, described later. Each of the plural insulator portions 32U includes an insulator main body portion 32U1 and an extending portion 32U2. The insulator main body portions 32U1 are integrated to respective surfaces of the plural core configuration sections 14U mentioned above, for example by integral molding or interlock mounting. The insulator main body portions 32U1 insulate between the teeth sections 24U formed to the core configuration sections 14U and the winding portions 26U. The extending portions 32U2 are positioned further to the radial direction inside than the core configuration sections 14U, and extend from the insulator main body portion 32U1 to the first axial direction side (the arrow Z1 side) of the yoke 40.

The connection portion 34U is disposed displaced with respect to the plural insulator portions 32U at the yoke 40 first axial direction side (the arrow Z1 side) and is formed in a ring shape. The connection portion 34U connects together the plural insulator portions 32U (or more specifically, extension end portions (end portions on the Z1 side) of the extending portions 32U2 in the plural insulator portions 32U), and is positioned further to the yoke 40 radial direction inside (the radial direction inside of the yoke 40 illustrated in FIG. 1) than the core configuration sections 14U. Plural projection shaped retaining portions 36U project out towards a radial direction outside from between the plural insulator portions 32U on the outer peripheral face of the connection portion 34U. The retaining portions 36U retain the crossing wires 28U mentioned above from a second axial direction side (arrow Z2 side) of the connection portion 34U. Plural notches 38U opening towards the second axial direction side (arrow Z2 side) are formed to the connection portion 34U between the plural insulator portions 32U.

The V-phase stator configuration section 12V illustrated in FIG. 2B has basically the same configuration as the U-phase stator configuration section 12U mentioned above. Namely, the V-phase stator configuration section 12V is configured including the plural V-phase yoke configuration sections 22V, plural teeth sections 24V, a coil wire 16V and an insulator 18V. The plural yoke configuration sections 22V, the plural teeth sections 24V, the coil wire 16V and the insulator 18V correspond to the above mentioned plural yoke configuration sections 22U, the plural teeth sections 24U, the coil wire 16U and the insulator 18U (see FIG. 2A for each). Note that in the V-phase stator configuration section 12V, a connection portion 34V is formed in a ring shape, and formed with a smaller diameter than the U-phase connection portion 34U mentioned above (see FIG. 2A). Moreover, retaining portions 36V retain the crossing wires 28V from the first axial direction side (the arrow Z1 side) of the connection portion 34V, and are positioned further to the radial direction inside than the core configuration sections 14V.

Moreover, each of the plural insulator portions 32V includes an insulator main body portion 32V1 and an extending portion 32V2. The insulator main body portions 32V1 are integrated to respective surfaces of the plural core configuration sections 14V mentioned above, for example by integral molding or interlock mounting. The insulator main body portions 32V1 insulate between the teeth sections 24V formed to the core configuration sections 14V and the winding portions 26V. The extending portions 32V2 are positioned further to the radial direction inside than the core configuration sections 14V, and extend along a yoke 40 circumferential direction from the insulator main body portions 32V1. The connection portion 34V is provided at the first axial direction side (the arrow Z1 side) of the plural insulator portions 32V. The connection portion 34V is formed in a ring shape, connects together the plural insulator portions 32V, and is positioned further to the radial direction inside than the core configuration sections 14V.

The W-phase stator configuration section 12W illustrated in FIG. 2C has basically the same configuration as the U-phase stator configuration section 12U mentioned above. Namely, the W-phase stator configuration section 12W is configured including the plural W-phase yoke configuration sections 22W, plural teeth sections 24W, a coil wire 16W and an insulator 18W. The plural yoke configuration sections 22W, the plural teeth sections 24W, the coil wire 16W and the insulator 18W correspond to the above mentioned plural yoke configuration sections 22U, the plural teeth sections 24U, the coil wire 16U and the insulator 18U (see FIG. 2A for each). Note that in the W-phase stator configuration section 12W, a connection portion 34W is formed in a ring shape, and formed with a smaller diameter than the V-phase connection portion 34V mentioned above (see FIG. 2B). The above mentioned notches (see the notches 38U in FIG. 2A) are omitted from the connection portion 34W. Moreover, retaining portions 36W retain the crossing wires 28W from the first axial direction side (the arrow Z1 side) of the connection portion 34W, and are positioned further to the radial direction inside than the core configuration sections 14W.

Moreover, each of the plural insulator portions 32W includes an insulator main body portion 32W1 and an extending portion 32W2. The insulator main body portions 32W1 are integrated to respective surfaces of the plural core configuration sections 14W mentioned above, for example by integral molding or interlock mounting. The insulator main body portions 32W1 insulate between the teeth sections 24W formed to the core configuration sections 14W and the winding portions 26W. The extending portions 32W2 are positioned further to the radial direction inside than the core configuration sections 14W, and extend from the insulator main body portions 32W1 towards a radial direction inside of the yoke 40. The connection portion 34W is provided at the first axial direction side (the arrow Z1 side) of the plural insulator portions 32W. The connection portion 34W is formed in a ring shape, connects together the plural insulator portions 32W (or more specifically, extension end portions (end portions on the radial direction inside) of the extending portions 32W2 in the plural insulator portions 32W), and is positioned further to the radial direction inside than the core configuration sections 14W.

As illustrated in FIG. 1, the plural stator configuration sections 12U, 12V, 12W are, as explained in detail later, assembled together to configure the stator 10. Moreover, in the stator 10, the ring shaped yoke 40 is configured by the plural yoke configuration sections 22U, 22V, 22W. In other words, the yoke 40 is segmented in the circumferential direction into the plural yoke configuration sections 22U, 22V, 22W. Each of the plural yoke configuration sections 22U, 22V, 22W is fitted between a respective pair of yoke configuration sections adjacent on both sides.

The plural connection portions 34U, 34V, 34W are disposed at the radial direction inside of the yoke 40. The plural connection portions 34U, 34V, 34W are disposed such that there are gaps present therebetween in the yoke 40 radial direction and axial direction, and are provided coaxially to the yoke 40. The V-phase retaining portions 36V are fitted against an inner peripheral face of the U-phase connection portion 34U, and the W-phase retaining portions 36W are fitted against an inner peripheral face of the V-phase connection portion 34V. The plural connection portions 34U, 34V, 34W are thus retained in a state separated from each other in the radial direction. Namely, the retaining portions 36U, 36V, 36W are provided between the plural connection portions 34U, 34V, 34W in the radial direction, and serve as projection shaped spacers to retain the plural connection portions 34U, 34V, 34W in a state separated from each other in the radial direction.

Moreover, as mentioned above, in the state in which the plural connection portions 34U, 34V, 34W are disposed such that gaps are present therebetween in the yoke 40 radial direction, the V-phase crossing wires 28V pass through inside the notches 38U formed at the U-phase connection portion 34U (are housed inside the notches 38U), and the W-phase crossing wires 28W pass through inside the notches 38U formed at the U-phase connection portion 34U and inside the notches 38V formed at the V-phase connection portion 34V (are housed inside the notches 38U and the notches 38V (see FIG. 3B)). The notches 38U, 38V are examples of a housing portion of the present invention.

Figure 4:
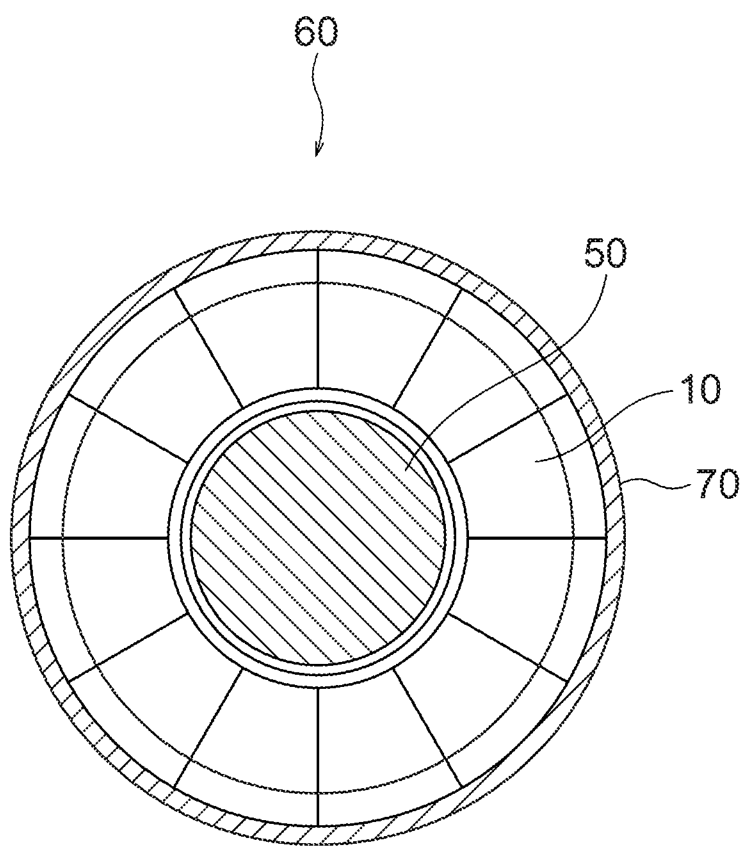
FIG. 4 is a cross-section illustrating a schematic configuration of a brushless motor provided with the stator illustrated in FIG. 1.

As illustrated in FIG. 4, the stator 10 configured as described above configures an inner rotor type brushless motor 60, together with a rotor 50 and a housing 70. Configuration in the brushless motor 60 is such that a rotational magnetic field is formed by the stator 10, and the rotor 50 is rotated thereby. Note that the brushless motor 60 is for example an 8-pole 12 slot motor.

Explanation follows regarding a manufacturing method of the stator 10 configured as described above.

First, as illustrated in FIG. 2A, the core configuration sections 14U are integrated to the insulator portions 32U of the insulator 18U to form a U-phase sub-assembly 42U configured from the insulator 18U and the plural core configuration sections 14U. Similarly, as illustrated in FIG. 2B, the core configuration sections 14V are integrated to the insulator portions 32V of the insulator 18V to form a V-phase sub-assembly 42V configured from the insulator 18V and the plural core configuration sections 14V. Moreover, as illustrated in FIG. 2C, the core configuration sections 14W are integrated to the insulator portions 32W of the insulator 18W to form a W-phase sub-assembly 42W configured from the insulator 18W and the plural core configuration sections 14W. The sub-assemblies 42U, 42V, 42W are thus formed for each of the U-phase, the V-phase and the W-phase (the sub-assembly forming process).

Figure 5:
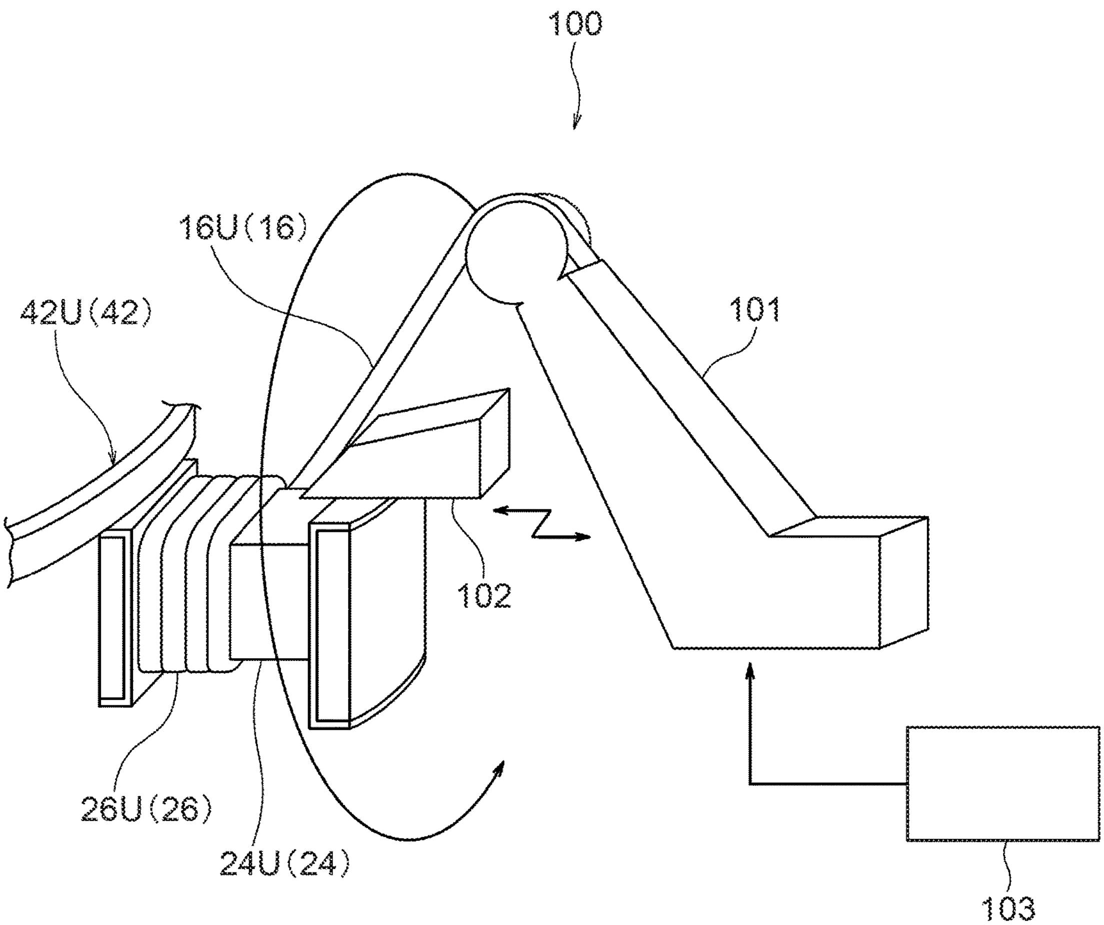
FIG. 5 is a drawing to explain winding of a coil wire by a flyer machine.

Next, as illustrated in FIG. 2A, a flyer machine 100 (see FIG. 5) is employed to wind the coil wire 16U on each of the teeth sections 24U of the U-phase sub-assembly 42U from the radial direction outside, forming the U-phase stator configuration section 12U with plural winding portions 26U formed at the sub-assembly 42U. Note that the flyer machine 100 is, as illustrated in FIG. 5, configured including a flyer 101 that winds the coil wires 16 in a circular motion so as to circle the periphery of each of the teeth sections 24, a variable former 102 that aligns the coil wires 16 wound onto the teeth sections 24, and a drive circuit 103 that controls the flyer 101 and the variable former 102.

Similarly, as illustrated in FIG. 2B, the flyer machine 100 mentioned above is employed to wind the coil wire 16V on each of the teeth sections 24V of the V-phase sub-assembly 42V from the radial direction outside, forming the V-phase stator configuration section 12V with plural winding portions 26V formed at the sub-assembly 42V. Moreover, as illustrated in FIG. 2C, the flyer machine 100 mentioned above is employed to wind the coil wire 16W on each of the teeth sections 24W of the W-phase sub-assembly 42W from the radial direction outside, forming the W-phase stator configuration section 12W with plural winding portions 26W formed on the sub-assembly 42W.

When this is performed, as illustrated in FIG. 2A, the plural crossing wires 28U are laid out along the outer peripheral face of the connection portion 34U. The plural crossing wires 28U are also retained from the second axial direction side (arrow Z2 side) of the connection portion 34U by the projection shaped retaining portions 36U. Similarly, as illustrated in FIG. 2B, the plural crossing wires 28V are laid out along the outer peripheral face of the connection portion 34V. The plural crossing wires 28V are also retained from the first axial direction side (the arrow Z1 side) of the connection portion 34V by the projection shaped retaining portions 36V. Moreover, as illustrated in FIG. 2C, the plural crossing wires 28W are laid out along the outer peripheral face of the connection portion 34W. The plural crossing wires 28W are also retained from the connection portion 34W from the first axial direction side (the arrow Z1 side) by the projection shaped retaining portions 36W.

Moreover, as illustrated in FIG. 2A, the terminal portions 30U at the two end sides of the coil wire 16U are led out from the teeth sections 24U to the first axial direction side (the arrow Z1 side) of the stator 10. Similarly, as illustrated in FIG. 2B, the terminal portions 30V at the two end sides of the coil wire 16V are led out from the teeth sections 24V towards the first axial direction side of the stator 10. Moreover, as illustrated in FIG. 2C, the terminal portions 30W at the two end sides of the coil wire 16W are led out from the teeth sections 24W towards the first axial direction side of the stator 10. The stator configuration sections 12U, 12V, 12W are thus formed for each of the U-phase, the V-phase and the W-phase (the stator configuration section forming process).

Figure 3A:
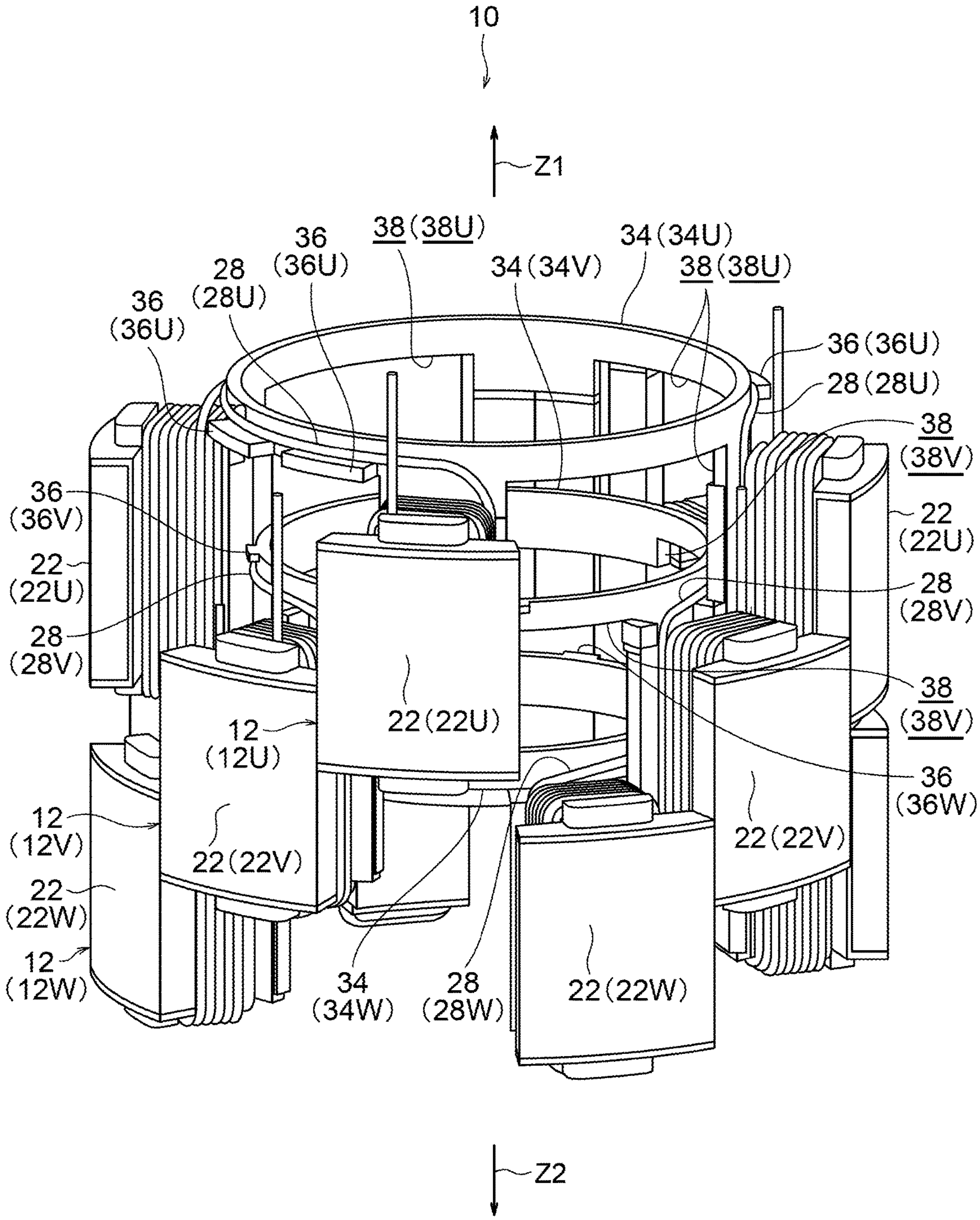
FIG. 3A is a perspective view illustrating a process in which the plural stator configuration sections illustrated in FIG. 1 are being assembled together.
Figure 3B:
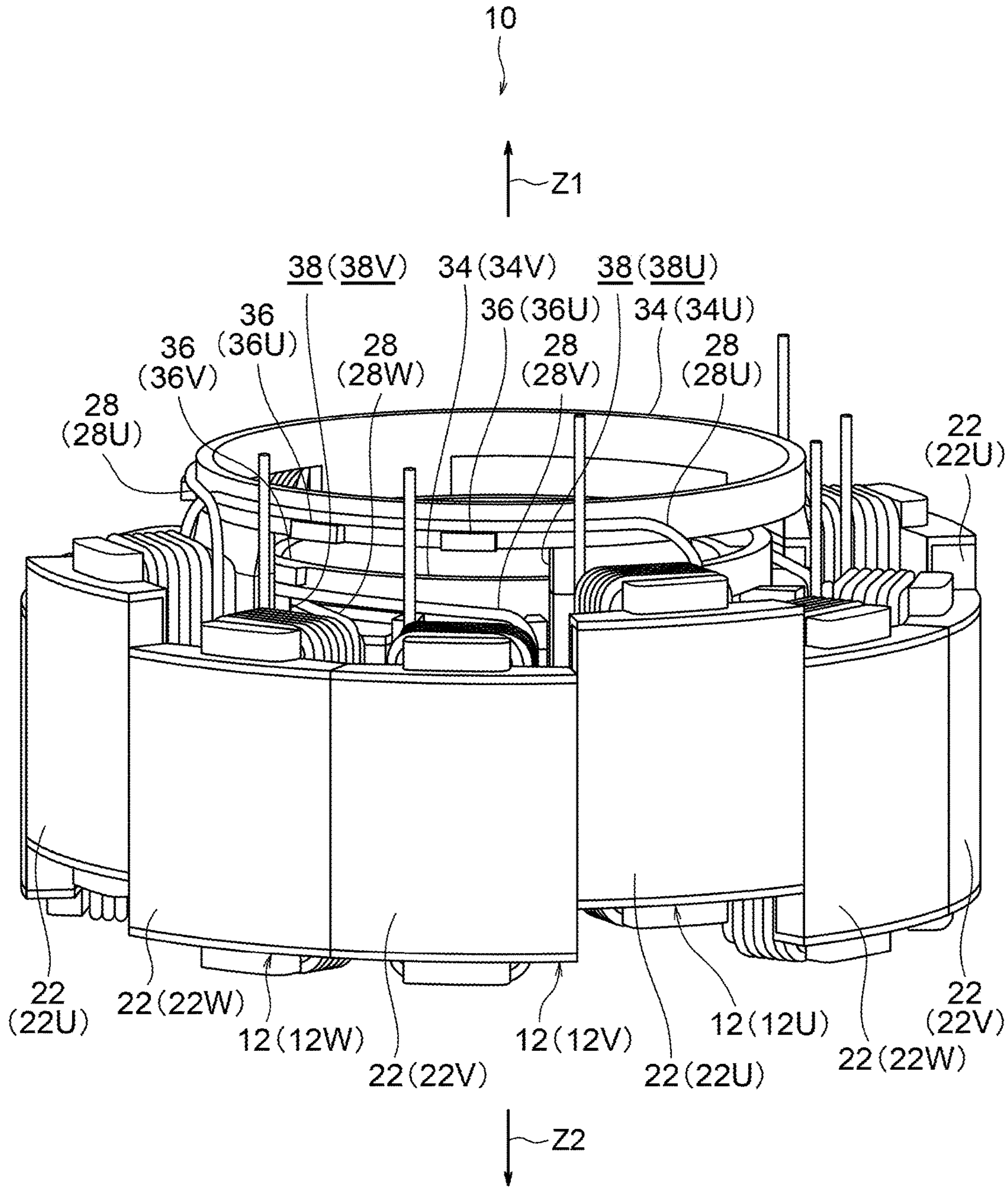
FIG. 3B is a perspective view illustrating a state in which assembly has progressed further than in FIG. 3A.

Then, as illustrated in FIG. 3A and FIG. 3B, in a state in which the V-phase stator configuration section 12V is displaced by a specific angle in a circumferential direction with respect to the W-phase stator configuration section 12W, the V-phase stator configuration section 12V is assembled to the W-phase stator configuration section 12W from the first axial direction side (the arrow Z1 side). Then, in a state in which the U-phase stator configuration section 12U is displaced by a specific angle in a circumferential direction with respect to the V-phase stator configuration section 12V, the U-phase stator configuration section 12U is assembled to the V-phase stator configuration section 12V and the W-phase stator configuration section 12W from the first axial direction side (the arrow Z1 side).

When this is performed, each of the plural yoke configuration sections 22U, 22V, 22W is fitted between a pair of yoke configuration sections respectively adjacent on both sides. Moreover, the V-phase retaining portions 36V are fitted against the inner peripheral face of the U-phase connection portion 34U, and the W-phase retaining portions 36W are fitted against the inner peripheral face of the V-phase connection portion 34V. The plural connection portions 34U, 34V, 34W are thus retained in a state separated from each other in the radial direction by the projection shaped retaining portions 36U, 36V, 36W.

Moreover, when this is performed, the V-phase crossing wires 28V pass through inside the notches 38U formed at the U-phase connection portion 34U, and the W-phase crossing wires 28W pass through inside the notches 38U formed at the U-phase connection portion 34U and through inside the notches 38V formed at the V-phase connection portion 34V. The plural stator configuration sections 12U, 12V, 12W are thus assembled together to form the stator 10 (stator forming process). Note that the terminal portions 30U, 30V, 30W are connected by a buzz bar or the like, not shown in the drawings. The stator 10 is accordingly manufactured by the above processes.

Explanation follows regarding operation and advantageous effects of the first exemplary embodiment.

Note that in the following explanation, for convenience the letters U, V, W are omitted as suffixes to the labels of each member and each portion when no discrimination is made between the U-phase, the V-phase and the W-phase.

According to the stator 10 of the first exemplary embodiment, the yoke 40 is configured by the plural yoke configuration sections 22 segmented in the circumferential direction. Therefore, even in a stator employed in a so-called inner rotor type brushless motor in which plural teeth sections 24 project towards radial direction inside of the yoke 40, the sub-assemblies 42 for each of the U-phase, V-phase and W-phase are formed as described above, and the coil wires 16 can be wound using the flyer machine 100 (see FIG. 5) onto each of the teeth sections 24 of the sub-assemblies 42 from the radial direction outside. There is accordingly no need to secure space between the teeth sections 24, as would be required when a nozzle machine is employed, enabling a higher dense arrangement of the coil wires 16 to be achieved, and enabling a more compact stator 10 to be realized.

Moreover, as described above, the yoke 40 is segmented in the circumferential direction into the plural yoke configuration sections 22, and so, for example, the stator 10 can be made more compact in the axial direction in comparison to cases in which the yoke 40 is segmented into plural yoke configuration sections in the axial direction.

Moreover, when the flyer machine 100 is employed, since the winding speed of the coil wires 16 is higher than when using a nozzle machine, the process of winding the coil wires 16 can be speeded up, and accordingly a reduction in cost of the stator 10 can be achieved due to reducing the number of equipment units.

Moreover, the notches 38U, 38V are formed in the U-phase connection portion 34U and the V-phase connection portion 34V, for the crossing wires 28V, 28W to pass through inside. Interference between the connection portions 34U, 34V and the crossing wires 28V, 28W can thereby be avoided, and the length of the crossing wires 28V, 28W can be suppressed from increasing. The stator 10 can accordingly be made even more compact and at even lower cost.

Moreover, in the U-phase stator configuration section 12U, the extending portions 32U2 are positioned further to the radial direction inside than the core configuration sections 14U. Interference between the flyer of the flyer machine and the extending portions 32U2 and the connection portion 34U can accordingly be suppressed when winding the coil wire 16U on the teeth sections 24U from the radial direction outside using the flyer machine.

Moreover, in the V-phase stator configuration section 12V and in the W-phase stator configuration section 12W, the connection portions 34V, 34W are respectively positioned further to the radial direction inside than the core configuration sections 14V, 14W. Interference between the flyer of the flyer machine and the connection portion 34V, 34W can accordingly be suppressed during winding the coil wires on the respective teeth sections 24V, 24W from the radial direction outside using the flyer machine.

Each of the connection portions 34 includes the retaining portions 36 that retain the respective crossing wires 28 laid on the respective connection portion itself. Therefore, for example as stated above, the crossing wires 28 can be retained at the connection portions 34 by means of the retaining portions 36 when forming the stator 10 by assembling together the plural stator configuration sections 12, and so efficient operation can be achieved when assembling together the plural stator configuration sections 12. Moreover, even after the stator 10 has been incorporated into the brushless motor, the crossing wires 28 are retained at the connection portions 34 by means of the retaining portions 36, and so flapping of the crossing wires 28 can be suppressed, enabling noise and fault occurrence to be suppressed.

The plural connection portions 34 can also be retained in a state separated from each other in the radial direction by the projection shaped retaining portions 36. Space for laying out the crossing wires 28 between the plural connection portions 34 can accordingly be secured in the radial direction, and rattling of the plural connection portions 34 can also be suppressed. Better operating efficiency can also be achieved when assembling the plural connection portions 34 together than in cases in which the plural connection portions 34 are fitted together around the whole circumference.

Moreover, the plural yoke configuration sections 22 are integrally formed to the teeth sections 24. Magnetic loss at each of the connection portions can accordingly be suppressed compared with, for example, a two-part type core including independent members of plural teeth sections with leading end portions connected together with thinned bridging sections and a yoke that connects together base end portions of the teeth sections. Namely, magnetic loss occurs at three locations in a two-part type core, namely at the bridging sections between the leading end portions of adjacent pairs of teeth sections, at the base end portions of pairs of teeth sections, and at connection portions of the yoke. In contrast thereto, in the stator 10 of the present exemplary embodiment, magnetic loss only occurs at one location, the connection portion between adjacent pairs of the yoke configuration sections 22, enabling magnetic loss to be reduced. It is accordingly possible to achieve even greater compactness and reduction in weight.

Moreover, a buzz bar to connect the plural winding portions 26 is not required since the plural winding portions 26 are connected together by the crossing wires 28. A reduction in the number of components can accordingly be made, thereby also enabling a reduction in cost.

Moreover, the crossing wires 28 can be wound onto each of the connection portions 34, and so the winding speed of the coil wires 16 can be raised, and a process to align the crossing wires 28 after winding the coil wires 16 can be dispensed with. A decrease in cost can also be achieved as a result.

Moreover, the brushless motor according to the first exemplary embodiment is equipped with the stator 10 as described above, and so greater compactness and a decrease in cost can also be achieved.

Moreover, in the stator manufacturing method according to the first exemplary embodiment, the sub-assemblies 42 are formed for each of the U-phase, V-phase and W-phase, and the coil wires 16 are wound on each of the teeth sections 24 of the sub-assemblies 42 from the radial direction outside using the flyer machine 100. There is accordingly no need to secure space between the teeth sections 24, as would be required when a nozzle machine is employed. A higher dense arrangement of the coil wires 16 is thereby enabled, and a more compact stator 10 can be realized.

Moreover, due to employing the flyer machine 100, the winding speed of the coil wires 16 is higher than when a nozzle machine is employed, and so the process of winding the coil wires 16 can be speeded up, and thereby a reduction in cost of the stator 10 can be achieved due to reducing the number of equipment units.

The connection portions 34 are provided coaxially to the yoke 40, enabling the structure to be simplified. The retaining portions 36 are also formed in projection shapes, thereby also enabling the structure to be simplified.

Explanation follows regarding modified examples of the first exemplary embodiment.

In the first exemplary embodiment, the brushless motor is configured as an example by an 8-pole 12 slot motor, however configuration may be made with a motor having another combination of numbers of poles and numbers of slots.

Figure 6:
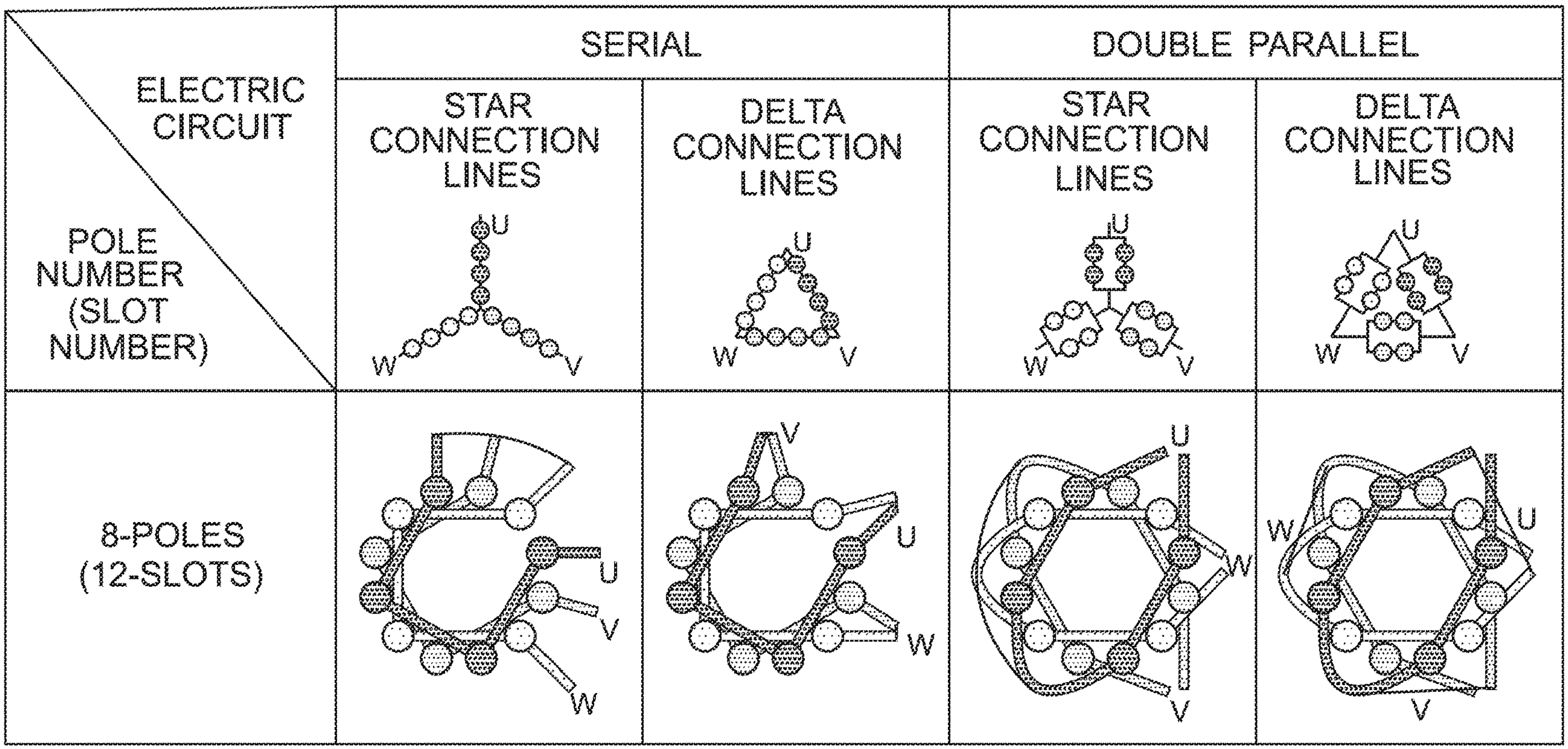
FIG. 6 is a drawing to explain plural connection patterns of coil wires applicable to a stator according to the first exemplary embodiment of the present invention.

The connection method of the plural coil wires 16U, 16V, 16W may be configured in a star connection pattern or a delta connection pattern, both in series or in parallel, as illustrated in FIG. 6.

The retaining portions 36 function for retaining the crossing wires 28 and also function as projection shaped spacers for retaining the plural connection portions 34 in a state separated from each other in the radial direction. However, retaining portions 36 and spacers may be independently provided.

Moreover, the retaining portions 36 are formed at all of the connection portions 34. However, the retaining portions 36U, 36W may be omitted from the U-phase connection portion 34U and the W-phase connection portion 34W. In their place, spacers formed separately at the retaining portions 36 may be provided at the outer peripheral face and the inner peripheral face of the V-phase connection portion 34V, to fit against the inner peripheral face of the U-phase connection portion 34U and the outer peripheral face of the W-phase connection portion 34W.

The connection portions 34 are only provided at the first axial direction side (Z1 side) of the plural insulator portions 32U, however connection portions may be provided only on the second axial direction side (Z2 side) of the plural insulator portions 32U or on both axial direction sides of the plural insulator portions 32U.

Moreover, the connection portions 34 are provided coaxially to the yoke 40, however connection portions may be provided so as not to be coaxial to the yoke 40. The connection portions 34 are also formed in ring shapes, however connection portions may be formed in another shape, such as a polygonal shape or for example a shape with a portion missing such as a C-shape.

The crossing wires 28V, 28W, serving as an example of a member of the present invention, are housed in the notches 38U, 38V, however different member may be housed.

The retaining portions 36 are formed in projection shapes, however the retaining portions 36 may be formed in a circular arc shape extending around the circumferential direction of the stator 10, or in another shape.

The extending portions 32U2 are only formed to the U-phase insulator 18U, however similar extending portions to the extending portions 32U2 may be formed to the V-phase insulator 18V and to the W-phase insulator 18W.

Figure 15:
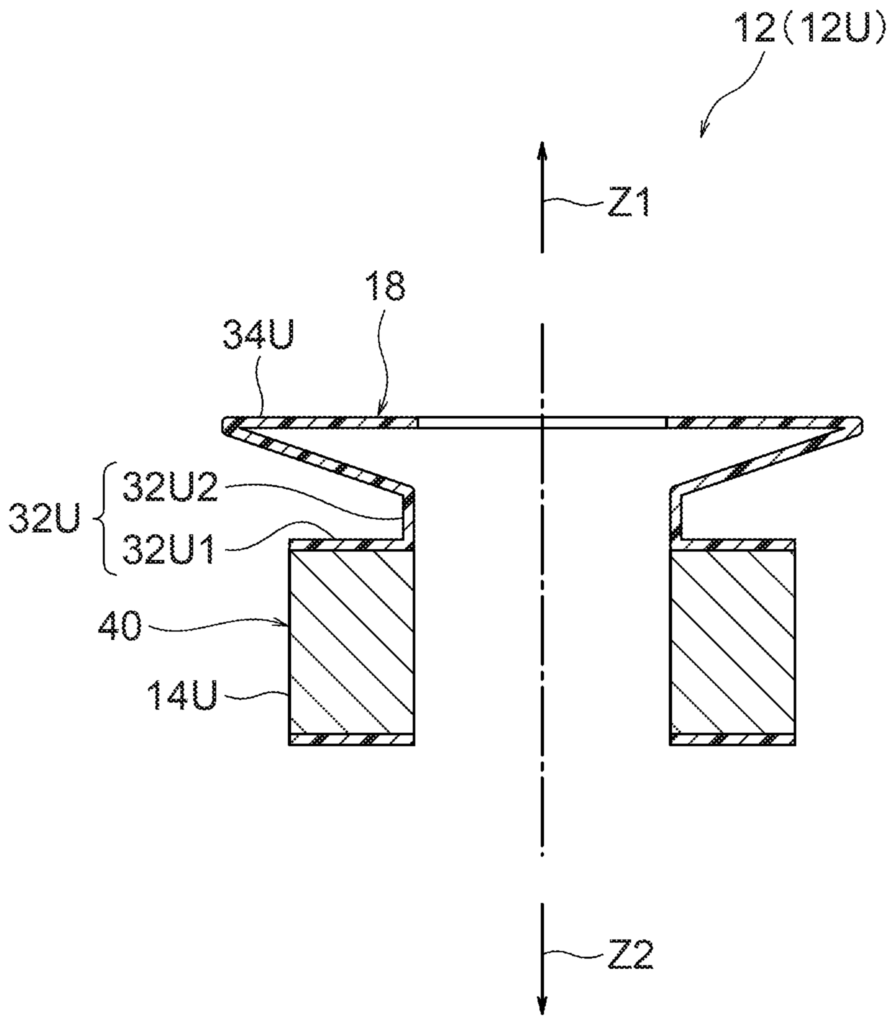
FIG. 15 is a drawing illustrating a first modified example of a stator according to the first exemplary embodiment.
Figure 16:
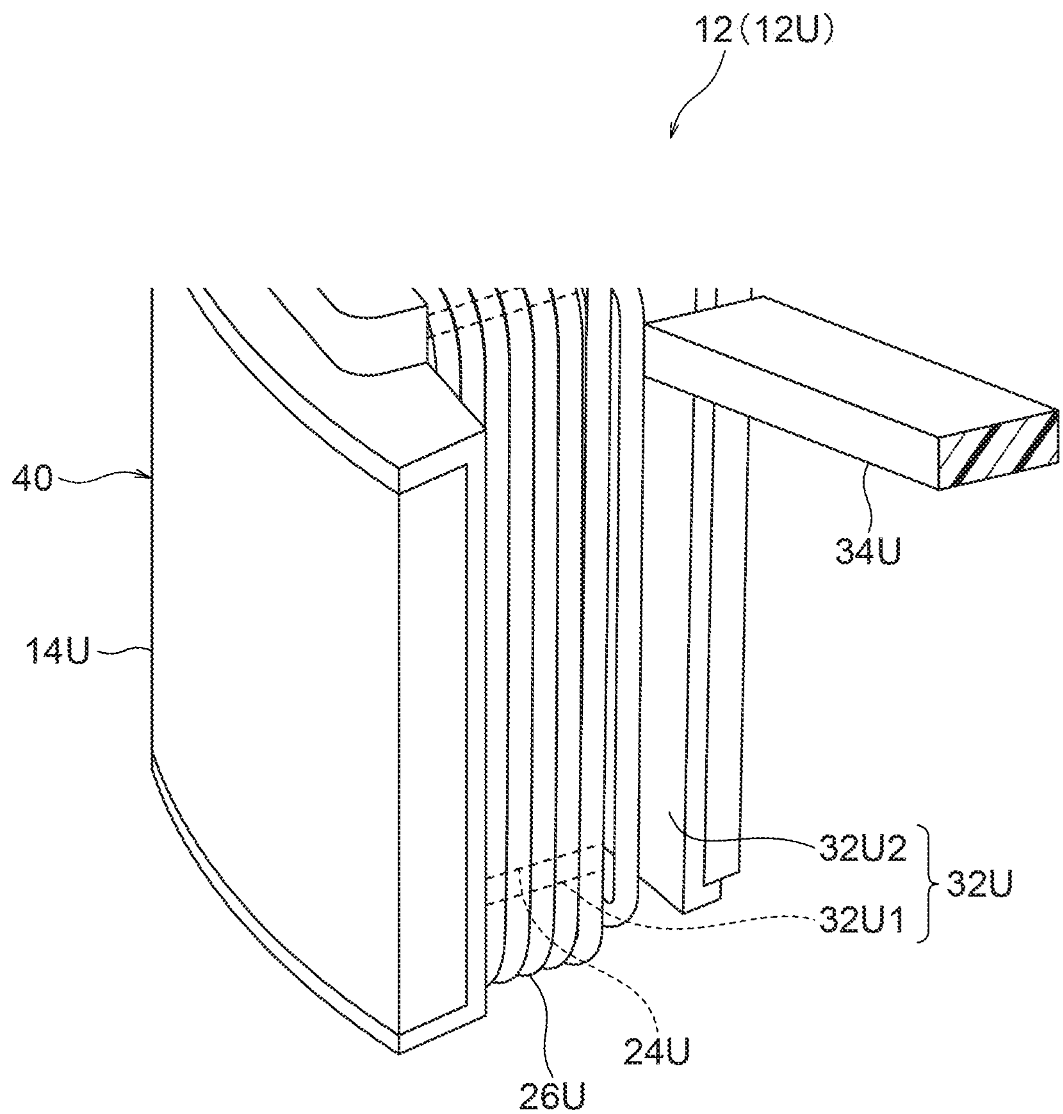
FIG. 16 is a drawing illustrating a second modified example of a stator according to the first exemplary embodiment.
Figure 17:
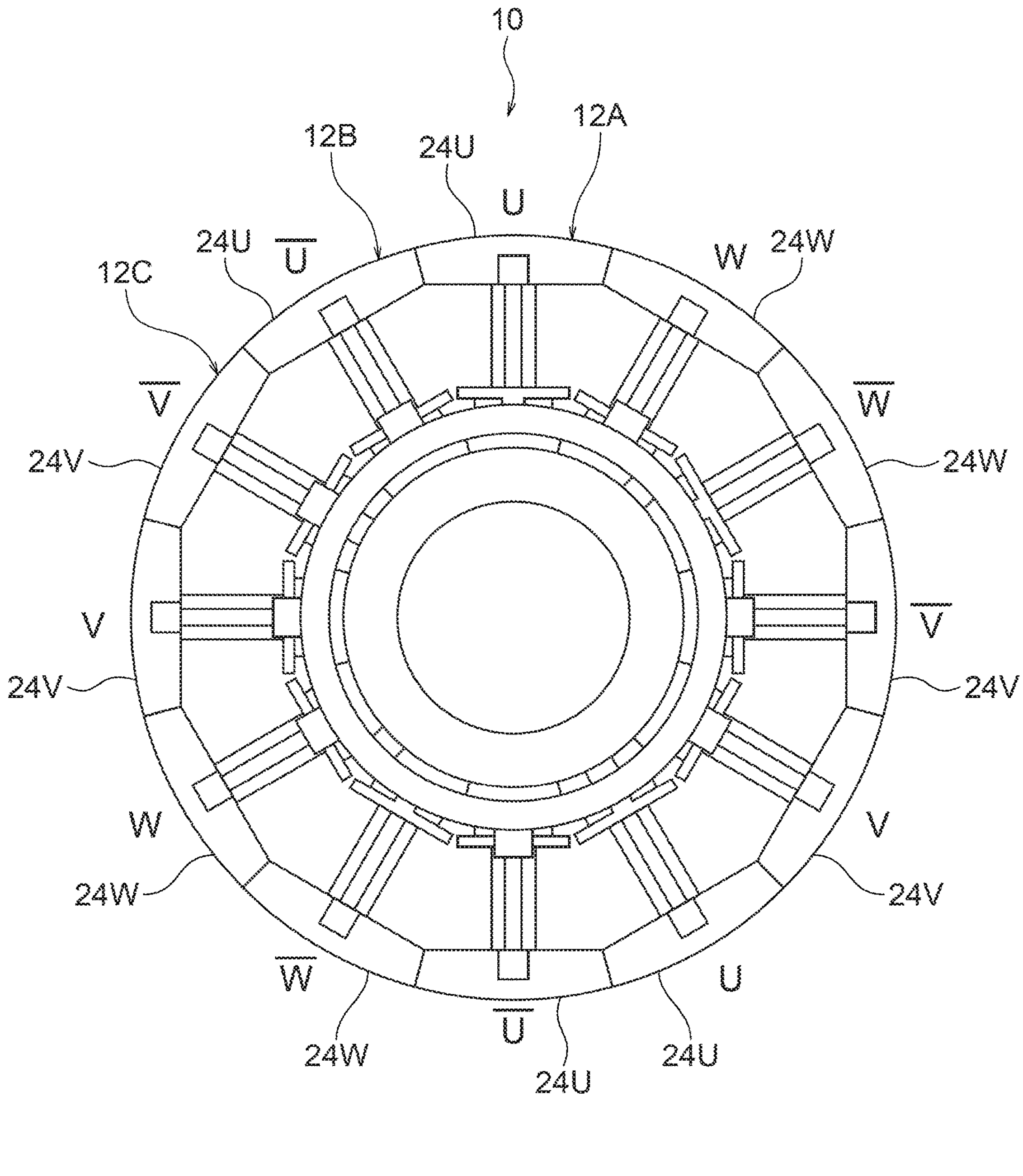
FIG. 17 is a drawing illustrating a third modified example of a stator according to the first exemplary embodiment.
Figure 18A:
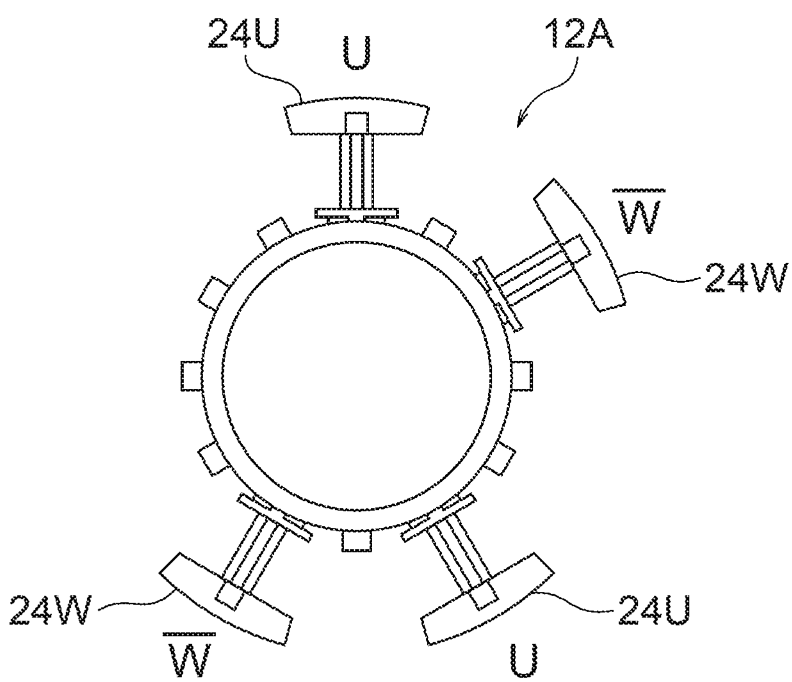
FIG. 18A is a plan view illustrating a first group of the stator configuration sections illustrated in FIG. 17.
Figure 18B:
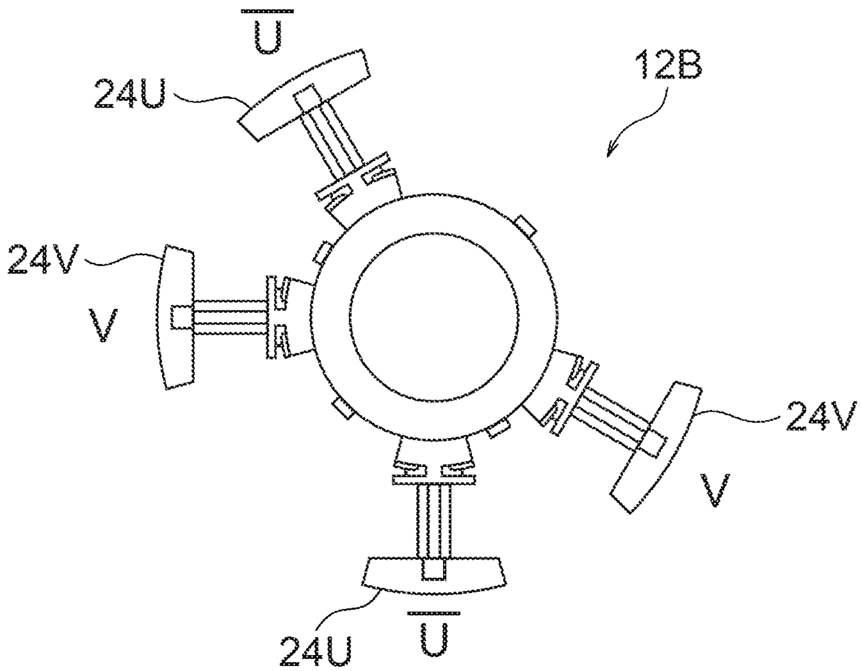
FIG. 18B is a plan view illustrating a second group of the stator configuration sections illustrated in FIG. 17.
Figure 18C:
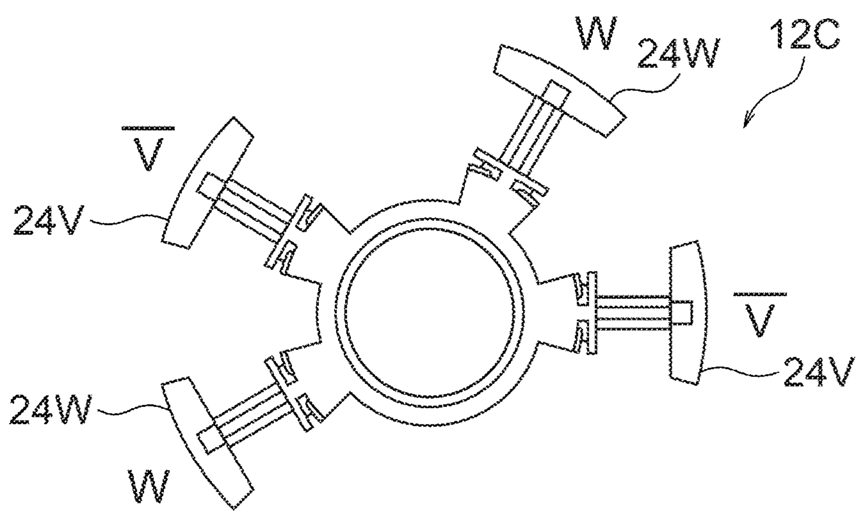
FIG. 18C is a plan view illustrating a third group of the stator configuration sections illustrated in FIG. 17.

The connection portion 34U is positioned further to the radial direction inside than the core configuration sections 14U. However, as schematically illustrated in FIG. 15, as long as the insulator 18U has extending portions 32U2 positioned further to the radial direction inside than the core configuration sections 14U, the connection portion 34U may be positioned further to the radial direction outside than the core configuration sections 14U. Moreover, as long as the extending portions 32U2 are positioned further to the radial direction inside than the core configuration sections 14U, the extending portions 32U2 may extend in one direction of axial direction, radial direction, or a direction that is a combination thereof of the yoke 40. Although the connection portion 34U is provided on the first axial direction side (Z1 side) of the insulator portions 32U and connects together the extension end portions of the extending portions 32U2 extending in the yoke 40 axial direction, configuration may be made, for example as illustrated in FIG. 16, with the extending portions 32U2 extending in the yoke 40 circumferential direction, and the connection portion 34U extending in the yoke 40 circumferential direction and connecting the extension end portions of the extending portions 32U2. Moreover, in cases in which the extending portions 32U2 extend in one direction of the yoke 40 axial direction, radial direction, or a direction that is a combination thereof, the connection portion 34U may connect the extension end portions of the extending portions 32U2, and may also connect other locations of the extending portions 32U2 other than the extension end portions. The above also similarly applies to cases in which extending portions and a connection portion are formed to the V-phase insulator 18V and the W-phase insulator 18W.

Figure 20A:
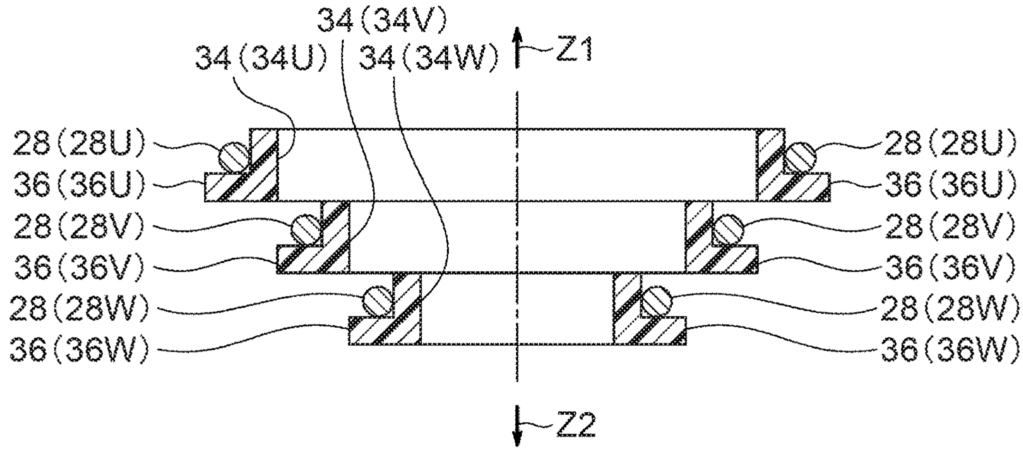
FIG. 20A is a side-on cross-section of plural connection portions illustrated in FIG. 1.
Figure 20B:
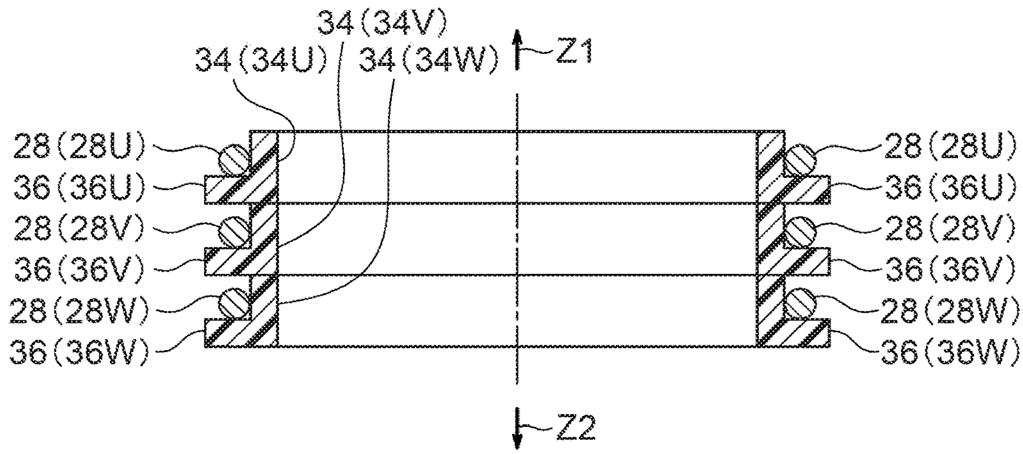
FIG. 20B is a side-on cross-section of a first modified example of plural connection portions illustrated in FIG. 20A.
Figure 20C:
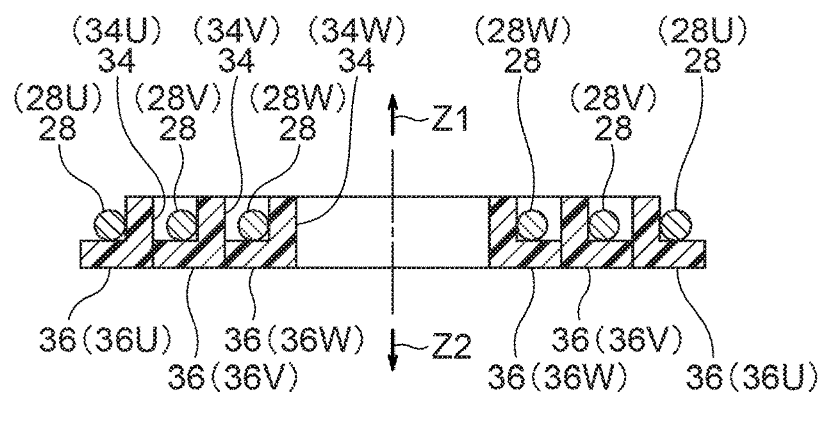
FIG. 20C is a side-on cross-section of a second modified example of plural connection portions illustrated in FIG. 20A.

Moreover, as illustrated in FIG. 20A, the plural connection portions 34U, 34V, 34W are disposed such that there are gaps present between each other in the yoke 40 radial direction and axial direction. However, configuration may be made with the connection portions 34U, 34V, 34W disposed such that there are gaps present between each other in the yoke 40 axial direction, as illustrated in FIG. 20B, or disposed such that there are gaps present between each other in the yoke 40 radial direction, as illustrated in FIG. 20C. A space can also be secured in such configurations for laying the crossing wires 28 between the plural connection portions 34U, 34V, 34W.

Although the stator 10 is also configured for use in a so-called inner rotor type brushless motor in which the plural teeth sections 24 project towards the yoke 40 radial direction inside, the stator 10 may also be configured for use in a so-called outer rotor type brushless motor in which plural teeth sections 24 project towards the yoke 40 radial direction outside.

Moreover, the stator 10 is configured segmented into the stator configuration sections 12U, 12V, 12W configured for each of the plural phases, as an example of plural groups. However, as illustrated in FIG. 17 and FIG. 18A to FIG. 18C, the stator 10 may be segmented into stator configuration sections 12A, 12B, 12C configured by groups each containing a combination of plural phases.

Note that, for example, in the examples illustrated in FIG. 17 and FIG. 18A to FIG. 18C, a stator configuration section 12A configuring a first group includes +U-phase teeth sections 24U and −W-phase teeth sections 24W, and a stator configuration section 12B configuring a second group includes +V-phase teeth sections 24V and −U-phase teeth sections 24U. Moreover, a stator configuration section 12C configuring a third group includes +W-phase teeth sections 24W and −V-phase teeth sections 24V. Note that the brushless motor of this example is a 10-pole 12 slot or a 14-pole 12 slot motor. The coil wire is reverse wound on the −U-phase, −V-phase, and −W-phase teeth sections.

Although not particularly illustrated, as an example of a different combination, configuration may be made such that for example: a stator configuration section 12A configuring the first group includes +U-phase teeth sections and −V-phase teeth sections; a stator configuration section 12B configuring a second group includes +V-phase teeth sections and −U-phase teeth sections; and a stator configuration section 12C configuring a third group includes +W-phase teeth sections and −W-phase teeth sections.

Moreover, configuration may be made such that: a stator configuration section 12A configuring a first group includes +U-phase teeth sections and −U-phase teeth sections; a stator configuration section 12B configuring a second group includes +V-phase teeth sections and −V-phase teeth sections; and a stator configuration section 12C configuring a third group includes +W-phase teeth sections and −W-phase teeth sections.

Moreover, configuration may be made such that: a stator configuration section 12A configuring a first group includes +U-phase teeth sections and −U-phase teeth sections; a stator configuration section 12B configuring a second group includes +V-phase teeth sections and −W-phase teeth sections; and a stator configuration section 12C configuring a third group includes +W-phase teeth sections and −V-phase teeth sections.

In addition to the above, configuration may also be made with stator configuration sections configuring each of the groups including teeth sections of plural phases in a combination other than those listed above.

Second Exemplary Embodiment of the Present Invention

Figure 7:
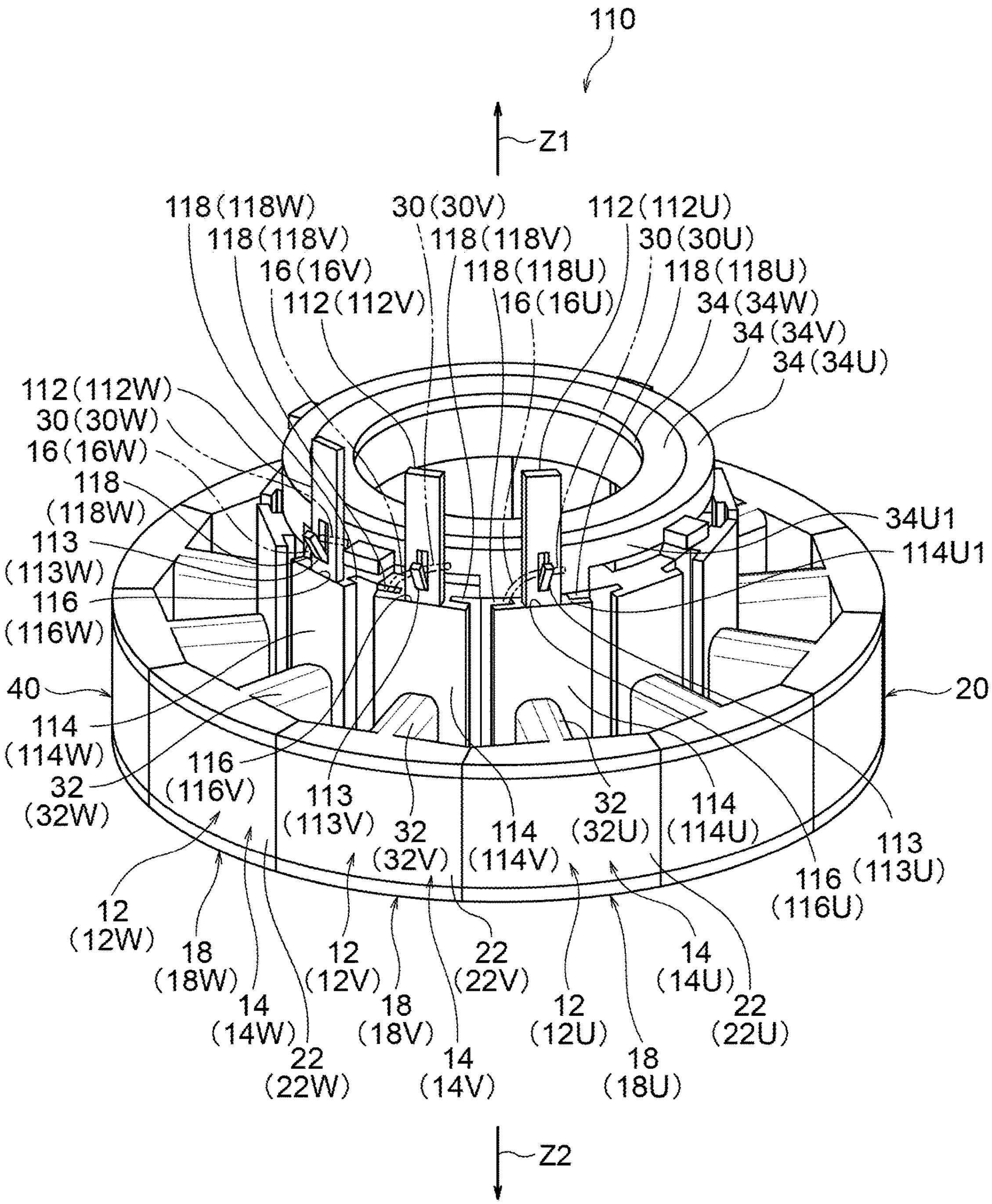
FIG. 7 is a perspective view illustrating a stator according to a second exemplary embodiment of the present invention.
Figure 8:
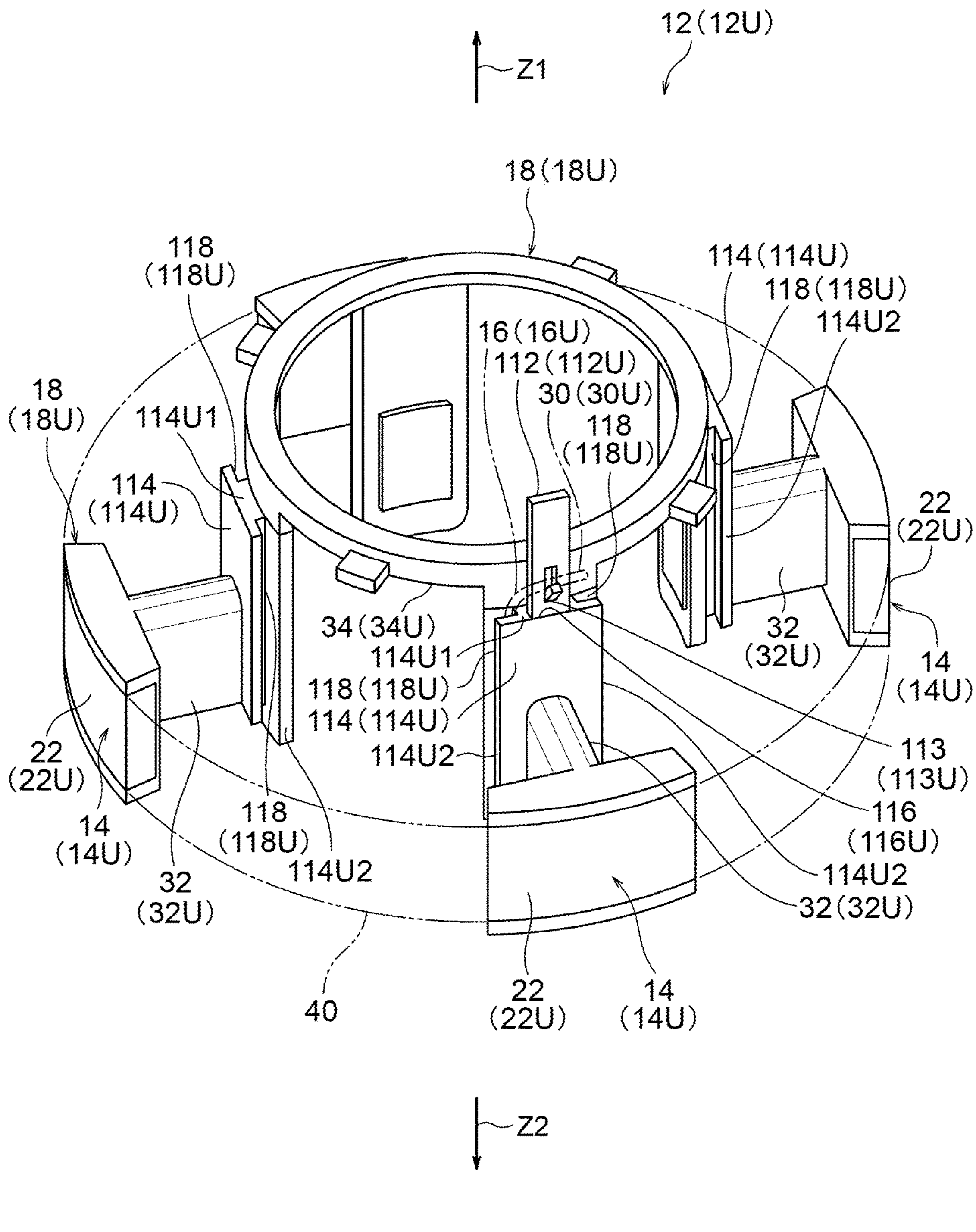
FIG. 8 is a perspective view illustrating a U-phase stator configuration section illustrated in FIG. 7.
Figure 9:
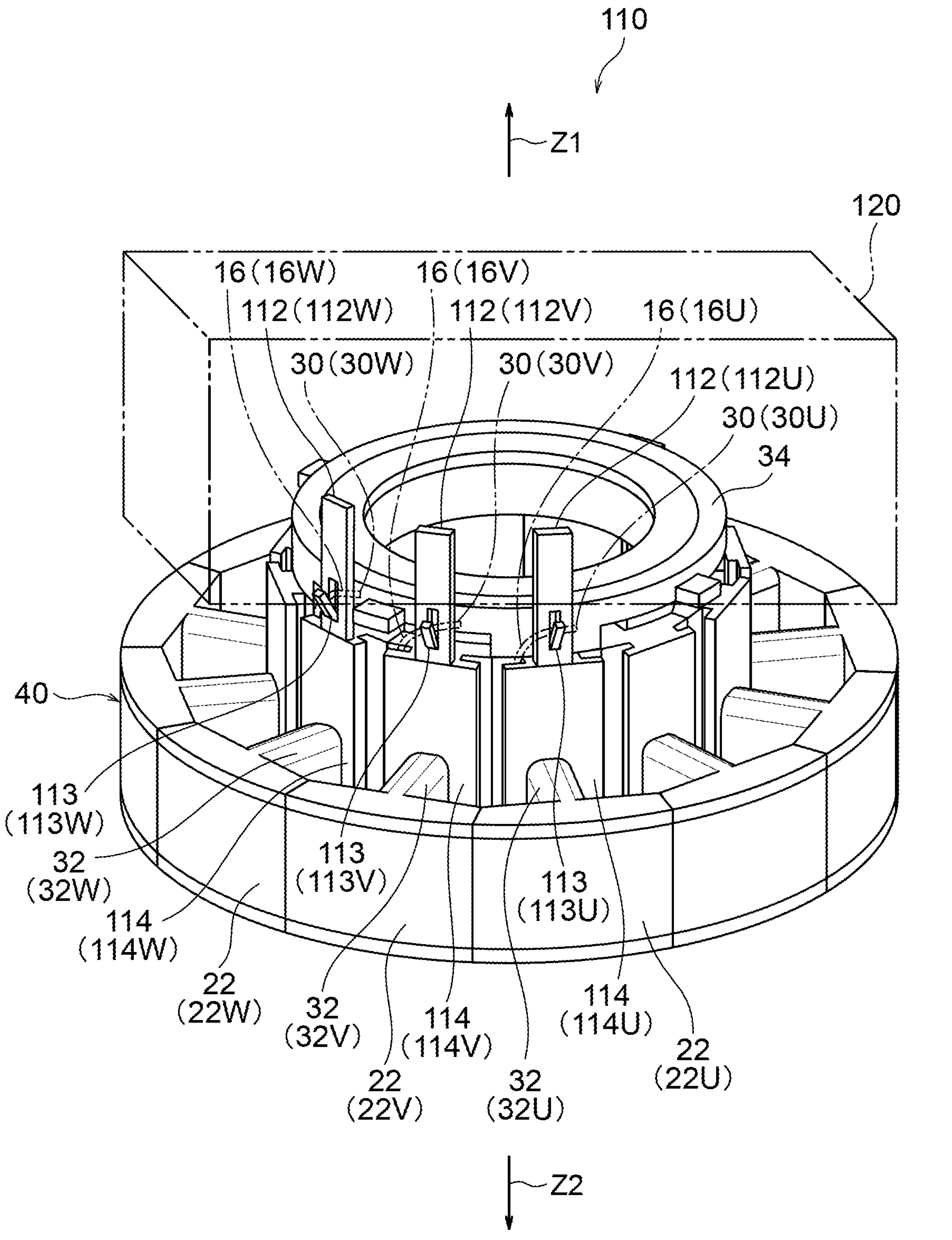
FIG. 9 is a perspective view illustrating an assembled state of a control circuit section to the stator illustrated in FIG. 7.

Explanation follows regarding a second exemplary embodiment of the present invention, with reference to FIG. 7 to FIG. 9.

The configuration of a stator 110 according to the second exemplary embodiment of the present invention varies from the stator 10 according to the first exemplary embodiment described above in the following manner. Note that in the second exemplary embodiment of the present invention, configuration similar to that of the first exemplary embodiment described above is allocated the same reference numerals and explanation thereof is abbreviated.

As illustrated in FIG. 7, elongated plate shaped conductive terminal stations 112U, 112V, 112W are respectively provided to each of plural insulators 18U, 18V, 18W. Terminal portions 30U, 30V, 30W of plural coil wires 16U, 16V, 16W are respectively connected to the terminal stations 112U, 112V, 112W. The terminal stations 112U, 112V, 112W are provided at a first axial direction side of a yoke 40 (the arrow Z1 side), namely at the same side as connection portions 34. Tongue shaped connector portions 113U, 113V, 113W are formed respectively to the terminal stations 112U, 112V, 112W for connecting to the terminal portions 30U, 30V, 30W.

Moreover, as illustrated in FIG. 8, in the U-phase insulator 18U, projection portions 114U are formed at end portions of each of insulator portions 32U on the opposite side to the yoke 40 (to yoke configuration sections 22U). The projection portions 114U project out to a yoke 40 side from a connection portion 34U. The projection portions 114U are formed in a plate shape extending along a yoke 40 axial direction, and are thicker than the connection portion 34U. End faces 114U1 are formed at the projection portions 114U, facing towards the yoke 40 first axial direction side (the arrow Z1 side). An insertion groove 116U is formed to the end face 114U1 of one of the insulator portions 32U, opening in the yoke 40 axial direction. The terminal station 112U is provided at the projection portion 114U by inserting (push-fitting) into the insertion groove 116U. The terminal station 112U also projects out further than the connection portion 34U in the yoke 40 axial direction.

Moreover, as illustrated in FIG. 7, similarly to with the terminal station 112U, insertion grooves 116V, 116W are also respectively formed to end faces of projection portions 114V, 114W of one of respective insulator portions 32V, 32W, and terminal stations 112V, 112W are provided to the projection portions 114V, 114W by inserting (push-fitting) into the insertion grooves 116V, 116W. The terminal stations 112U, 112V, 112W make contact with an outer peripheral face 34U1 (the surface on the yoke 40 side) of the connection portion 34U.

As illustrated in FIG. 8, groove shaped guide portions 118U are also formed at the insulator 18U along the yoke 40 axial direction (see FIG. 7). The guide portions 118U are, more specifically, formed to side faces 114U2 of the projection portions 114U (side faces facing in the yoke 40 circumferential direction). The terminal portions 30U of the coil wire 16U are guided by the guide portions 118U. Note that the terminal portions 30U in this case are, for example, fitted into the groove shaped guide portions 118U with a snap fit.

Moreover, as illustrated in FIG. 7, guide portions 118V, 118W similar to the guide portions 118U described above are also formed to side faces of the projection portions 114V, 114W, and the terminal portions 30V, 30W of the coil wires 16V, 16W are guided by the guide portions 118V, 118W.

Explanation follows regarding points in which operation and advantageous effects of the second exemplary embodiment of the present invention differ from those of the first exemplary embodiment described above.

Note that in the following explanation, for convenience the letters U, V, W are omitted as suffixes to the labels of each member and each portion when no discrimination is made between the U-phase, the V-phase and the W-phase.

According to the stator 110 of the second exemplary embodiment of the present invention, the terminal stations 112 are respectively provided to the plural insulators 18, and the terminal portions 30 of the respective plural coil wires 16 are connected to the terminal stations 112. Positioning of the terminal portions 30 can accordingly be performed easily.

Moreover, the terminal stations 112 project out further in the yoke 40 axial direction than the connection portions 34, and so as illustrated in FIG. 8, the terminal stations 112 and a control circuit section can be easily connected together.

Moreover, the terminal stations 112 are provided to the projection portions 114 that project out towards the yoke 40 side with respect to the connection portions 34. Interference between the terminal stations 112 and the connection portions 34 can accordingly be suppressed, and the terminal portions 30 can be easily positioned.

Moreover, the terminal stations 112 are inserted into the insertion grooves 116 formed to the projection portions 114, enabling the terminal stations 112 to be easily fixed to the projection portions 114.

The terminal stations 112 make contact with the outer peripheral face 34U1 of the connection portion 34U, and rattling of the terminal stations 112 can be suppressed.

The guide portions 118 are also formed to the respective plural insulators 18 along the yoke 40 axial direction, and the respective terminal portions 30 of the plural coil wires 16 are guided by the guide portions 118. This also enables positioning of the terminal portions to be performed easily.

The guide portions 118 are also provided to the projection portions 114 that project out to the yoke 40 side with respect to the connection portions 34. Interference between the terminal portions 30 and the connection portions 34 can accordingly be suppressed, and the terminal portions 30 can be positioned easily.

Explanation follows regarding modified examples of the second exemplary embodiment of the present invention.

In the exemplary embodiment described above, the projection portions 114 are formed to each of the insulator portions 32, however projection portions may only be formed to the insulator portions 32 that are disposed with the terminal stations 112, out of the plural insulator portions 32.

The guide portions 118U, 118V, 118W are also formed in groove shapes, however they may be configured in a shape other than a groove shape.

The terminal stations 112 may also connect each of the terminal portions 30 as neutral points.

Figure 10:
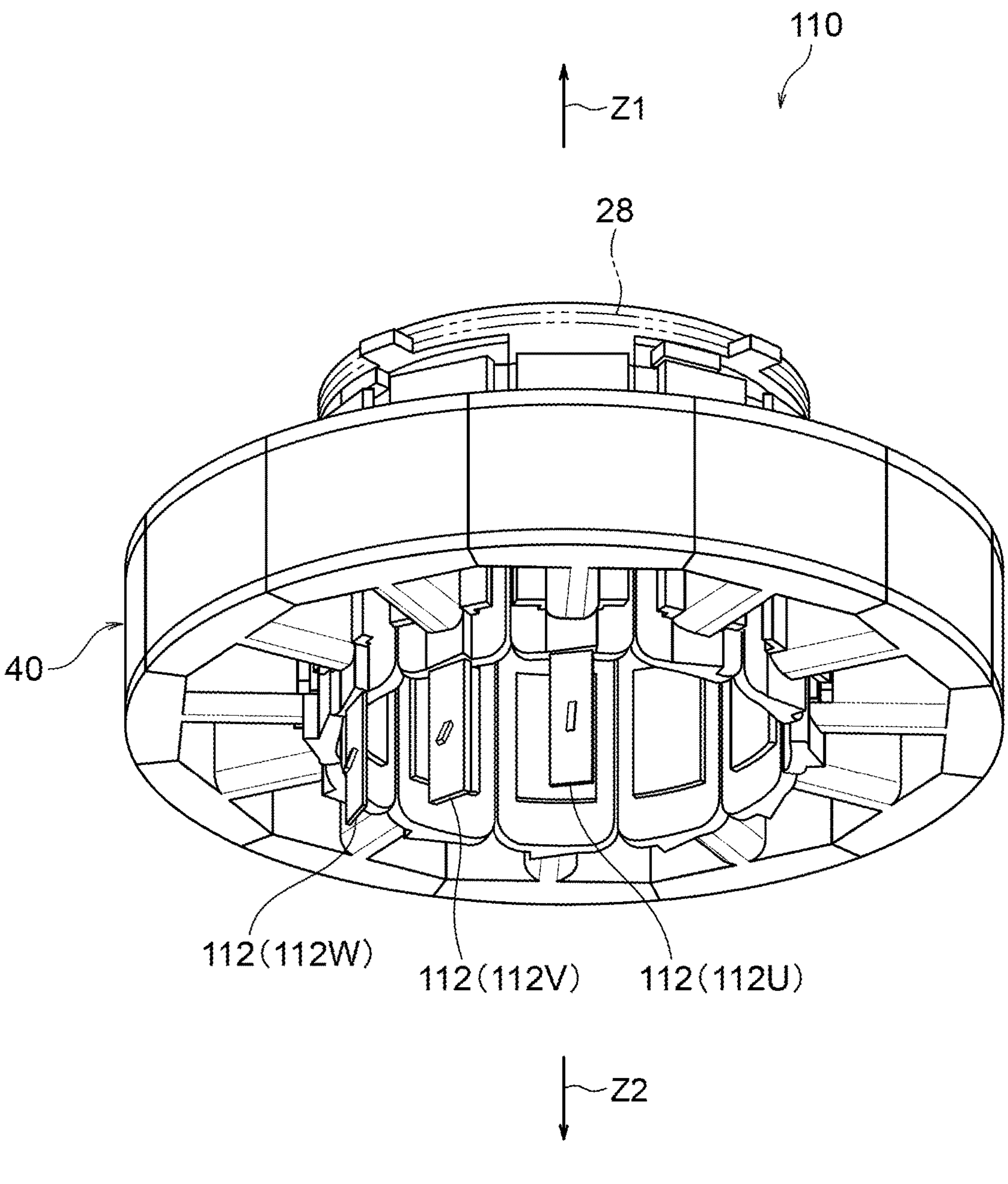
FIG. 10 is a perspective view illustrating a first modified example of the stator illustrated in FIG. 7.

Moreover, as illustrated in FIG. 10, the terminal stations 112U, 112V, 112W described above may be provided on the yoke 40 axial direction opposite side to the crossing wires 28 (the connection portions 34). Such a configuration enables connection to be performed easily between the terminal stations 112 and a control circuit section at the axial direction opposite side to the crossing wires 28.

Figure 11:
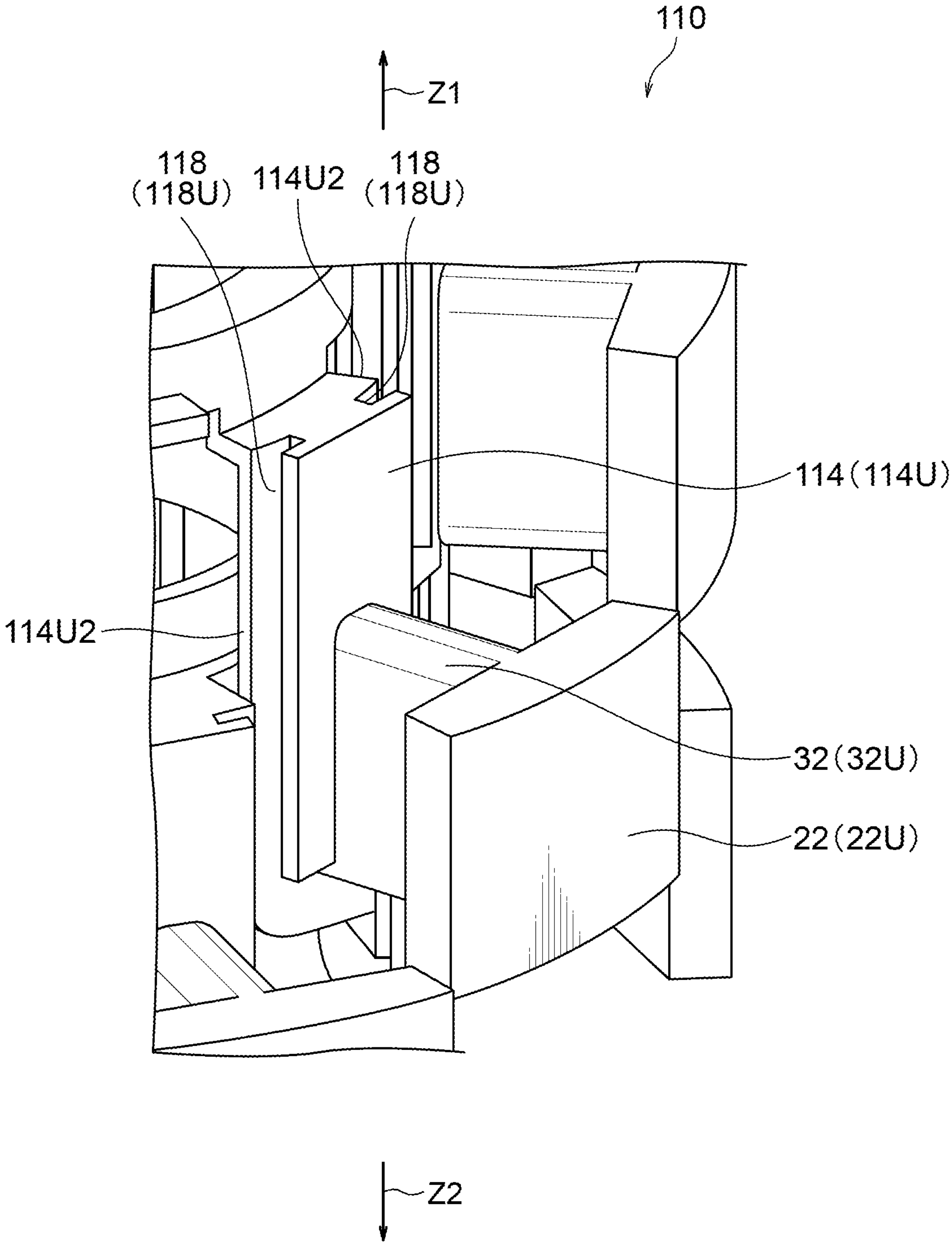
FIG. 11 is an enlarged perspective view illustrating relevant portions of a second modified example of the stator illustrated in FIG. 7.

Moreover, as illustrated in FIG. 11, the terminal stations 112 described above (see FIG. 7 to FIG. 9) may be omitted. In such cases, the terminal portions 30 may be connected directly to a control circuit section and not through the terminal stations 112 described above.

Although the guide portions 118 are formed respectively to side faces 114U2 on both sides of the projection portions 114, the guide portions 118 may only be formed to one of the side faces 114U2 of the projection portions 114.

Figure 12:
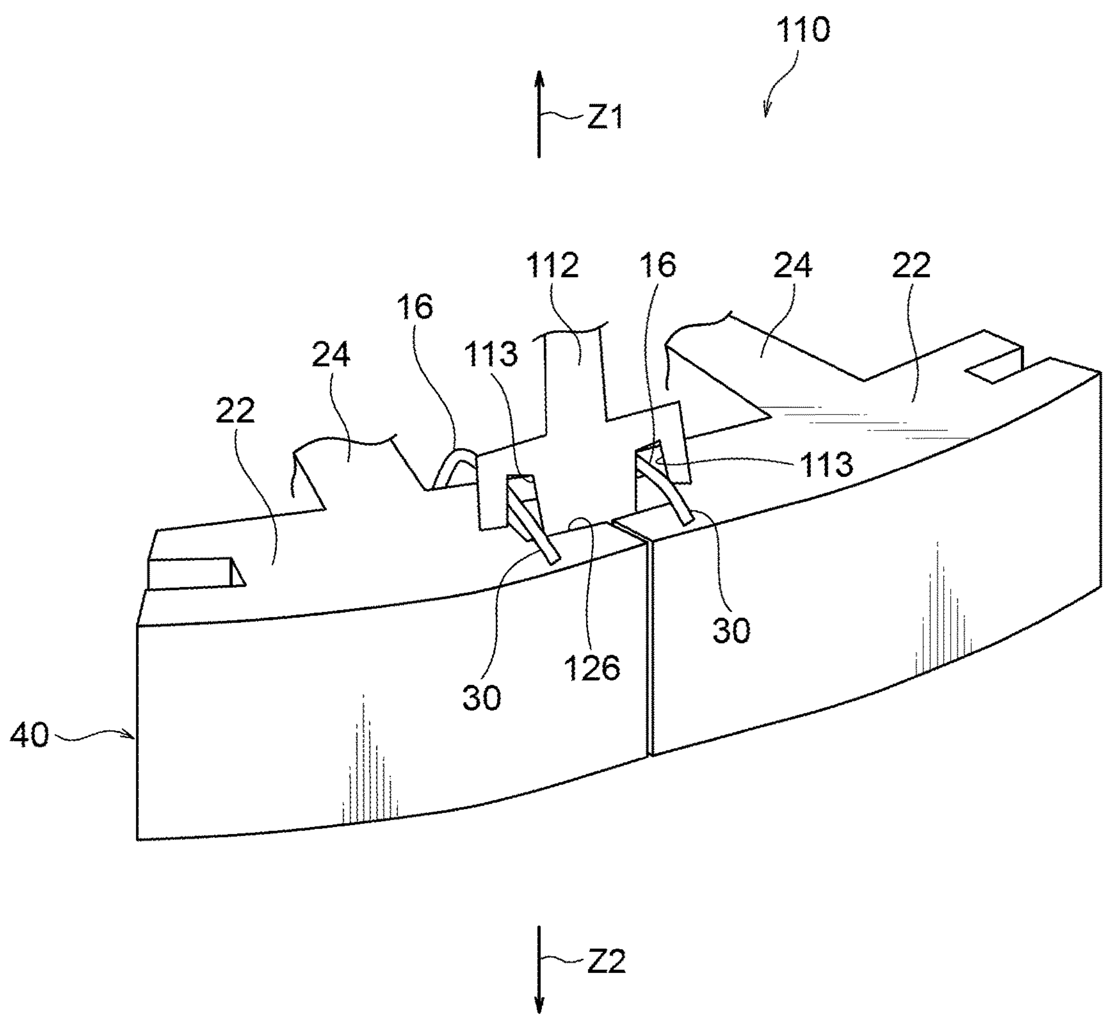
FIG. 12 is an enlarged perspective view illustrating relevant portions of a third modified example of the stator illustrated in FIG. 7.
Figure 13:
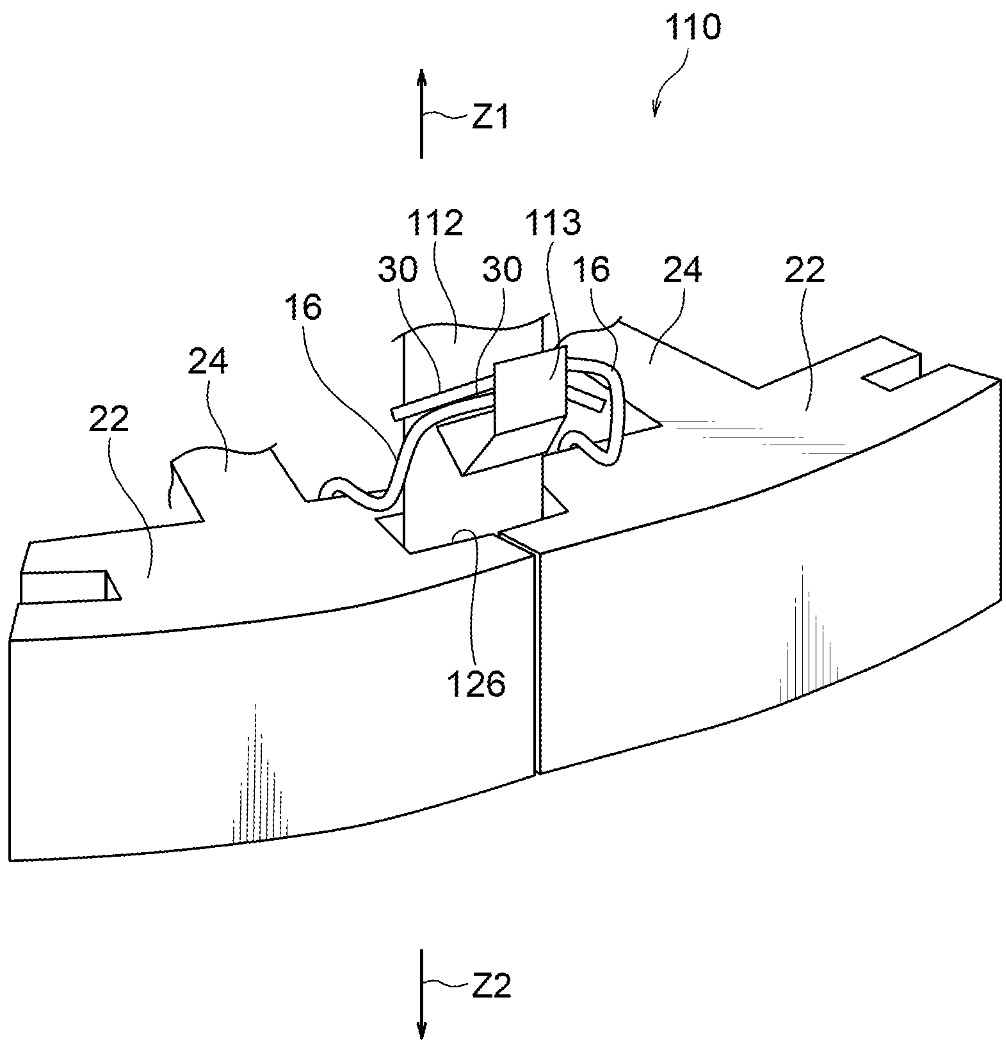
FIG. 13 is an enlarged perspective view illustrating relevant portions of a fourth modified example of the stator illustrated in FIG. 7.

As illustrated in FIG. 12 and FIG. 13, configuration may be made such that an insertion groove 126 is formed to yoke configuration sections 22 of one of the plural yoke configuration sections 22, opening in the yoke 40 axial direction, and with the terminal station 112 provided to this yoke configuration section 22 by inserting into the insertion groove 126. Such a configuration also enables positioning of the terminal portions 30 to be performed easily. Moreover, inserting the terminal stations 112 into the insertion groove 126 formed to the yoke configuration sections 22 enables the terminal stations 112 to be fixed to the yoke configuration sections 22 easily.

Moreover, configuration may be made with the connector portion 113 formed in a groove shape, as illustrated in FIG. 12, or formed as a tongue shape, as illustrated in FIG. 13. Note that in the case illustrated in FIG. 12, a covering of the terminal portion 30 is peeled off at the same time as insertion of the terminal station 112 into the insertion groove 126 is performed, and electrical continuity is made between the terminal portion 30 and the terminal station 112. However, in the case illustrated in FIG. 13, an operator hooks the terminal portion 30 onto the connector portion 113 by hand, and electrical continuity is made between the terminal portion 30 and the terminal station 112.

Figure 14:
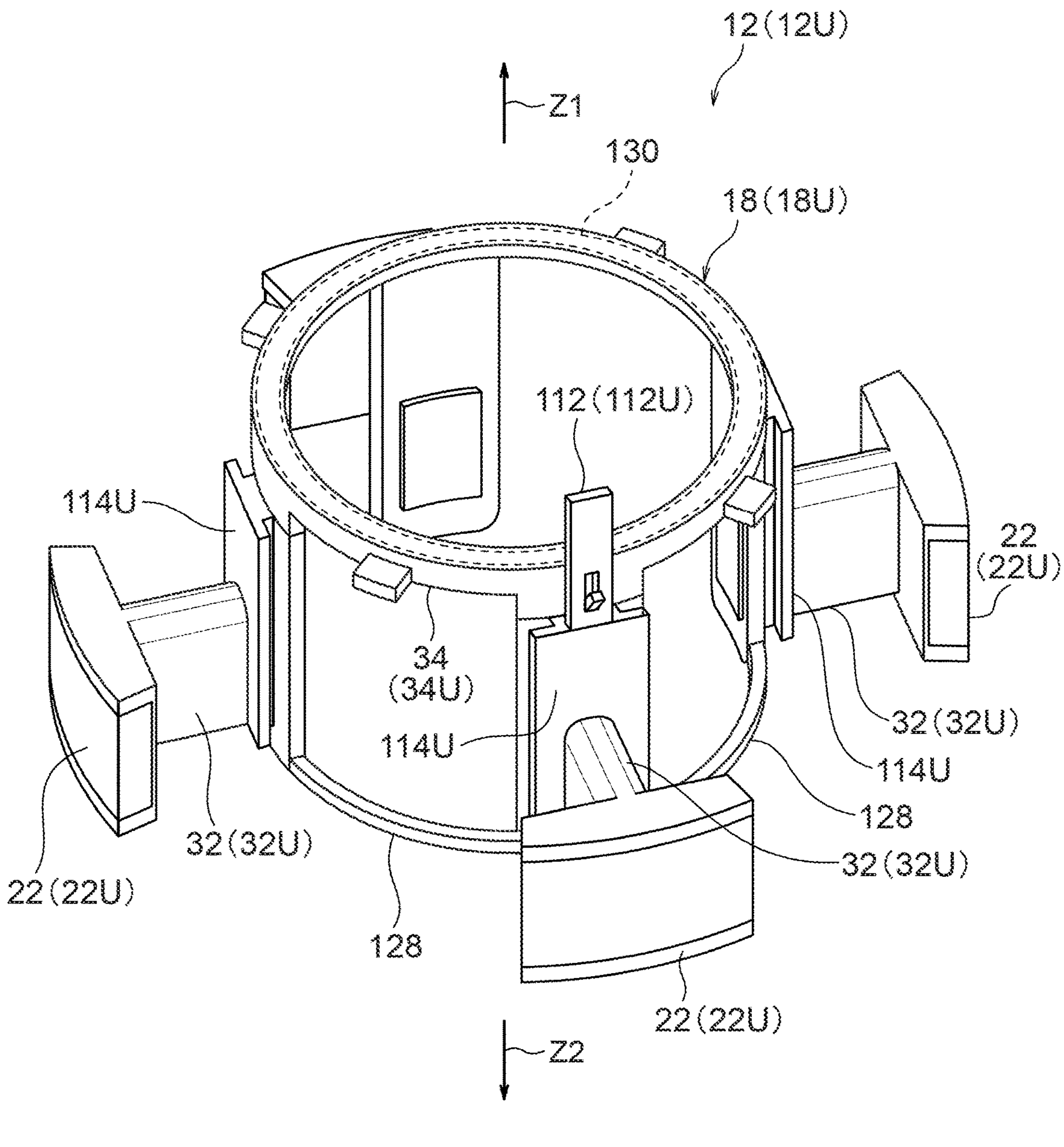
FIG. 14 is a perspective view illustrating a fifth modified example of the stator illustrated in FIG. 7.

As illustrated in FIG. 14, the plural insulator portions 32 may be connected by circular arc shaped reinforcement portions 128 at an opposite side to the yoke 40 axial direction to the connection portions 34 (the arrow Z2 side). Such a configuration enables the rigidity of the insulators 18 to be raised.

Moreover, in order to raise the rigidity of the insulators 18, configuration may be made with a reinforcement member 130 such as a metal ring or wire, buried in the connection portions 34 by insert molding. Configuration may also be made such that the insulators 18 are configured with the connection portions 34 formed from a high strength resin, and portions other than the connection portions 34 formed from a normal strength resin by employing two-color molding.

Figure 19:
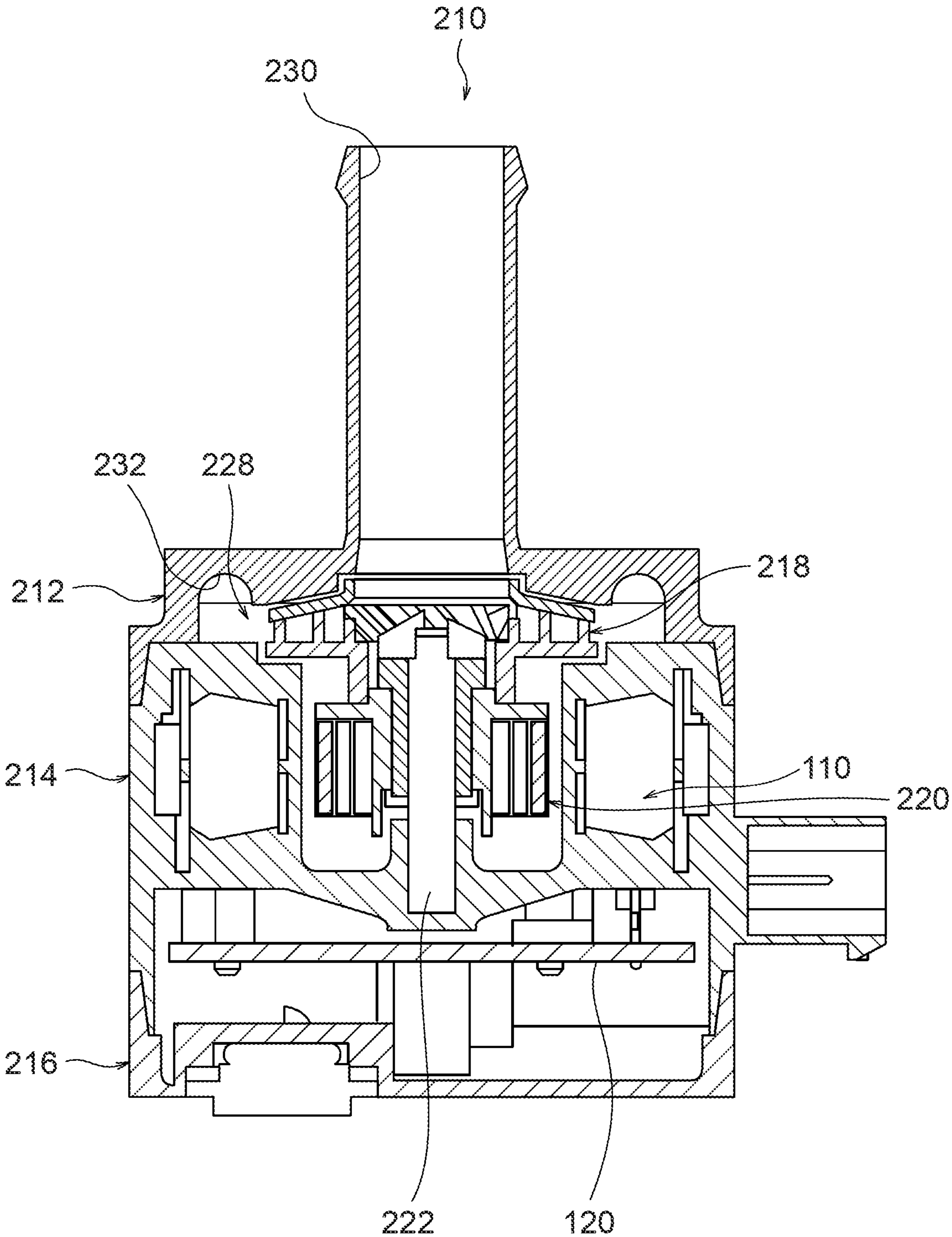
FIG. 19 is a side-on cross-section of a motor pump applied with a brushless motor according to the second exemplary embodiment of the present invention.

Examples of Application of the Second Exemplary Embodiment of the Present Invention Explanation follows regarding examples of application of the second exemplary embodiment of the present invention, with reference to FIG. 19.

A fluid pump 210 illustrated in FIG. 19 is applied with the stator 110 described above. The fluid pump 210 is equipped, in addition to the stator 110 and the control circuit section 120 described above, with a pump housing 212, a motor housing 214, an end housing 216, an impeller 218, a rotor 220 and a motor shaft 222. The stator 110 and the rotor 220 configure a brushless motor.

In the fluid pump 210, a rotational magnetic field is formed by the stator 110 when current is supplied to the stator 110 from the control circuit section 120, thereby rotating the impeller 218 together with the rotor 220. When the impeller 218 rotates, fluid is sucked in through a suction inlet 230 and conveyed into a pump chamber 228, and then the fluid conveyed into the pump chamber 228 is discharged through a discharge outlet 232.

According to the fluid pump 210 (brushless motor), greater compactness and lower cost can be realized due to being equipped with the stator 110.

Third Exemplary Embodiment of the Present Invention

Explanation follows regarding a third exemplary embodiment of the present invention, with reference to the drawings.

Figure 21:
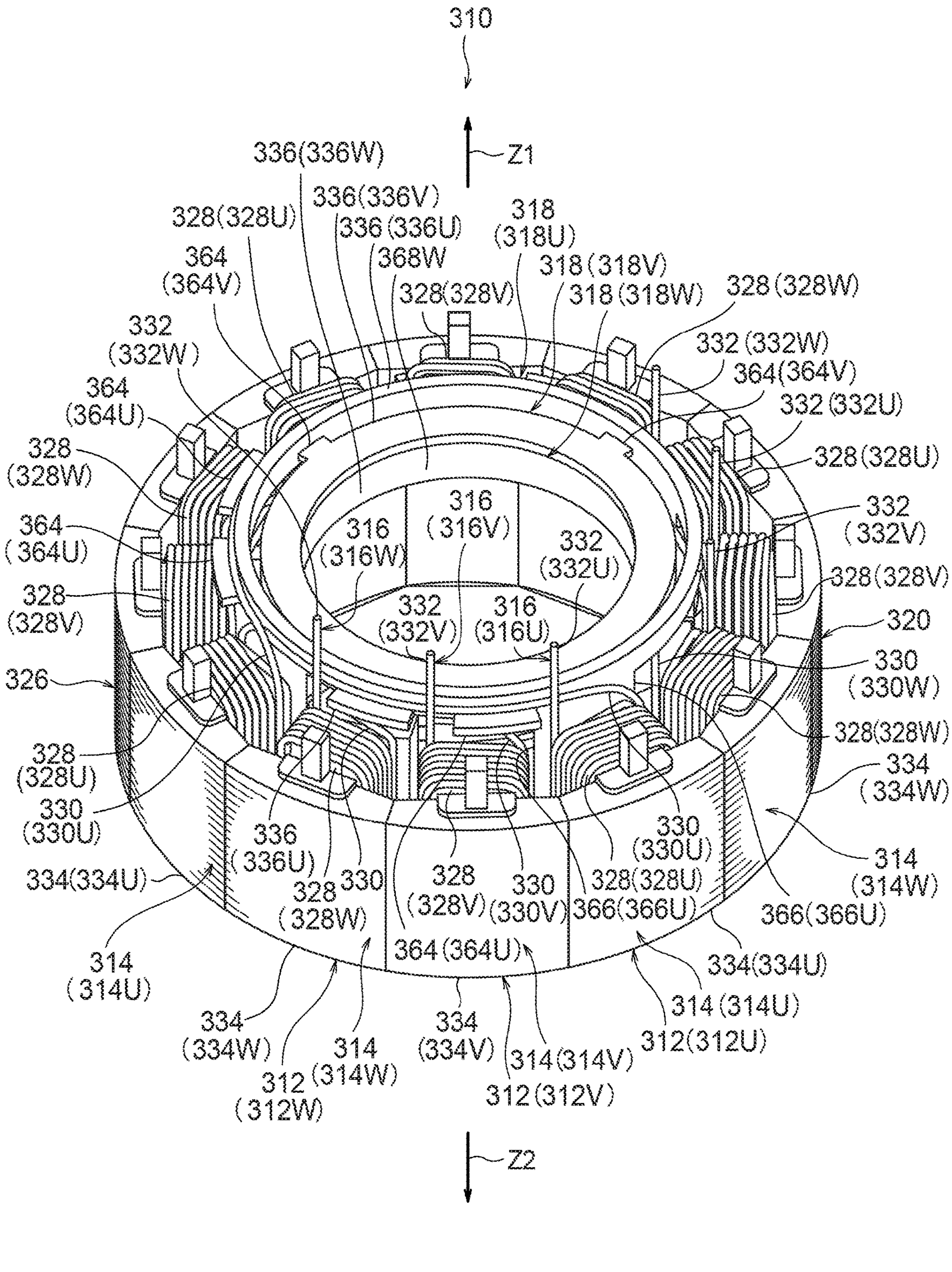
FIG. 21 is a perspective view illustrating a stator according to a third exemplary embodiment of the present invention.
Figure 22A:
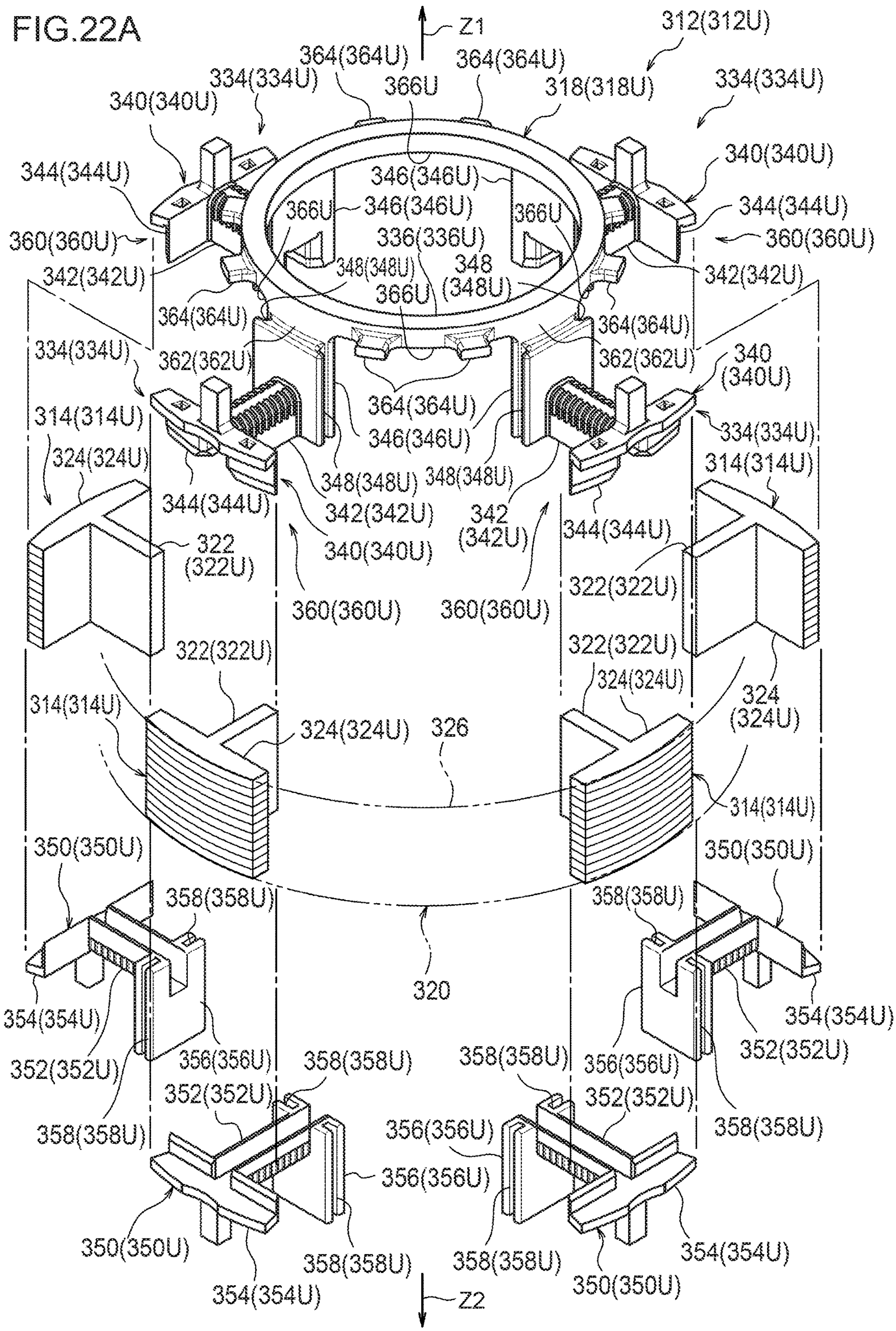
FIG. 22A is an exploded perspective view illustrating a U-phase stator configuration section illustrated in FIG. 21.
Figure 22B:
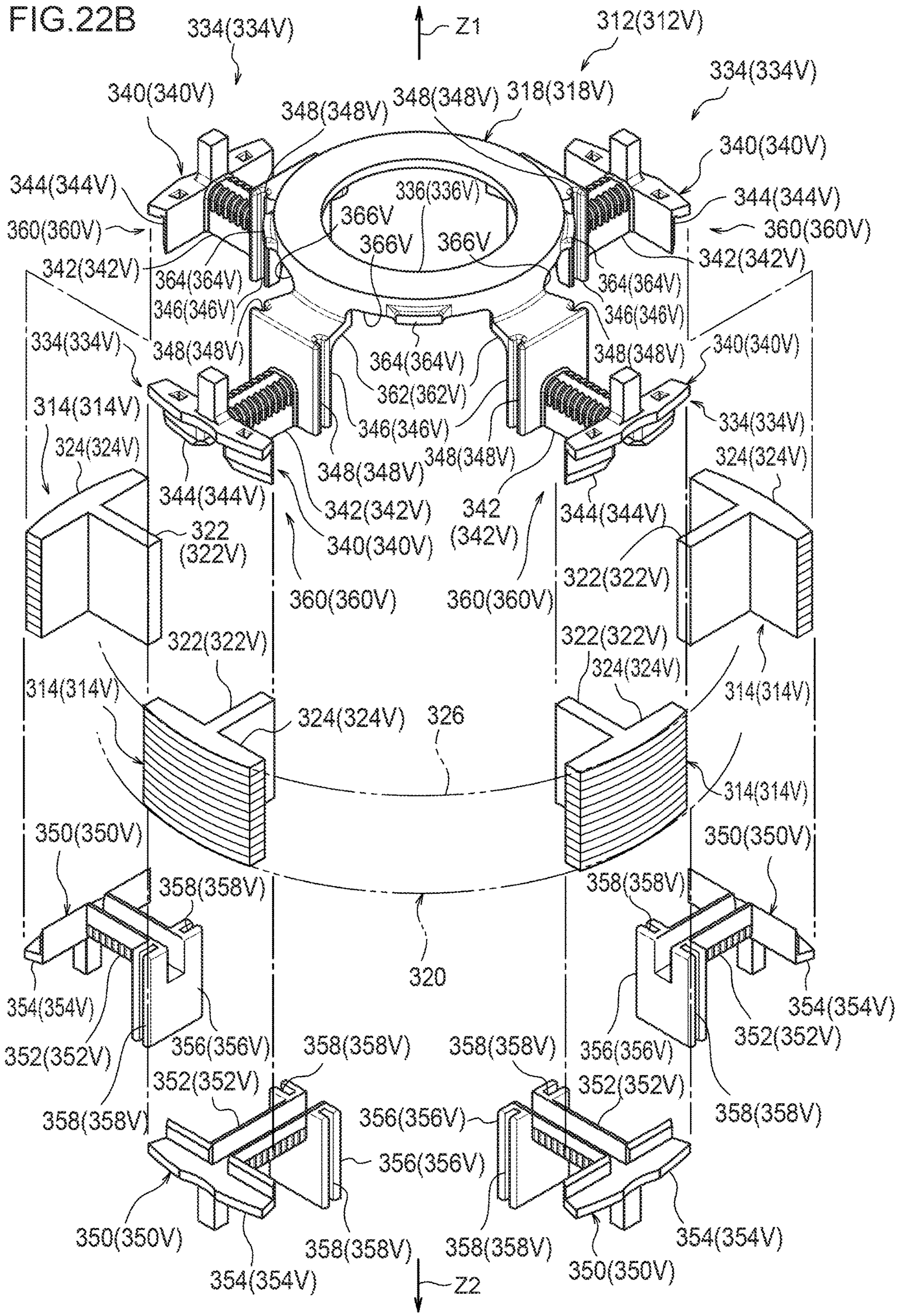
FIG. 22B is an exploded perspective view illustrating a V-phase stator configuration section illustrated in FIG. 21.
Figure 22C:
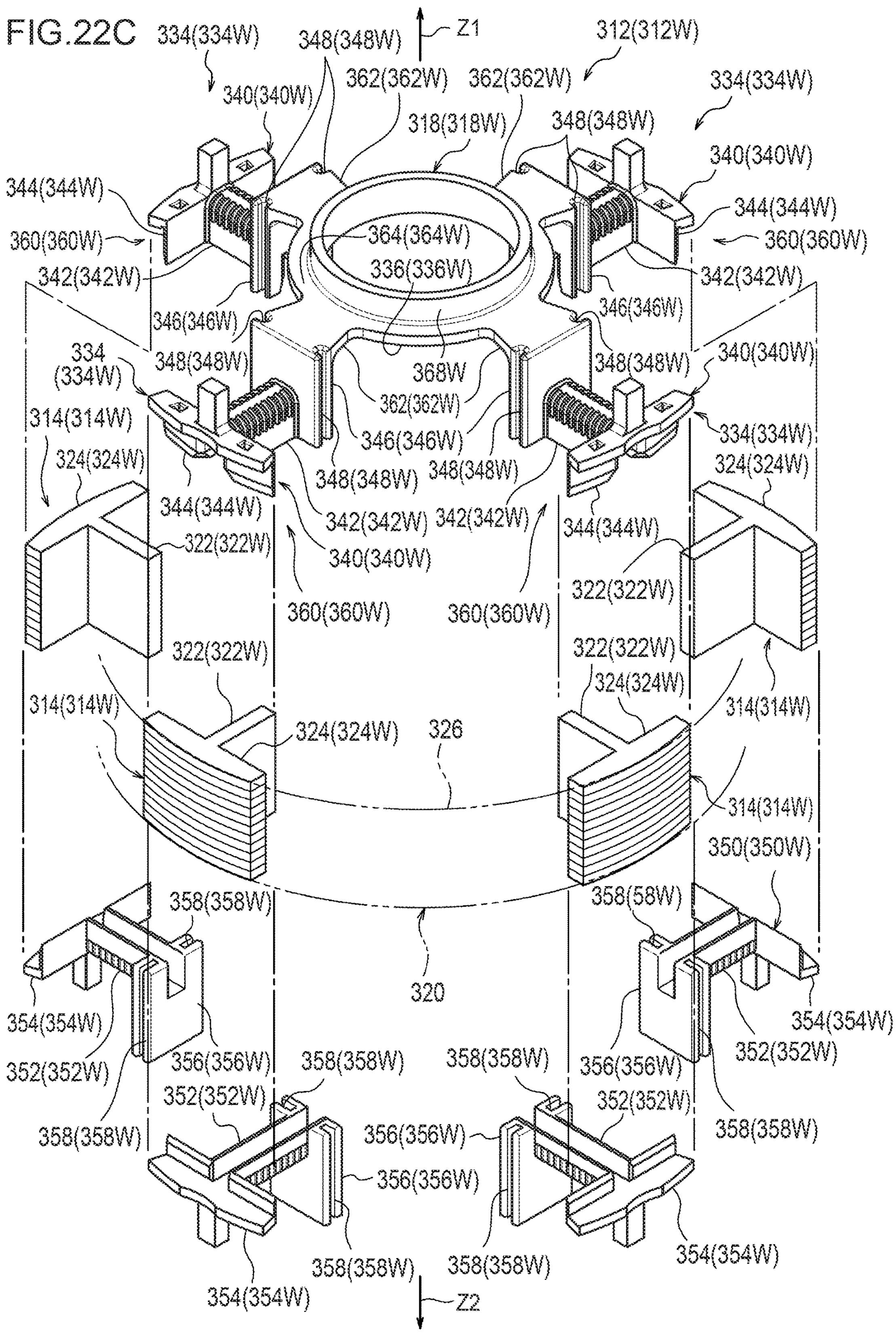
FIG. 22C is an exploded perspective view illustrating a W-phase stator configuration section illustrated in FIG. 21.

A stator 310 according to the third exemplary embodiment of the present invention is illustrated in FIG. 21, and is employed for example in an inner rotor type brushless motor, and is configured including a U-Phase stator configuration section 312U, a V-phase stator configuration section 312V and a W-phase stator configuration section 312W, illustrated in FIG. 22A to FIG. 22C.

As illustrated in FIG. 21 and FIG. 22A, the U-phase stator configuration section 312U is configured with plural core configuration sections 314U, a coil wire 316U, and an insulator 318U. Note that the coil wire 316U is omitted from illustration in FIG. 22A.

The plural core configuration sections 314U configure a stator core 320 together with plural V-phase core configuration sections 314V and plural W-phase core configuration sections 314W, described later. Each of the core configuration sections 314U includes a teeth section 322U and a yoke configuration section 324U. The teeth sections 322U extend along a radial direction of the stator core 320, and the yoke configuration sections 324U are formed to leading end portions of the teeth sections 322U. The yoke configuration sections 324U configure a ring shaped yoke 326, together with plural V-phase yoke configuration sections 324V and plural W-phase yoke configuration sections 324W, described later, and are respectively circular arc shaped.

The coil wire 316U illustrated in FIG. 21 configures the U-phase and includes plural coil wire winding portions 328U and plural crossing wires 330U. In the plural coil wire winding portions 328U, the coil wire 316U is wound concentrically on the teeth sections 322U of the core configuration sections 314U, with teeth section insulator portions 342U, 352U, described later, disposed therebetween. The coil wire winding portions 328U are connected to each other by the plural crossing wires 330U. The crossing wires 330U are laid out (wrapped) around the outer peripheral face of a connection portion 336U formed to the insulator 318U, described later. Terminal portions 332U at both end sides of the coil wire 316U are led out from the core configuration sections 314U to a first axial direction side (the arrow Z1 side) of the stator core 320.

The insulator 318U is made from a resin, and includes the plural insulator portions 334U and the connection portion 336U that have been integrated together, as illustrated in FIG. 22A. The number of the plural insulator portions 334U provided is the same as the number of the plural core configuration sections 314U mentioned above, and the insulator portions 334U are disposed at even intervals in a ring shape. Each of the plural insulator portions 334U includes a first insulator portion 340U and a second insulator portion 350U segmented in an axial direction of the stator core 320.

The first insulator portion 340U and the second insulator portion 350U respectively include the teeth section insulator portions 342U, 352U, yoke configuration section insulator portions 344U, 354U, and extension side wall portions 346U, 356U. The teeth section insulator portions 342U, 352U, the yoke configuration section insulator portions 344U, 354U, and the extension side wall portions 346U, 356U together configure an insulator main body portion 360U that insulates between the core configuration sections 314U and the coil wire winding portions 328U (see FIG. 21). The teeth section insulator portions 342U, 352U are installed to the teeth sections 322U from both axial direction sides of the stator core 320 and are configured to cover the teeth sections 322U. The yoke configuration section insulator portions 344U, 354U are formed at leading end portions of the teeth section insulator portions 342U, 352U, are installed to the yoke configuration sections 324U from both axial direction sides of the stator core 320, and are configured to cover portions of the yoke configuration sections 324U other than the outer peripheral face.

The extension side wall portions 346U, 356U are respectively formed at base end portions of the teeth section insulator portions 342U, 352U. The extension side wall portions 346U, 356U are formed as plate shapes extending along the stator core 320 axial direction with their plate thickness direction aligned with a radial direction of the stator core 320. The extension side wall portions 346U, 356U are formed along the stator core 320 circumferential direction and are wider in width than the teeth section insulator portions 342U, 352U mentioned above.

The guide grooves 348U, 358U that extend along the stator core 320 axial direction are respectively formed at side portions in a circumferential direction of the stator core 320 of the extension side wall portions 346U, 356U. The guide grooves 348U, 358U are present to guide the terminal portions 332U (see FIG. 21). An extending portion 362U is formed at the extension side wall portions 346U of the first insulator portion 340U, extending towards a first axial direction side of the stator core 320. An extension end portion of the extending portion 362U is connected to a connection portion 336U, described later.

The connection portion 336U is disposed at the stator core 320 first axial direction side (the arrow Z1 side) with respect to the insulator portions 334U, and is formed in a ring shape along the stator core 320 circumferential direction. The connection portion 336U is provided at a radial direction inside of the stator core 320 with respect to the teeth section insulator portions 342U, 352U. Projection shaped retaining portions 364U are respectively formed at an outer peripheral face of the connection portion 336U between the plural insulator portions 334U so as to project towards outside of the stator core 320 radial direction. The retaining portions 364U retain the crossing wires 330U mentioned above from a second axial direction side of the stator core 320 (the arrow Z2 side) (see FIG. 21). Moreover, portions between the plural extending portions 362U of the connection portion 336U are formed with notches 366U open to the stator core 320 second axial direction side.

The V-phase stator configuration section 312V illustrated in FIG. 21 and FIG. 22B has a similar basic configuration to the U-phase stator configuration section 312U mentioned above. Namely, the V-phase stator configuration section 312V is configured including plural core configuration sections 314V, a coil wire 316V and an insulator 318V. Note that the coil wire 316V is omitted from illustration in FIG. 22B.

Each of the core configuration sections 314V is configured similarly to the core configuration sections 314U mentioned above, and includes a teeth section 322V and a yoke configuration section 324V.

The coil wire 316V illustrated in FIG. 21 configures the V-phase and includes plural coil wire winding portions 328V and plural crossing wires 330V. In the plural coil wire winding portions 328V, the coil wire 316V is wound concentrically on the teeth sections 322V of the core configuration sections 314V, with teeth section insulator portions 342V, 352V, described later, disposed therebetween. The coil wire winding portions 328V are connected to each other by the plural crossing wires 330V. The crossing wires 330V are laid out (wrapped) around the outer peripheral face of a connection portion 336V formed to the insulator 318V, described later. Terminal portions 332V at both end sides of the coil wire 316V are led out from the core configuration sections 314V to a first axial direction side (the arrow Z1 side) of the stator core 320.

The insulator 318V is made from a resin, and includes plural insulator portions 334V and the connection portion 336V that have been integrated together, as illustrated in FIG. 22B. The number of the plural insulator portions 334V provided is the same as the number of the plural core configuration sections 314V mentioned above, and the insulator portions 334V are disposed at even intervals in a ring shape. Each of the plural insulator portions 334V includes a first insulator portion 340V and a second insulator portion 350V segmented in an axial direction of the stator core 320.

The first insulator portion 340V and the second insulator portion 350V respectively include the teeth section insulator portions 342V, 352V, yoke configuration section insulator portions 344V, 354V and extension side wall portions 346V, 356V. The teeth section insulator portions 342V, 352V, the yoke configuration section insulator portions 344V, 354V and the extension side wall portions 346V, 356V together configure an insulator main body portion 360V that insulates between the core configuration sections 314V and the coil wire winding portions 328V (see FIG. 21). The insulator main body portion 360V is configured similarly to the insulator main body portion 360U mentioned above.

Guide grooves 348V, 358V that extend along the stator core 320 axial direction are respectively formed to side portions in a circumferential direction of the stator core 320 of the extension side wall portions 346V, 356V. The guide grooves 348V, 358V are present to guide the terminal portions 332V mentioned above (see FIG. 21). An extending portion 362V is also formed at each of the extension side wall portions 346V of the first insulator portion 340V, extending towards inside in the stator core 320 radial direction. An extension end portion of the extending portion 362V is connected to a connection portion 336V, described later.

The connection portion 336V is disposed at the stator core 320 first axial direction side (the arrow Z1 side) with respect to the insulator portions 334V. The connection portion 336V is formed in a circular ring plate shape extending along a circumferential direction of the stator core 320 and with a plate thickness direction aligned with the stator core 320 axial direction. The connection portion 336V is provided at inside in the stator core 320 radial direction with respect to the teeth section insulator portions 342V, 352V. Projection shaped retaining portions 364V are respectively formed at the outer peripheral face of the connection portion 336V between the plural insulator portions 334V so as to project outside in the stator core 320 radial direction. The retaining portions 364V retain the crossing wires 330V mentioned above from a second axial direction side of he stator core 320 (the arrow Z2 side) (see FIG. 21). Moreover, portions between the plural extending portions 362V of the connection portion 336V are formed with notches 366V open to the stator core 320 second axial direction side.

The W-phase stator configuration section 312W illustrated in FIG. 21 and FIG. 22C has a similar basic configuration to the U-phase stator configuration section 312U and the V-phase stator configuration section 312V mentioned above. Namely, the W-phase stator configuration section 312W is configured including the plural core configuration sections 314W, a coil wire 316W and an insulator 318W. Note that the coil wire 316W is omitted from illustration in FIG. 22C.

Each of the core configuration sections 314W is configured similarly to the core configuration sections 314U, 314V mentioned above, and includes a teeth section 322W and a yoke configuration section 324W.

The coil wire 316W illustrated in FIG. 21 configures the W-phase and includes plural coil wire winding portions 328W and plural crossing wires 330W. In the plural coil wire winding portions 328W, the coil wire 316W is wound concentrically on the teeth sections 322W of the core configuration sections 314W, with teeth section insulator portions 342W, 352W, described later, disposed therebetween. The coil wire winding portions 328W are connected to each other by the plural crossing wires 330W. The crossing wires 330W are laid out (wrapped) around the outer peripheral face of a connection portion 336W formed to the insulator 318W, described later. Terminal portions 332W at both end sides of the coil wire 316W are led out from the core configuration sections 314W to a first axial direction side (the arrow Z1 side) of the stator core 320.

The insulator 318W is made from a resin, and includes plural insulator portions 334W and the connection portion 336W that have been integrated together, as illustrated in FIG. 22C. The number of the plural insulator portions 334W provided is the same as the number of the plural core configuration sections 314W mentioned above, and the insulator portions 334W are disposed at even intervals in a ring shape. Each of the plural insulator portions 334W includes a first insulator portion 340W and a second insulator portion 350W segmented in an axial direction of the stator core 320.

The first insulator portion 340W and the second insulator portion 350W respectively include the teeth section insulator portions 342W, 352W, yoke configuration section insulator portions 344W, 354W and extension side wall portions 346W, 356W. The teeth section insulator portions 342W, 352W, the yoke configuration section insulator portions 344W, 354W and the extension side wall portions 346W, 356W together configure an insulator main body portion 360W that insulates between the core configuration sections 314W and the coil wire winding portions 328W (see FIG. 21). The insulator main body portion 360W is configured similarly to the insulator main body portions 360U, 360V mentioned above.

Guide grooves 348W, 358W that extend along an axial direction of the stator core 320 are respectively formed at side portions in a circumferential direction of the stator core 320 at the extension side wall portions 346W, 356W. The guide grooves 348W, 358W are present to guide the terminal portions 332W mentioned above (see FIG. 21). An extending portion 362W is also formed to each of the extension side wall portions 346W of the first insulator portion 340W, extending towards inside in the stator core 320 radial direction. An extension end portion of the extending portion 362W is connected to a connection portion 336W, described later.

The connection portion 336W is disposed at the first axial direction side of the stator core 320 (the arrow Z1 side) with respect to the insulator portions 334W, and formed in a ring shape extending in a circumferential direction along the stator core 320. The connection portion 336W is provided at the stator core 320 radial direction inside with respect to the teeth section insulator portions 342W, 352W. The connection portion 336W includes a circular ring shaped retaining portion 364W with its plate thickness direction aligned with the stator core 320 axial direction, and a ring shaped spacer 368W that extends from locations at an radial direction inner side of the retaining portion 364W towards the first axial direction side of the stator core 320. The retaining portion 364W retains the crossing wires 330W from a second axial direction side of the stator core 320 (the arrow Z2 side) (see FIG. 21).

As illustrated in FIG. 21, the plural stator configuration sections 312U, 312V, 312W are assembled together to configure the stator 310. In the stator 310, the ring shaped stator core 320 is configured by the plural core configuration sections 314U, 314V, 314W, and the ring shaped yoke 326 is formed by the plural yoke configuration sections 324U, 324V, 324W. In other words, the stator core 320 is segmented in the circumferential direction into the plural core configuration sections 314U, 314V, 314W, and the yoke 326 is segmented in the circumferential direction into the plural yoke configuration sections 324U, 324V, 324W. The plural yoke configuration sections 324U, 324V, 324W respectively fit between pairs of yoke configuration sections adjacent on the two sides thereof.

The plural connection portions 336U, 336V, 336W are provided coaxially to the stator core 320. The plural connection portions 336U, 336V, 336W and the plural extending portions 362U, 362V, 362W mentioned above are positioned at the stator core 320 radial direction inside with respect to each of the core configuration sections 314U, 314V, 314W. The connection portion 336U is disposed at the radial direction outside of the connection portions 336V, 336W, with a gap present between the connection portions 336V, 336W. The connection portion 336V is disposed at the first axial direction side of the connection portion 336W, with a gap present between the connection portion 336V and the connection portion 336W.

The V-phase retaining portions 364V are fitted against an inner peripheral face of the U-phase connection portion 336U, and the connection portion 336U and the connection portion 336V are thereby retained in a state separated from each other in the radial direction. Namely, the retaining portions 364V are provided in the radial direction between the connection portion 336U and the connection portion 336V, and also perform the role of spacers for retaining the connection portion 336U and the connection portion 336V in a state separated from each other in the radial direction. However, the spacers 368W make contact with a face in the second axial direction side (the arrow Z2 side) of the V-phase connection portion 336V, thereby retaining the connection portion 336V and the connection portion 336W in a state separated from each other in the axial direction.

Moreover, as mentioned above, in an assembled state of the plural connection portions 336U, 336V, 336W, the V-phase crossing wires 330V pass through inside the notches 366U formed at the U-phase connection portion 336U (are housed inside the notches 366U). The W-phase crossing wires 330W pass through inside the notches 366U, 366V formed respectively at the U-phase connection portion 336U and the V-phase connection portion 336V (are housed inside the notches 366U, 366V). The notches 366U, 366V are examples of a housing portion of the present invention.

Explanation follows regarding a manufacturing method of the stator 310 configured as described above.

Molding Process

Figure 23A:
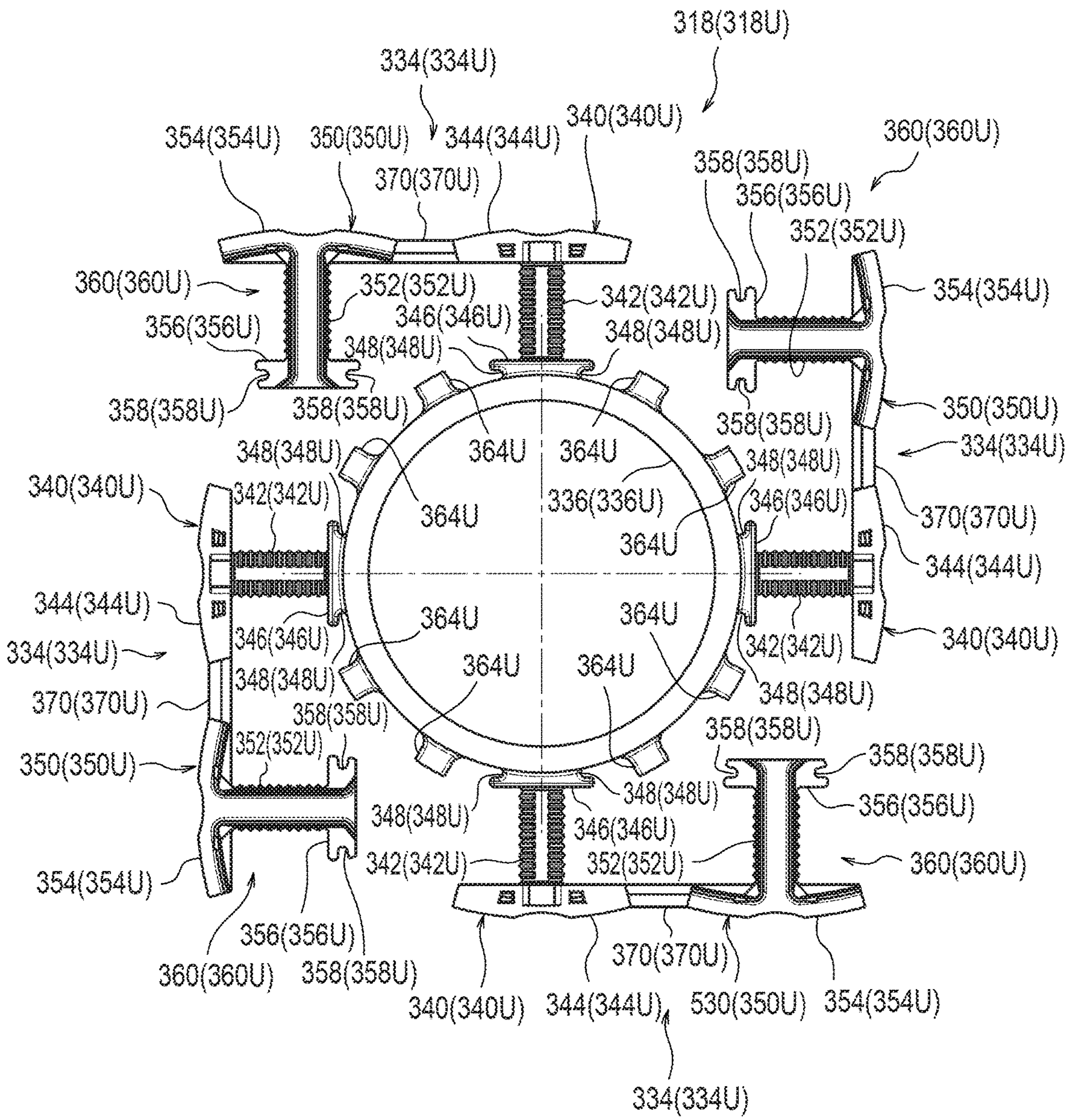
FIG. 23A is a plan view illustrating the insulator illustrated in FIG. 22A.

First, as illustrated in FIG. 23A, the above insulator 318U is formed by resin molding. When this is performed, as illustrated in FIG. 23A, in the insulator 318U, the second insulator portions 350U are formed so as to be adjacent to the first insulator portions 340U along tangential directions of the connection portion 336U, and bridging sections 370U are formed so as to connect together the yoke configuration section insulator portions 344U, 354U in the first insulator portions 340U and the second insulator portions 350U.

Namely, in this molding process, the first insulator portions 340U and the second insulator portions 350U are molded in a state connected together by the bridging sections 370U. Moreover, when this is performed, the plural second insulator portions 350U are each formed displaced to the same side (the same side in the connection portion 336U tangential direction) with respect to the respective first insulator portions 340U. Each of the bridging sections 370U is also formed with the same length as each other.

Note that, although in the insulator 318U the first insulator portions 340U and the second insulator portions 350U are molded so as to have U-shaped cross-section teeth section insulator portions 342U, 352U opening in opposite directions to each other, the first insulator portions 340U and the second insulator portions 350U may be molded so as to have U-shaped cross-section teeth section insulator portions 342U, 352U opening in the same direction as each other.

Installation and Cutoff Process

Figure 24A:
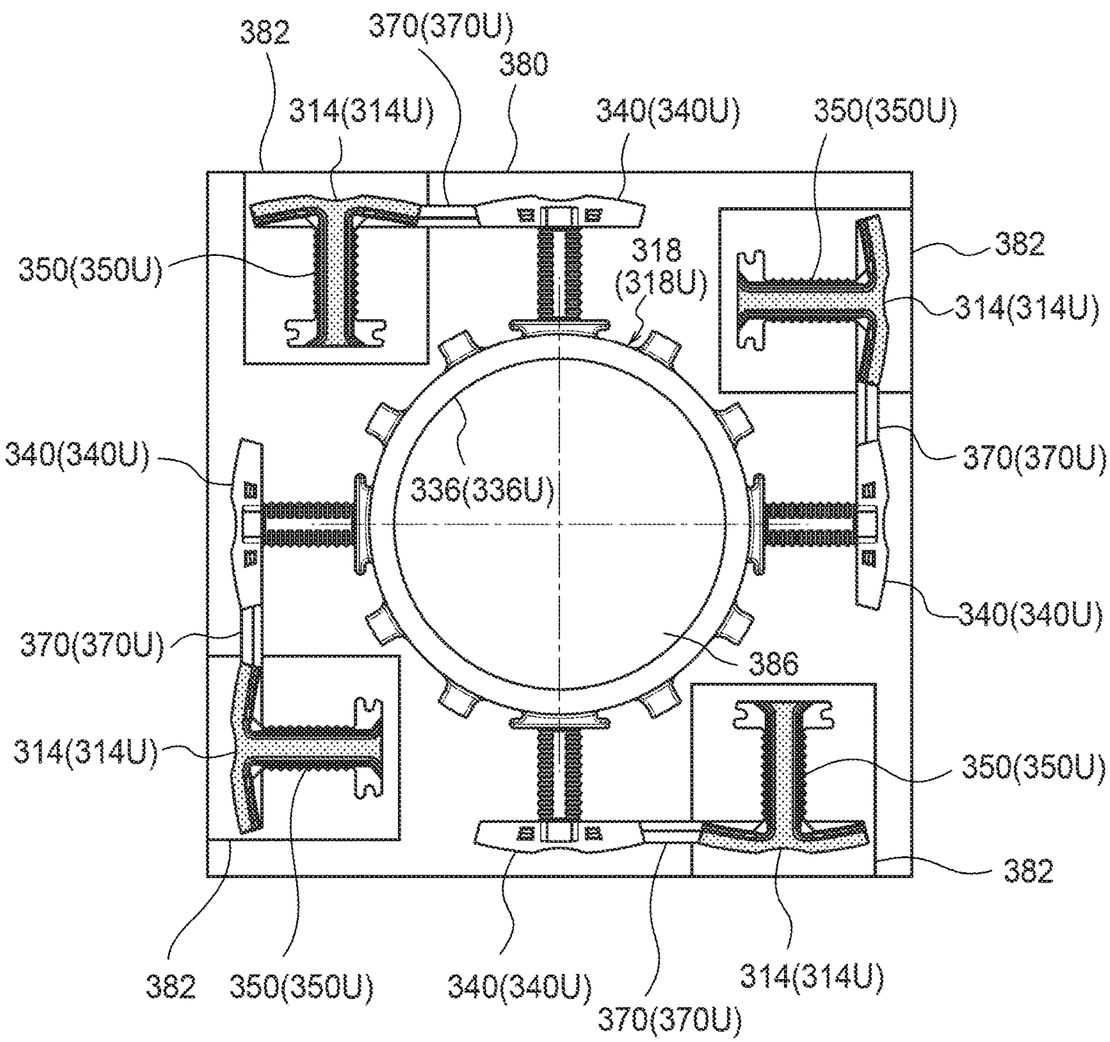
FIG. 24A is a drawing illustrating the insulator illustrated in FIG. 22A set in a jig and plural core configuration sections in a mounted state to second insulator portions.
Figure 24B:
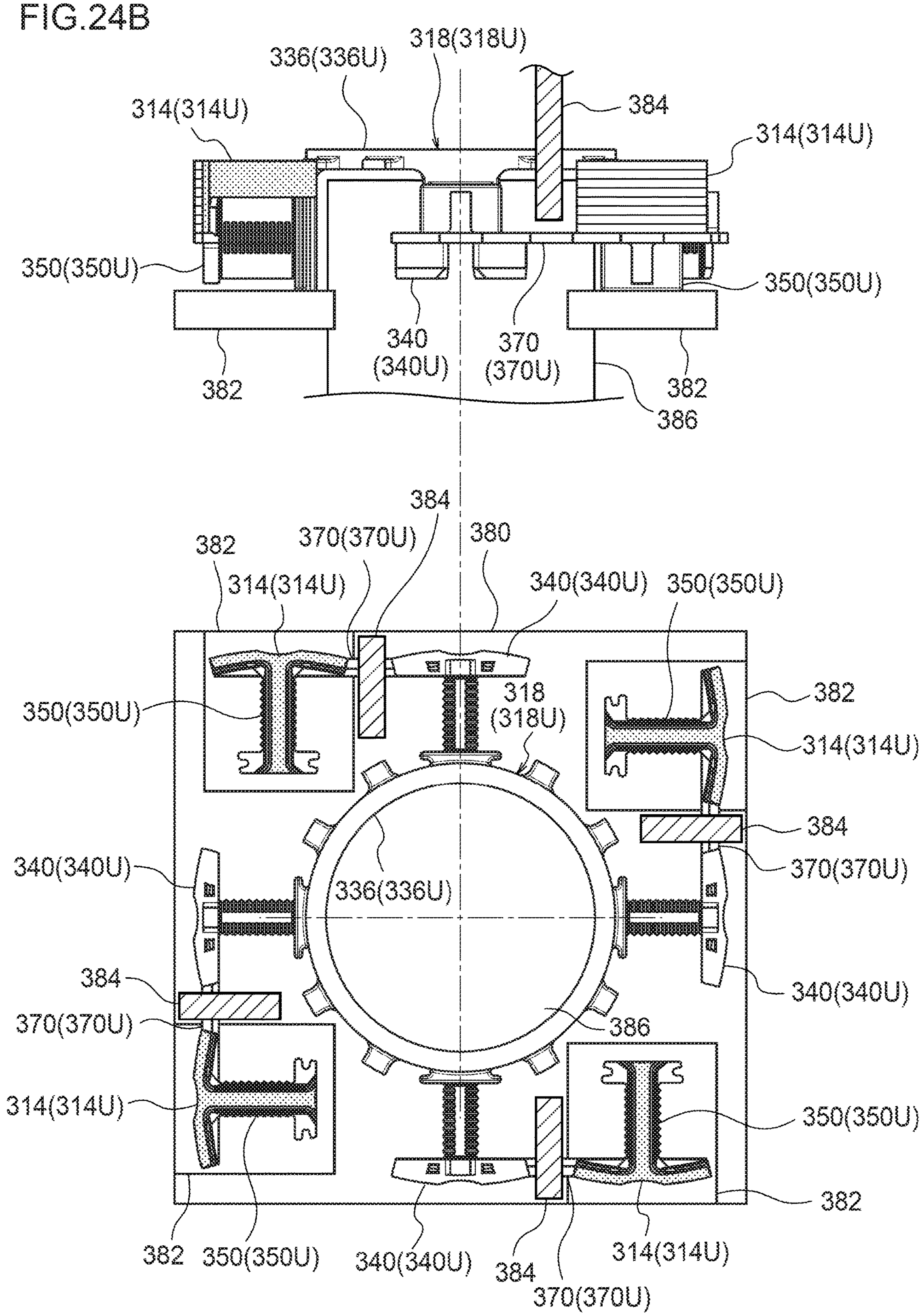
FIG. 24B is a drawing illustrating cut off of bridging section in the insulators illustrated in FIG. 24A.

Then, as illustrated in FIG. 24A, the insulator 318U is installed to a jig 380. When this is performed, the second insulator portions 350U are mounted to movable tables 382. Each of the plural core configuration sections 314U is then installed to the respective second insulator portion 350U from the vertical direction upper side. Then, as illustrated in FIG. 24B, each of the bridging sections 370 is cut off using a punching tool 384.

Positional Alignment Process

Figure 24C:
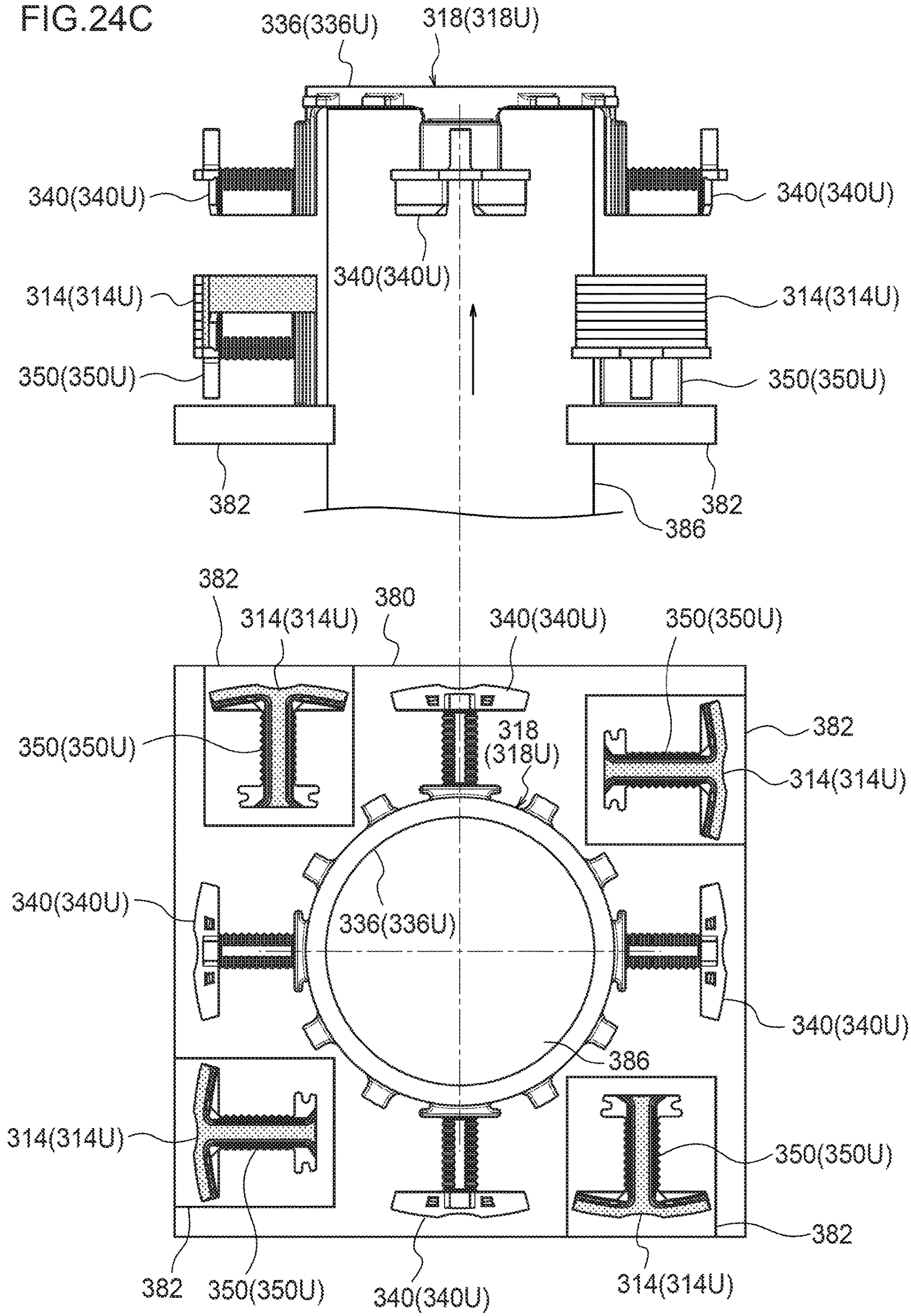
FIG. 24C is a drawing illustrating the insulators illustrated in FIG. 24B with portions other than the second insulator portions having been raised, and the second insulator portions having been slid.

Next, as illustrated in FIG. 24C, the connection portion 336U is raised, together with the plural first insulator portions 340U, using a lifting tool 386. When this is performed, the first insulator portions 340U are positioned at a higher position than the core configuration sections 314U. The movable tables 382 are then slid, together with the second insulator portions 350U, in connection portion 336U tangential directions such that the core configuration sections 314U are positioned below the first insulator portions 340U.

Figure 24D:
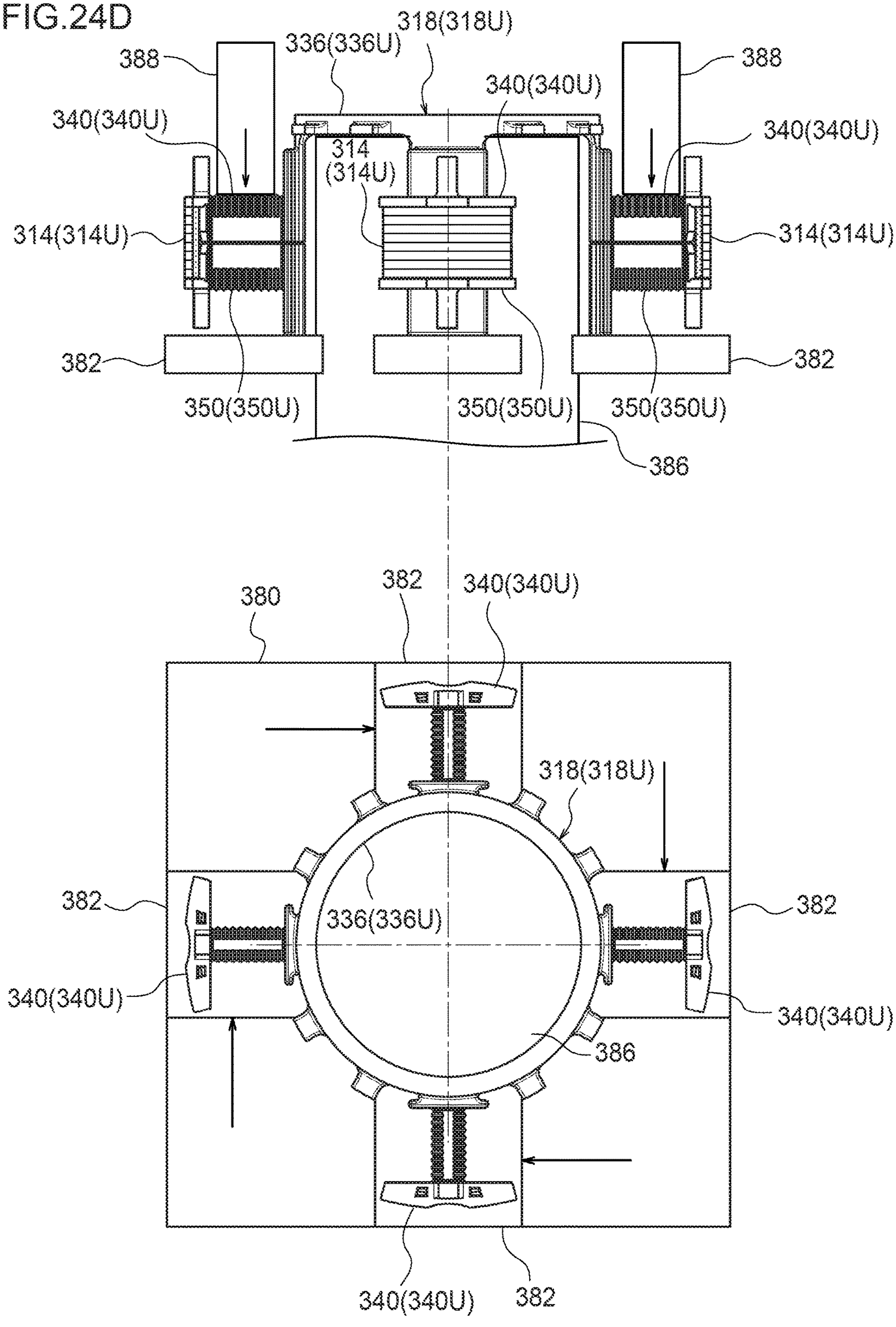
FIG. 24D is a drawing illustrating the insulators illustrated in FIG. 24C in a state with portions other than the second insulation sections having been lowered, and first insulator portions in a mounted state to core configuration sections.

Then, as illustrated in FIG. 24D, positional alignment is performed between the core configuration sections 314U installed to the second insulator portions 350U and the first insulator portions 340U. The positional alignment here is performed in a state in which the core configuration sections 314U remain installed vertically above the second insulator portions 350U.

Installation Process

Then, as illustrated in FIG. 24D, the connection portion 336U is lowered by the lifting tool 386 together with the plural first insulator portions 340U, and the first insulator portions 340U are installed on the core configuration sections 314U installed to the second insulator portions 350U. When this is performed, the first insulator portions 340U are pressed against the core configuration sections 314U by a press tool 388.

Coil Wire Winding Process

Figure 24E:
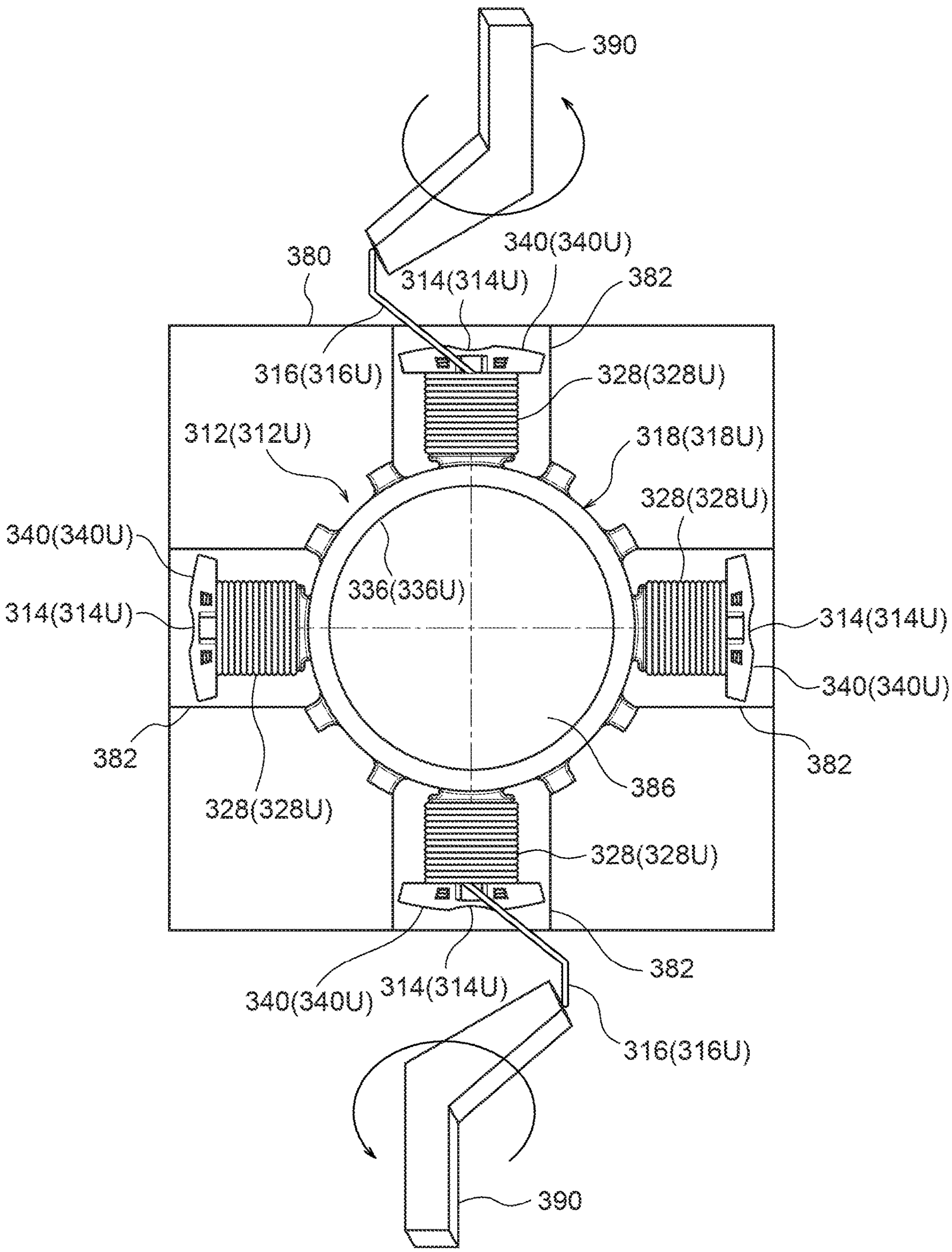
FIG. 24E is a drawing illustrating coil wires being wound onto the core configuration sections illustrated in FIG. 24D.

Then, as illustrated in FIG. 24E, using a flyer 390, the coil wire 316U is wound on the core configuration sections 314U, with the first insulator portions 340U and the second insulator portions 350U interposed therebetween. The coil wire winding portions 328U are thereby formed with the coil wire 316U on the core configuration sections 314U. The stator configuration section 312U is completed by the above processes.

The stator configuration sections 312V, 312W are also manufactured similarly to the stator configuration section 312U.

Figure 23B:
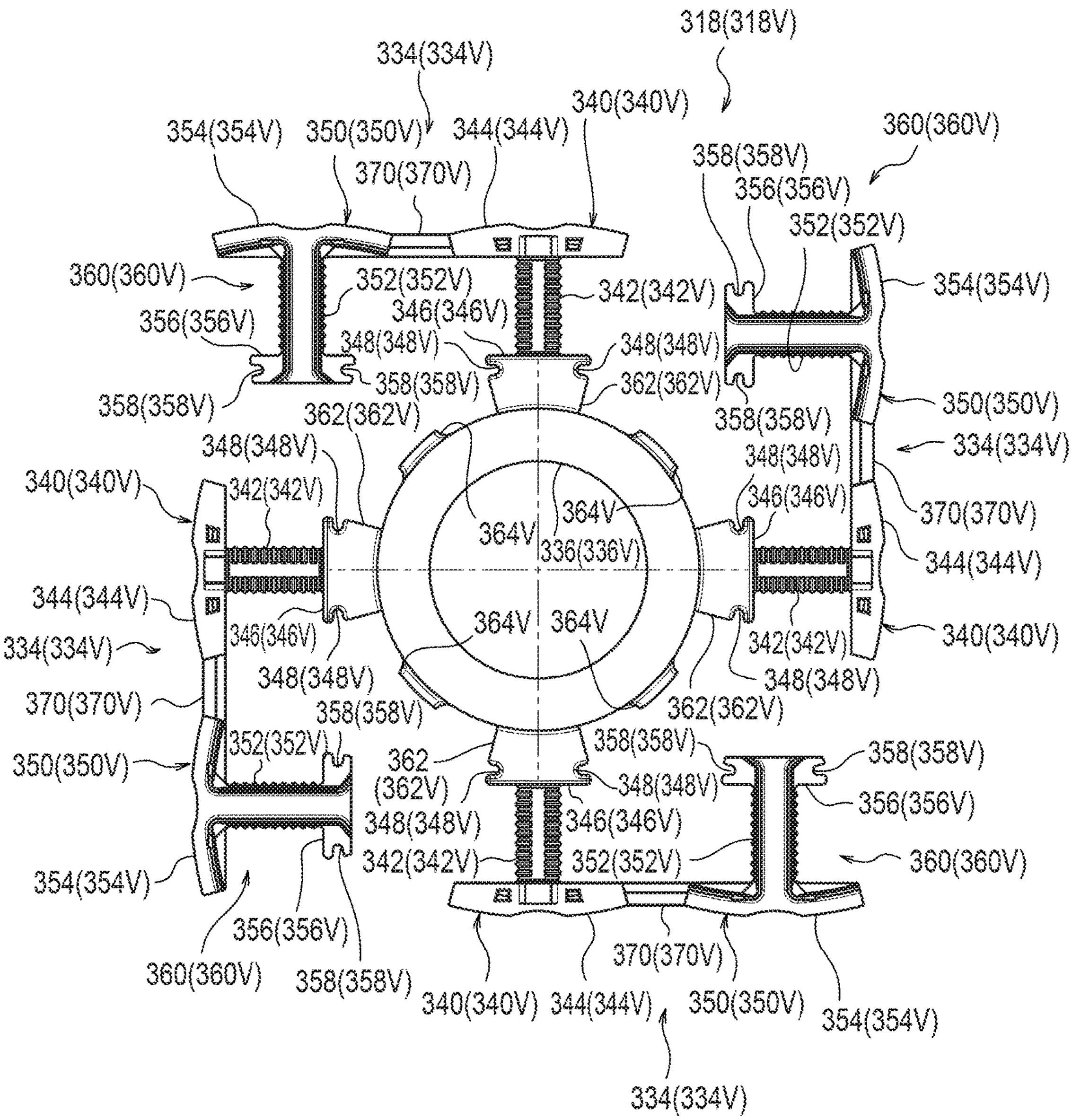
FIG. 23B is a plan view illustrating the insulator illustrated in FIG. 22B.
Figure 23C:
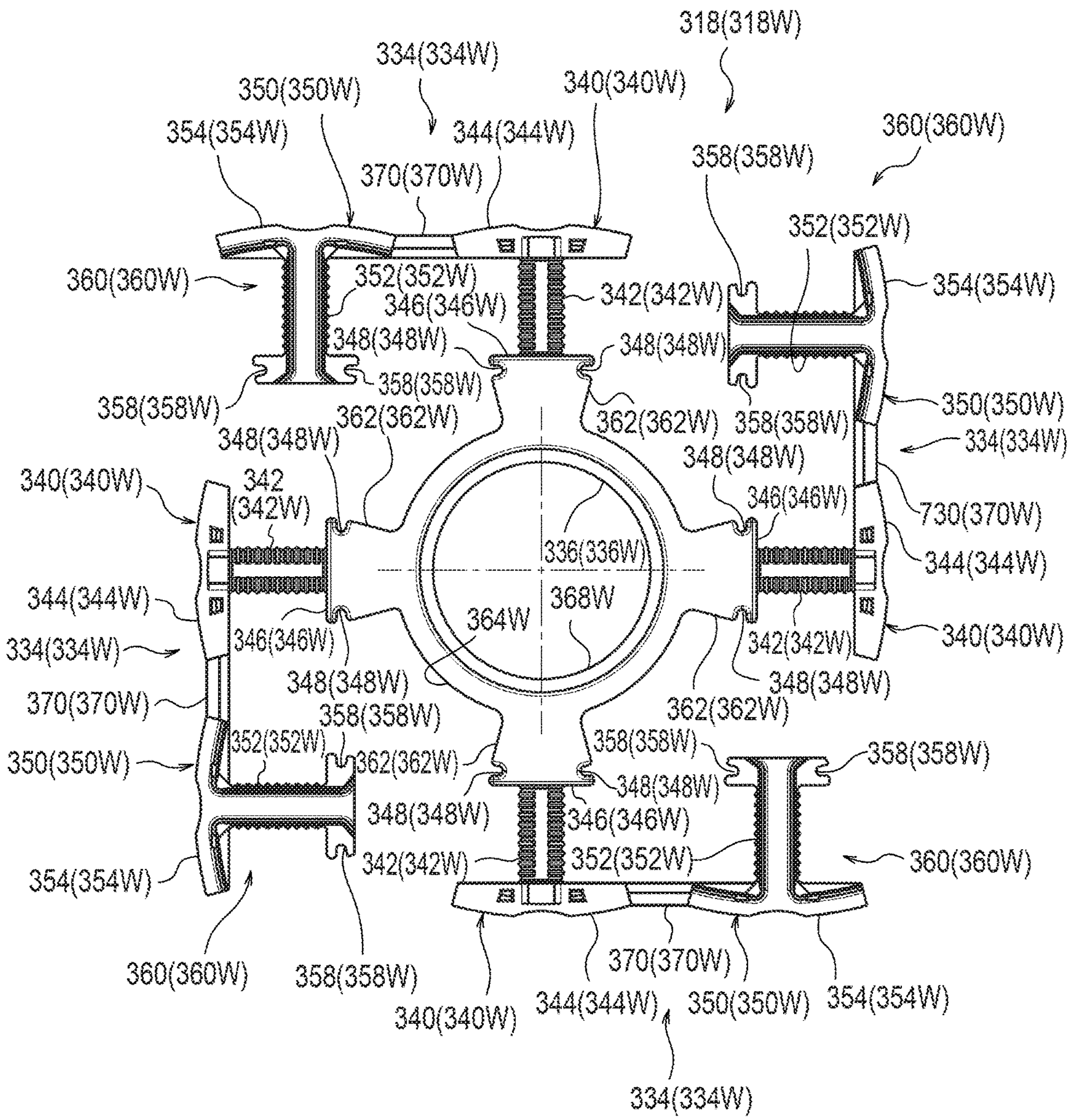
FIG. 23C is a plan view illustrating the insulator illustrated in FIG. 22C.

Namely, in the molding process, as illustrated in FIG. 23B, in the insulator 318V the first insulator portions 340V and the second insulator portions 350V are integrally formed to the bridging sections 370V for connecting together the first insulator portions 340V and the second insulator portions 350V. Moreover, as illustrated in FIG. 23C, in the insulator 318W the first insulator portions 340W and the second insulator portions 350W are integrally formed to the bridging sections 370W for connecting together the first insulator portions 340W and the second insulator portions 350W.

Then, in the installation and cutoff process, the plural core configuration sections 314V, 314W are respectively installed to the second insulator portions 350V, 350W, and then each of the bridging sections 370V, 370W are cut off. Moreover, in the positional alignment process, positional alignment is performed between the core configuration sections 314V, 314W installed to the second insulator portions 350U, 350W and the first insulator portions 3340V, 340W, and in the installation process, the first insulator portions 340V, 340W are then installed to the core configuration sections 314V, 314W installed to the second insulator portions 350V, 350W.

Then, in the coil wire winding process, the coil wires 316V, 316W are wound on the core configuration sections 314V, 314W, thereby forming the coil wire winding portions 328V, 328W with the coil wires 316V, 316W on the core configuration sections 314V, 314W. The stator configuration sections 312V, 312W are completed by the above processes.

Then the stator 310 is completed by assembling together the plural stator configuration sections 312U, 312V, 312W.

Explanation follows regarding operation and advantageous effects of the present exemplary embodiment.

Note that, in the following explanation, for convenience the letters U, V, W are omitted as suffixes to the labels of each member and each portion when no discrimination is made between the U-phase, the V-phase and the W-phase.

According to the manufacturing method of the stator 310 of the present exemplary embodiment, in the molding process, the first insulator portions 340 and the second insulator portions 350 of the insulators 318 are integrally formed with the bridging sections 370 interposed therebetween. The number of components required for assembling the stator 310 can accordingly be reduced compared to cases in which the first insulator portions 340 and the second insulator portions 350 are formed separately.

Moreover, in the installation and cutoff process, the bridging sections 370 are cut off after the core configuration sections 314 have been installed to the second insulator portions 350. Thus, when installing the core configuration sections 314 to the second insulator portions 350, and when setting the insulators 318 in the jig 380, the whole body of each of the insulators 318 including the second insulator portions 350 can be set in the jig 380 all in one operation. The number of processes for setting the insulators 318 in the jig 380 can accordingly be reduced in comparison to cases in which the bridging sections 370 are cut off prior to installing the core configuration sections 314 in the second insulator portions 350.

Moreover, in the molding process, the plural first insulator portions 340 arrayed in a ring shape are connected together by each of the connection portions 336. Thus in the subsequent positional alignment process, positional alignment can be easily performed between the core configuration sections 314 installed to the second insulator portions 350 and the first insulator portions 340.

In particular, in the molding process, the plural first insulator portions 340 are arrayed in the ring shape at even intervals therebetween, and the plural second insulator portions 350 are formed displaced to the same side with respect to each of the first insulator portions 340. Each of the bridging sections 370 is also formed with the same length as each other. Hence, the core configuration sections 314 are installed to the second insulator portions 350 in the installation and cutoff process subsequent to the molding process. In the positional alignment process, even when positional alignment between the core configuration sections 314 and the first insulation portions 340 is performed by moving the second insulator portions 350 with the installed core configuration sections 314 with respect to the first insulator portions 340, the movement distances of the plural second insulator portions 350 can be made the same as each other. Positional alignment between the core configuration sections 314 installed in the second insulator portions 350 and the first insulator portions 340 can accordingly be performed even more easily.

Moreover, in the positional alignment process, positional alignment is performed between the core configuration sections 314 and the first insulator portions 340 in a state in which the core configuration sections 314 have been installed from the vertical direction upper side in the second insulator portions 350. The core configuration sections 314 can accordingly be easily retained in an installed state in the second insulator portions 350, enabling positional alignment between the core configuration sections 314 and the first insulator portions 340 to be performed easily.

Moreover, according to the manufacturing method of the stator 310, plural of the insulators 318 are formed for a single stator core 320. Hence, the stator core 320 can be segmented into the plural stator configuration sections 312U, 312V, 312W by assembling each of the plural core configuration sections 314, which are segmented in the stator core 320 circumferential direction, to each of the insulators 318. It is accordingly possible to manufacture each of the stator configuration sections 312U, 312V, 312W, resulting in an easy assembly operation for the stator core 320 (in particular easy winding operations of the coil wires 316).

Moreover, when the plural insulators 318U, 318V, 318W are assembled together, placement is made such that there are gaps present in the stator core 320 radial direction between the connection portion 336U and the connection portions 336V, 336W, and placement is made such that there is a gap present in the stator core 320 axial direction between the connection portion 336V and the connection portion 336W. Thus interference between the plural connection portions 336U, 336V, 336W can be suppressed when assembling the plural insulators 318U, 318V, 318W together. Good operating efficiency can accordingly be achieved when assembling the plural insulators 318U, 318V, 318W together.

Moreover, the notches 366U for housing the V-phase and W-phase crossing wires 330V, 330W, which are examples of another member, are formed in the U-phase connection portion 336U, and the notches 366V for housing the W-phase crossing wires 330W, which is an example of another member, are formed in the V-phase connection portion 336V. Therefore in the assembled state of the stator 310, interference between the connection portion 336U and the crossing wires 330V, 330W and interference between the connection portion 336V and the crossing wires 330W can be avoided.

Moreover, in each of the connection portions 336U, 336V, 336W, the retaining portions 364U, 364V, 364W are formed in order to respectively retain the crossing wires 330U, 330V, 330W. Good operating efficiency can accordingly be achieved when assembling together the plural stator configuration sections 312U, 312V, 312W. Even after the stator 310 has been incorporated in a brushless motor, the crossing wires 330U, 330V, 330W are still retained at the connection portions 336U, 336V, 336W by the retaining portions 364U, 364V, 364W, and so flapping of the crossing wires 330U, 330V, 330W can be suppressed, enabling the occurrence of noise and faults to be suppressed.

Moreover, the retaining portions 364V that function as spacers so as to retain the connection portion 336U and the connection portion 336V in a state separated from each other are formed to the connection portion 336V, and the spacers 368W that retain the connection portion 336V and the connection portion 336W in a state separated from each other are formed to the connection portion 336W. The plural connection portions 336U, 336V, 336W can accordingly be retained in a state separated from each other in the assembled state of the stator 310. Space for, for example, laying out the crossing wires 330V, 330W between the plural connection portions 336U, 336V, 336W can accordingly be secured, and rattling of the plural connection portions 336U, 336V, 336W can also be suppressed.

The plural connection portions 336U, 336V, 336W are provided coaxially to the stator core 320 when the plural insulators 318U, 318V, 318W have been assembled to the stator core 320. The structure of the stator 310 can accordingly be simplified.

Each of the connection portions 336 is positioned to the radial direction inside with respect to the stator core 320 when the plural insulators 318U, 318V, 318W are assembled to the stator core 320. Interference between the flyer 390 and the connection portions 336 can accordingly be suppressed when using the flyer 390 to wind the coil wires 316 on the core configuration sections 314 from outside in the radial direction of the stator core 320.

The extending portions 362 also extend out from the insulator main body portions 360 (the extension side wall portions 346 of the first insulator portions 340) that insulate between the core configuration sections 314 and the coil wire winding portions 328, and the extending portions 362 are connected together by the connection portions 336. The extending portions 362 are positioned at the stator core 320 radial direction inside with respect to the core configuration sections 314. Hence, interference between the flyer 390 and the extending portions 362 and the connection portions 336 can be suppressed when using the flyer 390 to wind the coil wires 316 on the core configuration sections 314 from outside in the radial direction of the stator core 320.

Moreover, in the core configuration sections 314, the teeth sections 322 are locations where the coil wires 316 are wound to form the coil wire winding portions 328. Guide portions (the guide grooves 348, 358), for example, for guiding the terminal portions 332 of the coil wires 316 are also formed to base end sides of the teeth sections 322.

Regarding this point, according to the manufacturing method of the stator 310, the bridging sections 370 are formed so as to connect between the yoke configuration section insulator portions 344, 354 of the first insulator portions 340 and the second insulator portions 350. Although the bridging sections 370 is formed, it can accordingly be suppressed for the bridging sections 370 from influencing the coil wire winding portions 328, the guide portions and the like.

Explanation follows regarding modified examples of the present exemplary embodiment.

In the above exemplary embodiment the second insulator portions 350 are formed so as to be to adjacent to the first insulator portions 340 in the connection portions 336 tangential direction. However, as illustrated in FIG. 25, the second insulator portions 350 may be formed so as to be adjacent to the first insulator portions 340 in the connection portions 336 circumferential direction.

In the above exemplary embodiment, the second insulator portions 350 are connected by the bridging sections 370 to only one of the first insulator portions 340 out of the two adjacent first insulator portions 340 on the two sides of the second insulator portions 350. However, as illustrated in FIG. 25, the second insulator portions 350 may be connected through the bridging sections 370 to each of the first insulator portions 340 of the two adjacent first insulator portions 340 on the two sides of the second insulator portions 350.

Figure 25:
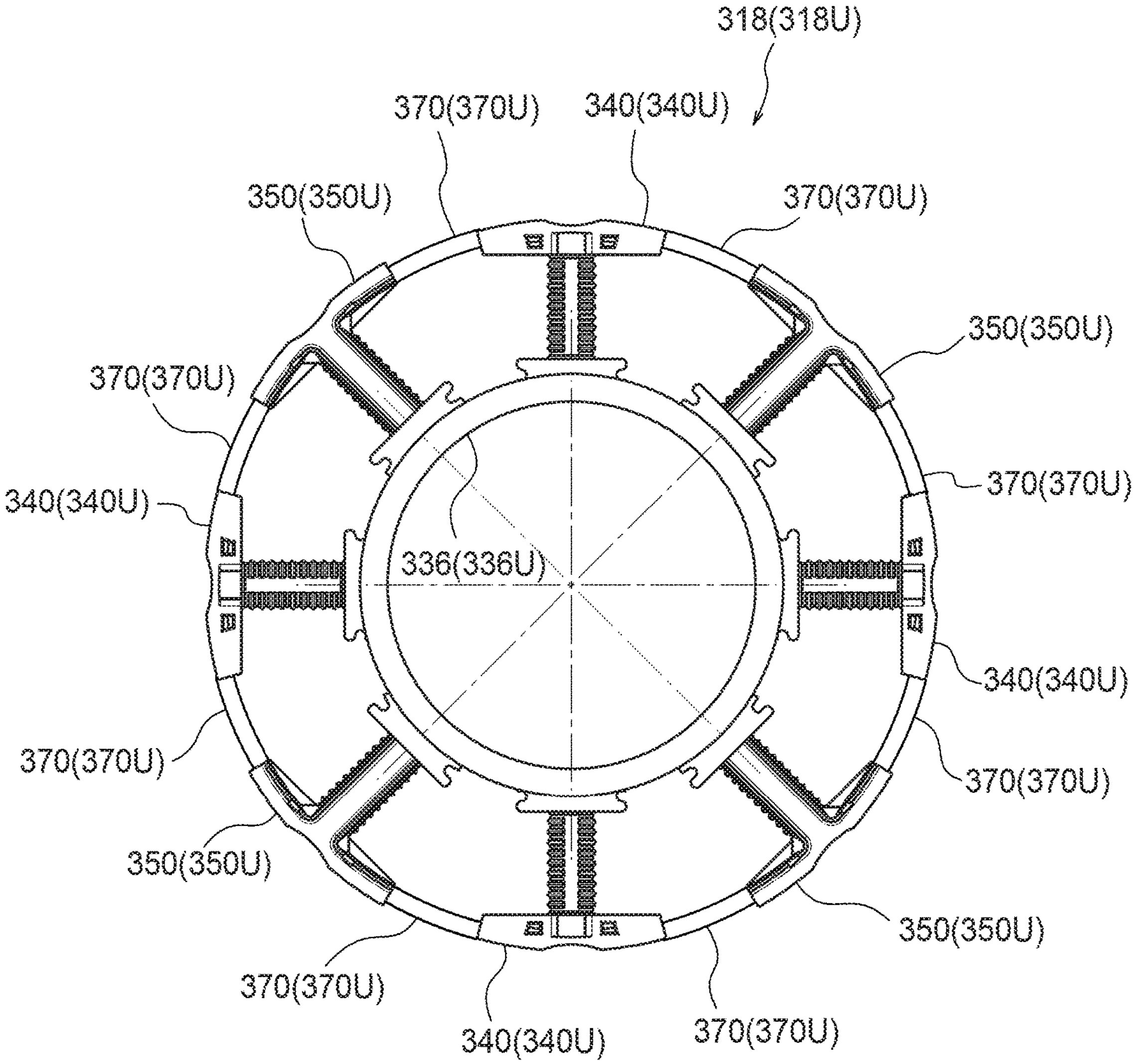
FIG. 25 is a drawing illustrating a modified example of insulators of the third exemplary embodiment.

Note that when the insulators 318 illustrated in FIG. 25 are employed, the stator configuration sections 312 are manufactured by a method that is similar to the above manufacturing method, as illustrated in FIG. 26A to FIG. 26D, but differs from the above manufacturing method in the following points.

Figure 26A:
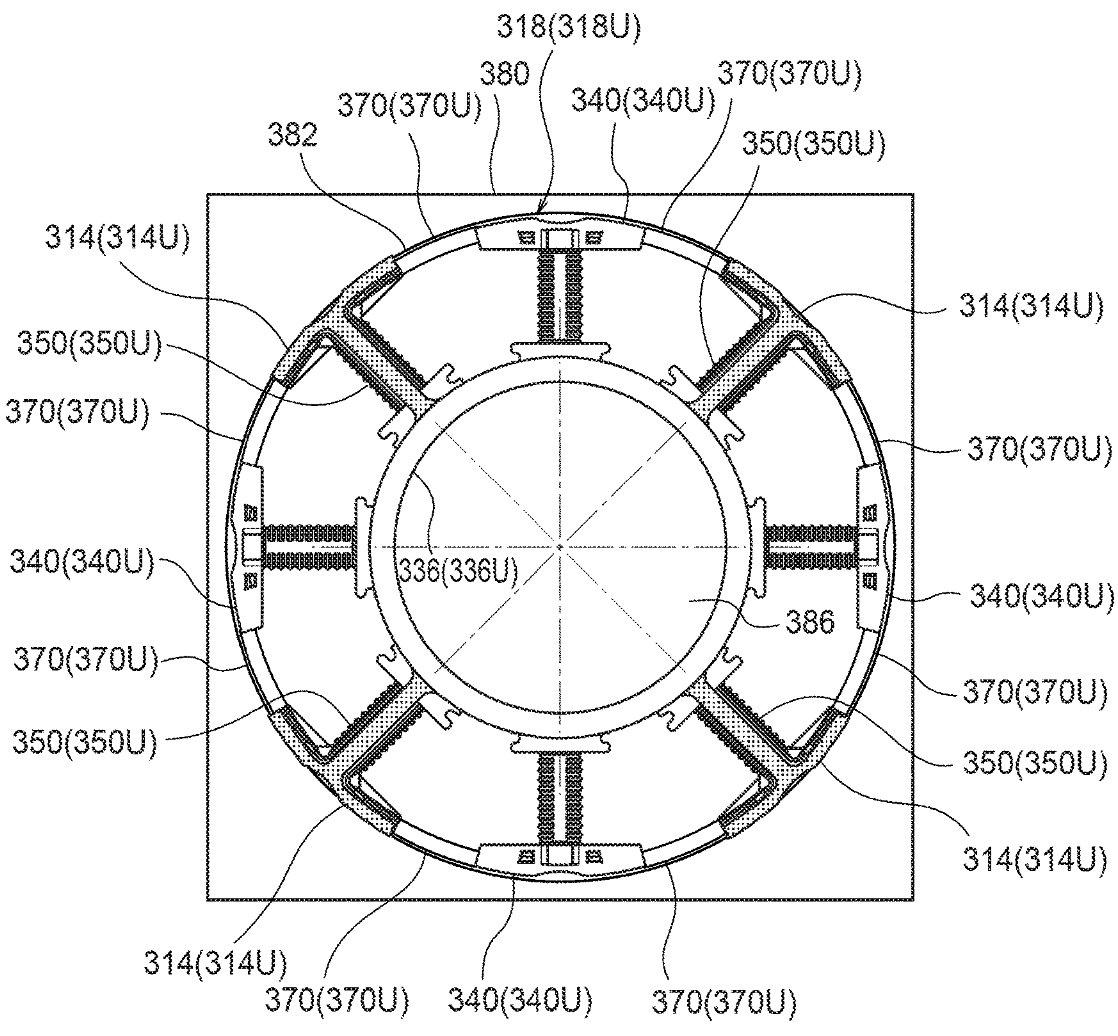
FIG. 26A is a drawing illustrating the insulators illustrated in FIG. 25 set in a jig and plural core configuration sections in an installed state to second insulator portions.
Figure 26B:
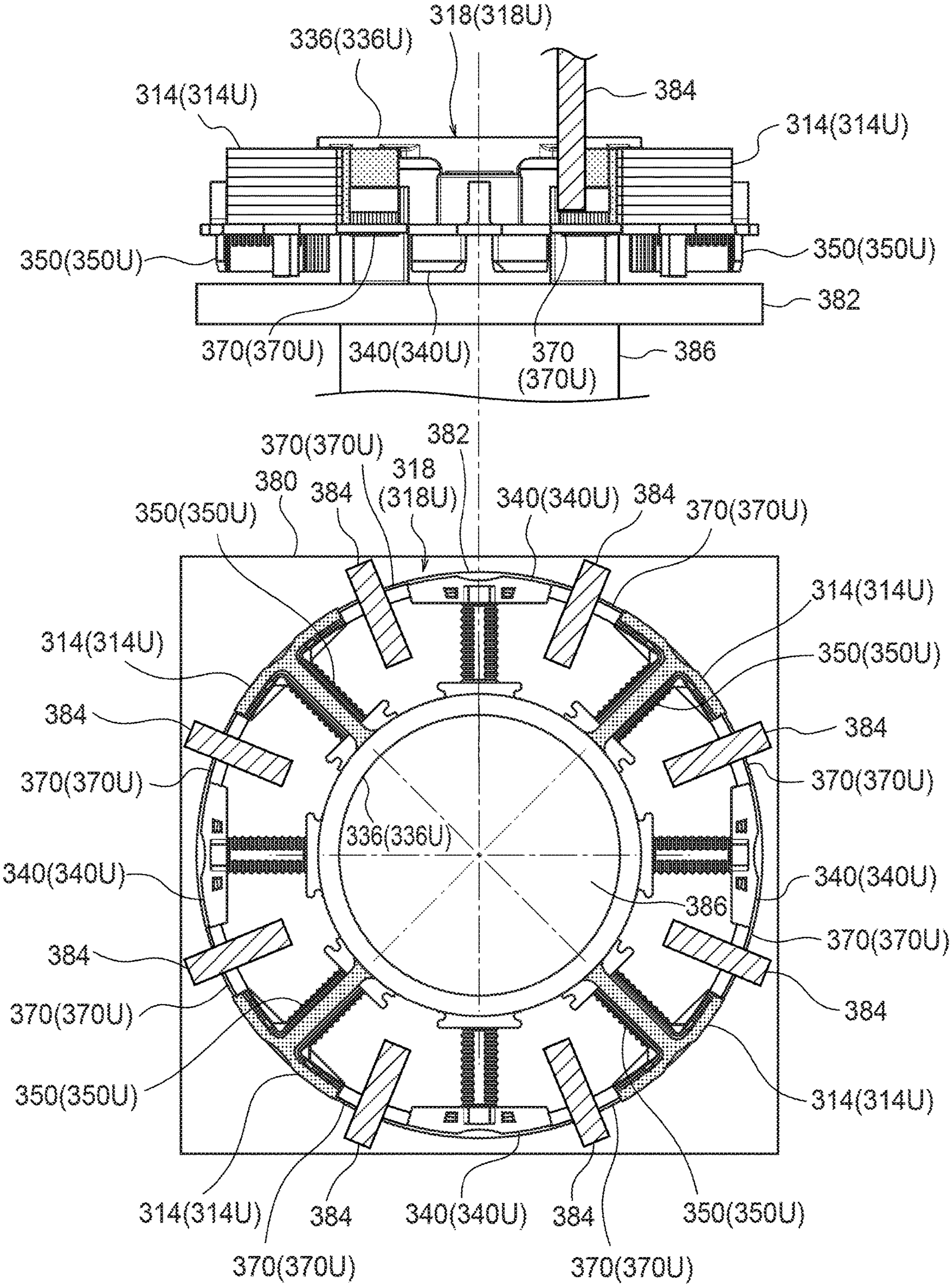
FIG. 26B is a drawing illustrating cut off of bridging sections in the insulators illustrated in FIG. 26A.
Figure 26C:
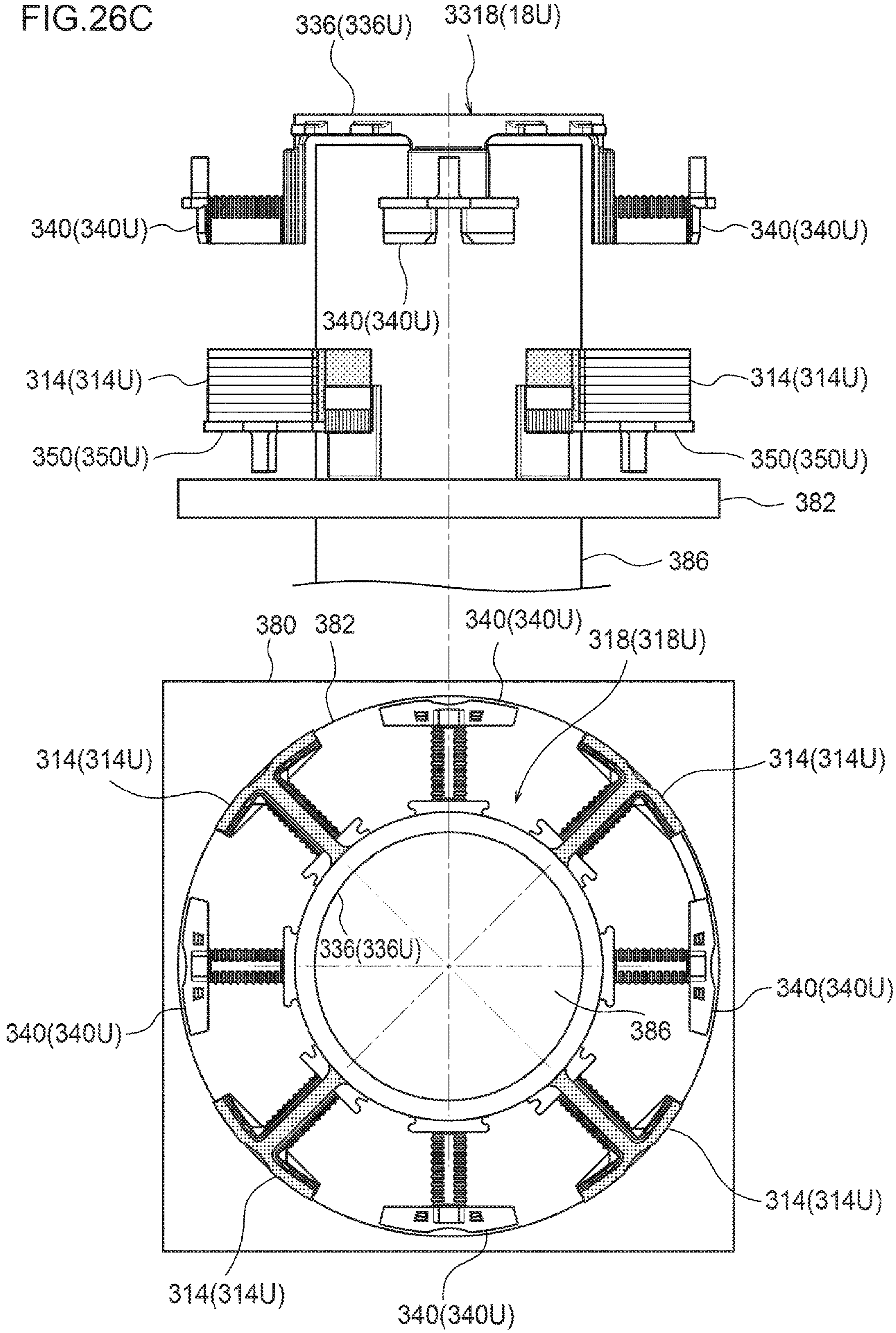
FIG. 26C is a drawing illustrating the insulators illustrated in FIG. 26B with portions other than the second insulator portions having been raised, and the second insulator portions having been slid.
Figure 26D:
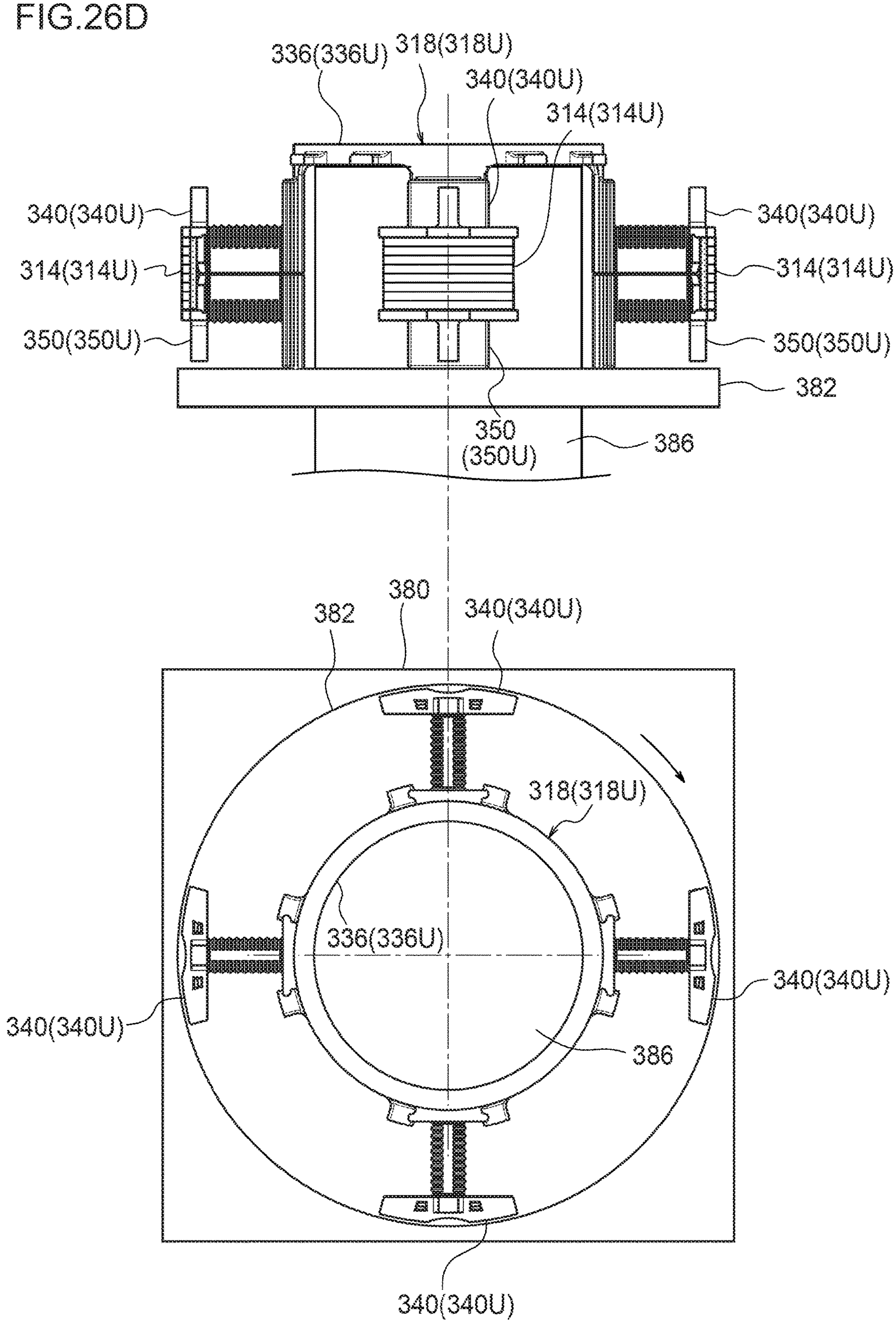
FIG. 26D is a drawing illustrating the insulators illustrated in FIG. 26C in a state with portions other than the second insulator portions having been lowered, and first insulator portions in an installed state to core configuration sections.

Namely, as illustrated in FIG. 26A, in the installation and cutoff process, movable tables capable of sliding in the connection portions 336 circumferential direction are employed for the movable tables 382. Moreover, as illustrated in FIG. 26B, in the installation and cutoff process, plural bridging sections 370 arranged at intervals along the connection portions 336 circumferential direction are cut off. Furthermore, as illustrated in FIG. 26C and FIG. 26D, in the positional alignment process, the movable tables 382 are slid together with the second insulator portions 350U in the connection portion 336U circumferential direction such that the core configuration sections 314U are positioned below the first insulator portions 340U. Note that the installation process and the coil wire winding process are similar to those described above.

Similar operation and advantageous effects can be exhibited using this manufacturing method to those of the manufacturing method of the above exemplary embodiment.

In the above exemplary embodiment, after the core configuration sections 314 have been installed to the second insulator portions 350 in the installation and cutoff process, the first insulator portions 340 are then installed to the core configuration sections 314 in the subsequent installation process. However, configuration may be made such that, after the first insulator portions 340 have been installed to the core configuration sections 314 from the vertical direction upper side in the installation and cutoff process, the second insulator portions 350 are then installed to the core configuration sections 314 from the vertical direction lower side in a subsequent installation process.

Note that in such cases, a recessed and protruding interlocking structure or a friction structure, or a jig or the like, not shown in the drawings, may be employed in order to prevent the core configuration sections 314 from falling out from the first insulator portions 340. The core configuration sections 314 may also be installed to the first insulator portions 340 that have been resiliently deformed by for example a jig, such that the core configuration sections 314 are retained in the first insulator portions 340 by rebound force of the first insulator portions 340.

Moreover, the insulators 318 may be configured in a vertically inverted state to that described above, such that the first insulator portions 340 are in a state opening upwards in the vertical direction, and the core configuration sections 314 then installed to the first insulator portions 340 from the vertical direction upper side in this state.

Moreover, in the above exemplary embodiment, the second insulator portions 350 installed with the core configuration sections 314 are moved with respect to the first insulator portions 340 in the positional alignment process. However, the first insulator portions 340 may be moved together with the connection portions 336 with respect to the second insulator portions 350 installed with the core configuration sections 314. Moreover, both the second insulator portions 350 installed with the core configuration sections 314 and the first insulator portions 340 may be moved.

In the installation and cutoff process, the bridging sections 370 are cut off after the core configuration sections 314 have been installed to the second insulator portions 350, however the bridging sections 370 may be cut off prior to installation of the core configuration sections to the second insulator portions 350.

Moreover, although placement is made such that there are gaps present between the connection portion 336U and the connection portions 336V, 336W in the stator core 320 radial direction, and placement is made such that there is a gap present between the connection portion 336V and the connection portion 336W in the stator core 320 axial direction, the plural connection portions 336U, 336V, 336W may be disposed such that there is a gap present in one direction out of the stator core 320 radial direction and axial direction, or in a direction that is a combination thereof.

Moreover, although the notches 366U serving as an example of a housing portion are formed in the connection portion 336U for housing the crossing wires 330V, 330W (for the crossing wires 330V, 330W to pass through), and the notches 366V serving as an example of a housing portion are formed in the connection portion 336V for housing the crossing wires 330W (for the crossing wires 330W to pass through), a notch shaped housing portion may for example be formed to the connection portion 336W for housing another member other than the crossing wires 330.

Moreover, although in the extending portions 362U extend from the extension side wall portions 346U towards the stator core 320 first axial direction side, the extending portions 362U may extend from the extension side wall portions 356U towards the stator core 320 second axial direction side.

Moreover, in the insulators 318U, 318V, 318W for each of the phases, the teeth section insulator portions 342, 352 and the yoke configuration section insulator portions 344, 354, excluding the extension side wall portions 346, 356, may configure the insulator main body portions 360, and a portion of the extension side wall portions 346 extending in the stator core 320 circumferential direction from the teeth section insulator portions 342 may also be configured as an extending portion. Similarly, the teeth section insulator portions 342, 352 and the yoke configuration section insulator portions 344, 354, excluding the extension side wall portions 346, 356, may configure the insulator main body portions 360, and a portion of the extension side wall portions 356 extending in the stator core 320 circumferential direction from the teeth section insulator portions 352 may also be configured as an extending portion. Each of the extending portions may also be connected by the connection portions 336.

In the insulators 318U, 318V, 318W for each of the phases, as long as the extending portion 362 is positioned to the stator core 320 radial direction inside with respect to the core configuration sections 314, the extending portion 362 may extend from the insulator main body portions 360 in one direction out of the stator core 320 axial direction, radial direction, or circumferential direction, or a direction that is a combination thereof.

In the V-phase insulator 318V, the retaining portions 364V have a function to act as retaining portions for retaining the crossing wires 330 and a function to act as spacers to retain the connection portions 336U, 336V in a stated separated from each other in the radial direction. However a retaining portion and a spacer may be provided independently from each other.

Moreover, although the plural connection portions 336U, 336V, 336W are provided coaxially to the stator core 320, they may be provided not coaxial to the stator core 320. Each of the connection portions 336U, 336V, 336W are also formed in a ring shape, however they may be formed in another shape, such as a polygonal shape or a shape with a portion missing such as a C-shape.

Each of the connection portions 336U, 336V, 336W are positioned to the stator core 320 radial direction inside with respect to the core configuration sections 314, however as long as the extending portions 362U, 362V, 362W are positioned to the stator core 320 radial direction inside with respect to the core configuration sections 314, each of the connection portions 336U, 336V, 336W may be positioned at the stator core 320 radial direction outside with respect to the core configuration sections 314.

Moreover, although the stator 310 is also configured for use in an inner rotor type brushless motor, the stator 310 may also be configured for use in an outer rotor type brushless motor.

Moreover, although the stator 310 is segmented into the stator configuration sections 312U, 312V, 312W configured for each of the plural phases, as an example of plural groups, the stator 310 may be segmented into plural stator configuration sections configuring groups that each contain a combination of plural phases.

Moreover, in addition to the above, configuration may also be made with stator configuration sections configuring each of the groups including other combinations of core configuration sections of plural phases.

Note that although the brushless motor applied with the stator 310 according to the present exemplary embodiment is configured as an example by an 8-pole 12 slot motor, configuration may be made with a motor having another combination of numbers of poles and numbers of slots.

Moreover, the connection method of the plural coil wires 316 may be configured in star connection pattern or a delta connection pattern, both in series or in parallel.

Fourth Exemplary Embodiment

Explanation follows regarding a fourth exemplary embodiment of the present invention.

Figure 27:
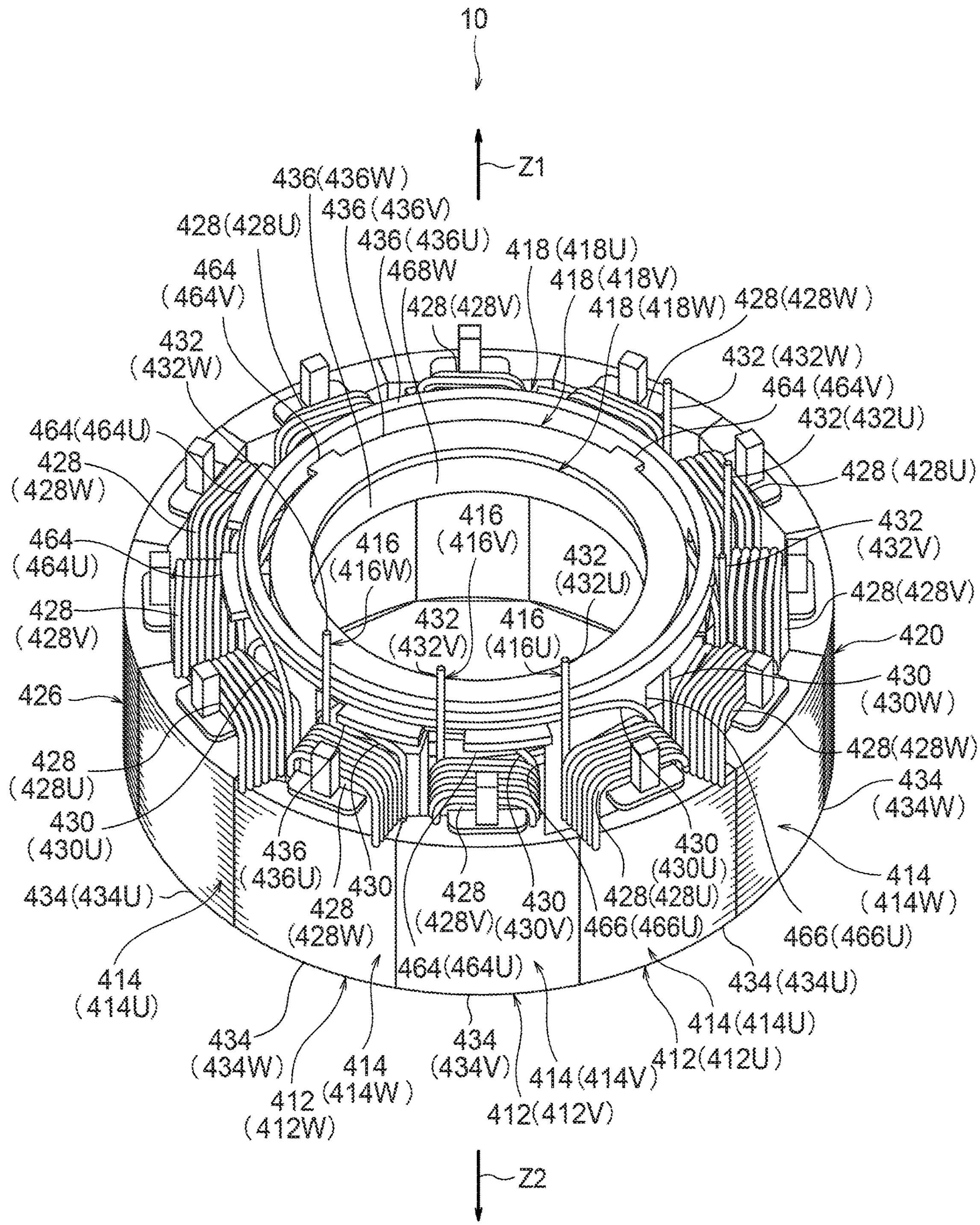
FIG. 27 is a perspective view illustrating a stator according to a fourth exemplary embodiment of the present invention.

A stator 410 according to a fourth exemplary embodiment of the present invention illustrated in FIG. 27 has portions similar to those of the stator of the third exemplary embodiment. Explanation hence focuses on differing portions and explanation regarding similar portions is omitted as appropriate.

Figure 28A:
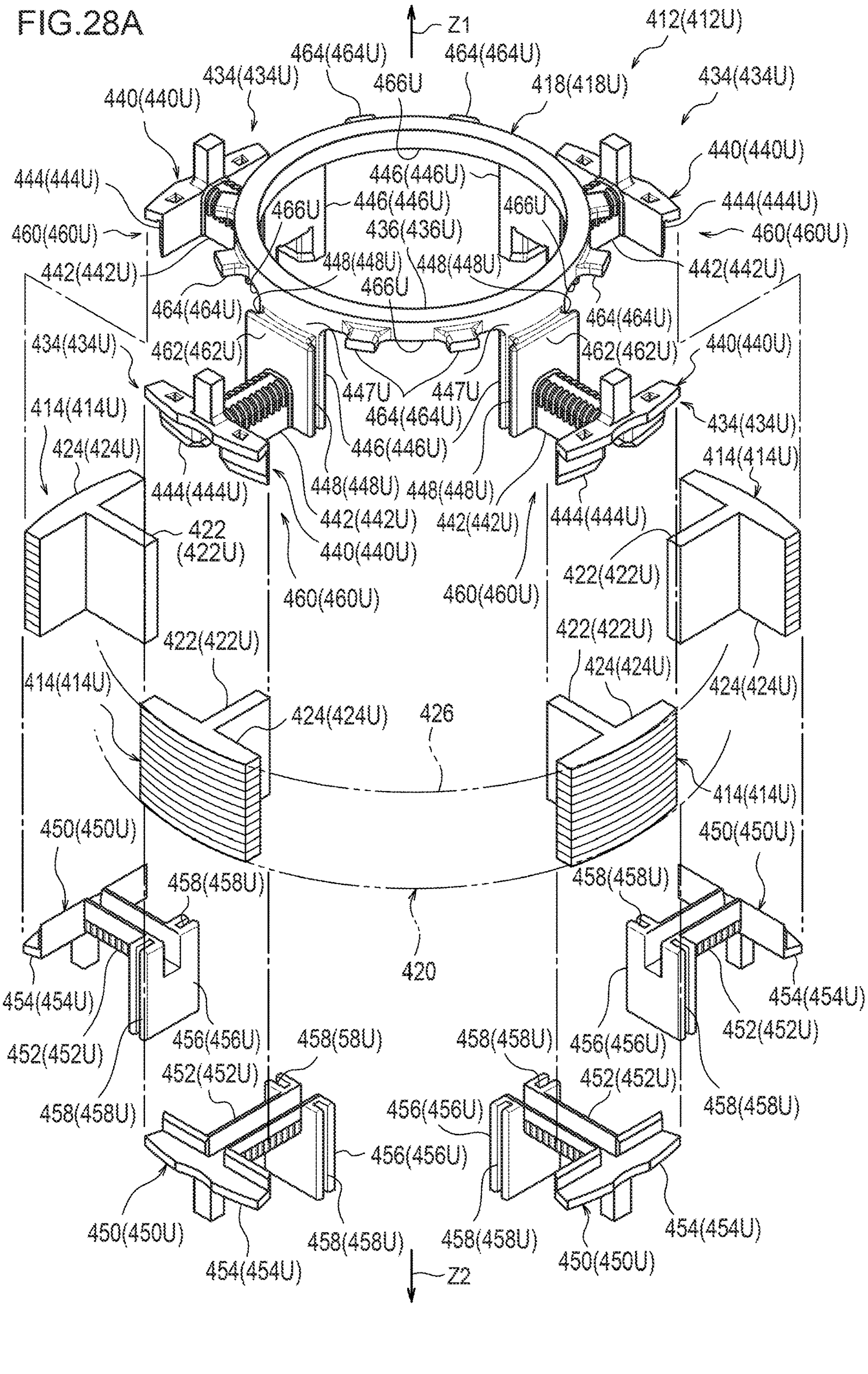
FIG. 28A is an exploded perspective view illustrating a U-phase stator configuration section illustrated in FIG. 27.

In the present exemplary embodiment, as illustrated in FIG. 27 and FIG. 28A, in a U-phase stator configuration section 412U, a first connection portion 436U is disposed at a first axial direction side (the arrow Z1 side) of a stator core 420 and is formed in a ring shape extending around a circumferential direction of the stator core 420. The first connection portion 436U is provided further to a stator core 420 radial direction inside than teeth section insulator portions 442U, 452U (namely, than winding portions 428U wound on teeth sections 422U). Axial direction extending portions 447U extend from the first connection portion 436U towards a stator core 420 second axial direction side (arrow Z2 side), and the leading end portions of the axial direction extending portions 447U are connected to end portions at the axial direction first side of extension side wall portions 446U. The axial direction extending portions 447U, the extension side wall portions 446U, and extension side wall portions 456U configure an extending portion 462U that is part of an insulator portion 434U.

Figure 28B:
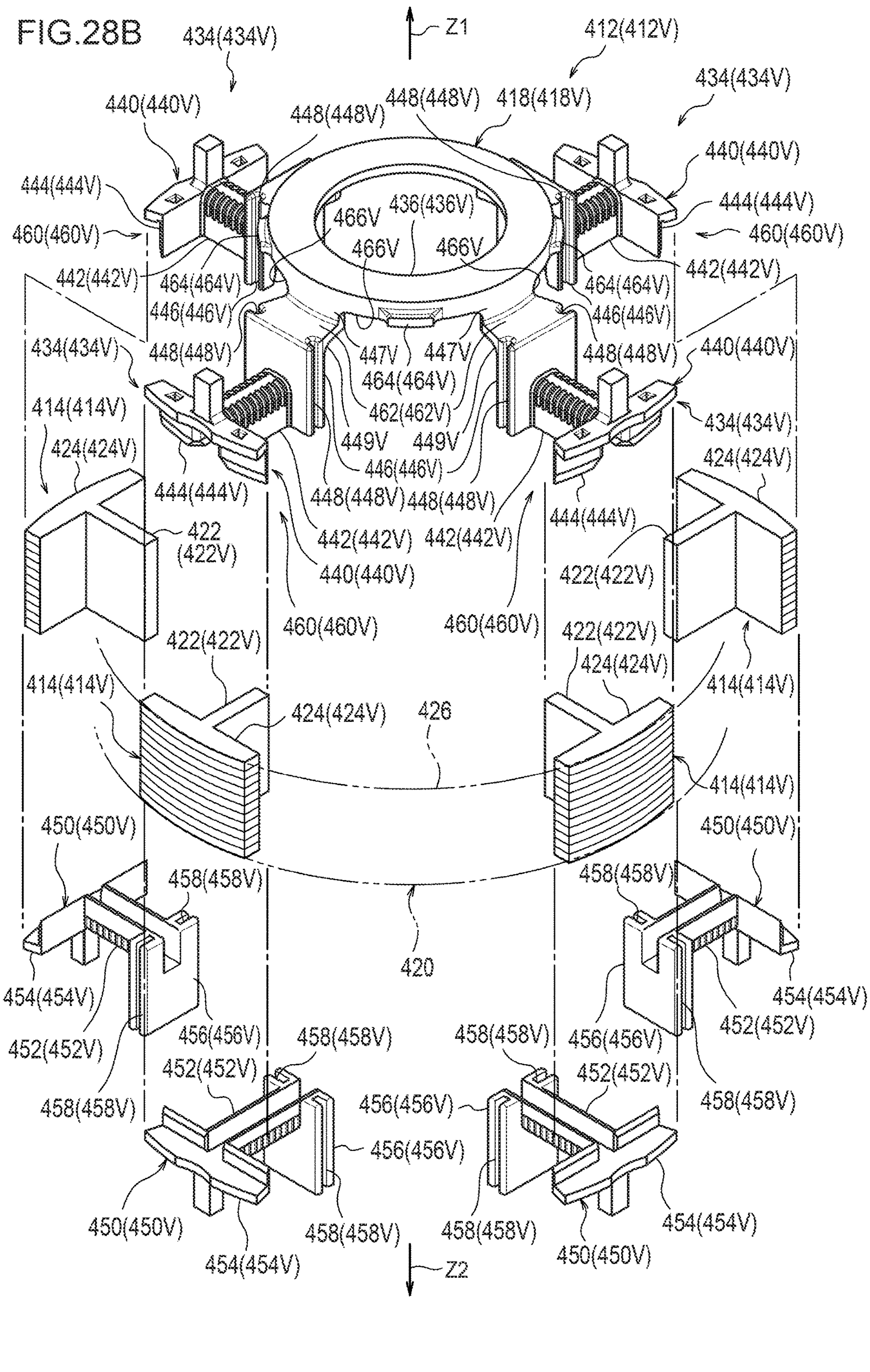
FIG. 28B is an exploded perspective view illustrating a V-phase stator configuration section illustrated in FIG. 27.

Next, as illustrated in FIG. 27 and FIG. 28B, in a V-phase stator configuration section 412V, a first connection portion 436V is disposed at the first axial direction side (the arrow Z1 side) of the stator core 420. The first connection portion 436V is formed in a circular ring plate shape extending around the stator core 420 circumferential direction and having its thickness direction aligned with the stator core 420 axial direction. The first connection portion 436V is provided further to the stator core 420 radial direction inside than teeth section insulator portions 442V, 452V (namely, than winding portions 428V wound on teeth sections 422V). Axial direction extending portions 447V extend from the first connection portion 436V towards the stator core 420 second axial direction side (arrow Z2 side). Moreover, radial direction extending portions 449V also extend towards the stator core 420 radial direction outside from leading end portions of the axial direction extending portions 447V. Leading end portions of the radial direction extending portions 449V are connected to end portions at the first axial direction side of extension side wall portions 446V. The axial direction extending portions 447V, the radial direction extending portions 449V, the extension side wall portions 446V, and extension side wall portions 456V configure an extending portion 462V that is part of an insulator portion 434V.

Figure 28C:
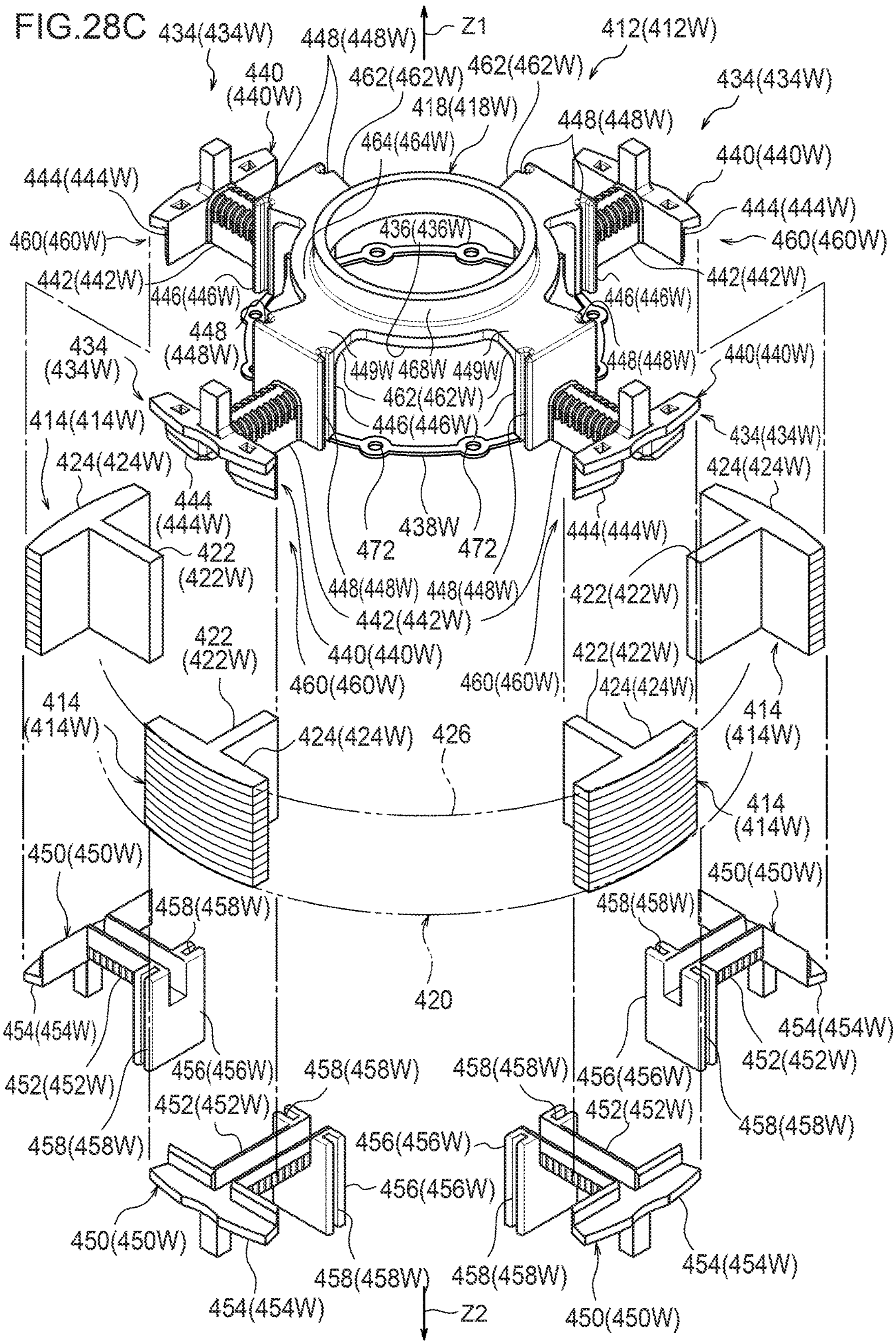
FIG. 28C is an exploded perspective view illustrating a W-phase stator configuration section illustrated in FIG. 27.

Next, as illustrated in FIG. 27 and FIG. 28C, in a W-phase stator configuration section 412W, a first connection portion 436W is disposed at the first axial direction side (the arrow Z1 side) of the stator core 420 and is formed in a ring shape extending around the circumferential direction of the stator core 420. The first connection portion 436W is provided further to the stator core 420 radial direction inside than teeth section insulator portions 442W, 452W (namely, than winding portions 428W wound on teeth sections 422W). Radial direction extending portions 449W extend towards the stator core 420 radial direction outside from the first connection portion 436W. Leading end portions of the radial direction extending portions 449W are connected to end portions at the axial direction first side of extension side wall portions 446W. The radial direction extending portions 449W, the extension side wall portions 446W, and extension side wall portions 456W configure extending portions 462W that are part of insulator portions 434W.

The first connection portion 436W mentioned above includes a circular ring shaped retaining portion 464W that has a plate thickness direction aligned with the stator core 420 axial direction, and a ring shaped spacer 468W that extends from a location at the radial direction inside of the retaining portion 464W towards the first axial direction side of the stator core 420. The retaining portion 464W retains the crossing wires 430W mentioned above from the stator core 420 second axial direction side (arrow Z2 side) (see FIG. 27).

Figure 29:
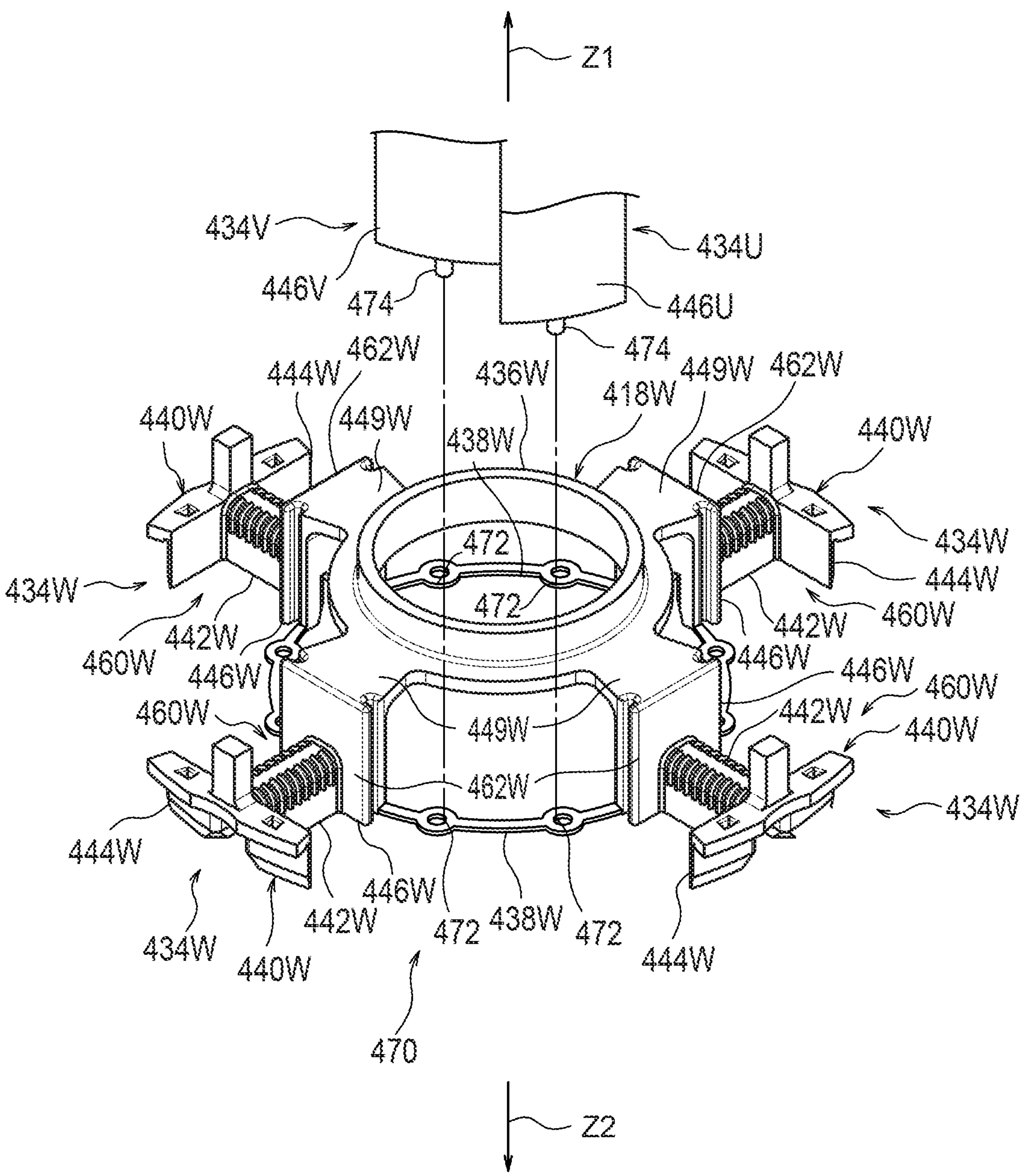
FIG. 29 is a perspective view illustrating an interlocking structure of the fourth exemplary embodiment of the present invention.

Moreover, as illustrated in FIG. 29, second connection portions 438W are formed at the extension side wall portions 446W that are positioned on the stator core 420 first axial direction side. The second connection portions 438W are formed in circular arc shapes extending around the stator core 420 circumferential direction, and connect end portions at the stator core 420 second axial direction side of the adjacent extension side wall portions 446W. The second connection portions 438W are disposed further to the stator core 420 radial direction inside than the teeth section insulator portions 442W, 452W (namely than winding portions 428W wound on teeth sections 422W with the teeth section insulator portions 442W, 452W interposed).

Figure 30:
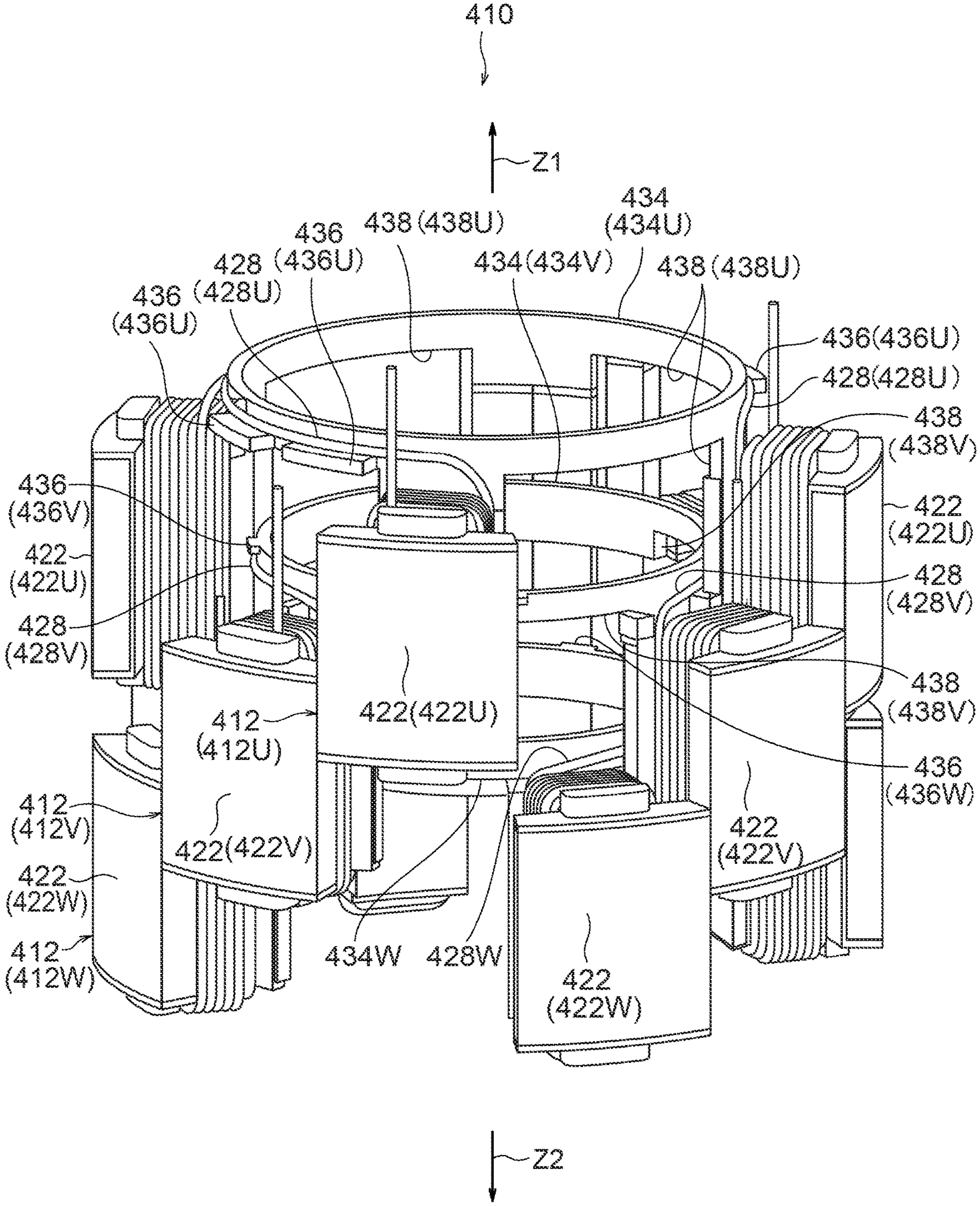
FIG. 30 is a perspective view illustrating a process of assembling together plural stator configuration sections illustrated in FIG. 27.

Then, as illustrated in FIG. 30, the stator configuration section 412U, the stator configuration section 412V and the stator configuration section 412W (the insulator 418U, insulator 418V and the insulator 418W) are disposed in sequence from the stator core 420 first axial direction side towards the second axial direction side, thereby assembling the plural stator configuration sections 412U, 412V, 412W together. When this is being performed, the plural stator configuration sections 412U, 412V, 412W are assembled together such that plural core configuration members 414U, 414V, 414W are arranged in the sequence U-phase, V-phase, W-phase around the circumferential direction of the stator core 420. Thus, as illustrated in FIG. 27, the stator 410 is configured by the plural stator configuration sections 412U, 412V, 412W.

Moreover, as illustrated in FIG. 29, the plural insulators 418U, 418V, 418W have an interlocking structure 470 for positioning with respect to each other. Namely, recess shaped fitting portions 472 are formed at the second connection portions 438W. Protrusion shaped fitted-to portions 474 onto which the fitting portions 472 fit are formed to insulator portions 438U, 438V (more specifically, end portions at the stator core 420 second axial direction side of the extension side wall portions 446U, 446V) disposed between pairs of insulator portions 434W that are connected together by the second connection portions 438W. The fitting portions 472 and the fitted-to portions 474 configuring the interlocking structure 470 fit together with each other, thereby positioning and fixing the plural insulators 418U, 418V, 418W with respect to each other.

The plural first connection portions 436U, 436V, 436W are positioned coaxially to each other, and provided coaxially to the stator core 420. The plural first connection portions 436U, 436V, 436W and the plural extending portions 462U, 462V, 462W mentioned above are also positioned further to the stator core 420 radial direction inside than each of the insulator main body portions 460U, 460V, 460W (the core configuration members 414U, 414V, 414W).

The first connection portion 436V external diameter is smaller than the first connection portion 436U external diameter, and the first connection portion 436W external diameter is smaller than the first connection portion 436V external diameter. The first connection portion 436U is disposed at the radial direction outside of the first connection portions 436V, 436W, with a gap present to the first connection portions 436V, 436W. The first connection portion 436V is disposed to the radial direction outside and on the first axial direction side of the first connection portion 436W, with a gap present to the first connection portion 436W.

The V-phase retaining portions 464V fit against an inner peripheral face of the U-phase first connection portion 436U, thereby retaining the first connection portion 436U and the first connection portion 436V in a state separated from each other in the radial direction. Namely, the retaining portions 464V are provided in the radial direction between the first connection portion 436U and the first connection portion 436V, and perform as the spacers to retain the first connection portion 436U and the first connection portion 436V in mutually separated state in the radial direction. The spacer 468W makes contact with a face at the second axial direction side (arrow Z2 side) of the V-phase first connection portion 436V, and thereby retains the first connection portion 436V and the first connection portion 436W in mutually separate state in the axial direction.

Moreover, as described above, in the mutually assembled state of the plural first connection portions 436U, 436V, 436W, the V-phase crossing wires 430V pass through inside notches 466U formed at the U-phase first connection portion 436U (are housed in the notches 466U). The W-phase crossing wires 430W pass through inside the notches 466U, 466V formed at the U-phase and V-phase first connection portions 436U, 436V (are housed in the notches 466U, 466V). The notches 466U, 466V are examples of housing portions of the present invention.

Explanation next follows regarding operation and advantageous effects of the fourth exemplary embodiment of the present invention.

As described in detail above, according to the stator 410 of the fourth exemplary embodiment of the present invention, as illustrated in FIG. 29, in the insulator 418W, the plural insulator portions 434W (first insulator portions 440W) are connected by the second connection portions 438W, as well as by the first connection portion 436W. The rigidity between the plural insulator portions 434W (the first insulator portions 440W), and hence the rigidity of the plural insulator portions 434U, 434V, 434W, can accordingly be secured by the second connection portions 438W. As a result, rigidity can be secured for the stator 410 as a whole after assembly.

Moreover, the second connection portions 438W are separated in the stator core 420 axial direction with respect to the first connection portions 436U, 436V, 436W. Well balanced rigidity can accordingly be secured after assembling the stator 410.

Out of the plural insulators 418U, 418V, 418W, the second connection portions 438W are formed at the insulator 418W positioned furthest to the stator core 420 second axial direction side when the plural insulators are arranged along the stator core 420 axial direction in a state prior to assembling the plural insulators (see FIG. 30). Hence, interference of the insulator portions 434U, 434V (the extension side wall portions 446U, 446V) formed to the other insulators 418U, 418V with the second connection portions 438W can be avoided when the plural insulators 418U, 418V, 418W are being assembled along the stator core 420 axial direction.

Moreover, in the insulator 418W, the plural first insulator portions 440W are connected together by the second connection portions 438W as well as the first connection portions 436W. The plural first insulator portions 440W can accordingly be easily assembled to the core configuration member 414W by the second connection portions 438W, and the plural first insulator portions 440W can also be stabilized and fixed thereby after assembly.

Out of the plural insulators 418U, 418V, 418W, the second connection portions 438W are also formed to the insulator 418W that has the first connection portion 436W with the smallest external diameter. Hence, interference of the insulator portions 434U, 434V (the extension side wall portions 446U, 446V) formed to the other insulators 418U, 418V with the second connection portions 438W can be avoided when the other insulators 418U, 418V are being assembled to the insulator 418W from the stator core 420 first axial direction side.

Moreover, the second connection portions 438W are disposed further to the stator core 420 radial direction inside than the teeth section insulator portions 442W, 452W (namely, than winding portions 428W wound on teeth sections 422W with the teeth section insulator portions 442W, 452W interposed). Thus, interference between a flyer and the second connection portions 438W can be avoided when for example coil wire 416W is being wound onto the teeth sections 422U by using the flyer.

Moreover, the second connection portions 438W connect together the plural extending portions 462W (extension side wall portions 446W) in the insulator 418W. Therefore, even though each of the insulator portions 434W includes the respective extending portions 462W that extend from the first connection portion 436W (the radial direction extending portions 449W, the extension side wall portions 446W, 456W), rigidity between the plural insulator portions 434W, and hence rigidity of the plural insulator portions 434U, 434V, 434W, can be secured.

In particular, the second connection portions 438W are formed to leading end portions of the extension side wall portions 446W. Rigidity between the plural insulator portions 434U, 434V, 434W can accordingly be secured efficiently.

Moreover, the stator 410 is formed with the second connection portions 438W on only the insulator 418W. A simplified structure is accordingly enabled.

Moreover, the plural insulators 418U, 418V, 418W have the interlocking structure 470 for mutual positioning. The insulators 418U, 418V, 418W can accordingly be positioned with respect to each other by the interlocking structure 470, thereby facilitating easy assembly of the stator 410.

In particular, the interlocking structure 470 includes the fitting portions 472 and the fitted-to portions 474, the fitting portions 472 are formed to the second connection portions 438W, and the fitted-to portions 474 are formed to the insulator portions 434U, 434V positioned between pairs of the insulator portions 434W that are connected together by the second connection portions 438W. Fitting together of the fitting portions 472 and the fitted-to portions 474 can accordingly be easily performed.

Explanation follows regarding modified examples of the fourth exemplary embodiment of the present invention.

Figure 31:
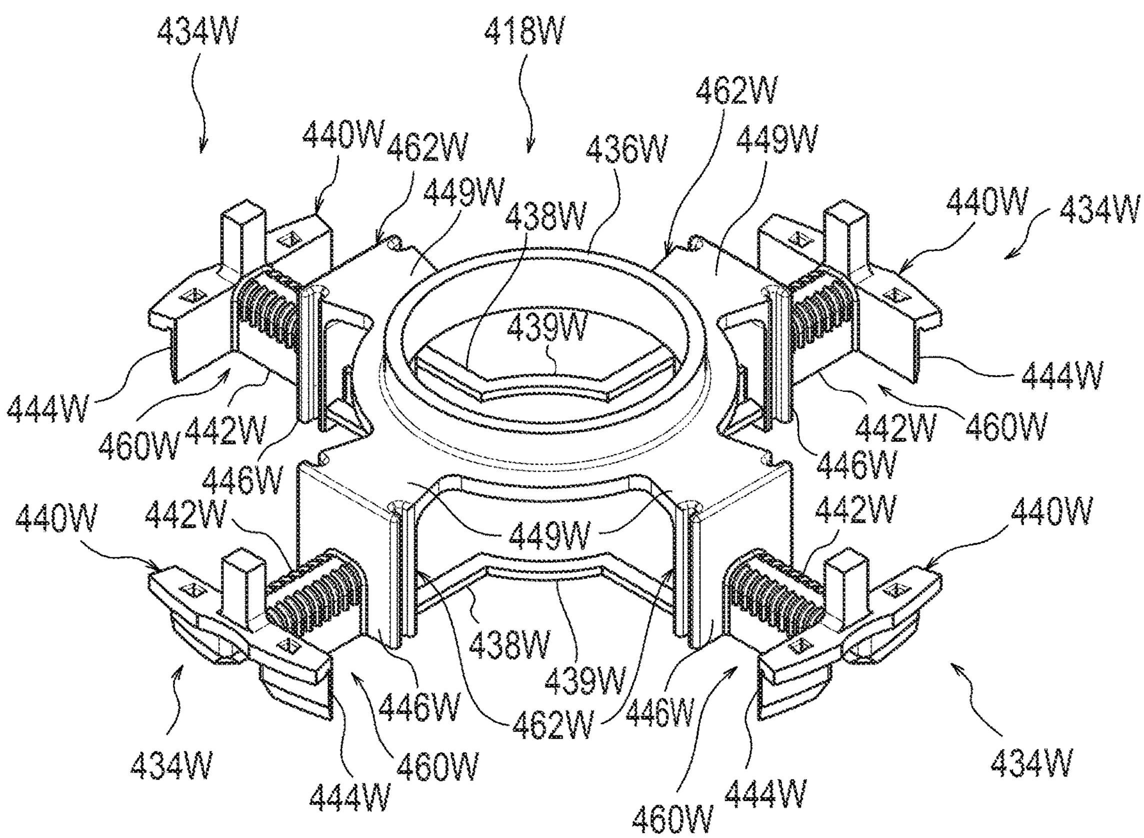
FIG. 31 is a perspective view illustrating a modified example of an insulator of the fourth exemplary embodiment of the present invention.

In the exemplary embodiment described above the second connection portions 438W are formed at the end portion on the stator core 420 second axial direction side of the extension side wall portions 446W. However the second connection portions 438W may be formed between a base end portion and an extension end portion of the extending portions 462W (namely between the base end portion of the radial direction extending portions 449W and the end portions on the stator core 420 second axial direction side of the extension side wall portions 446W). In such cases, as illustrated in FIG. 31, the second connection portions 438W preferably have inset portions 439W inset towards s center side of the first connection portion 436W such that interference with, for example, the other extension side wall portions 446U, 446V, 456U, 456V is avoided.

Figure 32:
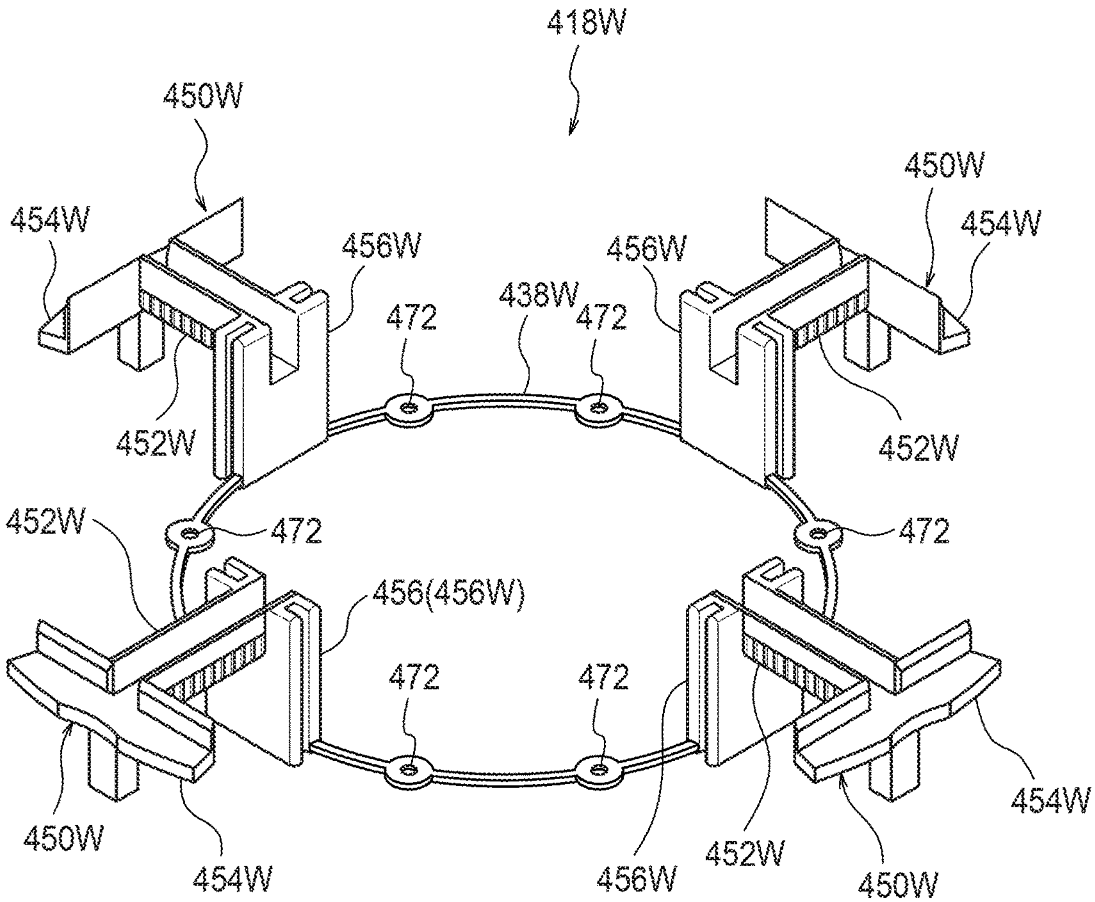
FIG. 32 is a perspective view illustrating a modified example of insulators of the fourth exemplary embodiment of the present invention.

Moreover, although configuration is made such that the second connection portions 438W connect together the plural first insulator portions 440W (the end portions on the stator core 420 second axial direction side of the extension side wall portions 446W), configuration may be made, as illustrated in FIG. 32, in which the second connection portions 438W connect together plural second insulator portions 450W (end portions on the stator core 420 second axial direction side of the extension side wall portions 456W) are connected together. When such a configuration is adopted, rigidity between the plural first insulator portions 440W and rigidity between the plural second insulator portions 450W can be increased with good balance due to the first connection portion 436W and the second connection portions 438W. Rigidity of the stator 410 as a whole after assembly can accordingly also be secured.

Moreover, in the modified example illustrated in FIG. 32, the plural second insulator portions 450W are connected together by the second connection portions 438W. The plural second insulator portions 450W can accordingly be easily assembled to the core configuration member 414W using the second connection portions 438W, enabling stability and fixing to be achieved after assembly.

When the plural second insulator portions 450W are connected by the second connection portions 438W, the fitting portions 472 may be formed to the second connection portions 438W. Note that in such cases, the fitted-to portions 474 illustrated in FIG. 29 are formed to end portions on the stator core 420 second axial direction side of the extension side wall portions 456U, 456V. Adopting such a configuration positions the first insulator portions 440U, 440V, 440W and the second insulator portions 450U, 450V, 450W with respect to each other during assembly, enhancing efficient assembly and enabling the first insulator portions 440U, 440V, 440W and the second insulator portions 450U, 450V, 450W to be stabilized and fixed.

Note that the fitting portions 472 may be omitted from the second connection portions 438W when the plural first insulator portions 440W are connected together by the second connection portions 438W. In such a configuration, the plural first insulator portions 440W are connected together by the second connection portions 438W in addition to by the first connection portion 436W, and so the plural first insulator portions 440W can be easily assembled to the core configuration member 414W by means of the second connection portions 438W, and enabling stabilization and fixing to be achieved after assembly.

Figure 33:
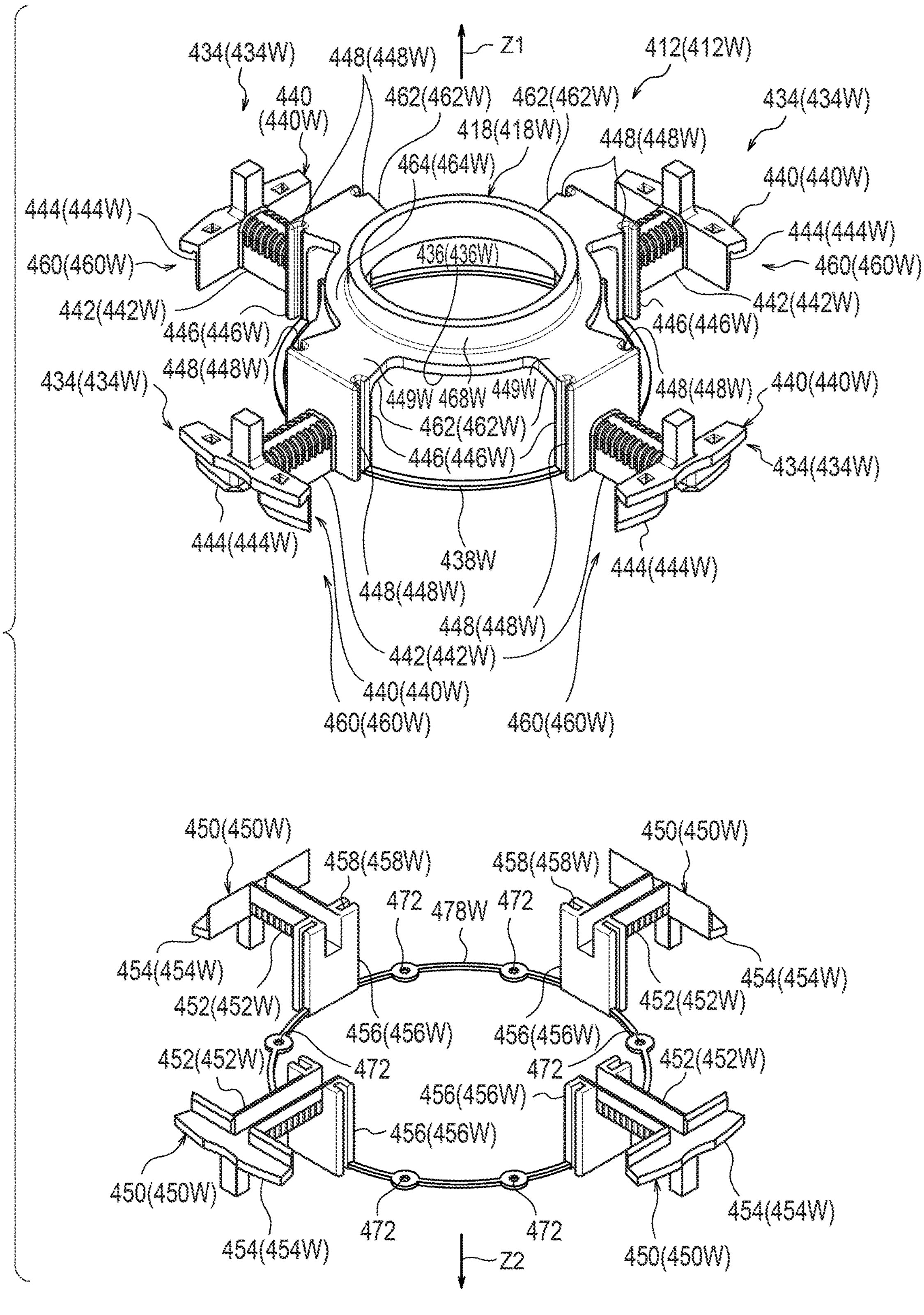
FIG. 33 is a perspective view illustrating a modified example of insulators of the fourth exemplary embodiment of the present invention.

As illustrated in FIG. 33, the plural first insulator portions 440W (the end portions on the stator core 420 first axial direction side and the end portions on the stator core 420 second axial direction side of the extension side wall portions 446W) may be connected together by the first connection portion 436W and the second connection portions 438W, and the plural second insulator portions 450W (the end portions on the stator core 420 second axial direction side of the extension side wall portions 456W) may be connected together by third connection portions 478W. Adopting such a configuration enables the rigidity between the plural first insulator portions 440W and the rigidity between the plural second insulator portions 450W to be raised by the first connection portion 436W, the second connection portions 438W and the third connection portions 478W. The rigidity of the stator 410 as a whole after assembly can hence also be raised.

Moreover, the fitting portions 472 may be formed to the third connection portions 478W when the plural second insulator portions 450W are connected together by the third connection portions 478W. Note that in such cases, the fitted-to portions 474 illustrated in FIG. 29 are formed to end portions on the stator core 420 second axial direction side of the extension side wall portions 456U, 456V. Adopting such a configuration positions the first insulator portions 440U, 440V, 440W and the second insulator portions 450U, 450V, 450W with respect to each other during assembly, enhancing efficient assembly and enabling the first insulator portions 440U, 440V, 440W and the second insulator portions 450U, 450V, 450W to be stabilized and fixed.

Although configuration is made such that the second connection portions 438W are only formed at the insulator 418W, the second connection portions 438W may be formed at the other insulators 418U, 418V, or may be formed at all of the insulators 418U, 418V, 418W. Similarly, the third connection portions 478W may also be formed at the other insulators 418U, 418V, or may be formed at all the insulators 418U, 418V, 418W.

Although the first connection portion 436U and the first connection portions 436V, 436W are disposed with a gap present therebetween in the stator core 420 radial direction, and the first connection portion 436V and the first connection portion 436W are disposed with a gap present therebetween in the stator core 420 radial direction and axial direction, the plural first connection portions 436U, 436V, 436W may be disposed such that there is a gap present therebetween in any direction out of the stator core 420 radial direction or axial direction or a direction that is a combination thereof.

Moreover, although the fitting portions 472 are formed in recess shapes, and the fitted-to portions 474 are formed in protrusion shapes, the fitting portions 472 may be formed in protrusion shapes and the fitted-to portions 474 may be formed in recess shapes.

Although the stator 410 is configured for use in an inner rotor type brushless motor, the stator 410 may also be configured for use in an outer rotor type brushless motor.

Moreover, although the stator 410 is configured segmented into the stator configuration sections 412U, 412V, 412W configured for each of the plural phases, as an example of plural groups, the stator 410 may be segmented into plural stator configuration sections configured by groups each containing a combination of plural phases.

Moreover, in addition to the above, configuration may also be made with the stator configuration sections configuring each of the groups including teeth of plural phases in other combinations.

Note that although the brushless motor applied with the stator 410 according to the present exemplary embodiment is configured as an example by an 8-pole 12 slot motor, configuration may be made with a motor having another combination of numbers of poles and numbers of slots.

Moreover, in the connection method of the plural coil wires 416 may be configured as a star connection or a delta connection both in series and in parallel.

Fifth Exemplary Embodiment

Explanation follows regarding a fifth exemplary embodiment of the present invention.

Note that in the following explanation, for convenience the letters U, V, W are omitted as suffixes to the labels of each member and each portion when no discrimination is made between the U-phase, the V-phase and the W-phase.

Figure 34:
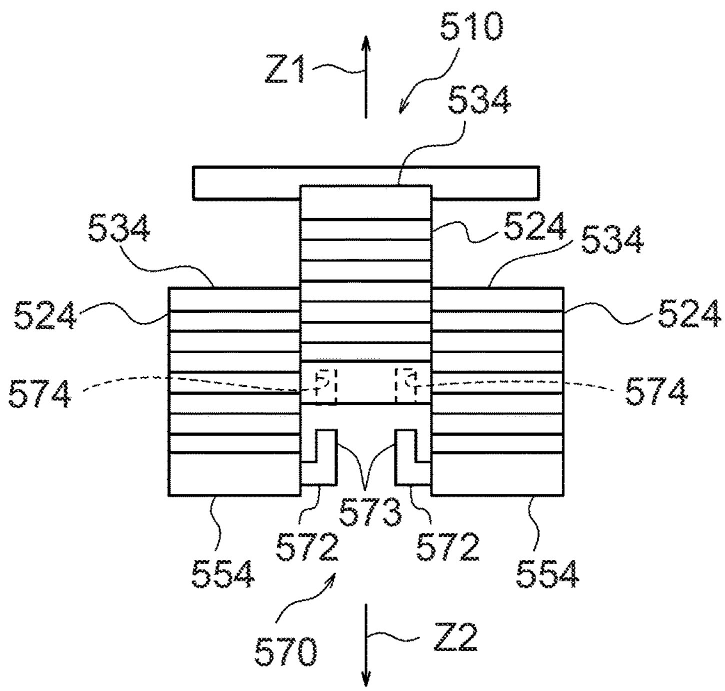
FIG. 34 is a drawing illustrating an interlocking structure of a fifth exemplary embodiment of the present invention.

The fifth exemplary embodiment of the present invention illustrated in FIG. 34 has an interlocking structure 570 that differs from that of the fourth exemplary embodiment of the present invention in the following respects.

Namely, fitting portions 572 are formed at one member of adjacent yoke configuration section insulator portions 554, and fitting protrusions 573 are formed to the fitting portions 572. Recess shaped fitted-to portions 574 are moreover formed at the other member of the adjacent yoke configuration section insulator portions 554. Insulator portions 534 of any insulators 518 out of the plural insulators are accordingly fixed together by the fitting portions 572 and the fitted-to portions 574 fitting together.

When such a configuration is adopted, the rigidity between the plural insulator portions 534, and hence the rigidity of the stator 510 as a whole after assembly can also be secured by fixing the plural insulator portions 534 together with the interlocking structure 570.

Moreover, since the fitting portions 572 are formed to one member of adjacent yoke configuration section insulator portions 554, and the fitted-to portions 574 are formed to the other member of the adjacent yoke configuration section insulator portions 554, fitting together of the fitting portions 572 and the fitted-to portions 574 can be easily accomplished.

Figure 35:
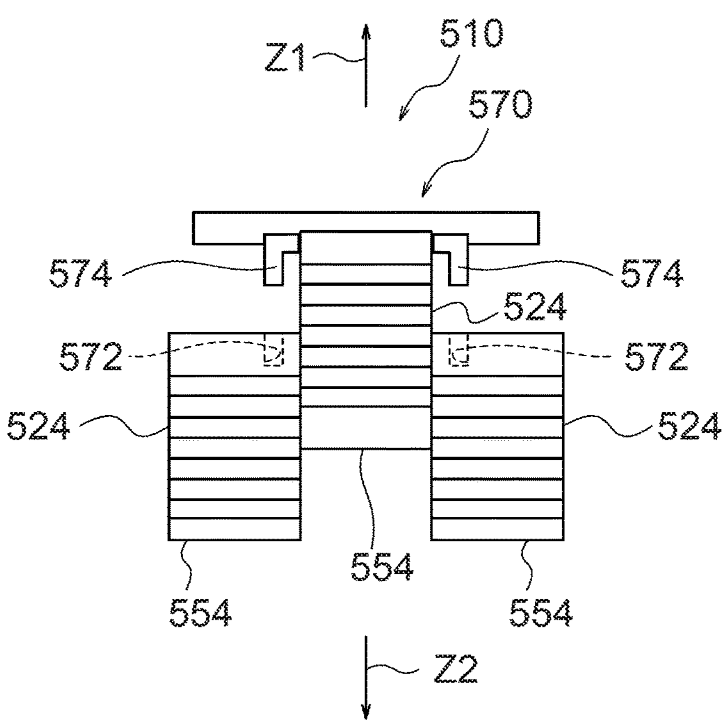
FIG. 35 is a drawing illustrating a modified example of an interlocking structure of the fifth exemplary embodiment of the present invention.

Note that, as illustrated in FIG. 35, the fitting portions 572 may be formed as recess shapes in one member of the adjacent yoke configuration section insulator portions 554, and the fitted-to portions 574 may be formed as protrusion shapes on the other member of the adjacent yoke configuration section insulator portions 554.

Figure 36:
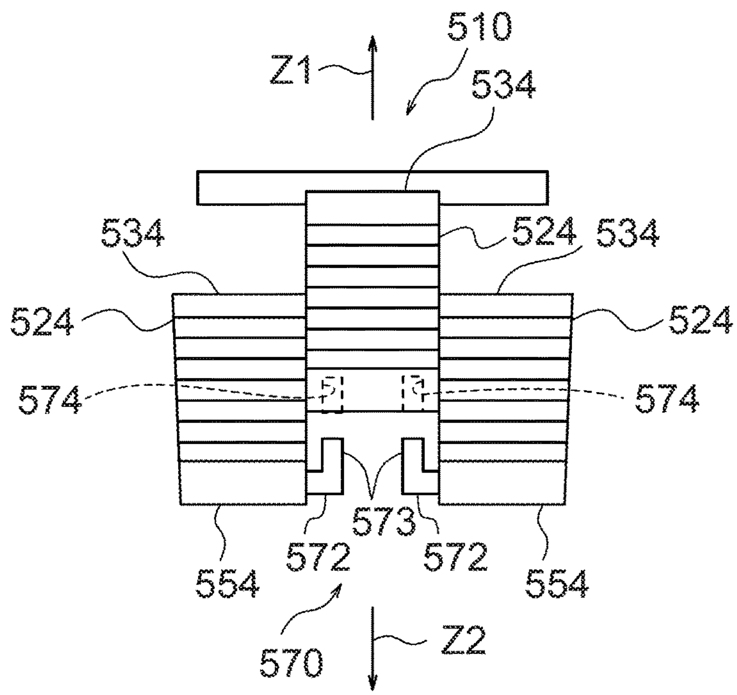
FIG. 36 is a drawing illustrating a modified example of an interlocking structure of the fifth exemplary embodiment of the present invention.
Figure 37:
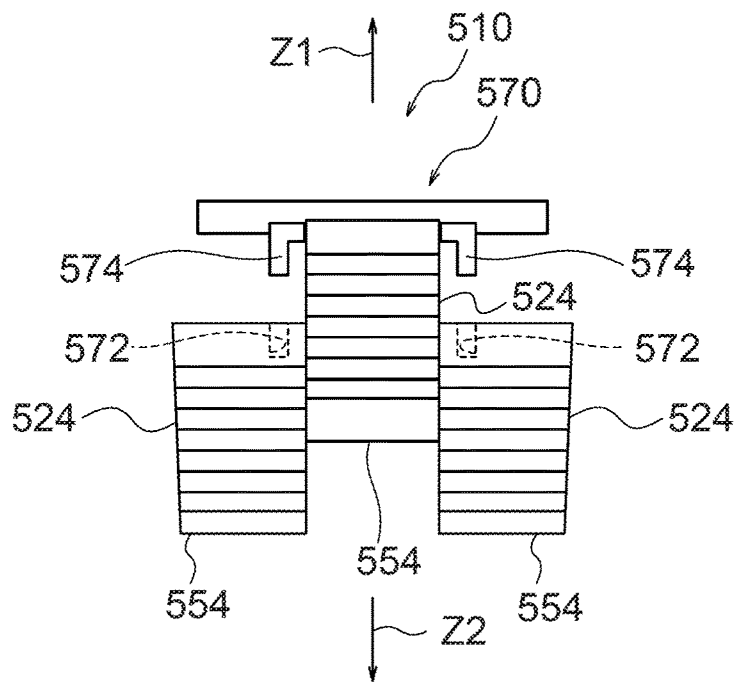
FIG. 37 is a drawing illustrating a modified example of an interlocking structure of the fifth exemplary embodiment of the present invention.

Moreover, as illustrated in FIG. 36 and FIG. 37, the insulator portions 534 may be sloped so as to approach each other on progression towards an second axial direction side (arrow Z2 side) of the stator 510. When such a configuration is adopted, a gap between any given pair of insulator portions 534 adjacent in the circumferential direction of the stator 510 gets gradually tighter on progression towards the stator 510 second axial direction side (arrow Z2 side), and so plural yoke configuration sections 524 make close contact with each other after assembly of the stator 510. The yoke configuration sections 524 can thereby be assembled without rattling, enabling the magnetic path formed by the yoke configuration sections 524 to be more efficiently formed.

Sixth Exemplary Embodiment

Explanation follows regarding a sixth exemplary embodiment of the present invention.

Figure 38:
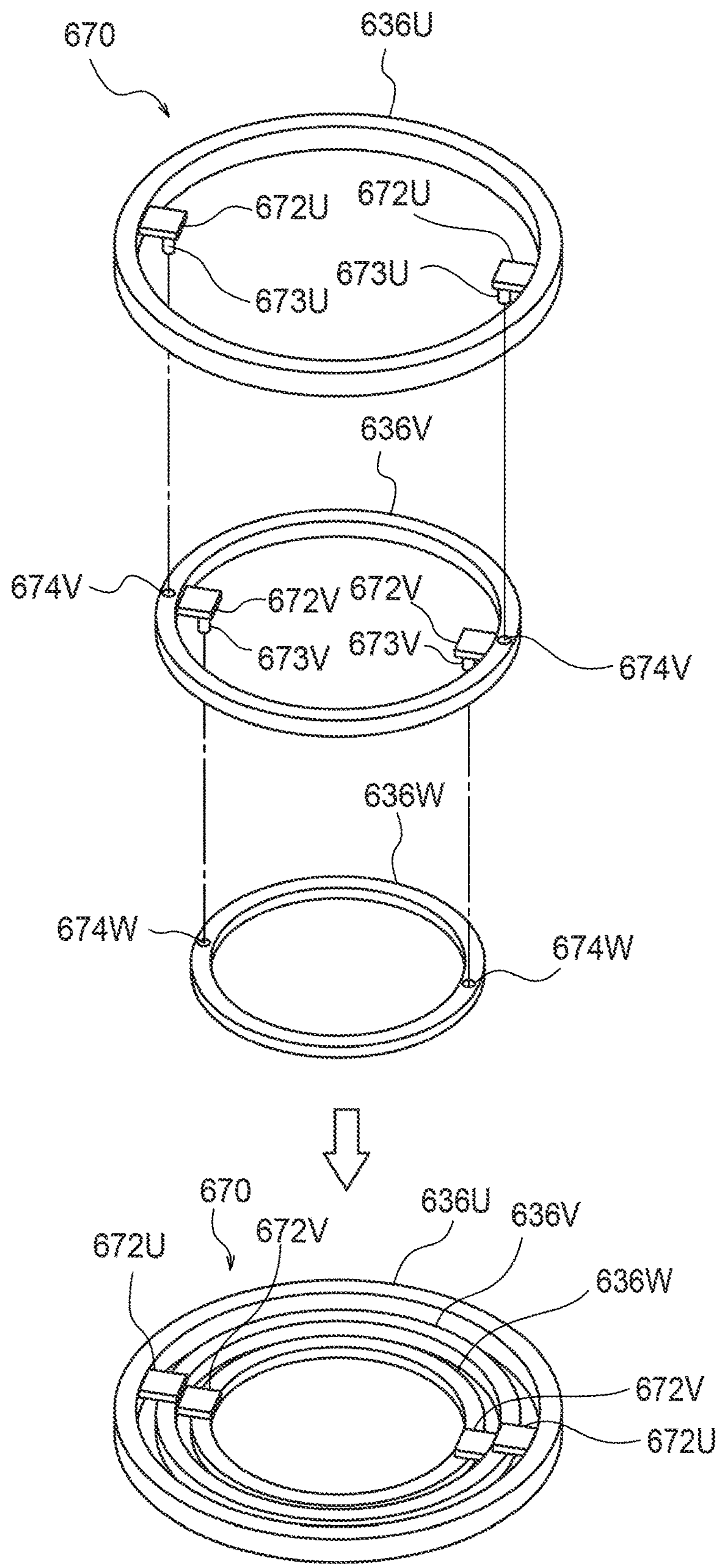
FIG. 38 is a drawing illustrating an interlocking structure of a sixth exemplary embodiment of the present invention.

In the sixth exemplary embodiment of the present invention illustrated in FIG. 38, the configuration of an interlocking structure 670 differs from that of the fifth exemplary embodiment of the present invention in the following respects.

Namely, fitting portions 672U are formed to a first connection portion 636U so as to extend towards the radial direction inside. Fitting protrusions 673U are formed at leading end portions of the fitting portions 672U. Recess shaped fitted-to portions 674V are formed at a first connection portion 636V.

Fitting portions 672V are also formed to the first connection portion 636V so as to extend towards the radial direction inside. Fitting protrusions 673V are also formed at leading end portions of the fitting portions 672V. Recess shaped fitted-to portions 674W are also formed at a first connection portion 636W. The first connection portions 636U, 636V, 636W that serve as connection portions are fixed by the fitting portions 672U and the fitted-to portions 674V fitting together, and the fitting portions 672V and the fitted-to portions 674W fitting together.

When such a configuration is adopted, the rigidity between the plural first connection portions 636U, 636V, 636W, and hence the rigidity of the stator as a whole after assembly, can be secured by the interlocking structure 670 in which the plural first connection portions 636U, 636V, 636W are fixed together.

Moreover, since the fitting portions 672U and the fitted-to portions 674V are respectively formed to the first connection portions 636U, 636V, fitting together of the fitting portions 672U and the fitted-to portions 674V can be easily accomplished. Moreover, since the fitting portions 672V and the fitted-to portions 674W are respectively formed to the first connection portions 636V, 636W, fitting together of the fitting portions 672V and the fitted-to portions 674W can be performed easily.

Note that the fitting portions 672U, 672V may be formed as recess shapes and the fitted-to portions 674V, 672W may be formed as protrusion shapes.

Seventh Exemplary Embodiment

Explanation follows regarding a seventh exemplary embodiment of the present invention, with reference to the drawings.

Figure 39:
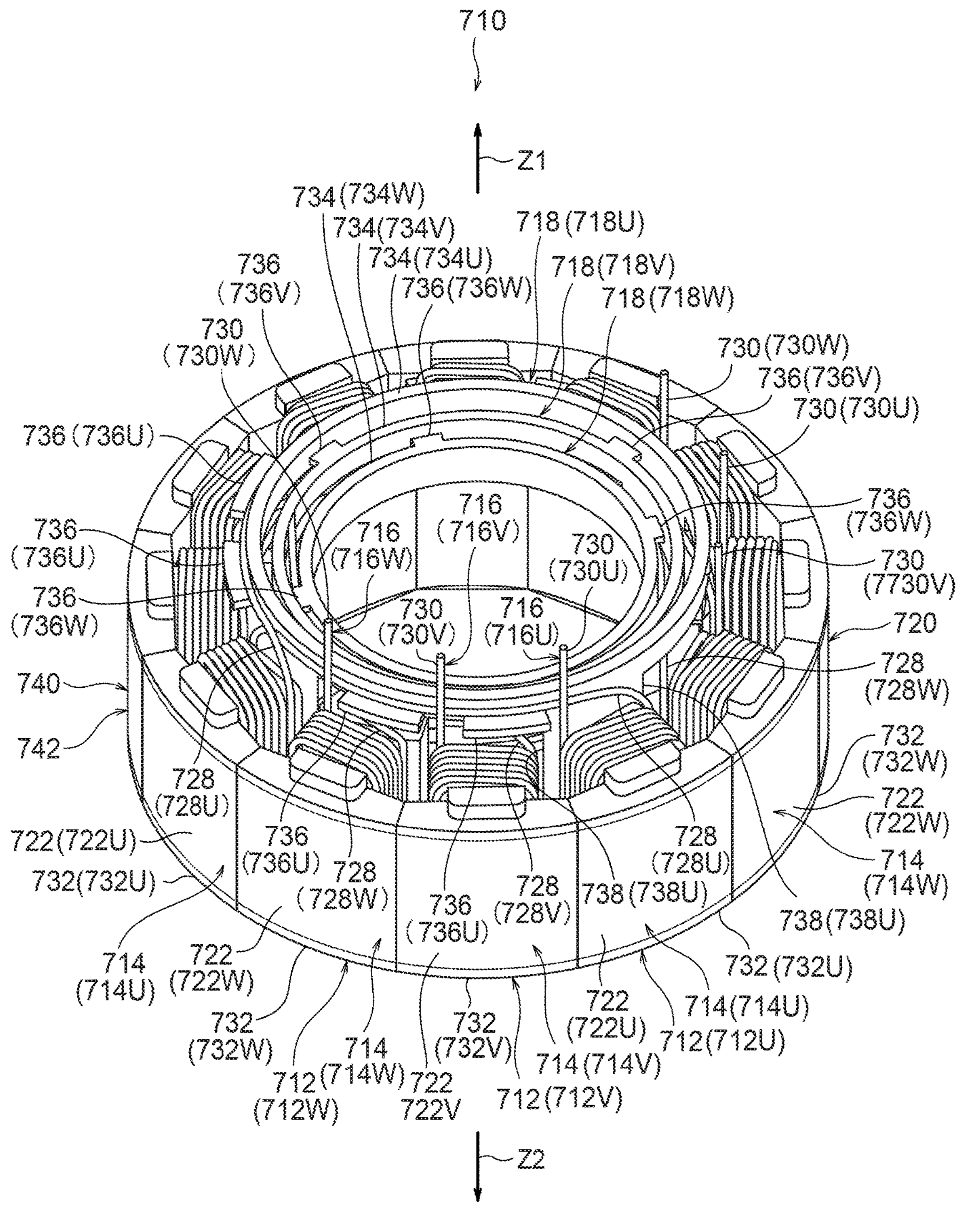
FIG. 39 is a perspective view illustrating a stator according to a seventh exemplary embodiment of the present invention.

A stator 710 according to a seventh exemplary embodiment of the present invention illustrated in FIG. 39 has portions similar to those of the stator of the first exemplary embodiment. Explanation hence focuses on differing portions and explanation of similar portions is omitted as appropriate.

Figure 40A:
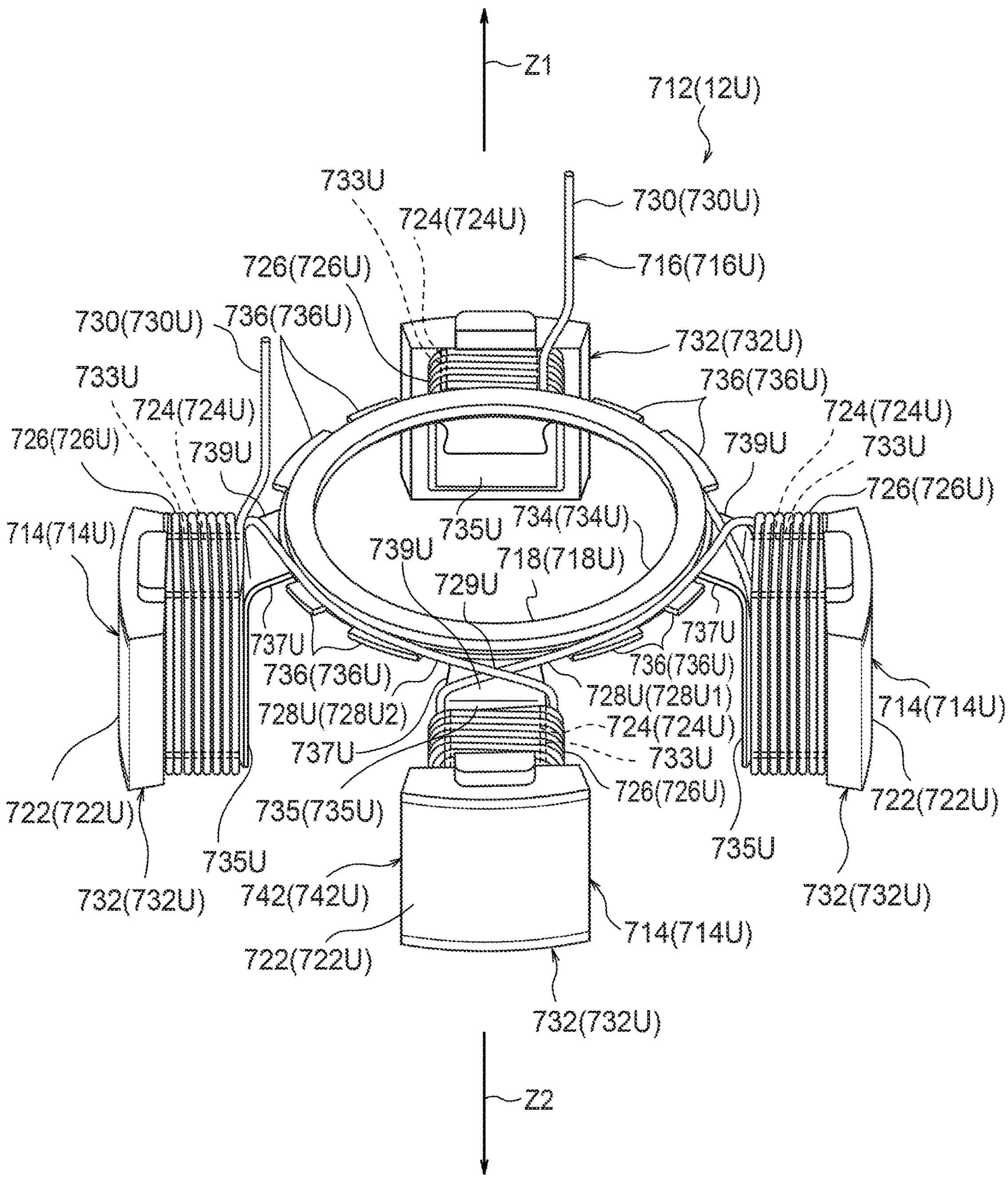
FIG. 40A is a perspective view illustrating a U-phase stator configuration section illustrated in FIG. 39.

In the present exemplary embodiment, as illustrated in FIG. 39 and FIG. 40A, in a U-phase stator configuration portion 712U, a coil wire 716U configuring a U-phase includes plural winding portions 726U and plural crossing wires 728U. The coil wire 716U is formed continuously from one end to the other end. The coil wire 716U is wound concentrically around the plural winding portions 726U on teeth sections 724U, with insulator portions 732U (insulator main body portions 733U), described later, respectively disposed therebetween. The winding portions 726U are mutually connected to each other by the plural crossing wires 728U. The crossing wires 728U are laid out (wrapped) around the outer peripheral face of a connection portion 734U formed to an insulator 718U, described later. Terminal portions 730U at both end sides of the coil wire 716U is led out from the teeth sections 724U to a first axial direction side (the arrow Z1 side) of the stator 710.

The insulator 718U is made from a resin, and includes plural insulator portions 732U and a connection portion 734U that have been integrated together. The number of the plural insulator portions 732U provided is the same as the number of the plural teeth sections 724U mentioned above. The plural insulator portions 732U include insulator main body portions 733U, extension side wall portions 735U and radial direction extension portions 737U. The insulator main body portions 733U are integrated to the respective surfaces of the plural core configuration sections 714U, for example by integral molding or interlock mounting. The insulator main body portions 733U insulate between the teeth sections 724U formed to the core configuration sections 714U and the winding portions 726U. The extension side wall portions 735U are positioned further inside in a radial direction of the stator configuration section 712U than the core configuration sections 714U (than the insulator main body portions 733U). The radial direction extension portions 737U extend out in the radial direction of the stator configuration section 712U from the connection portion 734U. The extension side wall portions 735U extend towards a second axial direction side (Z2 side) of the stator configuration section 712U from extending ends of the radial direction extension portions 737U and connect together the insulator main body portions 733U and the radial direction extension portions 737U. The extension side wall portions 735U and the radial direction extension portions 737U configure extending portions 739U that connect together the insulator main body portions 733U and the connection portion 734U.

The connection portion 734U is provided at a first axial direction side (Z1 side) of the plural insulator portions 732U. The connection portion 734U is formed in a ring shape, connects together the plural insulator portions 732U (or more specifically, base end portions of the radial direction extension portions 737U of the plural insulator portions 732U), and is positioned further to a radial direction inside than the core configuration sections 714U. Plural projection shaped retaining portions 736U project out from an outer peripheral face of the connection portion 734U towards a radial direction outside between the plural insulator portions 732U. The retaining portions 736U retain the crossing wires 728U mentioned above from the second axial direction side (arrow Z2 side) of the connection portion 734U.

Figure 40B:
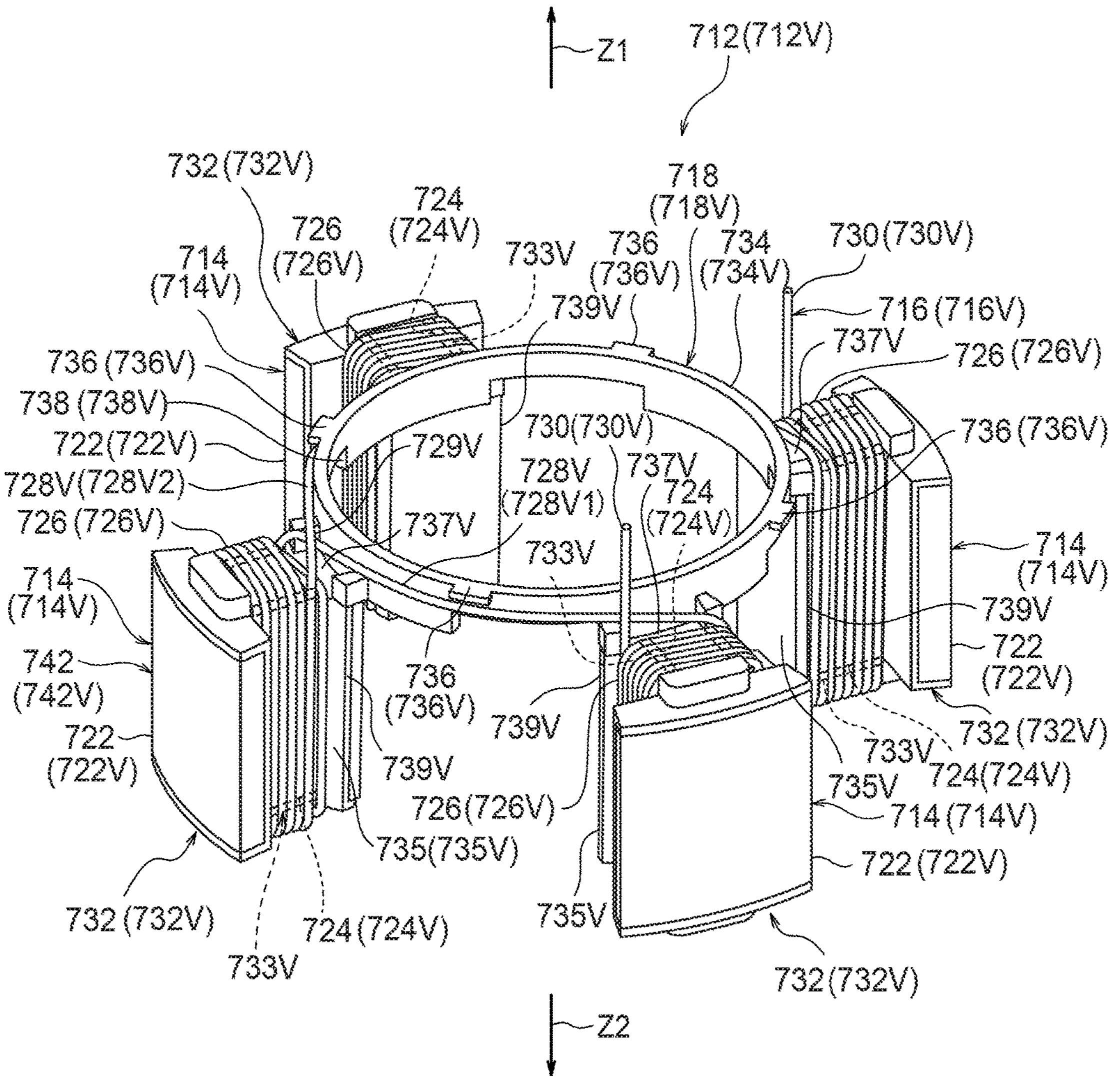
FIG. 40B is a perspective view illustrating a V-phase stator configuration section illustrated in FIG. 39.

A V-phase stator configuration section 712V illustrated in FIG. 40B has a similar basic configuration to the U-phase stator configuration section 712U described above. In the V-phase stator configuration section 712V, a connection portion 734V is formed in a ring shape, and is formed with a smaller diameter than the U-phase connection portion 734U described above (see FIG. 40A). Retaining portions 736V retain crossing wires 728V from a first axial direction side (the arrow Z1 side) of the connection portion 734V, and are positioned further to a radial direction inside than core configuration sections 714V.

The plural insulator portions 732V include insulator main body portions 733V, extension side wall portions 735V and radial direction extension portions 737V. The insulator main body portions 733V are integrated to respective surfaces of the plural core configuration sections 714V, for example by integral molding or interlock mounting. The insulator main body portions 733V insulate between teeth sections 724V formed to the core configuration sections 714V and winding portions 726V. The extension side wall portions 735V are positioned further inside in a radial direction of the stator configuration section 712V than the core configuration sections 714V (than the insulator main body portions 733V). The radial direction extension portions 737V extend out in the radial direction of the stator configuration section 712V from the connection portion 734V. The extension side wall portions 735V extend towards a second axial direction side (Z2 side) of the stator configuration section 712V from extending ends of the radial direction extension portions 737V and connect together the insulator main body portions 733V and the radial direction extension portions 737V. The extension side wall portions 735V and the radial direction extension portions 737V configure extending portions 739V that connect together the insulator main body portions 733V and the connection portion 734V. The connection portion 734V is provided at the first axial direction side (Z1 side) of the plural insulator portions 732V. The connection portion 734V is formed in a ring shape, connects together the plural insulator portions 732V, and is positioned further to a radial direction inside than the core configuration sections 714V.

Figure 40C:
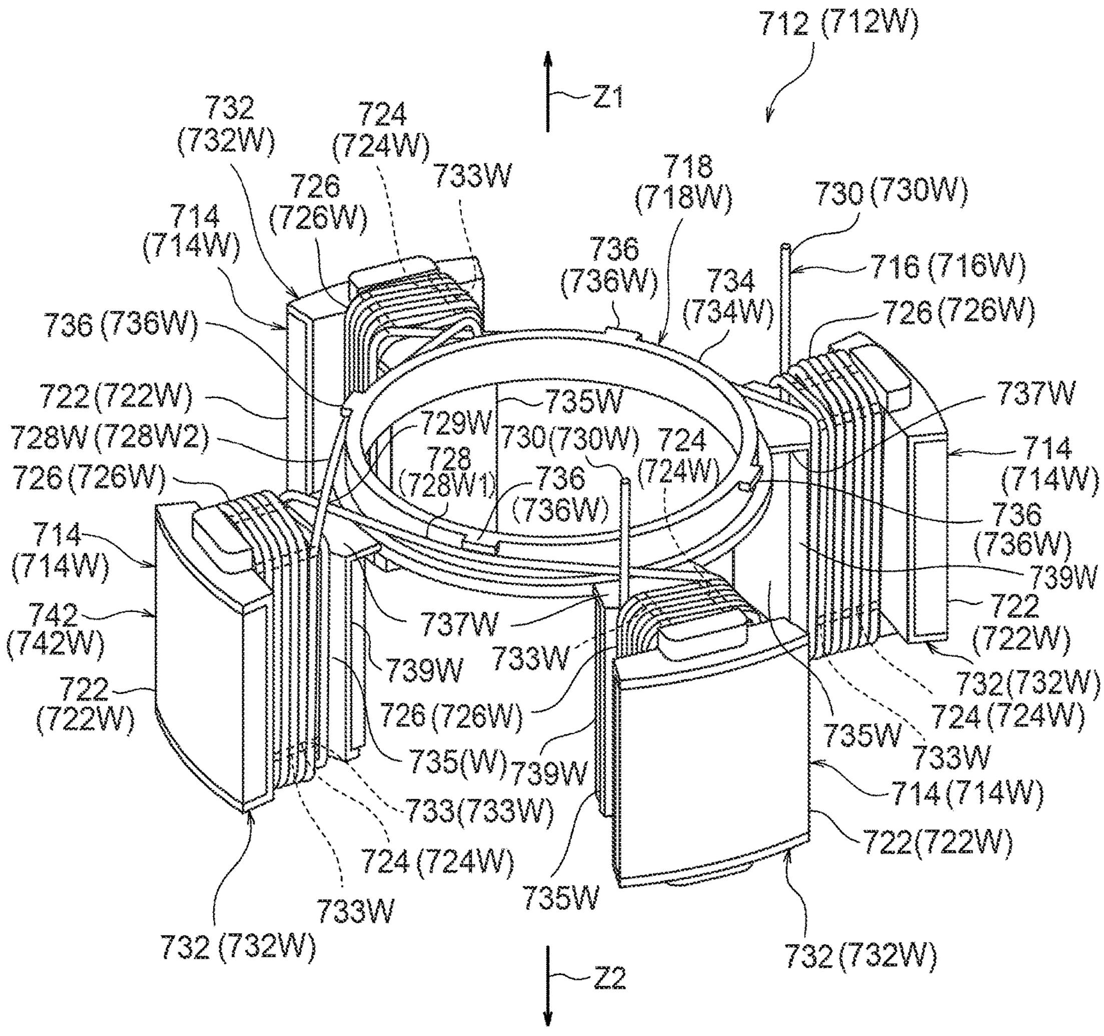
FIG. 40C is a perspective view illustrating a W-phase stator configuration section illustrated in FIG. 39.

A W-phase stator configuration section 712W illustrated in FIG. 40C also has a similar basic configuration to the U-phase stator configuration section 712U described above. In the W-phase stator configuration section 712W, a connection portion 734W is formed in a ring shape, and is formed with a smaller diameter than the V-phase connection portion 734V described above (see FIG. 40B). The retaining portions 736W retain crossing wires 728W from a first axial direction side (the arrow Z1 side) of a connection portion 734W, and are positioned further inside in a radial direction than the core configuration sections 714W.

The plural insulator portions 732W include insulator main body portions 733W, extension side wall portions 735W and radial direction extension portions 737W. The insulator main body portions 733W are integrated to respective surfaces of the plural core configuration sections 714W, for example by integral molding or interlock mounting. The insulator main body portions 733W insulate between teeth sections 724W formed to the core configuration sections 714W and winding portions 726W. The extension side wall portions 735W are positioned further inside in a radial direction of a stator configuration section 712W than the core configuration sections 714W (than the insulator main body portions 733W). The radial direction extension portions 737W extend out in the stator configuration section 712W radial direction from the connection portion 734W. The extension side wall portions 735W extend towards a second axial direction side (Z2 side) of the stator configuration section 712W from extending ends of the radial direction extension portions 737W and connect together the insulator main body portions 733W and the radial direction extension portions 737W. The extension side wall portions 735W and the radial direction extension portions 737W configure extending portions 739W that connect together the insulator main body portions 733W and the connection portion 734W. The connection portion 734W is provided at the first axial direction side (Z1 side) of the plural insulator portions 732W. The connection portion 734W is formed in a ring shape, connects together the plural insulator portions 732W (or more specifically, extension end portions (end portions on the radial direction inside) of the extension side wall portions 735W of the plural insulator portions 732W), and is positioned further to the radial direction inside than the core configuration sections 714W.

The plural connection portions 734U, 734V, 734W are disposed at a radial direction inside of a yoke 740. The plural connection portions 734U, 734V, 734W are disposed with gaps between each other in the yoke 740 radial direction and axial direction, and are provided coaxially to the yoke 740. The V-phase retaining portions 736V fit against an inner peripheral face of the U-phase connection portion 734U, and the W-phase retaining portions 736W fit against an inner peripheral face of the V-phase connection portion 734V. The plural connection portions 734U, 734V, 734W are accordingly retained in a radial direction mutually separated state. Namely, the retaining portions 736U, 736V, 736W are provided in the radial direction between the plural connection portions 734U, 734V, 734W, and also perform as projection shaped spacers that retain the plural connection portions 734U, 734V, 734W in a radial direction mutually separated state.

Moreover, as illustrated in FIG. 40A, out of the crossing wires 728U described above, a crossing wire 728U1 connected to the winding start end portion of one of the winding portions 726U and a crossing wire 728U2 connected to a winding finish end portion of this winding portion 726U cross over at the radial direction extension portions 737U of the connection portion 734U and the insulator portions 732U. The radial direction extension portions 737U are examples of a connection vicinity between the connection portion 734U and the insulator portions 732U. Namely, in the present exemplary embodiment, as an example, intersection portions 729U between the crossing wire 728U1 connected to the winding start end portion of one of the winding portions 726U and the crossing wire 728U2 connected to a winding finish end portion of this winding portion 726U are disposed at positions overlapping with the radial direction extension portions 737U as viewed along the stator configuration section 712U axial direction.

Moreover, as illustrated in FIG. 40B, 40C, the crossing wires 728V, 728W are similar to the crossing wires 728U described above. Namely, as illustrated in FIG. 40B, intersection portions 729V between the crossing wire 728V1 connected to the winding start end portion of one of the V-phase winding portions 726V and the crossing wire 728V2 connected to a winding finish end portion of this winding portion 726V are disposed at positions overlapping with the radial direction extension portions 737V as viewed along the stator configuration section 712V axial direction. As illustrated in FIG. 40C, intersection portions 729W between the crossing wire 728W1 connected to the winding start end portion of one of the W-phase winding portions 726W and the crossing wire 728W2 connected to a winding finish end portion of this winding portion 726W are disposed at positions overlapping with the radial direction extension portions 737W as viewed along the stator configuration section 712W axial direction.

Note that the U-phase stator configuration section 712U illustrated in FIG. 40A has terminal portions 730U connected to two of the winding portions 726U out of the four winding portions 726U, and has crossing wires 728U connected to the remaining two winding portions 726U. Out of the two winding portions 726U connected to these crossing wires 728U, one of the crossing wires 728U2 that is connected the winding finish end portion of a first of the winding portions 726U is in turn connected to the winding start end portion of another of the winding portions 726U. The crossing wire 728U1 that is connected to the winding start end portion of one of the winding portions 726U is connected to the winding finish end portion of one of the winding portions 726U out of the two winding portions 726U connected to the terminal portions 730U. A crossing wire 728U2 that is connected to the winding finish end portion of another of the winding portions 726U is connected to the winding start end portion of the other winding portions 726U out of the two winding portions 726U that are connected to the terminal portions 730U. Similar applies to the coil wires 716V, 716W illustrated in FIG. 40B and FIG. 40C.

Figure 42:
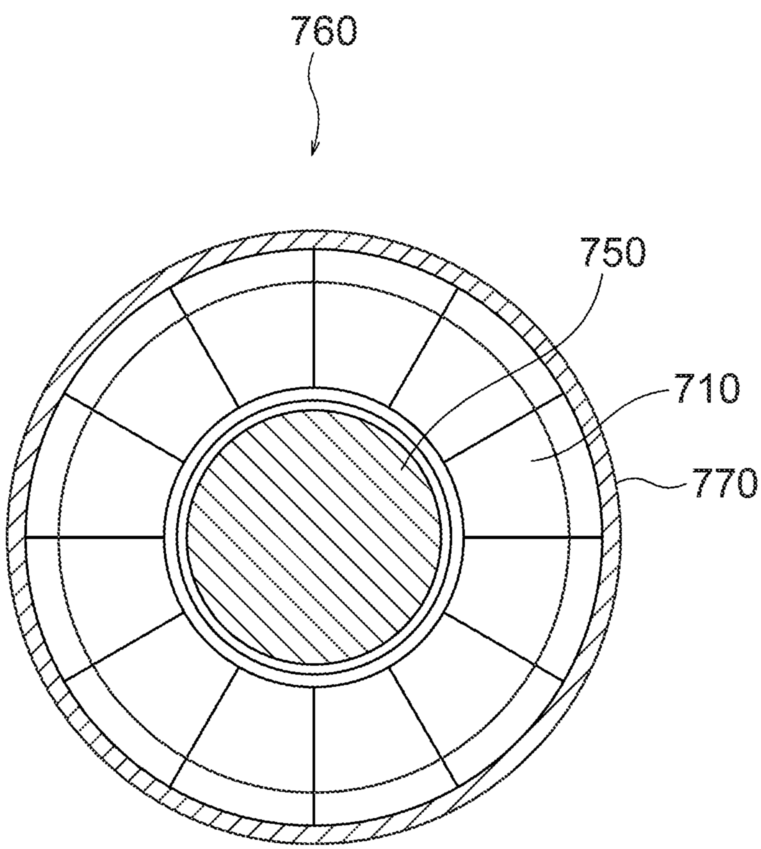
FIG. 42 is a cross-section illustrating a schematic configuration of a brushless motor provided with the stator illustrated in FIG. 39.

As illustrated in FIG. 42, the stator 710 configured as described above configures an inner rotor type brushless motor 760, together with a rotor 750 and a housing 770. Configuration in the brushless motor 760 is such that a rotational magnetic field is formed by the stator 710, and the rotor 750 is rotated thereby. Note that the brushless motor 760 is for example an 8-pole 12 slot motor.

Explanation follows regarding a manufacturing method of the stator 710 configured as described above.

First, as illustrated in FIG. 40A, the core configuration sections 714U are integrated to the insulator portions 732U of the insulator 718U to form a U-phase sub-assembly 742U configured from the insulator 718U and the plural core configuration sections 714U. Similarly, as illustrated in FIG. 40B, the core configuration sections 714V are integrated to the insulator portions 732V of the insulator 718V to form a V-phase sub-assembly 742V configured from the insulator 718V and the plural core configuration sections 714V. Moreover, as illustrated in FIG. 40C, the core configuration sections 714W are integrated to the insulator portions 732W of the insulator 718W to form a W-phase sub-assembly 742W configured from the insulator 718W and the plural core configuration sections 714W. The sub-assemblies 742U, 742V, 742W are thus formed for each of the U-phase, the V-phase and the W-phase (the sub-assembly forming process).

Next, as illustrated in FIG. 40A, a flyer machine 100 (see FIG. 5) is employed to wind the coil wire 716U on each of the teeth sections 724U of the U-phase sub-assembly 742U from the radial direction outside, forming the U-phase stator configuration section 712U with the plural winding portions 726U formed at the sub-assembly 742U. Note that the flyer machine 100 is, as illustrated in FIG. 5, configured including a flyer 101 that winds the coil wires 716 in a circular motion so as to circle the periphery of each of the teeth sections 724, a variable former 102 that aligns the coil wires 716 wound onto the teeth sections 724, and a drive circuit 103 that controls the flyer 101 and the variable former 102.

Similarly, as illustrated in FIG. 40B, the flyer machine 100 mentioned above is employed to wind the coil wire 716V on each of the teeth sections 724V of the V-phase sub-assembly 742V from the radial direction outside, forming the V-phase stator configuration section 712V with the plural winding portions 726V formed at the sub-assembly 742V. Moreover, as illustrated in FIG. 40C, the flyer machine 100 mentioned above is employed to wind the coil wire 716W on each of the teeth sections 724W of the W-phase sub-assembly 742W from the radial direction outside, forming the W-phase stator configuration section 712W with the plural winding portions 726W formed at the sub-assembly 742W.

When this is performed, as illustrated in FIG. 40A, the plural crossing wires 728U are laid out along an outer peripheral face of the connection portion 734U. The plural crossing wires 728U are also retained from a second axial direction side (arrow Z2 side) of the connection portion 734U by the projection shaped retaining portions 736U. Moreover, configuration is made such that the crossing wire 728U1 that is connected to the winding start end portion of one of the winding portions 726U and the crossing wire 728U2 that is connected to the winding finish end portion of this winding portion 726U cross over on the respective radial direction extension portion 737U of the connection portion 734U and the insulator portion 732U. When this occurs, the crossing wire 728U1 and the crossing wire 728U2 are tightly crossed over such that slack does not occur in the winding portions 726U.

Similarly, as illustrated in FIG. 40B, the plural crossing wires 728V are laid out along an outer peripheral face of the connection portion 734V. The plural crossing wires 728V are also retained from the first axial direction side (the arrow Z1 side) of the connection portion 734V by the projection shaped retaining portions 736V. Moreover, configuration is made such that the crossing wire 728V1 that is connected to the winding start end portion of one of the winding portions 726V and the crossing wire 728V2 that is connected to the winding finish end portion of this winding portion 726V cross over on the respective radial direction extension portion 737V of the connection portion 734V and the insulator portion 732V.

Moreover, as illustrated in FIG. 40C, the plural crossing wires 728W are laid out along an outer peripheral face of the connection portion 734W. The plural crossing wires 728W are also retained from the first axial direction side (the arrow Z1 side) of the connection portion 734W by the projection shaped retaining portions 736W. Moreover, configuration is made such that the crossing wire 728W1 that is connected to the winding start end portion of one of the winding portions 726W and the crossing wire 728W2 that is connected to the winding finish end portion of this winding portion 726W cross over on the respective radial direction extension portion 737W of the connection portion 734W and the insulator portion 732W.

A illustrated in FIG. 40A, the terminal portions 730U at the two end sides of the coil wire 716U are led out from the teeth sections 724U to the first axial direction side (the arrow Z1 side) of the stator 710. Similarly, as illustrated in FIG. 40B, the terminal portions 730V at the two end sides of the coil wire 716V are led out from the teeth sections 724V towards the first axial direction side of the stator 710. Moreover, as illustrated in FIG. 40C, the terminal portions 730W at the two end sides of the coil wire 716W are led out from the teeth sections 724W towards the first axial direction side of the stator 710. The stator configuration sections 712U, 712V, 712W are thus formed for each of the U-phase, the V-phase and the W-phase (the stator configuration section forming process).

Figure 41A:
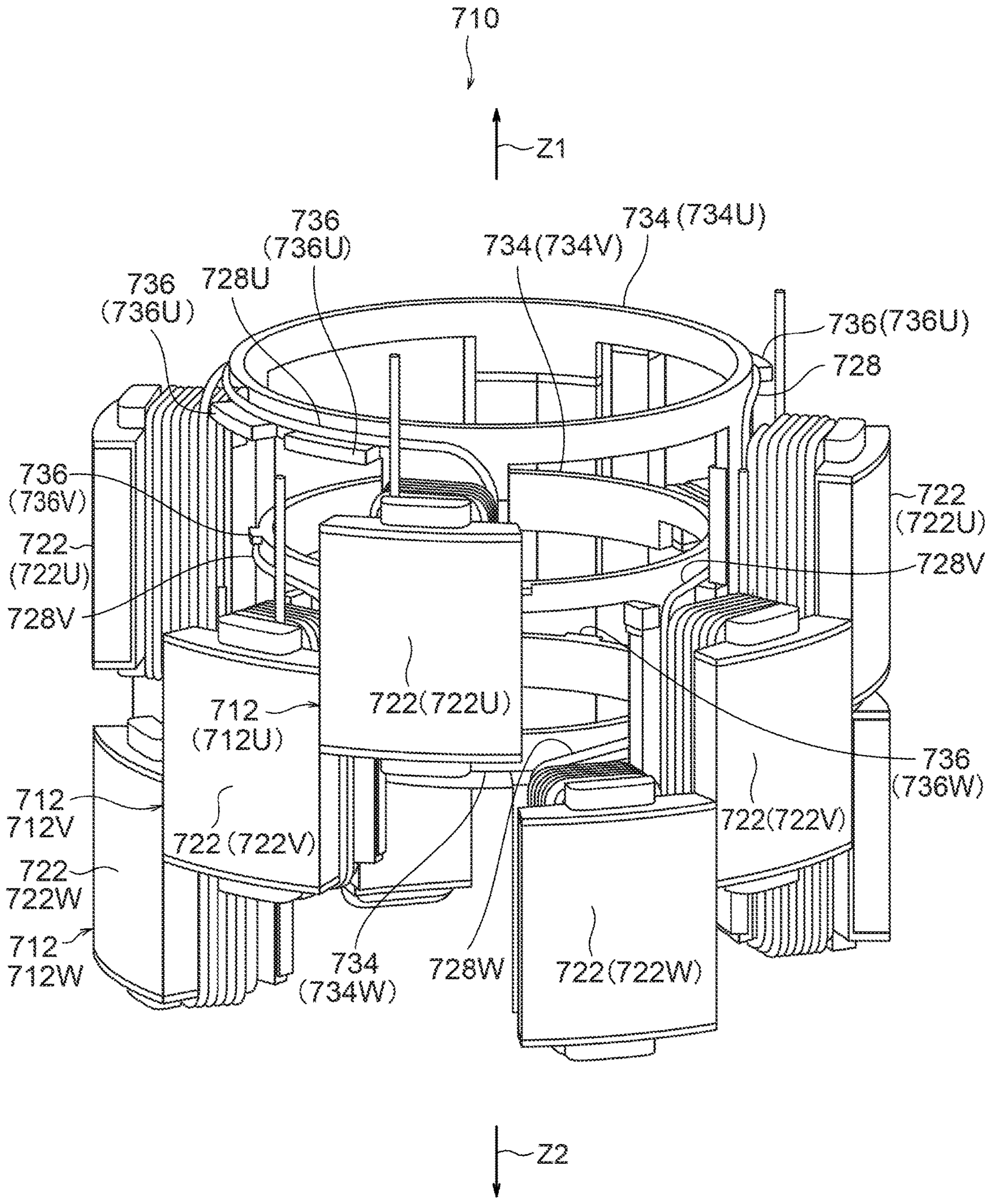
FIG. 41A is a perspective view illustrating a process in which plural stator configuration sections illustrated in FIG. 39 are being assembled together.
Figure 41B:
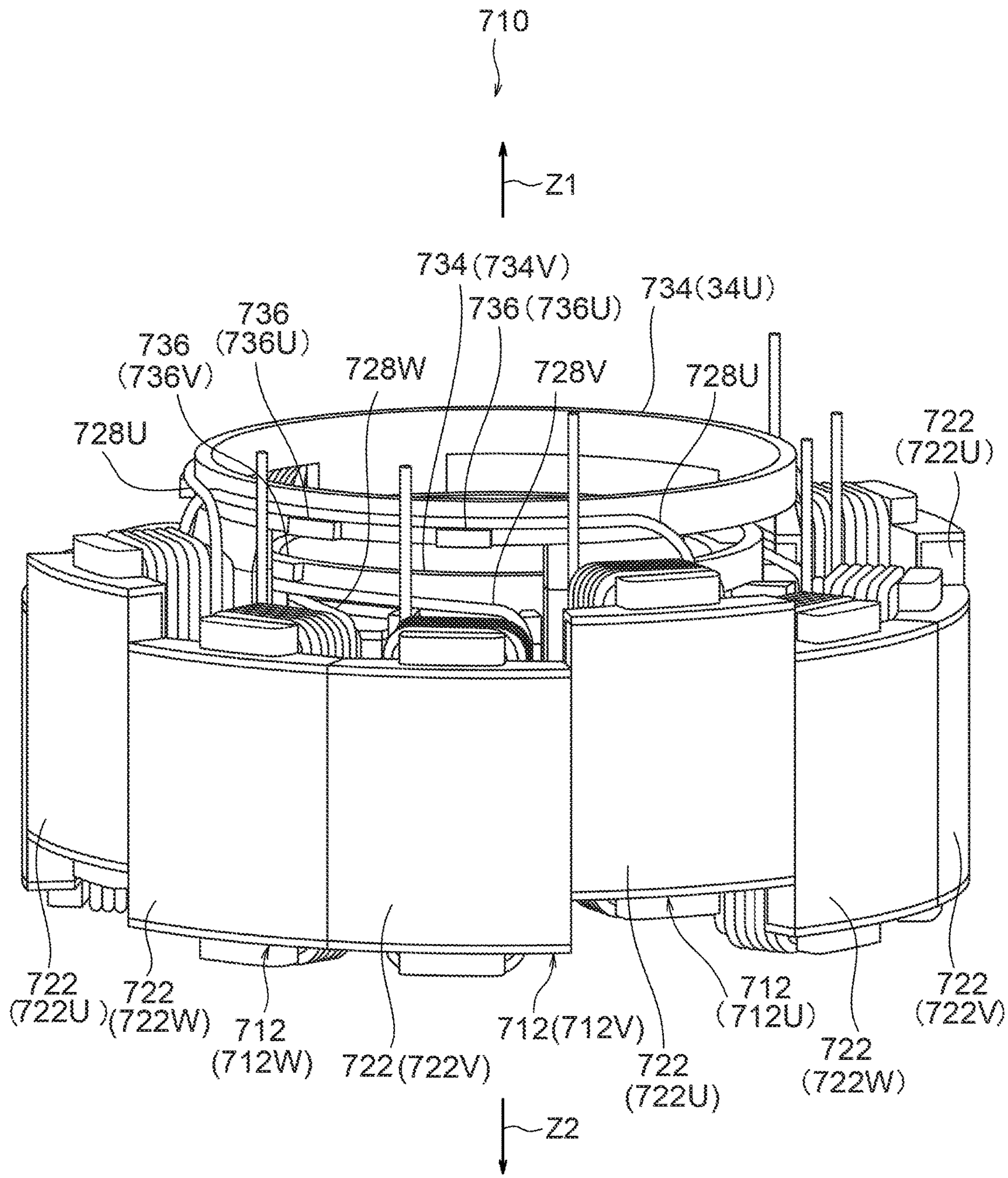
FIG. 41B is a perspective view illustrating a state in which assembly has progressed further than in FIG. 41A.

Then, as illustrated in FIG. 41A and FIG. 41B, in a state in which the V-phase stator configuration section 712V is displaced by a specific angle in a circumferential direction with respect to the W-phase stator configuration section 712W, the V-phase stator configuration section 712V is assembled to the W-phase stator configuration section 712W from the first axial direction side (the arrow Z1 side). Then, in a state in which the U-phase stator configuration section 712U is displaced by a specific angle in a circumferential direction with respect to the V-phase stator configuration section 712V, the U-phase stator configuration section 712U is assembled to the V-phase stator configuration section 712V and the W-phase stator configuration section 712W from the first axial direction side (the arrow Z1 side).

When this is performed, each of the plural yoke configuration sections 722U, 722V, 722W is fitted between respective pairs of yoke configuration sections adjacent on both sides. The V-phase retaining portions 736V are fitted against n inner peripheral face of the U-phase connection portion 734U, and the W-phase retaining portions 736W are fitted against n inner peripheral face of the V-phase connection portion 734V. The plural connection portions 734U, 734V, 734W are thus retained in a state separated from each other in the radial direction by the projection shaped retaining portions 736U, 736V, 736W.

The plural stator configuration sections 712U, 712V, 712W are thus assembled together in this manner to form the stator 710 (stator forming process). Note that the terminal portions 730U, 730V, 730W are connected by a buzz bar or the like, not shown in the drawings. The stator 710 is accordingly manufactured by the above processes.

Explanation follows regarding operation and advantageous effects of the seventh exemplary embodiment of the present invention.

Note that in the following explanation, for convenience the letters U, V, W are omitted as suffixes to the labels of each member and each portion when no discrimination is made between the U-phase, the V-phase and the W-phase.

According to the present exemplary embodiment, the yoke 740 is configured by the plural yoke configuration sections 722U segmented in the circumferential direction. Therefore, even in a stator employed in a so-called inner rotor type brushless motor in which plural teeth sections 724 project towards inside in a yoke 740 radial direction, the sub-assemblies 742 for each of the U-phase, V-phase and W-phase are formed as described above, and the coil wires 716 can be wound using the flyer machine 100 (see FIG. 5) onto each of the teeth sections 724 of each of the sub-assemblies 742 from outside in the radial direction of the yoke 740. There is accordingly no need to secure space between the teeth sections 724, as would be required when a nozzle machine is employed, enabling a higher dense arrangement of the coil wires 716 to be achieved, and enabling a more compact stator 710 to be realized.

Moreover, as described above, the yoke 740 is segmented in the circumferential direction into the plural yoke configuration sections 722, and so, for example, the stator 710 can be made more compact in the axial direction in comparison to cases in which the yoke 740 is segmented into plural yoke configuration sections in the axial direction.

When the flyer machine 100 is employed, since the winding speed of the coil wires 716 is higher than when using a nozzle machine, the process of winding the coil wires 716 can be speeded up, and accordingly a reduction in cost of the stator 710 can be achieved due to reducing the number of equipment units.

Moreover, in each of the plural groups (the U-phase, V-phase, W-phase) of the stator configuration sections 712, adjacent of the plural core configuration sections 714 are disposed with a gap corresponding to two core configuration sections present between each other. Hence, as described above, the flyer machine 100 can be suppressed from interfering with the other core configuration sections 714 even when using the flyer machine 100 to wind the coil wires 716 onto each of the teeth sections 724 of each of the sub-assemblies from the radial direction outside.

Moreover, the coil wire 716U is formed continuously from one end to the other, and including the crossing wires 728U that are laid out along the connection portion 734U and that connect together the plural winding portions 726U. Slack of the winding portions 726U from the teeth sections 724U can accordingly be suppressed from occurring.

Moreover, the crossing wire 728U1 that is connected to the winding start end portion of one of the winding portions 726U and the crossing wire 728U2 that is connected to the winding finish end portion of this winding portions 726U cross over in the connection vicinity between the connection portion 734U and the respective insulator portion 732U. Slack of the winding portions 726U from the teeth sections 724U can accordingly be more effectively suppressed from occurring.

In particular, the radial direction extension portions 737U that extend in the radial direction of the stator configuration section 712U are formed to the extending portions 739U that connect together insulator main body portions 733U and the connection portion 734. The intersection portions 729U of the crossing wires 728U1, 728U2 described above are disposed at positions overlapping with the radial direction extension portions 737U as viewed along the stator configuration section 712U axial direction. The crossing wires 728U1, 728U2 described above accordingly cross over in space secured by the radial direction extension portions 737U, and so slackening of the winding portions 726U from the teeth sections 724U can accordingly be even more effectively suppressed from occurring.

Moreover, due to the V-phase crossing wires 728V1, 728V2, and the W-phase crossing wires 728W1, 728W2 also crossing over similarly to the U-phase crossing wires 728U1, 728U2, slacking of the winding portions 726V, 726W from the teeth sections 724V, 724W can be respectively suppressed from occurring.

Even though the teeth sections 724 project from the yoke configuration sections 722 towards the yoke 740 radial direction inside, the yoke 740 is configured by the plural yoke configuration sections 722 segmented in the yoke 740 circumferential direction, and so the coil wires 716 can be wound on each of the teeth sections 724 of each of the sub-assemblies using the flyer machine 100 from the radial direction outside.

Moreover, in each of the stator configuration sections 712, the connection portions 734 are respectively positioned further to the radial direction inside than the core configuration sections 714. Interference between the flyer of the flyer machine 100 and the connection portions 734 can accordingly be suppressed from occurring when the coil wires 716 are respectively wound on the teeth sections 724 from the radial direction outside using the flyer machine 100.

Moreover, the plural yoke configuration sections 722 are integrally formed to the teeth sections 724. Magnetic loss at each of the connection portions can accordingly be suppressed compared with, for example, a two-part type core including independent members of plural teeth sections with leading end portions connected together with thinned bridging sections and a yoke that connects together base end portions of the teeth sections. Namely, magnetic loss occurs at three locations in the two-part type core, at the bridging sections between the leading end portions of pairs of adjacent teeth sections, at the base end portions of pairs of teeth sections, and at connection portion of the yoke. In contrast thereto, in the stator 710 of the present exemplary embodiment, magnetic loss only occurs at one location, the connection portion between pairs of the adjacent yoke configuration sections 722, enabling magnetic loss to be reduced. It is accordingly possible to achieve even greater compactness and reduction in weight.

Figure 43:
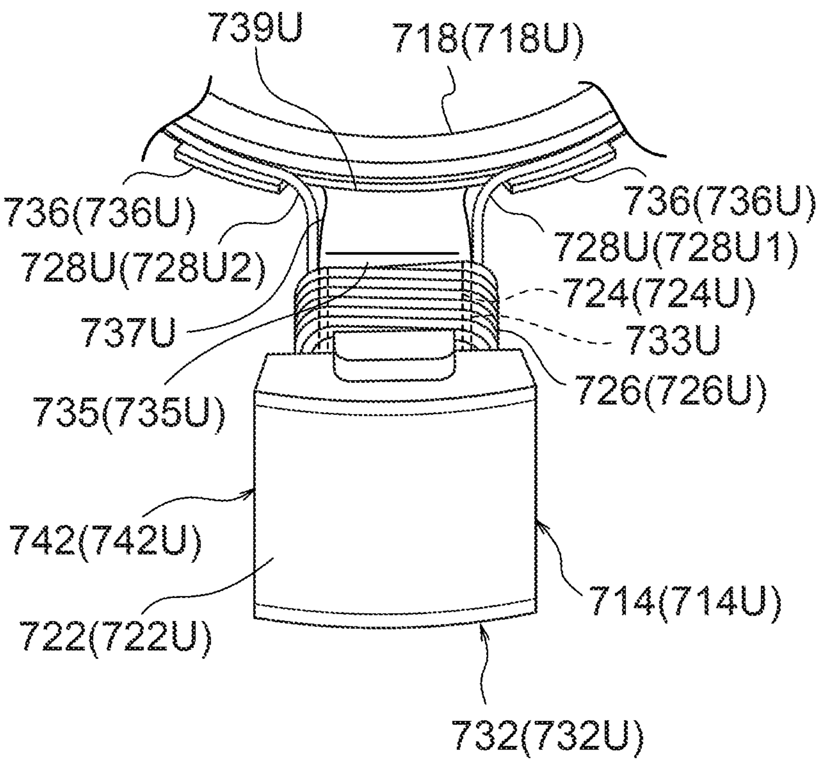
FIG. 43 is a perspective view illustrating a modified example of a coil wire illustrated in FIG. 39.

Although in the present exemplary embodiment, in each of the stator configuration sections 712, all of the crossing wires 728 cross over at the connection vicinity between the connection portions 734 and the insulator portions 732, configuration may be made such that one or more of the crossing wires 728 do not cross over, as illustrated in FIG. 43. Namely, where there are cases in which the crossing wires 728 are tightly wound so as to cross over as illustrated in FIG. 40C, configuration may be made with any of the crossing wires 728 wound loosely without cross over.

In the present exemplary embodiment, the radial direction extension portions 737 that extend in the radial direction of the stator configuration sections 712 are formed to the extending portions 739, and the intersection portions 729 of the crossing wires 728 described above are disposed at positions overlapping with the radial direction extension portions 737 as viewed along the stator configuration sections 712 axial direction. However, configuration may be made such that axial direction extension portions are formed to the extending portions 739 to extend in an axial direction of the stator configuration sections 712, and the intersection portions 729 of the above crossing wires 728 are disposed at positions overlapping with the axial direction extension portions as viewed along a stator configuration sections 712 radial direction. Slacking of the winding portions 726 from the teeth sections 724 can also be suppressed from occurring by adopting such a configuration.

Moreover, although the crossing wires 728 are laid out along the connection portions 734, configuration may also be made with a straight line stretched formation in which tension is applied to crossing wires not laid out along the connection portions 734.

Eighth Exemplary Embodiment

Figure 44:
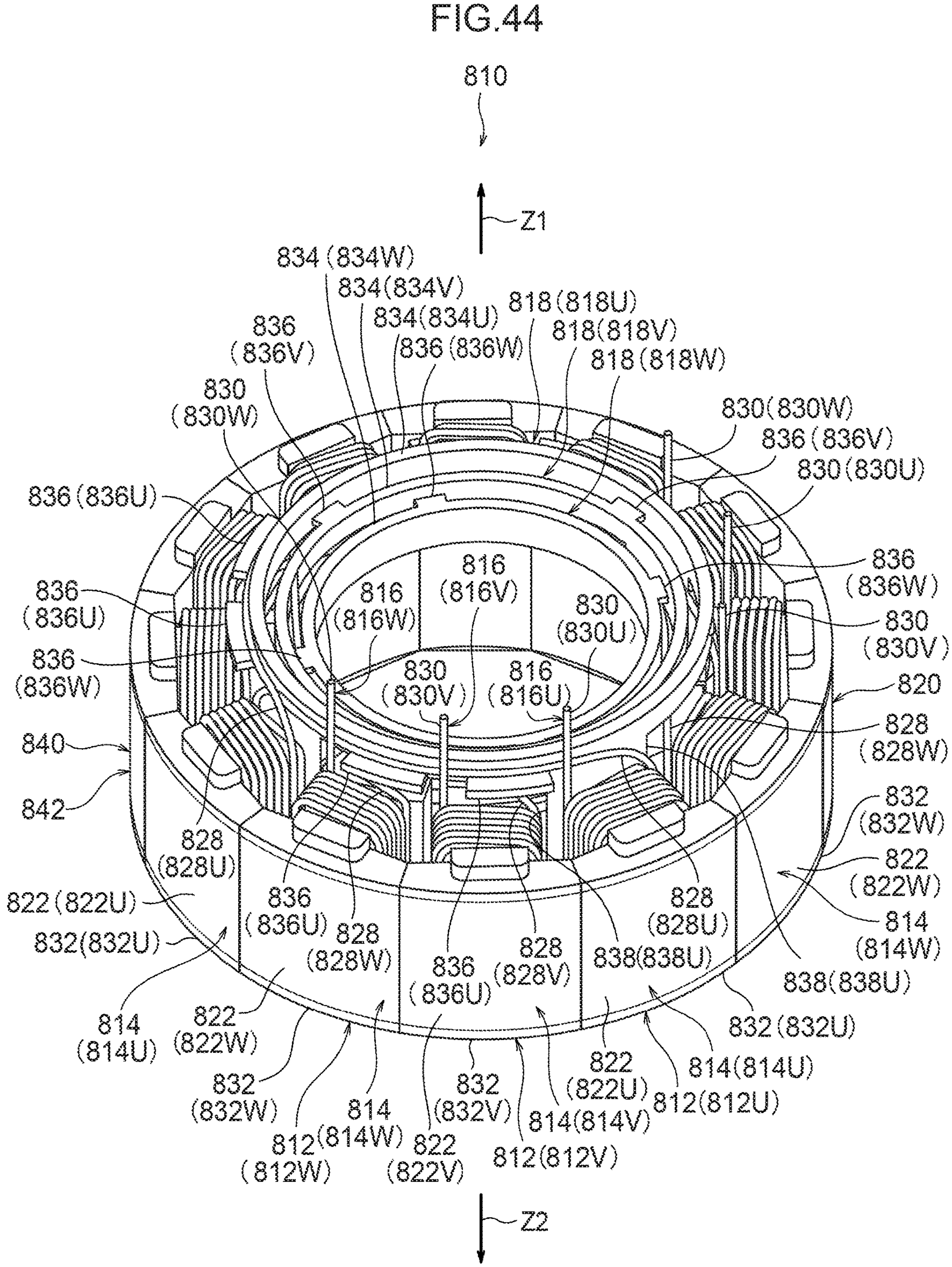
FIG. 44 is a perspective view illustrating a stator according to an eighth exemplary embodiment of the present invention.

Explanation follows regarding an eighth exemplary embodiment of the present invention. A stator 810 according to the eighth exemplary embodiment of the present invention illustrated in FIG. 44 has portions similar to those of the stator of the first exemplary embodiment. Explanation hence focuses on differing portions and explanation of similar portions is omitted as appropriate.

Figure 45A:
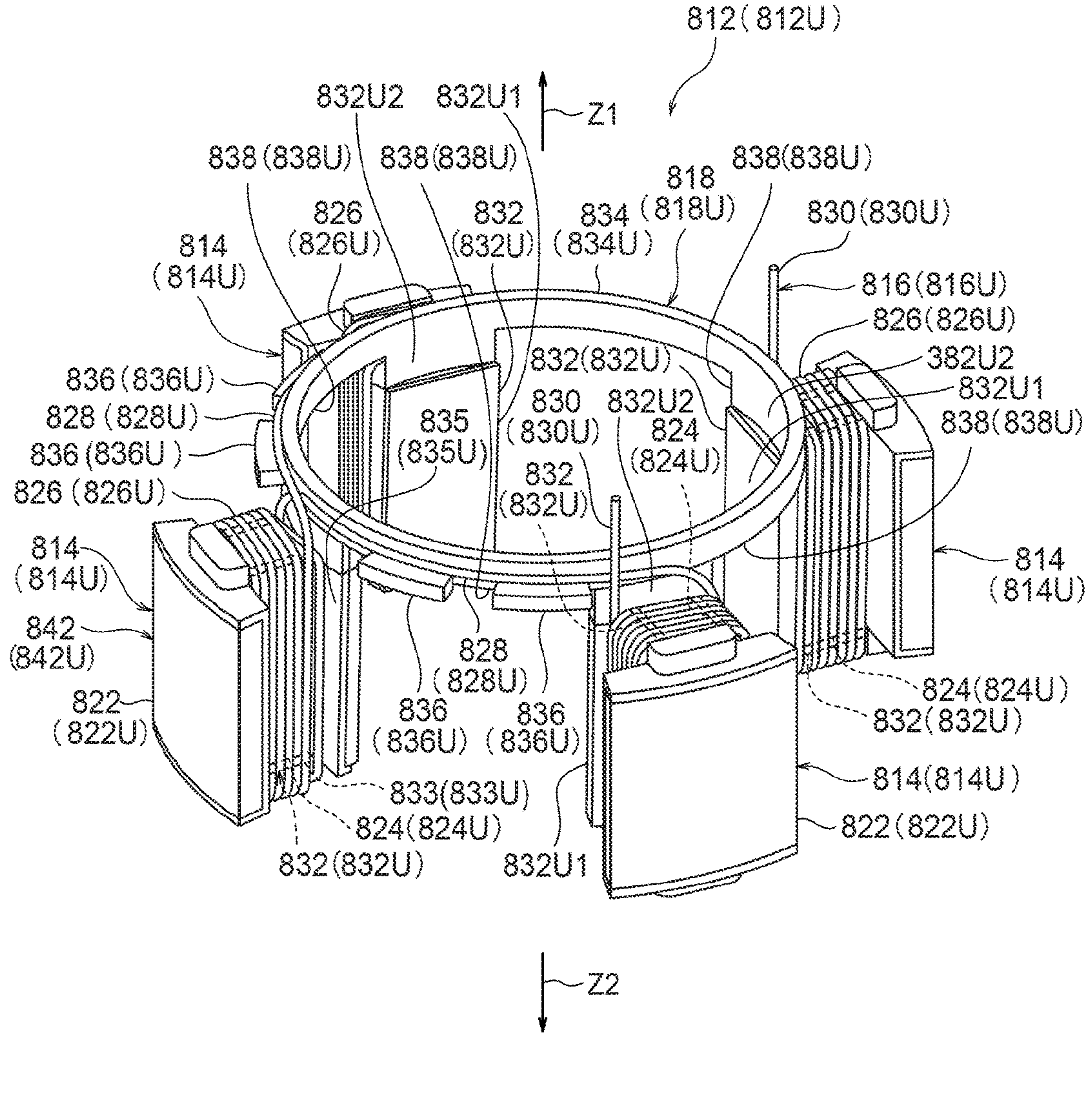
FIG. 45A is a perspective view illustrating a U-phase stator configuration section illustrated in FIG. 44.

As illustrated in FIG. 45A, in a U-phase stator configuration section 812, an insulator 818U includes plural resin-formed insulator portions 832U. The number of plural insulator portions 832U provided is the same as the number of plural teeth sections 824U. The plural insulator portions 832U include respective insulator main body portions 833U and extension side wall portions 835U. The insulator main body portions 833U are integrated to respective surfaces of plural core configuration sections 814U, for example by integral molding or interlock mounting. The insulator main body portions 833U insulate between the teeth sections 824U formed to the core configuration sections 814U and winding portions 826U. The extension side wall portions 835U are positioned further inside in a radial direction of stator configuration section 812U than the core configuration sections 814U (than the insulator main body portions 833U). The extension side wall portions 835U extend from a connection portion 834U towards a second axial direction side (arrow Z2 side) of the stator configuration section 812U, and connect together the insulator main body portions 833U and the connection portion 834U.

Figure 45B:
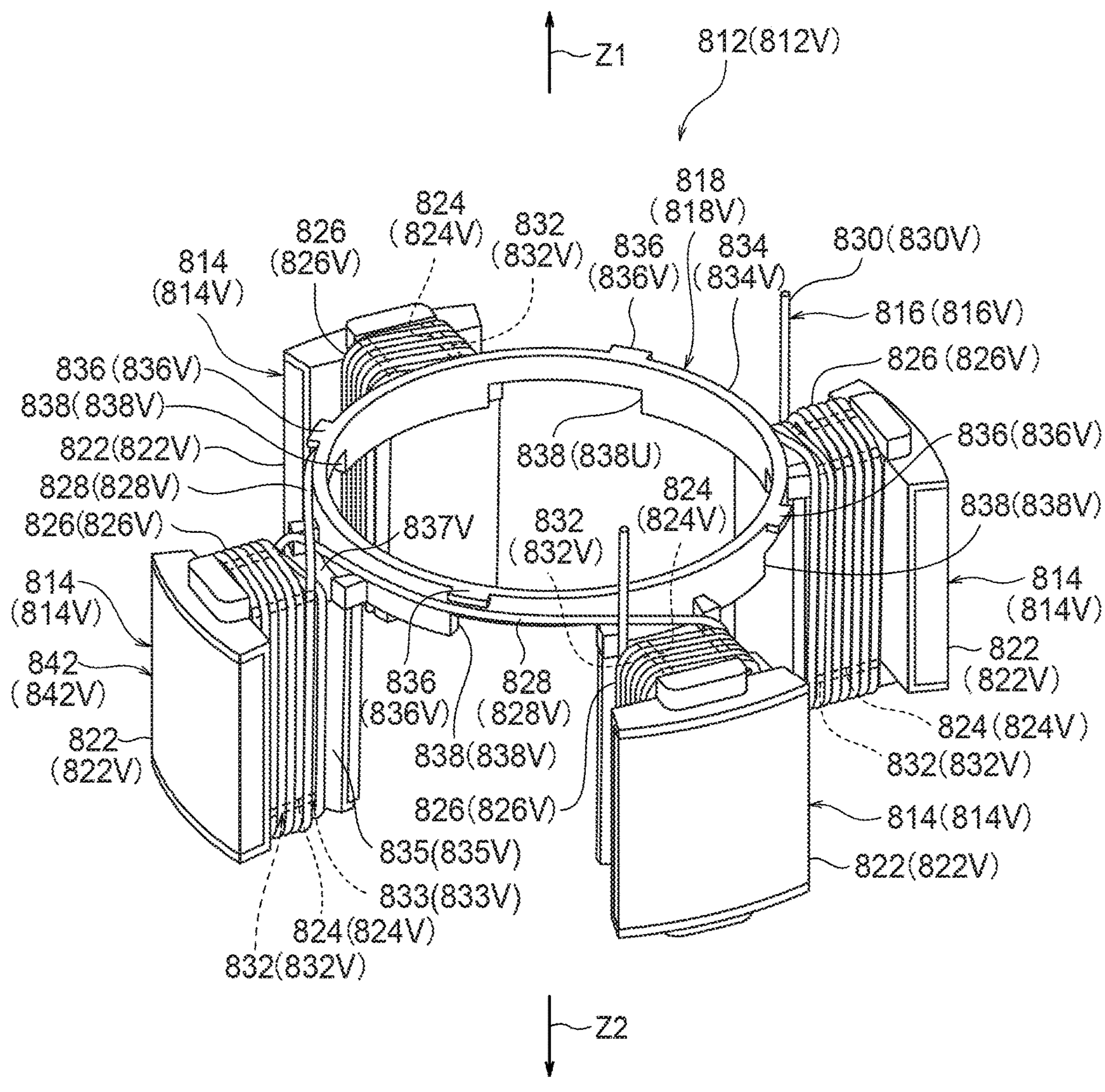
FIG. 45B is a perspective view illustrating a V-phase stator configuration section illustrated in FIG. 44.

A V-phase stator configuration section 812V illustrated in FIG. 45B also has a similar basic configuration to the U-phase stator configuration section 812U described above.

The plural insulator portions 832V include respective insulator main body portions 833V, extension side wall portions 835V and radial direction extension portions 837V. The insulator main body portions 833V are integrated to respective surfaces of plural core configuration sections 814V, for example by integral molding or interlock mounting. The insulator main body portions 833V insulate between teeth sections 824V formed to the core configuration sections 814V and winding portions 826V. The extension side wall portions 835V are positioned further inside in a radial direction of the stator configuration section 812V than the core configuration sections 814V (than the insulator main body portions 833V). The radial direction extension portions 837V extend outside in the radial direction of the stator configuration section 812V from connection portion 834V. The extension side wall portions 835V extend from extending ends of the radial direction extension portions 837V towards a second axial direction side (Z2 side) of the stator configuration section 812V and connect together the insulator main body portions 833V and the radial direction extension portions 837V. The connection portion 834V is provided at a first axial direction side (Z1 side) of the plural insulator portions 832V. The connection portion 834V is formed in a ring shape, connects together the plural insulator portions 832V, and is positioned further to the radial direction inside than the core configuration sections 814V.

Figure 45C:
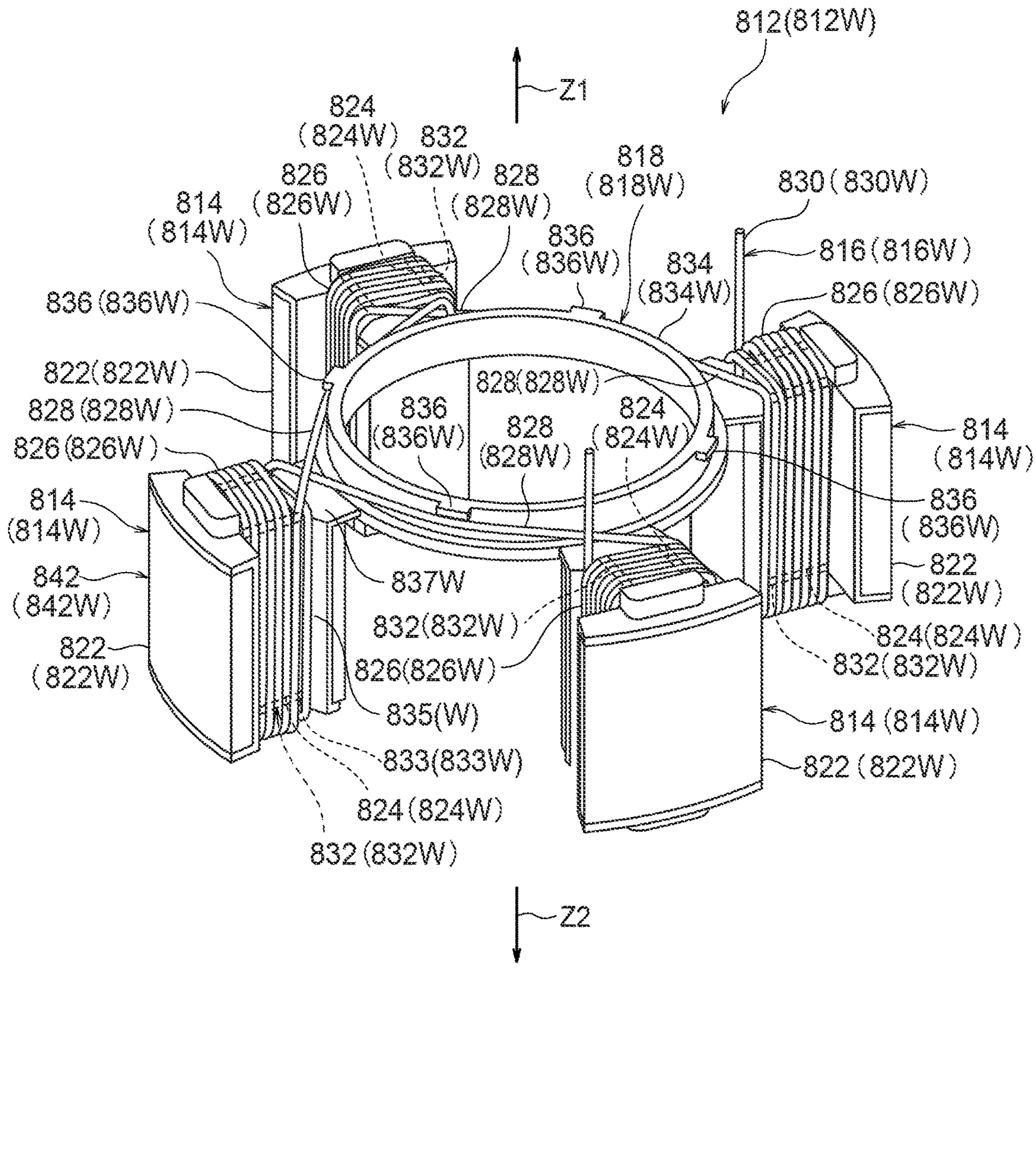
FIG. 45C is a perspective view illustrating a W-phase stator configuration section illustrated in FIG. 44.

A W-phase stator configuration section 812W illustrated in FIG. 45C also has a similar basic configuration to the U-phase stator configuration section 812U described above.

The plural insulator portions 832W include respective insulator main body portions 833W, extension side wall portions 835W and radial direction extension portions 837W. The insulator main body portions 833W are integrated to respective surfaces of plural core configuration sections 814W, for example by integral molding or interlock mounting. The insulator main body portions 833W insulate between teeth sections 824W formed to the core configuration sections 814W and winding portions 826W. The extension side wall portions 835W are positioned further inside in a radial direction of the stator configuration section 812W than the core configuration sections 814W (than the insulator main body portions 833W). The radial direction extension portions 837W extend outside in the radial direction of the stator configuration section 812W from connection portion 834W. The extension side wall portions 835W extend from extending ends of the radial direction extension portions 837W towards a second axial direction side (arrow Z2 side) of the stator configuration section 812W, and connect together the insulator main body portions 833W and the radial direction extension portions 837W. The connection portion 834W is provided at a first axial direction side (the arrow Z1 side) of the plural insulator portions 832W. The connection portion 834W is formed in a ring shape, connects together the plural insulator portions 832W (or more specifically, extension end portions (end portions on the radial direction inside) of the extension side wall portions 835W of the plural insulator portions 832W), and is positioned further to the radial direction inside than the core configuration sections 814W.

Figure 46A:
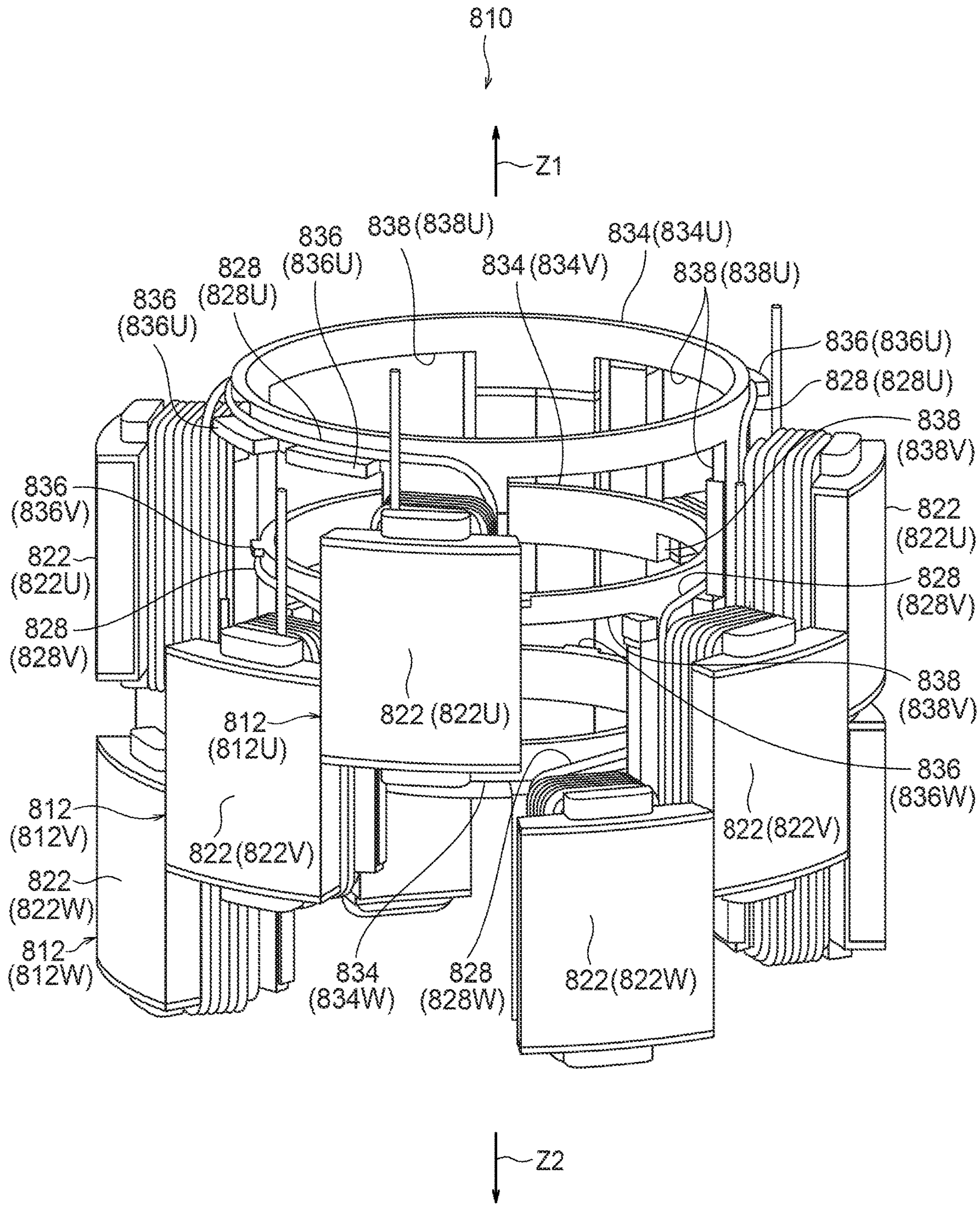
FIG. 46A is a perspective view illustrating a process in which plural stator configuration sections illustrated in FIG. 44 are being assembled together.
Figure 46B:
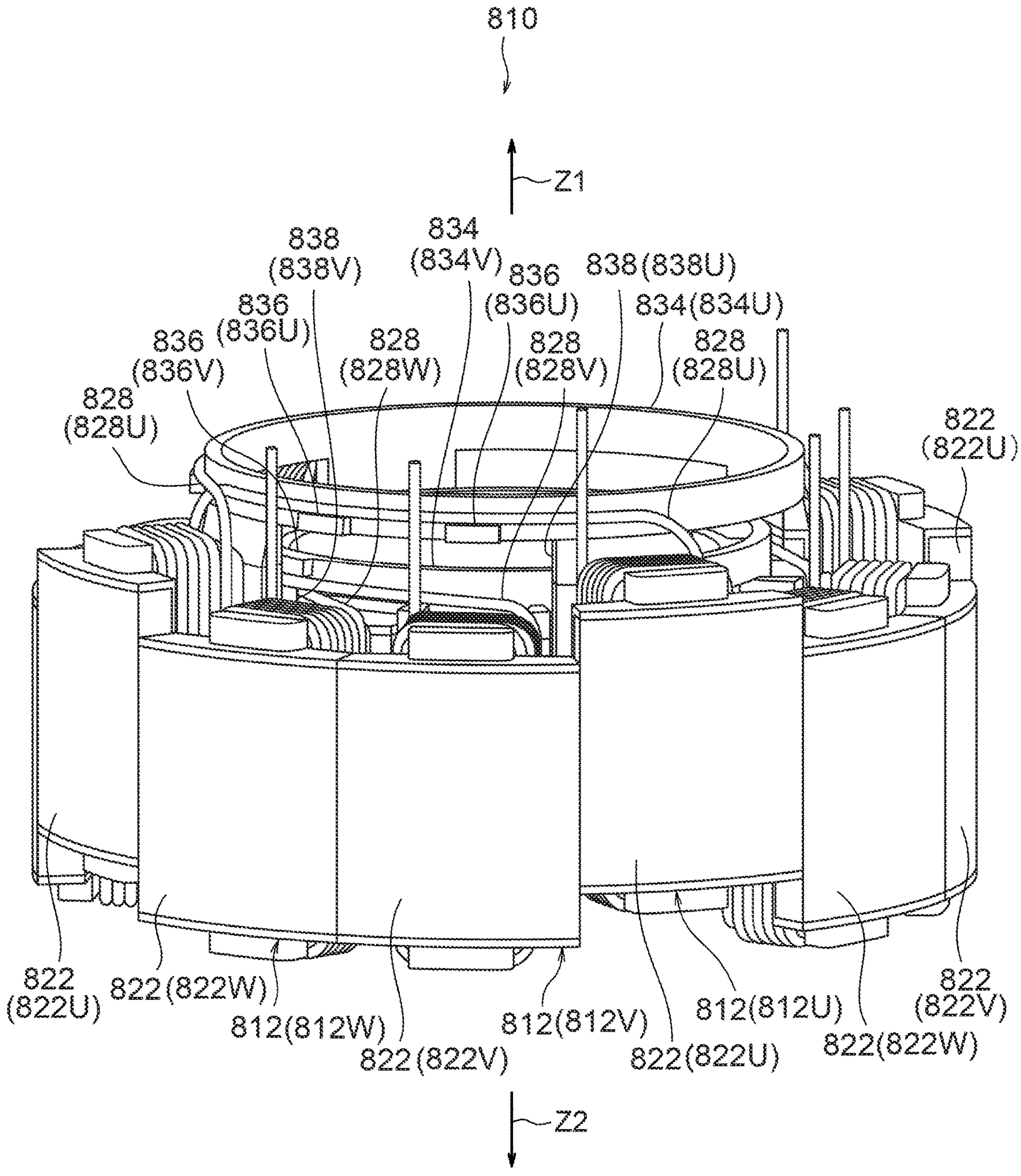
FIG. 46B is a perspective view illustrating a state in which assembly has progressed further than in FIG. 46A.
Figure 47:
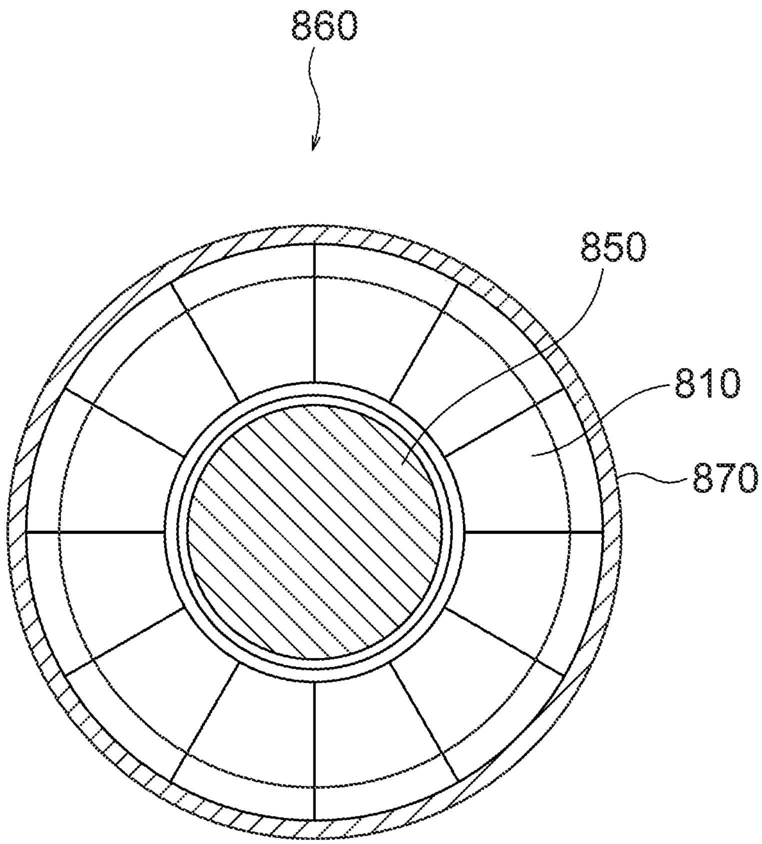
FIG. 47 is a cross-section illustrating a schematic configuration of a brushless motor provided with the stator illustrated in FIG. 44.

Moreover, in a state in which the plural connection portions 834U, 834V, 834W are disposed with gaps between each other in a radial direction of the yoke 840, V-phase crossing wires 828V pass through inside notches 838U formed in the U-phase connection portion 834U (are housed in the notches 838U), and W-phase crossing wires 828W pass through inside notches 838V formed in the V-phase connection portion 834V and through inside notches 838U formed in the U-phase connection portion 834U (are housed in the notches 838U and notches 838V) (see FIG. 46B). The notches 838U, 838V are examples of housing portion of the present invention.

In each of the stator configuration sections 812U, 812V, 812W of the plural groups described above, as illustrated in FIG. 48, the positional relationship between one of the core configuration section 814 and another of the core configuration sections 814 adjacent to this core configuration section 814 is as set out below, when an imaginary tangent line X passes through the extension side wall portion 835 in a tangential direction to the stator configuration section 812, a circumferential direction end portion 822A of a yoke configuration section 822 in one of the core configuration sections 814 is positioned on the opposite side with respect to the imaginary tangent line X form the other core configuration section 814. Note that the imaginary tangent line X may pass through the extension side wall portions 835 at any position on the extension side wall portion 835, in plan view.

In each of the stator configuration sections 812U, 812V, 812W of the plural groups, the winding portions are pressed and compression deformed (high density packed) by a press 104, as described later (see FIG. 49 and FIG. 50).

Explanation follows regarding a manufacturing method of the stator 810 configured as described above. A sub-assembly forming process and a stator configuration section forming process are substantially the same as those of the first exemplary embodiment.

Figure 49:
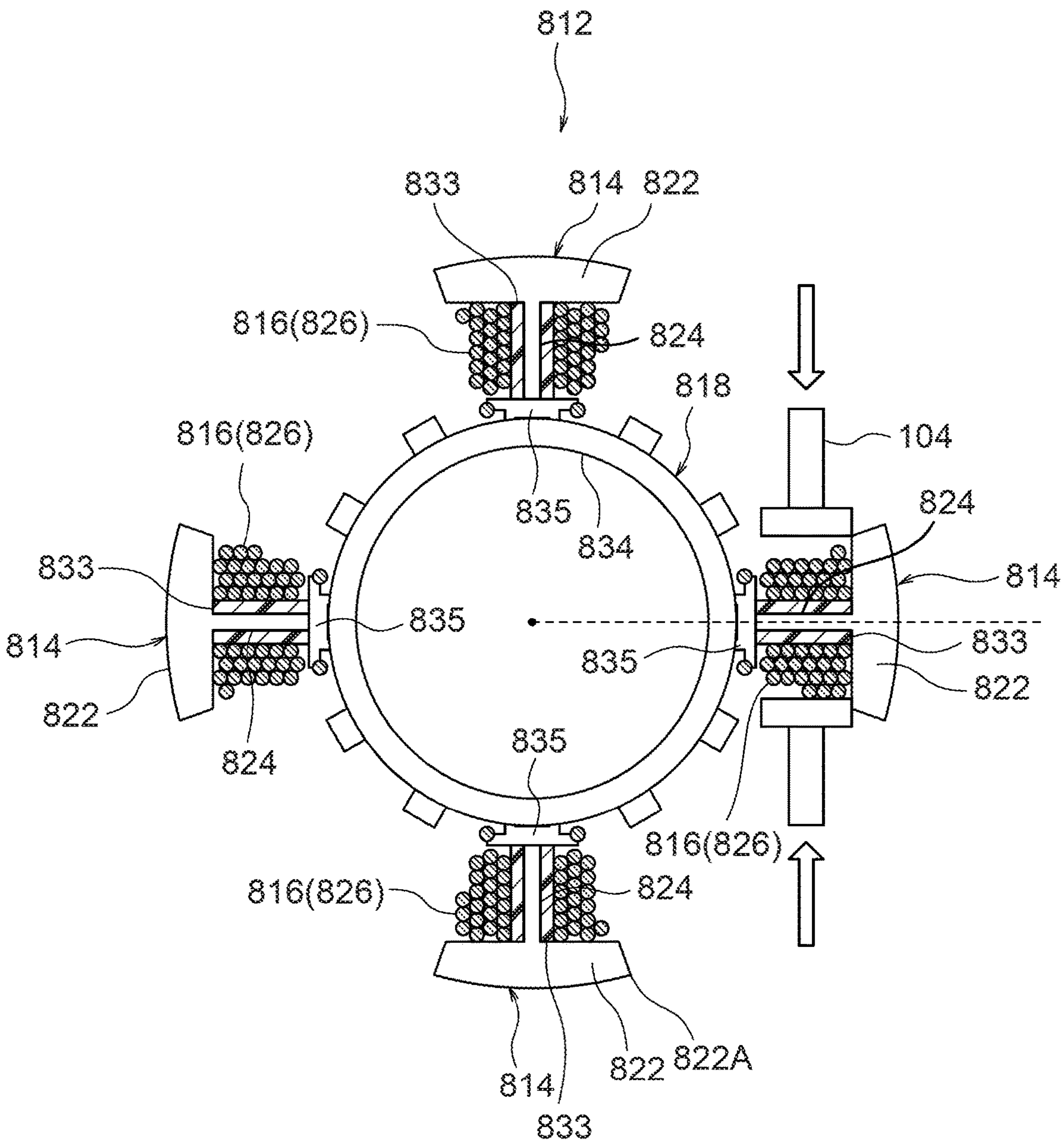
FIG. 49 is a plan view to explain a manner in which a coil wire is pressed using a press.
Figure 50:
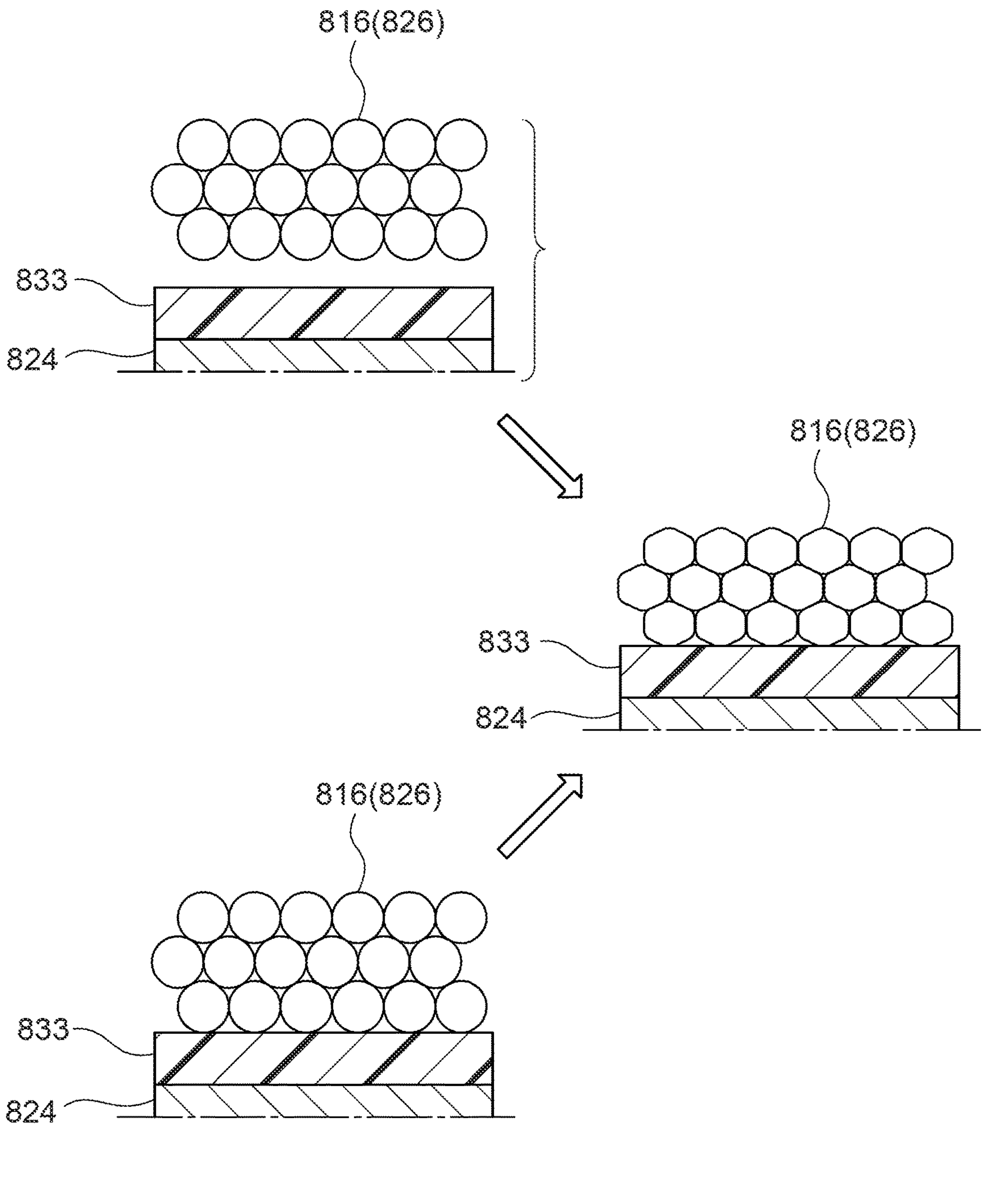
FIG. 50 is an expanded area drawing to explain a manner in which a winding portion is pressed.

In each of the stator configuration sections 812U, 812V, 812W of the plural groups, as illustrated in FIG. 49 and FIG. 50, the winding portions 826 are pressed and compression deformed by the press 104 (compression process). When this is performed, the winding portions 826 are pressed from both side in a direction intersecting with (for example orthogonal to) the teeth sections 824 axial direction. Moreover, the winding portions 826 are pressed such that pressing direction to the winding portions 826 is arranged in a tangential direction to the stator configuration section 812.

Explanation follows regarding operation and advantageous effects of the eighth exemplary embodiment of the present invention.

Figure 48:
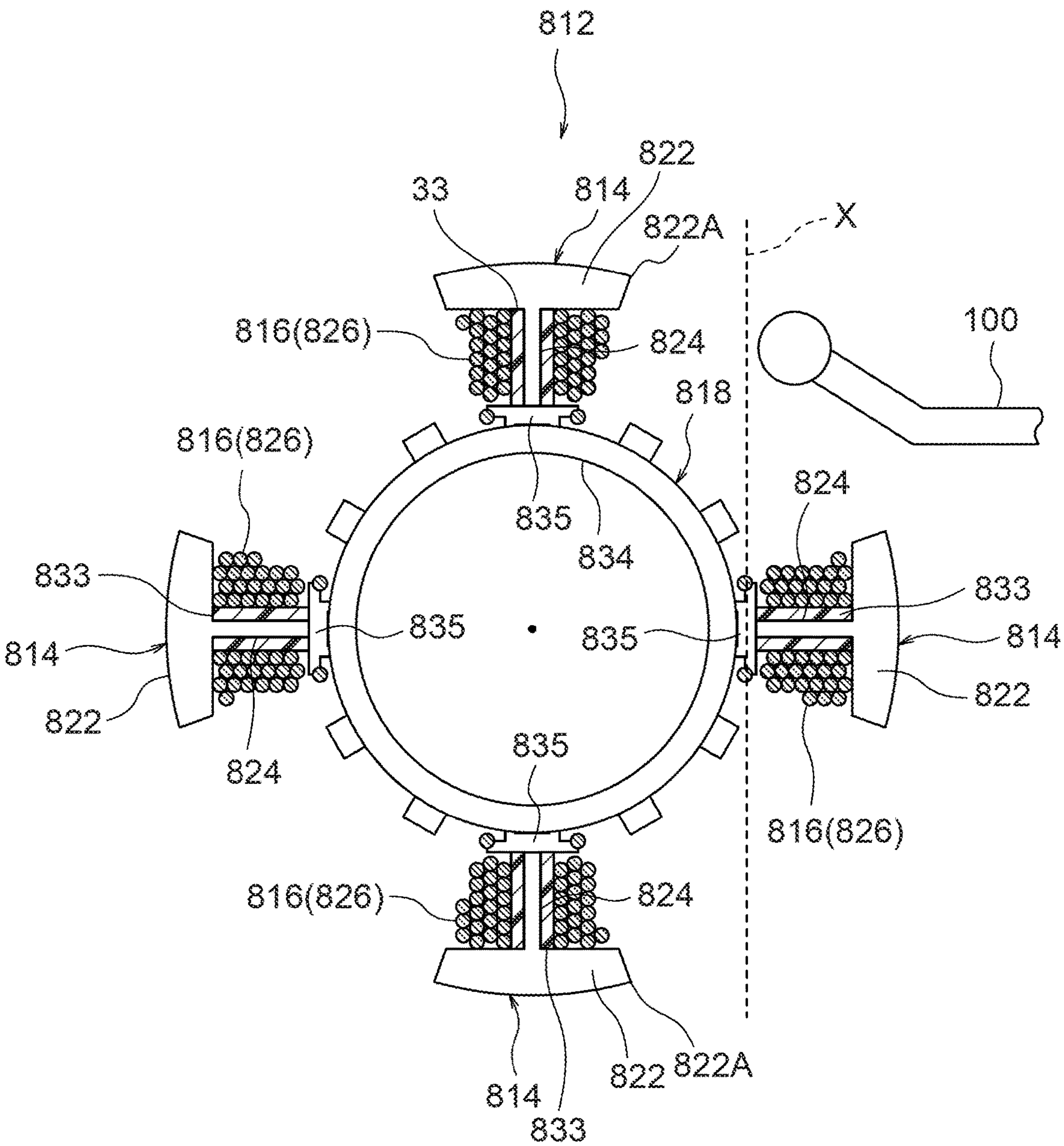
FIG. 48 is a plan view to explain winding of a coil wire using a flyer machine.

In each of the stator configuration section 812 of the plural groups, as illustrated in FIG. 48, when the imaginary tangent line X passes through the extension side wall portion 835 in a tangential direction to the stator configuration section 812, the circumferential direction end portions 822A of the yoke configuration section 822 of one of the core configuration sections 814 are positioned on the opposite side with respect to the imaginary tangent line X to the other core configuration sections 814 that are adjacent to this core configuration section 814. Consequently, even when coil wires 816 are wound onto each of the teeth sections 824 of each of the sub-assemblies from the radial direction outside using the flyer machine 100, the flyer machine 100 can be suppressed from interfering with the other core configuration sections 814, and in particular interfering with the circumferential direction end portions 822A of the yoke configuration section 822.

Figure 56:
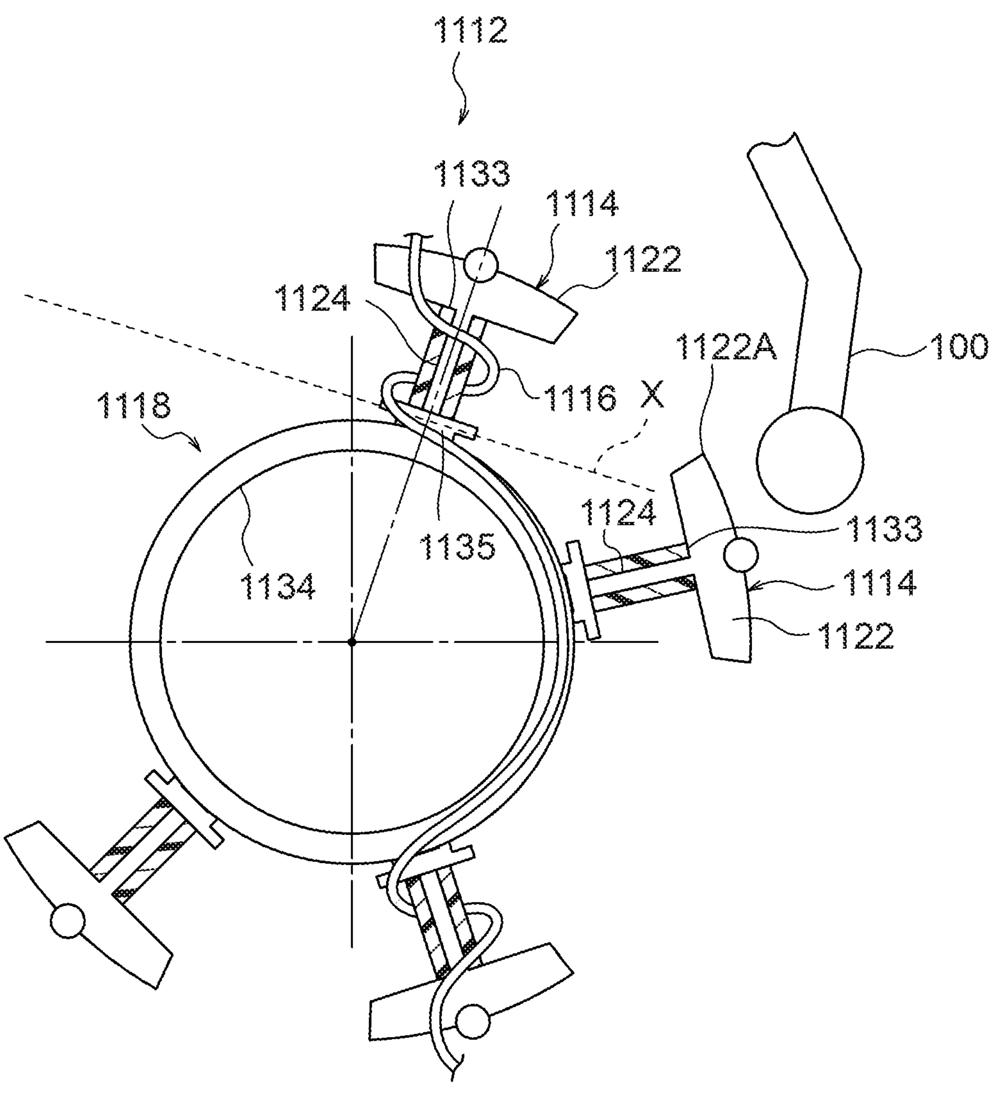
FIG. 56 is a drawing to explain winding a coil wire in a stator according to a comparative example.

Namely, suppose that, as illustrated in FIG. 56, a circumferential direction end portion 1122A of a yoke configuration section 1122 in one of the core configuration sections 1114 is positioned on the same side with respect to the imaginary tangent line X to another of the core configuration sections 1114, the flyer machine 100 would interfere with the circumferential direction end portion 1122A of the yoke configuration section 1122 of the another core configuration sections 1114. However, according to the present exemplary embodiment such interference can be suppressed from occurring.

Moreover, the winding portions 826 are pressed and compression deformed (high density packed) by the press 104. Bulges in the winding portions 826 are accordingly suppressed, a high dense arrangement of the coil wires 816 can be achieved, and space for the pressing operation of the press 104 can also be secured.

Moreover, in the compression process, the winding portions 826 are pressed in a direction intersecting with the teeth sections 824 axial direction. Therefore, as illustrated in FIG. 49, even in cases in which gaps occur between the teeth sections 824 and the winding portions 826 or in cases in which gaps are left between individual strands of coil wire in the winding portions 826, bulging of the winding portions 826 can be better suppressed, and a high dense arrangement of the coil wires 816 can be achieved. In particular, the coil wires 816 can be better compression deformed due to pressing the winding portions 826 from both sides in a direction intersecting with the teeth sections 824 axial direction.

Moreover, in the compression process the winding portions 826 are pressed such that the pressing direction on the winding portions 826 is a tangential direction to the stator configuration section 812. In each of the plural groups of the stator configuration sections 812, adjacent core configuration sections 814 are disposed while a space of two core configuration sections is maintained between the adjacent core configuration sections 814. The winding portions 826 can accordingly be pressed while still suppressing the press 104 from interfering with the core configuration sections 814.

Ninth Exemplary Embodiment

Explanation follows regarding a ninth exemplary embodiment of the present invention.

Figure 51:
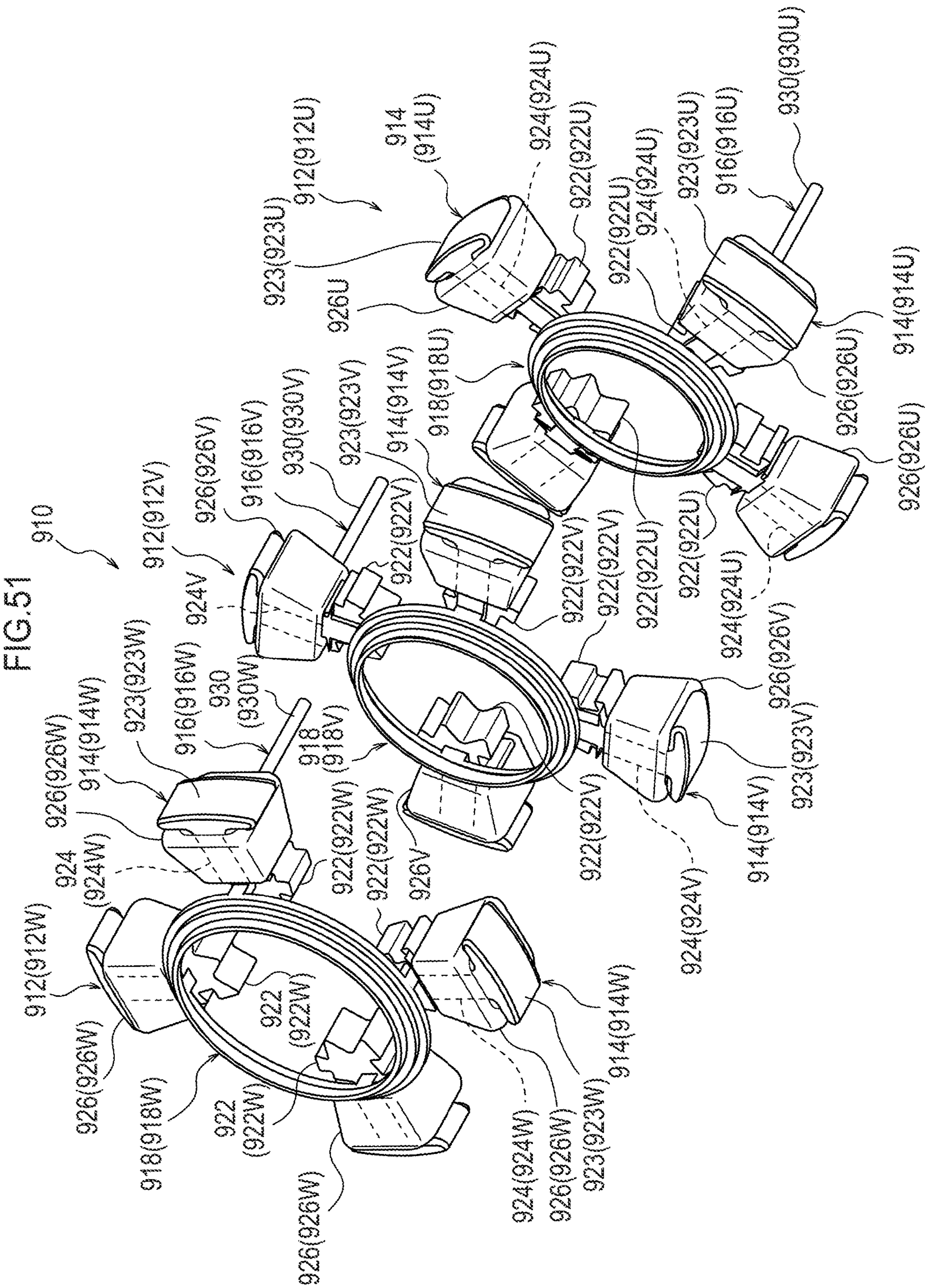
FIG. 51 is an exploded perspective view illustrating a stator according to a ninth exemplary embodiment of the present invention.
Figure 52:
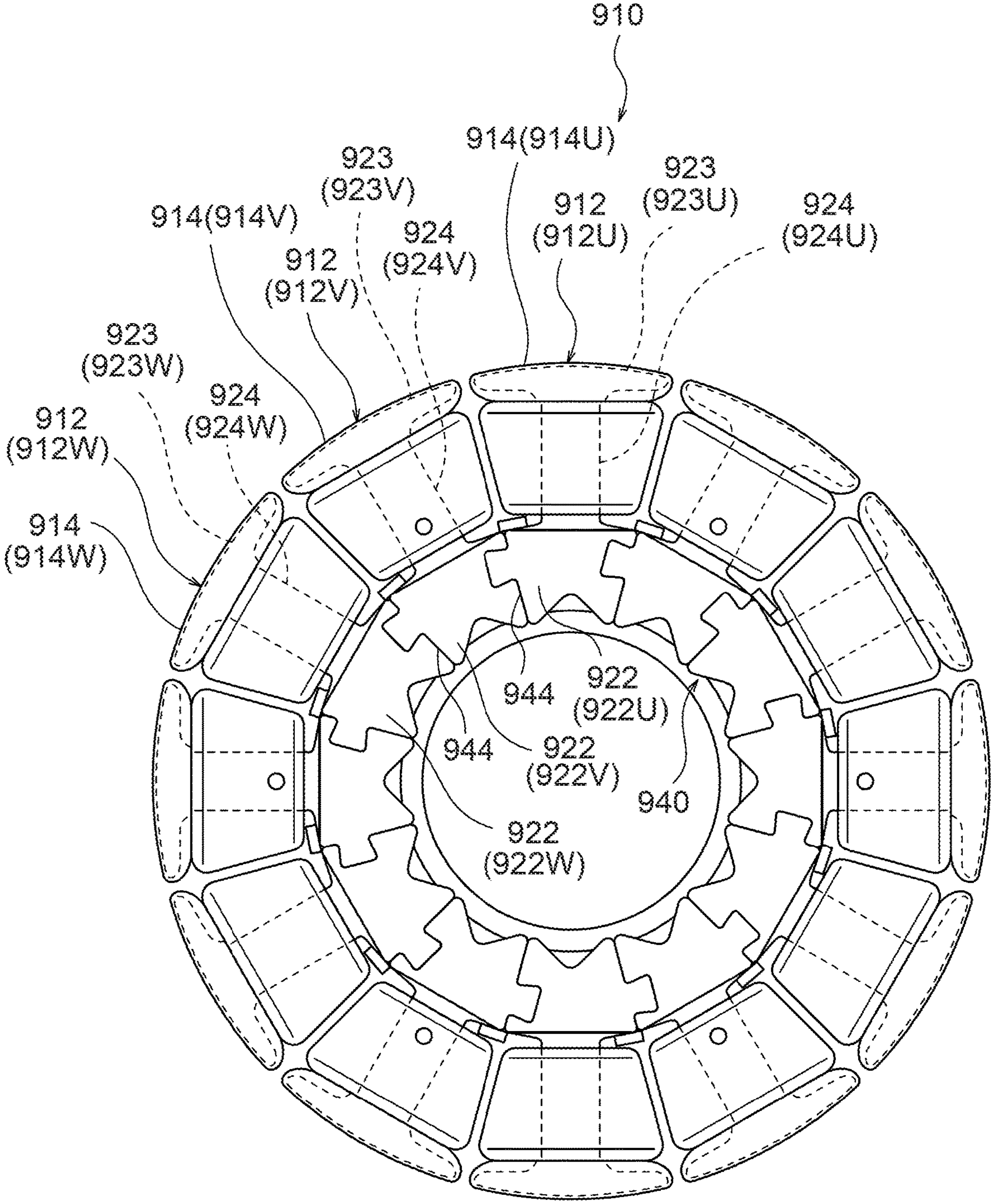
FIG. 52 is a plan view illustrating an assembled state of the stator illustrated in FIG. 51.

In the eighth exemplary embodiment of the present invention, the stator 810 is employed in an inner rotor type motor, and the teeth sections 824 protrude from the yoke configuration section 822 towards the yoke 840 radial direction inside. However, as illustrated in FIG. 51 and FIG. 52, a stator 910 according to the ninth exemplary embodiment of the present invention is employed in an outer rotor type motor. The teeth sections 924 project out from a yoke configuration section 922 towards an outside in a radial direction of a yoke 940. Yoke configuration sections 923 are formed to leading end portions of the teeth sections 924. Note that the stator 910 is employed in a 10-pole, 12-slot or a 14-pole, 12-slot motor. Other than in the above respects, configuration of the present exemplary embodiment is substantially similar to that of the eighth exemplary embodiment of the present invention.

When such a configuration is adopted, an interval can be secured between leading end portions of adjacent teeth sections 924, and therefore a coil wire winding machine can be employed to wind the coil wires 916 onto each of the teeth sections 924 from the radial direction outside. Namely, even when circumferential direction end portions of the yoke configuration sections 923 of one of the teeth sections 924 are positioned on the same side with respect to the above imaginary tangent line X (see FIG. 48) as other teeth sections 924, interference of a flyer machine with the teeth sections 924 (the yoke configuration sections 923) can be suppressed in comparison to the conventional cases by employing for example a non-illustrated variable former.

Note that in the present exemplary embodiment, as illustrated in FIG. 52, the adjacent yoke configuration sections 922 may fit together with recess and protrusion shaped fitting portions 944. Adopting such a configuration enables the rigidity of the yoke 940 to be raised.

Tenth Exemplary Embodiment

Explanation follows regarding a tenth exemplary embodiment of the present invention.

A stator 10140 according to the tenth exemplary embodiment of the present invention illustrated in FIG. 53 has a configuration changed in the following manner from the stator 910 according to the ninth exemplary embodiment of the present invention described above. Namely, the stator 10140, as illustrated in FIG. 54A to FIG. 54C, is segmented into stator configuration sections 1012A, 1012B, 1012C configured for each of groups that include plural phases. Note that the stator 10140 is, for example, applied to a 10-pole, 12-stroke brushless motor 1060.

As illustrated in FIG. 54A, the stator configuration section 1012A configuring a first group includes a +U-phase teeth section 1024U, a −U-phase teeth section 1024U, a +W-phase teeth section 1024W and a −W-phase teeth section 1024W. Moreover, as illustrated in FIG. 54B, the stator configuration section 1012B configuring a second group includes a +V-phase teeth section 1024V, a −V-phase teeth section 1024V, a +W-phase teeth section 1024W and a −W-phase teeth section 1024W. Moreover, as illustrated in FIG. 54C, the stator configuration section 1012C configuring a third group includes a +U-phase teeth section 1024U, a −U-phase teeth section 1024U, a +V-phase teeth section 1024V and −V-phase teeth section 1024V. Each of the stator configuration sections 1012A, 1012B, 1012C are thus configured by a combination of mutually different phases (U-phase, V-phase, W-phase).

Moreover, in each of the stator configuration sections 1012A, 1012B, 1012C, the plural teeth sections 1024 are disposed at even intervals from each other (at for example 90 degrees in the present exemplary embodiment). As illustrated in FIG. 53, in each of the stator configuration sections 1012A, 1012B, 1012C, two core configuration sections 1014 (teeth sections 1024) from other stator configuration sections are disposed between each adjacent pair of core configuration sections 1014 (teeth sections 1024).

As illustrated in FIG. 54A, the coil wire 1016U is wound in a tightening direction (forwards) on the −U-phase teeth section 1024 and in a loosening direction (reverse direction) on the +U-phase teeth section 1024. Namely, the winding portions 1026U and the crossing wires 1028U in the coil wire 1016U are connected together by a lead portion 1046 that is led out from the teeth section 1024U. The coil wire 1016U is wound in the tightening direction when, as viewed along an axial direction of the stator configuration section 1012A, the lead portion 1046 extends so as to intersect the stator configuration section 1012A radial direction (when overlapping with the core configuration section 1014U). However, the coil wire 1016U is wound in the loosening direction when, as viewed along the axial direction of the stator configuration section 1012A, the lead portion 1046 extends along the stator configuration section 1012A radial direction (when not overlapping with the core configuration section 1014U).

Similarly, as illustrated in FIG. 54A, the coil wire 1016W is wound in the tightening direction on the +W-phase teeth section 1024 and the coil wire 1016W is wound in the loosening direction on the −W-phase teeth section 1024. Moreover, as illustrated in FIG. 54B, the coil wire 1016V is wound in the tightening direction on the −V-phase teeth section 1024 and the coil wire 1016V is wound in the loosening direction on the +V-phase teeth section 1024. The coil wire 1016W is wound in the tightening direction on the +W-phase teeth section 1024 and coil wire 1016W is wound in the loosening direction on the −W-phase teeth section 1024. Moreover, as illustrated in FIG. 54C, the coil wire 1016U is wound in the tightening direction on the +U-phase teeth section 1024U and coil wire 1016U is wound in the loosening direction on the −U-phase teeth section 1024U. The coil wire 1016V is wound in the tightening direction on the +V-phase teeth section 1024V and the coil wire 1016V is wound in the loosening direction on the −V-phase teeth section 1024V.

Thus, out of the plural winding portions 1026, pairs of winding portions 1026 facing each other across central axes of the plural stator configuration sections 1012A, 1012B, 1012C are formed with the same coil wire 1016 and are formed with opposite winding directions to each other. Note that in order to prevent flow of circulating currents that occur when a parallel circuit is configured using plural coil wires 1016, preferably two circuit systems are configured without parallel circuits, or plural parallel circuits are combined such that circulating currents are not generated (so-called cancelling winding) even though parallel circuits are formed.

Out of pairs of winding portions 1026 facing each other across the central axes of the plural stator configuration sections 1012A, 1012B, 1012C, the winding portion 1026 wound in the loosening direction on the teeth section 1024 and the crossing wire 1028 between the pair of winding portions 1026 are connected together by the lead portion 1046 that leads out from the teeth sections 1024.

Figure 55:
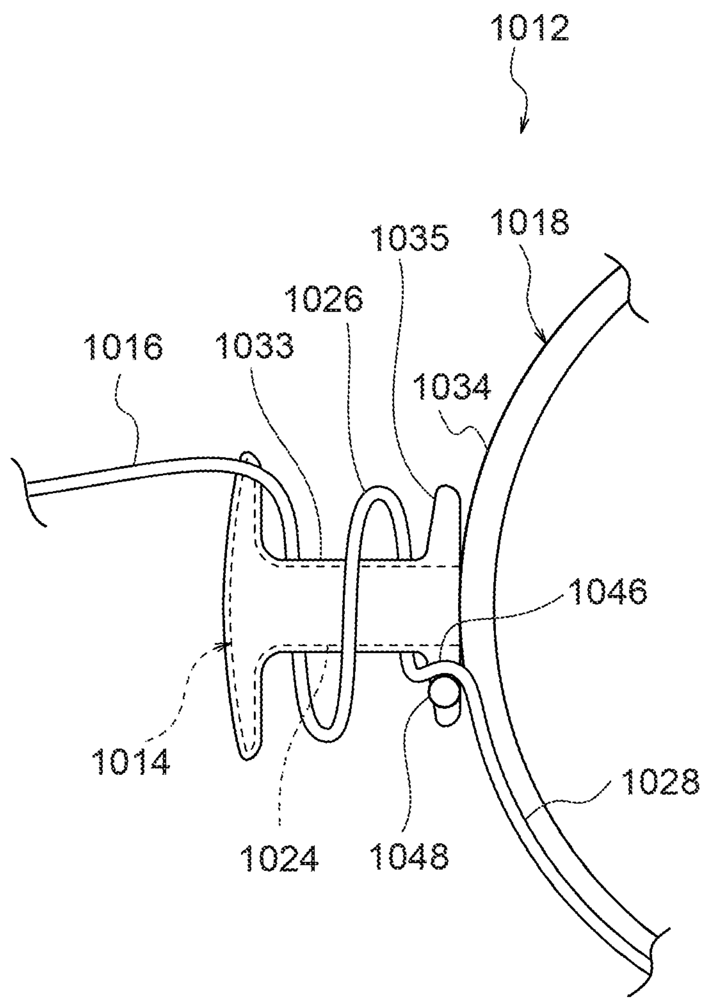
FIG. 55 is an enlarged plan view of relevant portions of the stator illustrated in FIG. 53.

Moreover, as illustrated in FIG. 55, a protrusion portion 1048 is formed to an insulator 1018, and the lead portion 1046 is anchored to the protrusion portion 1048. The insulator 1018 is formed with insulator main body portions 1033 and extension side wall portions 1035. The insulator main body portions 1033 insulate between the teeth sections 1024 integrated to the core configuration sections 1014 and the winding portions 1026. The extension side wall portions 1035 extend in an axial direction of the stator configuration section 1012 from a connection portion 1034 and connect together the insulator main body portions 1033 and the connection portion 1034. The protrusion portion 1048 is, more specifically, formed at an end portion in an extension direction of the extension side wall portions 1035 (the same direction as the stator configuration section 1012 axial direction). Out of the pairs of winding portions 1026 described above, at the winding portion 1026 wound in the loosening direction on the teeth section 1024, the lead portion 1046 is restricted from slackening by anchoring on the protrusion portion 1048.

Note that other parts of the configuration in the present exemplary embodiment, are similar to those of the eighth and ninth exemplary embodiments of the present invention.

Due to adopting such a configuration, the plural teeth sections 1024 are disposed at even intervals in each of the stator configuration sections 1012, and separation between the teeth sections 1024 is secured. The coil wires 1016 can accordingly be easily wound on the teeth sections 1024.

Moreover, the winding portions 1026 that are wound in the loosening direction on the teeth sections 1024 are restricted from slackening by anchoring the lead portions 1046 on the projection portions 1048. Slackening of the winding portions 1026 that are wound in the loosening direction onto the teeth sections 1024 can accordingly be suppressed.

Figure 53:
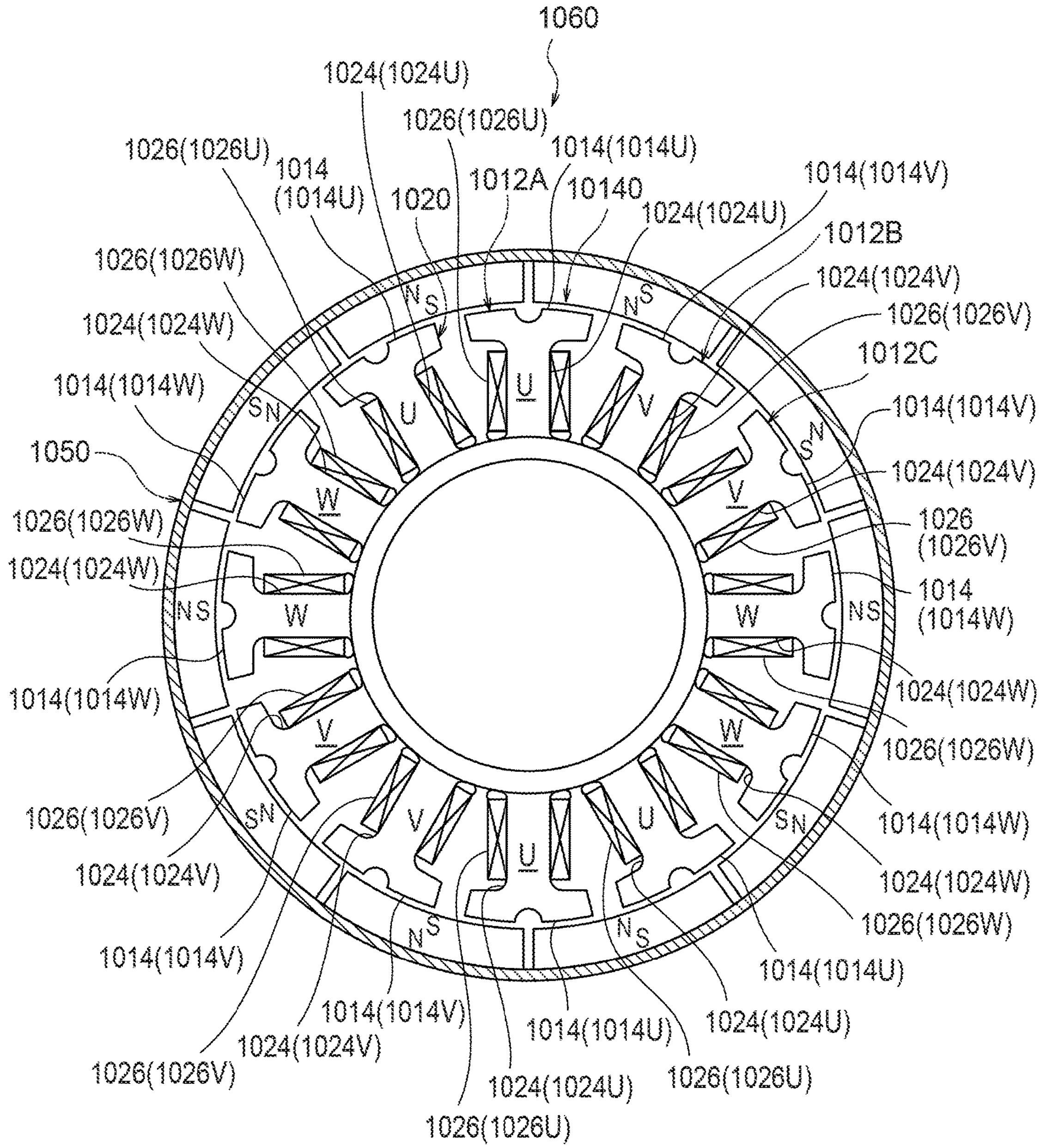
FIG. 53 is a plan view illustrating a brushless motor provided with a stator according to a tenth exemplary embodiment of the present invention.
Figure 54A:
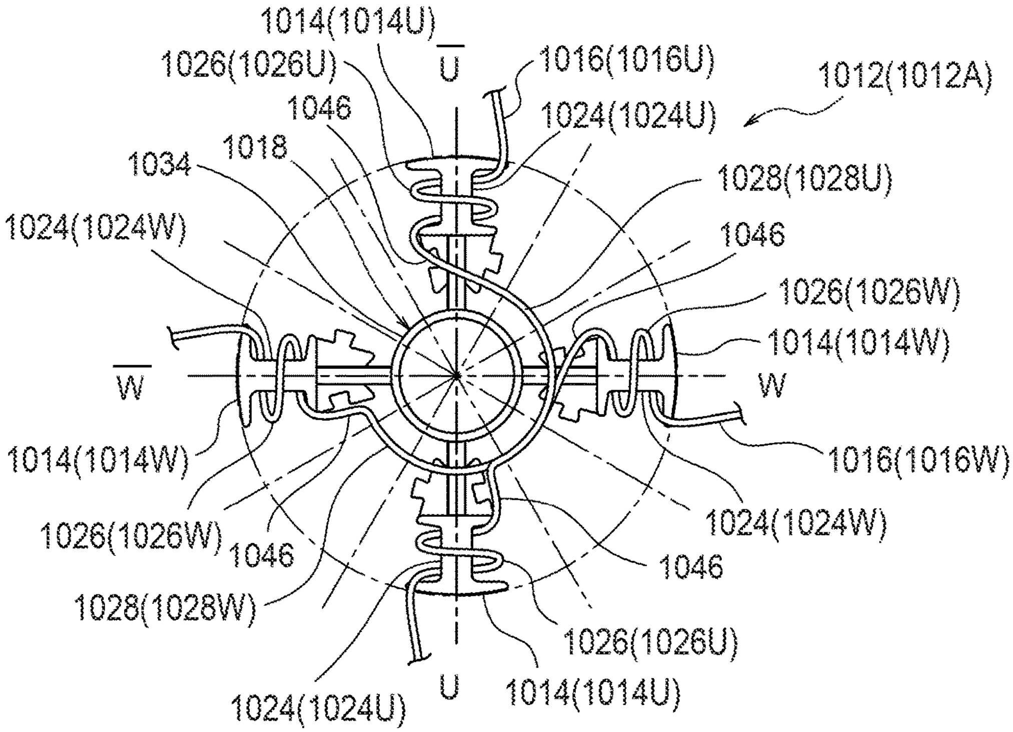
FIG. 54A is a plan view illustrating a first group stator configuration section illustrated in FIG. 53.
Figure 54B:
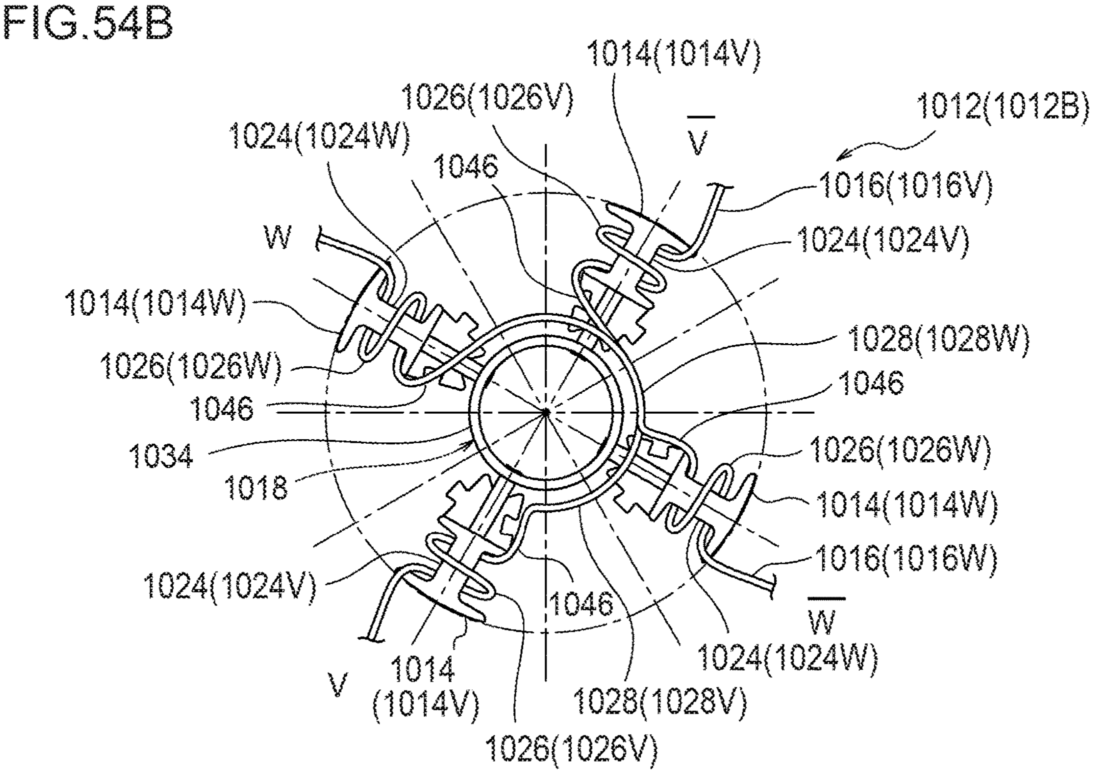
FIG. 54B is a plan view illustrating a second group stator configuration section illustrated in FIG. 53.
Figure 54C:
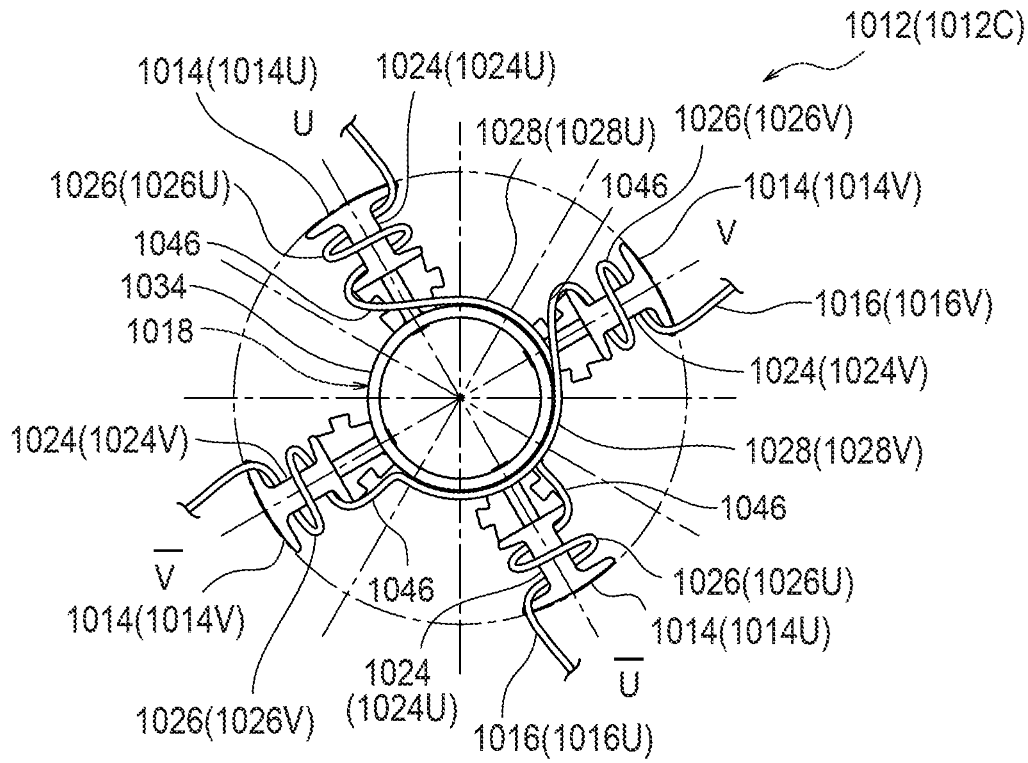
FIG. 54C is a plan view illustrating a third group stator configuration section illustrated in FIG. 53.

Note that in the present exemplary embodiment, the stator 10140 is, as illustrated in FIG. 53, employed in an outer rotor type motor, and the teeth sections 1024 project out from a yoke configuration sections 1022 towards a yoke 1040 radial direction outside. However, the stator 10140 may be employed in an inner rotor type motor, with the teeth sections 1024 configured to project out from the yoke configuration sections 1022 towards the yoke 1040 radial direction inside.

Moreover, in other modified examples thereof, it is also possible to employ modified examples similar to the those of the eighth exemplary embodiment of the present invention described above. Moreover, although the stator 10140 is as an example applied to a 10-pole, 12-slot brushless motor, application may be made to a 14-pole, 12-slot brushless motor.

Generally copper is employed as wire material for the coil wires, however aluminum coil wire is recently attracting attention in order to reduce cost. However, aluminum coil wire has inferior durability to tensional stress compared to copper coil wire, and there are concerns that coil wire may break or may have damage to insulation layers of the coil wire by using conventional complicated winding methods that are employed in high speed winding machines. However, in each of the above exemplary embodiments, even for such a relatively soft material as aluminum coil wire, the load on the coil wire is light, and it is possible to wind coil wire at high speed.

Explanation is given above of each exemplary embodiments of the present invention, however the present invention is not limited by the above, and clearly various modifications are possible in addition to those described above within a scope not departing from the spirit of the present invention.

What is claimed is:

1. A stator, comprising:

a plurality of core configuration sections each comprising a plurality of yoke configuration sections that configure a ring shaped yoke and are segmented in a yoke circumferential direction and a plurality of teeth sections that project from the respective yoke configuration sections along a radial direction of the yoke, with the plurality of yoke configuration sections and the plurality of teeth sections integrated together;

a plurality of coil wires that are wound onto the respective teeth sections to configure a plurality of winding portions;

a plurality of insulators, each including a plurality of insulator portions and a connection portion that connects together the plurality of insulator portions, the plurality of insulator portions being integrated with respective core configuration sections and insulating the teeth sections from the winding portions; and a terminal station that is provided at each of the plurality of insulators and that connects to a terminal portion of each of the plurality of coil wires, wherein the plurality of insulator portions are respectively segmented in a yoke axial direction into a first insulator portion and a second insulator portion, and wherein the plurality of teeth sections project inwardly from the respective yoke configuration sections along the radial direction of the yoke, the connection portion is located at an inner side in the yoke radial direction from the plurality of insulator portions, extension side wall portions are formed, along the yoke axial direction, further at a connection portion side with respect to the teeth sections at the respective insulator portions of the insulators, and guide grooves are formed at side portions in the yoke circumferential direction at the respective extension side wall portions such that the terminal portions of the plurality of coil wires are guided at any of the guide grooves.

2. The stator of claim 1, wherein the plurality of coil wires configure a plurality of phases.

3. The stator of claim 2, wherein:

each of the coil wires includes a plurality of crossing wires that connect together the plurality of winding portions and are laid out at the connection portion;

the plurality of connection portions are disposed with a gap between adjacent connection portions, in the yoke radial direction, a yoke axial direction, or a combination thereof; and a housing portion is formed at at least one connection portion out of the plurality of connection portions for housing a member.

4. The stator of claim 3, wherein:

each of the coil wires includes a plurality of crossing wires that connect together the plurality of winding portions and are laid out at at least one of the plurality of connection portions; and each of the connection portions includes a retaining portion that retains the plurality of crossing wires laid out at the connection portion.

5. The stator of claim 4, wherein:

the plurality of connection portions are disposed with a gap between adjacent connection portions in a yoke radial direction; and at least one of the plurality of connection portions includes a spacer that is provided between the plurality of connection portions in the yoke radial direction and that retains the plurality of connection portions in a state separated from each other in the yoke radial direction.

6. The stator of claim 5, wherein the spacer is formed in a projection shape.

7. The stator of claim 6, wherein the connection portion is positioned further to the yoke radial direction inside than the core configuration section.

8. The stator of claim 7, wherein:

the insulator portions of at least one of the plurality of insulators includes insulator main body portions, that are integrated with respective core configuration sections and insulate the teeth sections from the winding portions, and extending portions that are positioned further to the yoke radial direction inside than the core configuration sections and extend from the insulator main body portions in the yoke axial direction, the yoke radial direction, a circumferential direction, or any combination thereof; and the connection portion connects together the extending portions of the plurality of insulator portions.

9. The stator of claim 8, wherein:

the insulator portion includes a first insulator portion and a second insulator portion, the first insulator portion and the second insulator portion each including a teeth section insulator portion and a yoke configuration section insulator portion respectively covering the teeth section and the yoke configuration section.

10. The stator of claim 4 wherein:

the plurality of connection portions are disposed with a gap between adjacent connection portions in a yoke axial direction; and at least one of the plurality of connection portions includes a spacer that is provided between the plurality of connection portions in the yoke axial direction and that retains the plurality of connection portions in a state separated from each other in the yoke axial direction.

11. The stator of claim 10, wherein the plurality of connection portions are provided coaxially with respect to the yoke.

12. The stator of claim 4, wherein the retaining portion is formed in a projection shape.

13. The stator of claim 3, wherein the member is a crossing wire among the plurality of crossing wires, the crossing wire being laid out on a connection portion different from the connection portion having the housing portion.

14. The stator of claim 1, wherein:

the connection portion is positioned at the yoke radial direction inside; and a projection portion is formed at an end portion of at least one insulator portion out of the plurality of insulator portions at side opposite from a yoke side, the projection portion projecting out to the yoke side with respect to the connection portion; and the terminal station is provided at the projection portion.

15. The stator of claim 14, wherein:

an insertion groove is formed at the projection portion so as to open towards the yoke axial direction; and the terminal station is inserted into the insertion groove.

16. The stator of claim 14, wherein:

the connection portion is disposed displaced in the yoke axial direction with respect to the plurality of insulator portions; and the terminal station makes contact with a surface on the yoke side of the connection portion.

17. The stator of claim 1, wherein:

each of the plurality of coil wires includes a crossing wire that connects together the plurality of winding portions and that is laid out displaced in a yoke axial direction with respect to the insulator portion; and the terminal station is provided on the yoke axial direction opposite side to the crossing wires.

18. The stator of claim 1, further comprising a guide portion that is formed along the yoke axial direction at each of the plurality of insulators and that guides the terminal portion of each of the plurality of coil wires.

19. The stator of claim 18, wherein the guide portion is provided at a side face of the projection portion.

20. The stator of claim 1, wherein one of the plurality of yoke configuration sections is provided with a terminal station that connects to a terminal portion of each of the plurality of coil wires.

21. The stator of claim 1, wherein:

a plurality of independently formed groups of stator configuration sections are configured by assembling the plurality of core configuration sections with the respective plurality of insulators;

in each of the plurality of stator configuration section groups, the plurality of core configuration sections are disposed so as to form a gap corresponding to at least one core configuration section between adjacent core configuration sections;

the plurality of stator configuration section groups are disposed such that, in a mutually assembled state, a core configuration section of another group is disposed in each gap; and each of the plurality of coil wires is formed continuously from end-to-end and includes a crossing wire that connects together the plurality of winding portions.

22. The stator of claim 21, wherein:

out of the crossing wires, at least one of the crossing wires connected to a winding start end portion of the winding portion and one of the crossing wires connected to a winding finish end portion of the winding portion cross over at a connection vicinity between the connection portion and the insulator portion.

23. The stator of claim 22, wherein:

each of the insulator portions includes an insulator main body portion, that is integrated with the core configuration section and insulates the teeth section from the winding portion, and an extending portion that connects together the insulator main body portion and the connection portion; and a radial direction extension portion is formed at the extending portion so as to extend, in a radial direction of the stator configuration section, from the connection portion; and an intersection portion between the crossing wire connected to the winding start end portion of the winding portion and the crossing wire connected to the winding finish end portion of the winding portion is disposed at a position that overlaps with the radial direction extension portion as viewed along the stator configuration section axial direction.

24. The stator of claim 22, wherein:

each of the insulator portions includes an insulator main body portion, that is integrated with the core configuration section and insulates the teeth section from the winding portion, and an extending portion that connects together the insulator main body portion and the connection portion; and an axial direction extension portion is formed at the extending portion so as to extend, in an axial direction of the stator configuration section, from the connection portion; and an intersection portion between the crossing wire connected to the winding start end portion of the winding portion and the crossing wire connected to the winding finish end portion of the winding portion is disposed at a position that overlaps with the axial direction extension portion as viewed along the stator configuration section radial direction.

25. A brushless motor comprising:

the stator according to claim 21; and a rotor that rotates in a rotational magnetic field generated by the stator.

26. The stator of claim 1, wherein the teeth section projects from the yoke configuration section towards the yoke radial direction inside.

27. The stator of claim 26, wherein:

the insulator portion includes an extension side wall portion that extends along an axial direction of the stator configuration section; and in each of the plurality of stator configuration section groups, with respect to an imaginary line extending in a tangential direction to the stator configuration section so as to pass through the extension side wall portion, an end, in the circumferential direction of the yoke configuration section, of a first core configuration section is positioned so as to be on the opposite side from a second core configuration section disposed adjacent to the first core configuration section with the imaginary line being positioned between the first and second core configuration sections.

28. A brushless motor comprising:

the stator according to claim 1; and a rotor that rotates in a rotational magnetic field generated by the stator.

29. The stator of claim 1, further comprising a second connection portion that is separated in a stator core axial direction from the connection portion, that is formed at at least one insulator out of the plurality of insulators, and that connects together the plurality of insulator portions of the at least one insulator.

30. The stator of claim 29, wherein:

the connection portion is disposed at a first side in the stator core axial direction;

the second connection portion is formed at the insulator positioned furthest to a second side in the stator core axial direction out of the plurality of insulators when the plurality of insulators are in a pre-assembly state arranged along the stator core axial direction.

31. The stator of claim 29, wherein:

the plurality of connection portions are disposed coaxially to each other and have different external diameters to each other; and the second connection portion is formed to the insulator with the connection portion of the smallest external diameter out of the plurality of insulators.

32. The stator of claim 31, wherein:

the second connection portion connects together a plurality of the extending portions of one of the insulators.

33. The stator of claim 32, wherein the plurality of insulators have an interlocking structure for positioning with respect to each other, the interlocking structure comprising:

a fitting portion formed at the second connection portion; and a fitted-to portion that fits together with the fitting portion and is formed to an insulator portion positioned between a pair of insulator portions connected by the second connection portion out of the plurality of insulator portions.

34. The stator of claim 33, wherein:

the insulator portion includes a first insulator portion and a second insulator portion segmented in the stator core axial direction;

the connection portion connects together the plurality of first insulator portions of each of the insulators; and the second connection portion connects together the plurality of first insulator portions in one of the insulators.

35. The stator of claim 33, wherein:

the insulator portion includes a first insulator portion and a second insulator portion segmented in the stator core axial direction;

the connection portion connects together the plurality of first insulator portions of each of the insulators; and the second connection portion connects together a plurality of the second insulator portions in one of the insulators.

36. A brushless motor comprising:

the stator according to claim 29; and a rotor that rotates in a rotational magnetic field generated by the stator.

37. The stator of claim 1, wherein:

the insulators have an interlocking structure for positioning with respect to each other;

the core configuration member includes a teeth section extending along the stator core radial direction and a yoke configuration section formed to a leading end portion of the teeth section;

the plurality of insulator portions each includes a yoke configuration section insulator portion that covers the yoke configuration section; and the interlocking structure comprises a fitting portion formed to a first of adjacent of the yoke configuration section insulator portions, and a fitted-to portion that fits together with the fitting portion and is formed to a second of the adjacent yoke configuration section insulator portions.

38. The stator of claim 1, further comprising an interlocking structure that fixes the plurality of connection portions together.

39. A manufacturing method for a stator of claim 1, the stator manufacturing method comprising:

a sub-assembly forming process in which the core configuration sections are integrated to the insulator portions of each of the insulators to form a sub-assembly for each of a plurality of groups;

a stator configuration section forming process in which the stator configuration sections are formed for each of the plurality of groups by winding the coil wire on each of the teeth sections of each of the sub-assemblies from a radial direction outside of the stator configuration section using a coil wire winding machine; and a stator forming process that forms a stator by assembling the plurality of stator configuration sections together.

40. The stator manufacturing method of claim 39, further comprising, between the stator configuration section forming process and the stator forming process, a compression process that presses and compression deforms the winding portions in each of the plurality of stator configuration section groups.

41. The stator manufacturing method of claim 40, wherein in the compression process the winding portions are pressed from a direction orthogonal to a teeth section axial direction.

42. The stator manufacturing method of claim 40, wherein in the compression process the winding portions are pressed from both sides of a direction orthogonal to the teeth section axial direction.

43. The stator manufacturing method of claim 40, wherein in the compression process the winding portions are pressed such that the pressing direction on the winding portions is a tangential direction to the respective stator configuration section.

* * * * *